(12) United States Patent
Mikuni et al.

(10) Patent No.: US 7,907,297 B2
(45) Date of Patent: Mar. 15, 2011

(54) IMAGE CAPTURE APPARATUS CAPABLE OF COMMUNICATING WIRELESSLY AND REDUCING POWER CONSUMPTION, AND METHOD FOR CONTROLLING THE SAME

(75) Inventors: Makoto Mikuni, Kanagawa (JP); Michihiro Izumi, Chiba (JP); Yoshiyuki Hirai, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1236 days.

(21) Appl. No.: 10/874,387

(22) Filed: Jun. 24, 2004

(65) Prior Publication Data

US 2004/0233475 A1 Nov. 25, 2004

Related U.S. Application Data

(62) Division of application No. 09/903,675, filed on Jul. 13, 2001, now Pat. No. 6,785,748.

(30) Foreign Application Priority Data

Jul. 18, 2000 (JP) .................................. 2000-217843

(51) Int. Cl.
*G06F 3/12* (2006.01)
(52) U.S. Cl. ...................... 358/1.15; 358/1.16; 358/1.17; 358/400; 358/405; 358/406
(58) Field of Classification Search ................ 358/1.15, 358/1.16, 1.17, 400, 405, 406
See application file for complete search history.

(56) References Cited

U.S. PATENT DOCUMENTS

| | | | | |
|---|---|---|---|---|
| 4,837,812 A * | 6/1989 | Takahashi et al. | ......... | 379/93.07 |
| 5,287,194 A * | 2/1994 | Lobiondo | ................... | 358/296 |
| 5,392,132 A | 2/1995 | Yamamoto et al. | ......... | 358/407 |
| 5,418,630 A | 5/1995 | Mori et al. | ..................... | 358/472 |
| 5,560,021 A * | 9/1996 | Vook et al. | ..................... | 713/323 |
| 5,689,755 A * | 11/1997 | Ataka | ............................... | 399/8 |
| 5,729,667 A * | 3/1998 | Lee | ............................... | 358/1.14 |

(Continued)

FOREIGN PATENT DOCUMENTS

EP 1175081 A2 * 1/2002

(Continued)

OTHER PUBLICATIONS

European Search Report dated Jan. 29, 2007, issued in counterpart application.

(Continued)

*Primary Examiner* — David K Moore
*Assistant Examiner* — Benjamin O Dulaney
(74) *Attorney, Agent, or Firm* — Fitzpatrick, Cella, Harper & Scinto

(57) ABSTRACT

A wireless mode between a scanner and an image communication apparatus is changed, in response to completion of image transmission from the scanner to the image communication apparatus, completion of print of the image sent from the scanner to the image communication apparatus, completion of transmission via a communication line connected to the image communication apparatus of the image sent from the scanner to the image communication apparatus, instructions to stop print of the image sent from the scanner to the image communication apparatus, instructions to stop transmission via the communication line connected to the image communication apparatus of the image sent from the scanner to the image communication apparatus, and states of the scanner and the image communication apparatus at a predetermined time and so on. For example, a low power consumption mode and communication mode of Bluetooth communication are switched to each other.

4 Claims, 72 Drawing Sheets

U.S. PATENT DOCUMENTS

| | | | |
|---|---|---|---|
| 5,758,040 A * | 5/1998 | Ichimura et al. | 358/1.14 |
| 5,764,864 A * | 6/1998 | Sujita | 358/1.14 |
| 6,067,168 A * | 5/2000 | Nishiyama et al. | 358/1.16 |
| 6,072,599 A * | 6/2000 | Oba et al. | 358/444 |
| 6,141,112 A * | 10/2000 | Nishiyama et al. | 358/1.16 |
| 6,459,896 B1 * | 10/2002 | Liebenow | 455/425 |
| 6,883,016 B1 * | 4/2005 | Fujii et al. | 709/203 |
| 7,110,791 B2 * | 9/2006 | Izumi | 455/557 |
| 7,310,158 B2 * | 12/2007 | Nakao et al. | 358/1.14 |
| 7,419,100 B2 * | 9/2008 | Groeneboer et al. | 235/472.01 |
| 2002/0025835 A1 * | 2/2002 | Izumi | 455/557 |
| 2002/0034965 A1 * | 3/2002 | Hirai et al. | 455/557 |
| 2002/0039194 A1 * | 4/2002 | Nakao et al. | 358/1.14 |
| 2002/0075508 A1 * | 6/2002 | Luman | 358/1.15 |
| 2002/0196478 A1 * | 12/2002 | Struble | 358/474 |
| 2003/0132298 A1 | 7/2003 | Swartz et al. | 235/472.02 |
| 2003/0218769 A1 * | 11/2003 | Otsuka | 358/1.14 |
| 2004/0109192 A1 * | 6/2004 | Nuttall et al. | 358/1.14 |
| 2004/0184096 A1 * | 9/2004 | Choi | 358/1.15 |
| 2004/0190060 A1 * | 9/2004 | Funakawa et al. | 358/1.16 |
| 2005/0078337 A1 * | 4/2005 | Ichikawa et al. | 358/1.15 |
| 2005/0179930 A1 * | 8/2005 | Doi et al. | 358/1.14 |
| 2007/0201076 A1 * | 8/2007 | Ishida | 358/1.14 |

FOREIGN PATENT DOCUMENTS

| | | | |
|---|---|---|---|
| EP | 1187447 A1 * | 3/2002 | |
| EP | 1372332 A2 * | 12/2003 | |
| GB | 2 333 932 A | 8/1999 | |
| JP | 04175061 A * | 6/1992 | |
| JP | 2001251470 A * | 9/2001 | |
| JP | 2004112166 A * | 4/2004 | |

OTHER PUBLICATIONS

Haartsen, J., "Bluetooth—The universal radio interface forad *hoc*, wireless connectivity" Ericsson Review, Ericsson, Stockholm, SE, No. 3, 1998, pp. 110-117.

Spaker, R. "Bluetooth Basics", Embedded Systems Programming, Miller Freeman, San Francisco, CA, vol. 13, No. 7, Jul. 2000, pp. 57-58, 60, 62, 64, 66, 68, 70, 72.

Patent Abstracts of Japan, vol. 1999, No. 14, Dec. 22, 1999 (JP 11 252329 A).

Patent Abstracts of Japan, vol. 017, No. 317 (E-1382), Jun. 16, 1993 (JP 05 030248 A).

* cited by examiner

108: OPERATION UNIT

FS1: FACSIMILE APPARATUS

430: CORDLESS HAND SCANNER

470: CORDLESS HAND SCANNER

OPERATION FOR TRANSITION OF HAND SCANNER 430 TO Park Mode OF HAND SCANNER 430

INITIALIZATION OPERATION OF MAIN PART B

EXAMPLE OF PACKET (2)

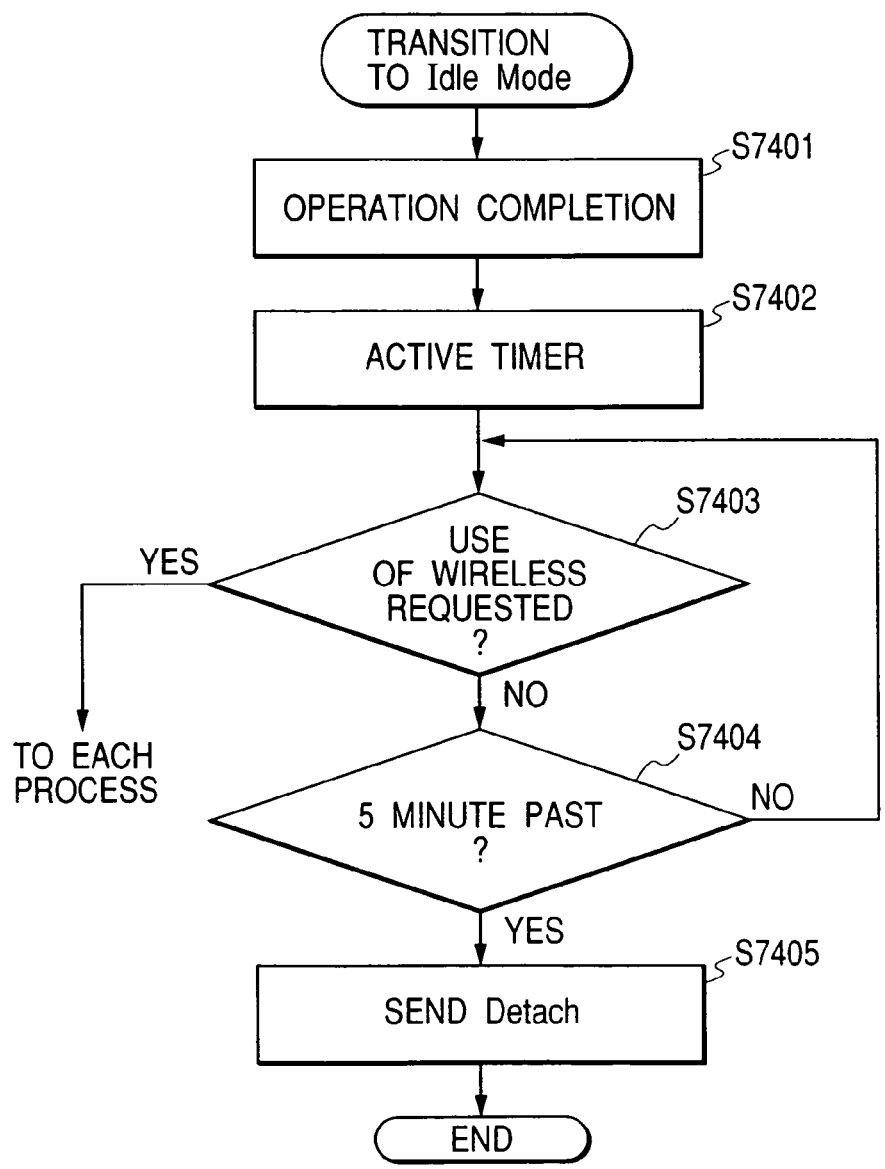

IMAGE CAPTURE APPARATUS CAPABLE OF COMMUNICATING WIRELESSLY AND REDUCING POWER CONSUMPTION, AND METHOD FOR CONTROLLING THE SAME

RELATED APPLICATION

This application is a division of application Ser. No. 09/903,675, filed on Jul. 13, 2001, the entire disclosure of which is incorporated herein by reference.

BACKGROUND OF THE INVENTION

Field of the Invention

The present invention relates to an image capture apparatus that can be connected wirelessly to other apparatuses and a method for controlling the same.

For the above described prior art, the facsimile apparatus is simply connected to the scanner by wireless, in which the facsimile apparatus and the scanner are always connected in a one-to-one relationship, and data can be sent at any time from the scanner to the facsimile apparatus by the operation of the facsimile apparatus. In other words, consideration is not given at all to power consumption of a battery when the scanner is driven on the battery.

Therefore, for the above described prior art, impractically power consumption increases and scanner's driving time is shortened.

Also, it is not assumed that communication is performed with any terminal of a plurality of terminals, like Bluetooth or the like that has been disseminated rapidly in recent years, and so on. Also, methods of using the function of Bluetooth efficiently have not been studied yet.

Also, conventionally, a wireless connection cannot be made from the scanner apparatus when the scanner apparatus and the facsimile apparatus are connected by wireless with infrared communication such as IrDA and used. Therefore, inconveniently an operator of the facsimile apparatus must make a wireless connection, and issue a command to the scanner apparatus after ensuring that the connection has been made.

The above-described problems occur not only in the case of wireless connection between a facsimile apparatus and a scanner, but also in the case where an image input/output apparatus such as a scanner and printer and an information processing apparatus such as a PC are connected wirelessly, and further in the case where an image input apparatus (or an image capture apparatus) such as a scanner and a camera are connected to an image output apparatus such as a printer wirelessly.

SUMMARY OF THE INVENTION

An object of the present invention is to reduce power consumption when an image capture apparatus such as a scanner is wirelessly connected to another apparatus.

Also, another object of the present invention is effectively to use a frequency resource when an image capture apparatus such as a scanner is wirelessly connected to another apparatus.

Also, another object of the present invention is to prevent interference with communication with another apparatus when an image capture apparatus such as a scanner is wirelessly connected to another apparatus.

Also, another object of the present invention is to efficiently use functions based on the Bluetooth specification.

Also, another object of the present invention is to change wireless modes in optimum timing.

Also, another object of the present invention will be apparent from the following examples and drawings.

BRIEF DESCRIPTION OF THE DRAWINGS

FIG. 74 is a flowchart showing an operation between the facsimile apparatus and the hand scanner in the embodiment of the present invention.

DETAILED DESCRIPTION OF THE PREFERRED EMBODIMENTS

First Embodiment

Figure 1:
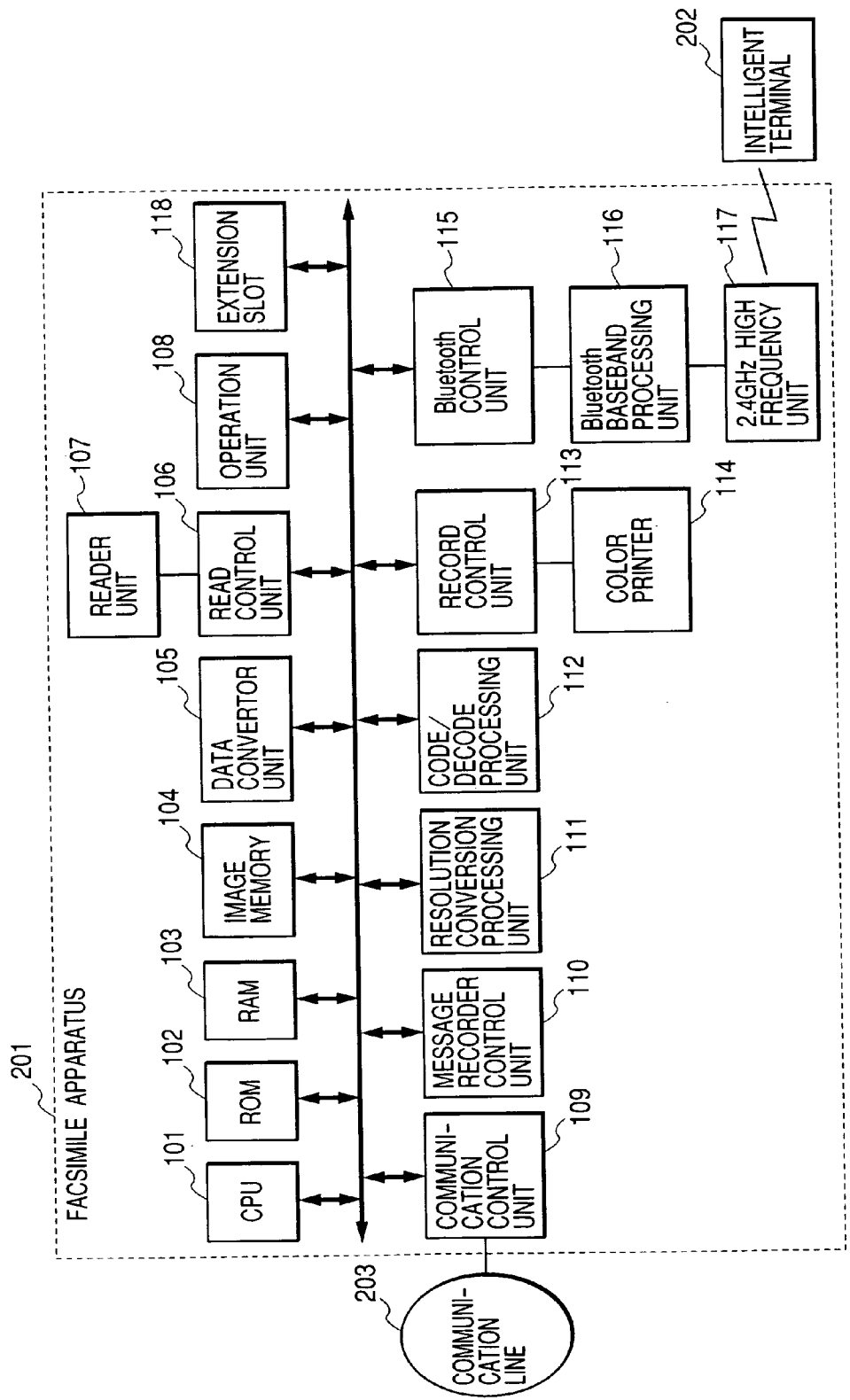
FIG. 1 is a block diagram showing a facsimile apparatus 201 in the embodiment of the present invention.

FIG. 1 is a block diagram showing a facsimile apparatus 201 being one embodiment of the present invention.

The facsimile apparatus 201 is one example of image formation apparatuses.

In the facsimile apparatus 201, a CPU 101 is a system control unit, which controls the entire facsimile apparatus 201. A ROM 102 stores a control program of the CPU 101, an operating system (OS) program, etc. RAM 103 is constituted by a SRAM, etc. and stores program control variables, etc. Also, set values, management data for apparatuses and the like registered by the operator and various kinds of work buffers are also stored in the RAM 103. An image memory 104 is constituted by a DRAM, etc., and accumulates therein image data.

In the above described embodiment, for each control program stored in the ROM 102, software control of scheduling, task switch and the like is performed under the management of the OS (operating system) stored in the ROM 102. An operation unit 108 is constituted by various kinds of keys, LEDs, LCDs, etc. and is to perform various input operations by the operator, display of operation states of the image formation apparatus and the like.

A read control unit 106 reads an original optically by a CS image sensor (contact type image sensor) in a reader unit 107, and subjects image signals converted into electrical image data to various kinds of image processing such as binarization process and intermediation process by an image processing control unit to output image data of high definition. Furthermore, the read control unit 106 in the above described embodiment corresponds to both of sheet read control in which the original is read while it is transported and book read control in which the original put on an original glass is scanned.

In a record control unit 113, image data to be recorded in a color printer 114 such as a laser beam printer and an inkjet printer is subjected to a various kinds of image processing such as smoothing processing and record density correction processing and color correction by the image processing control unit to convert the image data into image data of high definition and output the same to the color printer.

A communication control unit 109 is constituted by a MODEM (modulator/demodulator), a NCU (network control unit), etc. The communication control unit 109 in the above described embodiment is connected to an analog communication line (PSTN) 203, and performs communication control in T30 protocol, and line control of call-out and call-in, etc. for the communication line. Also, a message recorder control unit 110 is constituted by a voice IC, a voice record play back control unit, etc., and provides a phone answering function.

A code/decode processing unit 112 performs code/decode processing and scaling processing for image data treated by the image formation apparatus. Also, a resolution conversion processing unit 111 performs resolution conversion processing such as millimeter-inch resolution conversion of image data. Furthermore, scaling processing for image data can be performed also in the resolution conversion unit 111. In addition, a data conversion unit 105 performs conversion of image data such as analysis of page description language (PDL), etc. and CG development of character data.

A Bluetooth control unit 115 performs communication control of Bluetooth, performs protocol control in accordance with the specification of Bluetooth, and converts a command from a Bluetooth control task of the CPU into a packet to send the same to a Bluetooth baseband processing unit 116, and in contrast thereto, sends a packet as a command from the Bluetooth baseband processing unit 116 to the CPU.

The Bluetooth baseband processing unit 116 performs frequency hopping processing of Bluetooth and processing of assembly/decomposition of frames. Also, a 2.4 GHz high frequency unit 117 is provided therein for sending and receiving radio waves.

An extension slot 118 is a slot for inserting option boards in the facsimile apparatus 201 as the image formation apparatus, and allows a various kinds of option boards such as a extended image memory, a SCSI interface board and a video interface board to be mounted.

Figure 2:
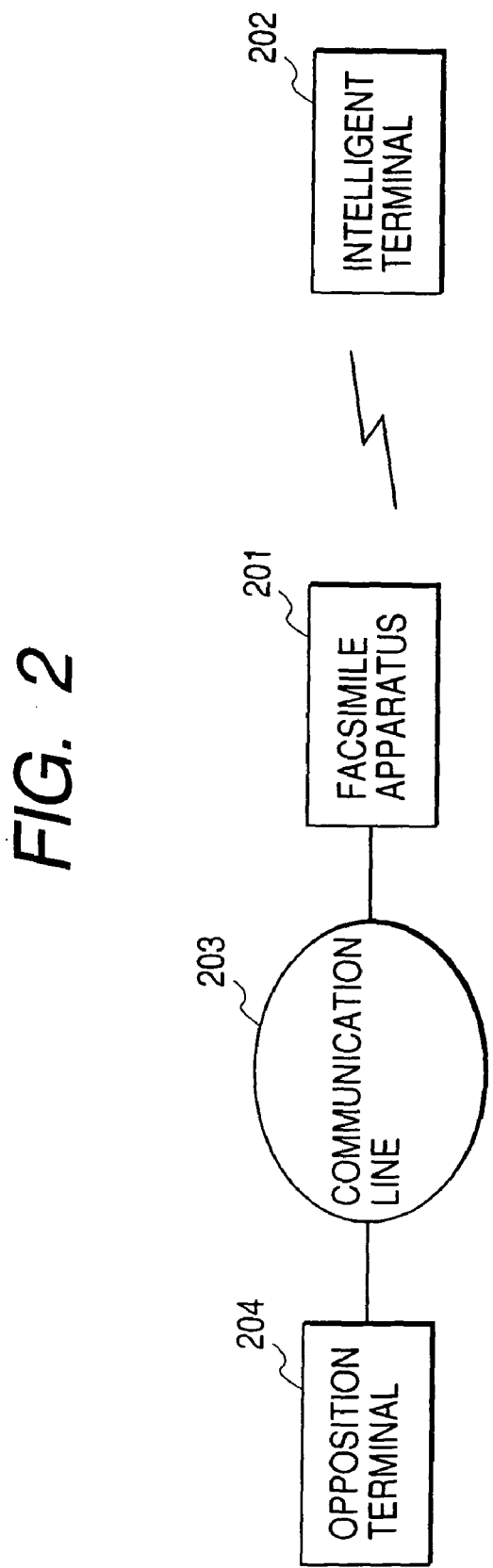
FIG. 2 shows a system configuration in the embodiment of the present invention.

FIG. 2 shows a system configuration of the above described embodiment.

In this system, the facsimile apparatus 201, an intelligent terminal 202 such as a PC (personal computer), a communication line 203 such as a PSTN and an opposition terminal 204 are provided.

The facsimile apparatus 201, which is connected to the communication line 203, can perform facsimile communication, and can also be connected to the intelligent terminal 202 wirelessly. Also, in the above described embodiment, since the wireless part is defined as Bluetooth, the sending and receiving of images and the exchange of data and programs with the intelligent terminal 202 can be performed if a unit for Bluetooth communication is included in the intelligent terminal 202, or the unit for Bluetooth communication is connected to the intelligent terminal 202.

In addition, in the above described embodiment, for example, the image formation apparatus such as a multifunction apparatus having scanner and printer functions may be provided in place of the facsimile apparatus 201, or another image formation apparatus such as an E-MAIL terminal having scanner and printer functions may be provided.

Figure 3:
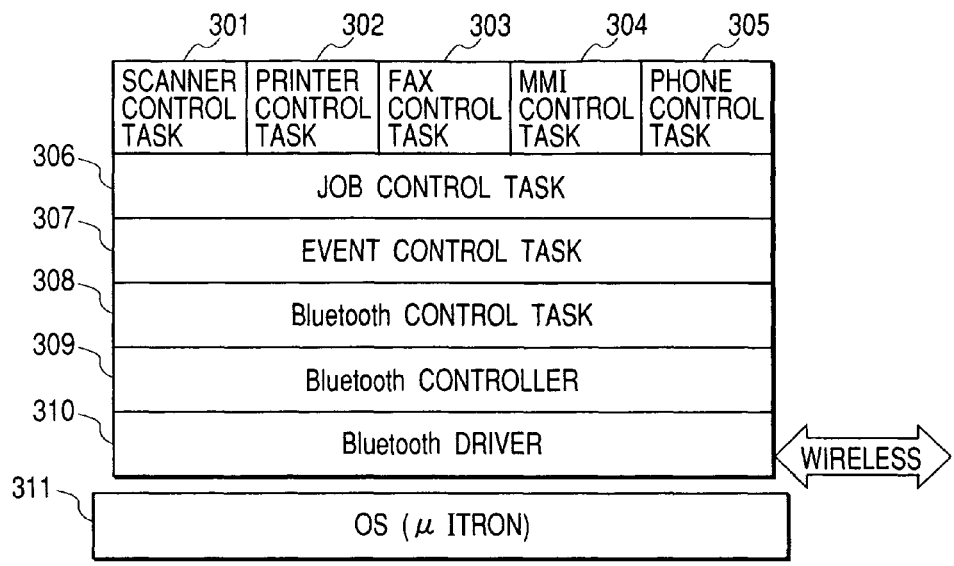
FIG. 3 shows a software hierarchy in the facsimile apparatus 201 in the embodiment of the present invention.

FIG. 3 is a software hierarchy in the facsimile apparatus 201.

A scanner control task 301, a printer control task 302, a facsimile control task 303, an MMI (man/machine interface) control task 304 and a phone control task 305 are control tasks of the top layer of the facsimile apparatus 201, and perform device control and control of user operation ports of the facsimile.

A job control task 306 analyzes and allocates jobs from an event control task 307 representing a lower layer for queuing them in the above described control tasks of the top layer.

The event control task 307 analyzes an event received from the lower Bluetooth control task for queuing commands for corresponding to control tasks.

In a Bluetooth control task 308, when information to be sent to the intelligent terminal 202 is received from the upper event control task 307, the information is passed to a lower Bluetooth controller 309.

Also, when information to be sent to an upper layer is received from the lower Bluetooth controller 309, the information is passed to the upper event control task 307. In this way, an operation mode in which the Bluetooth control task 308 passes information to the lower Bluetooth controller 309 when receiving the information from the upper event control task 307, and it passes information to the upper event control task 307 when receiving the information from the lower Bluetooth controller 309 is hereinafter referred to as a command though mode.

Also, in the Bluetooth control task 308, even when information to be sent to the intelligent terminal 202 is received from the upper event control task 307, if it is determined by this task's own determination that the response is given back to the upper layer immediately, the response can be given back to the upper layer without passing the information to the lower layer. This operation mode is hereinafter referred to as a command return mode.

Information received from the upper layer of the Bluetooth controller 309, with respect to the Bluetooth controller 309 and a Bluetooth driver 310, is treated as wireless information to form an air interface, in accordance with the generic access profile of the Bluetooth and its lower concept that is the serial port profile.

An OS 311 is an embedded type operating system of the facsimile apparatus 201, and performs task switching, event management and memory management for the above described software hierarchy for use in this embodiment.

Figure 4:
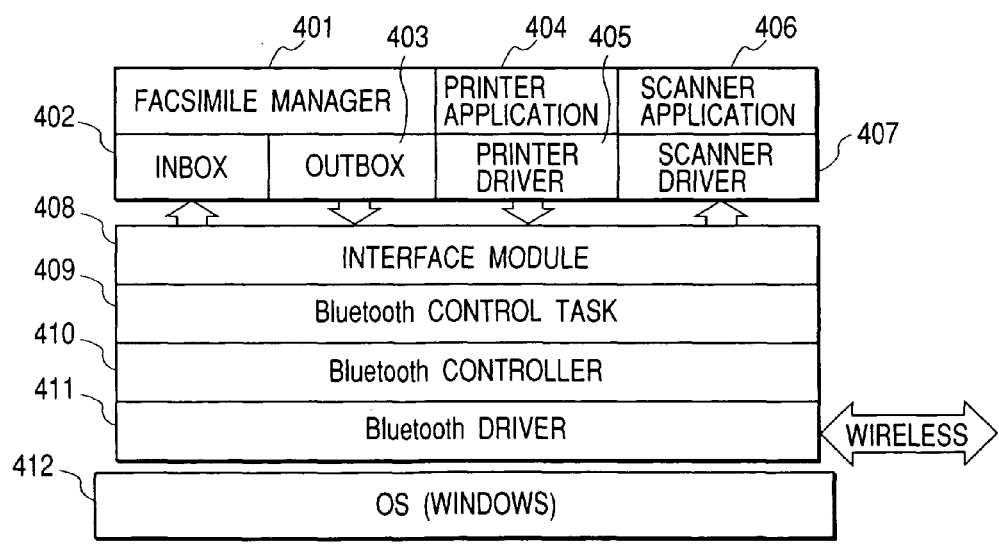
FIG. 4 shows a software hierarchy in an intelligent terminal 202 in the embodiment of the present invention.

FIG. 4 shows a software hierarchy being an embodiment in the intelligent terminal 202.

By way of an interface module 408, a Bluetooth control task 409, a Bluetooth controller 410 and a Bluetooth driver 411, the operation structure between the intelligent terminal 202 and the facsimile apparatus 201 is shown.

For control information between the intelligent terminal 202 and the facsimile apparatus 201, the interface module 408 controls exchange of information of a facsimile manager 401, a printer application 404, a scanner application 406, etc. in the upper layer via an inbox 402, an outbox 403, a printer driver 405 and a scanner driver 407, as exchange of information between the intelligent terminal 202 and the facsimile apparatus 201.

Regardless of whether the control is performed by the facsimile manager 410 or by one of the drivers, the interface module 408 manages transfer of facsimile images to be sent, images to be scanned, etc. read of facsimile received images and transfer of images to be printed.

In a Bluetooth control task 409, when information to be sent to the facsimile apparatus 201 is received from the interface module 408, the information is passed to the lower Bluetooth controller 410. Also, when information to be sent to the interface module 408 is received from the lower Bluetooth controller 410, the information is passed to the interface module 408. This operation mode is hereinafter referred to as a command though mode.

Also, in the Bluetooth control task 409, even when information to be sent to the facsimile apparatus 201 is received from the upper interface module, if it is determined by this task's own determination that the response is given back to the upper layer immediately, the response can be given back to the upper layer without passing the information to the lower layer, and this operation mode is hereinafter referred to as the command return mode.

Information received from the upper layer of the Bluetooth controller 410, with respect to the Bluetooth controller 410 and a Bluetooth driver 411, is treated as wireless information to form an air interface, in accordance with the generic access profile of the Bluetooth and its lower concept that is the serial port profile.

An OS 412 is an operating system in the intelligent terminal 202 and receives services of control of MMI and applications on the intelligent terminal 202, in a fundamental part of the service of control of the above described hierarchy MMI and applications for use in the above described embodiment.

Figure 5:
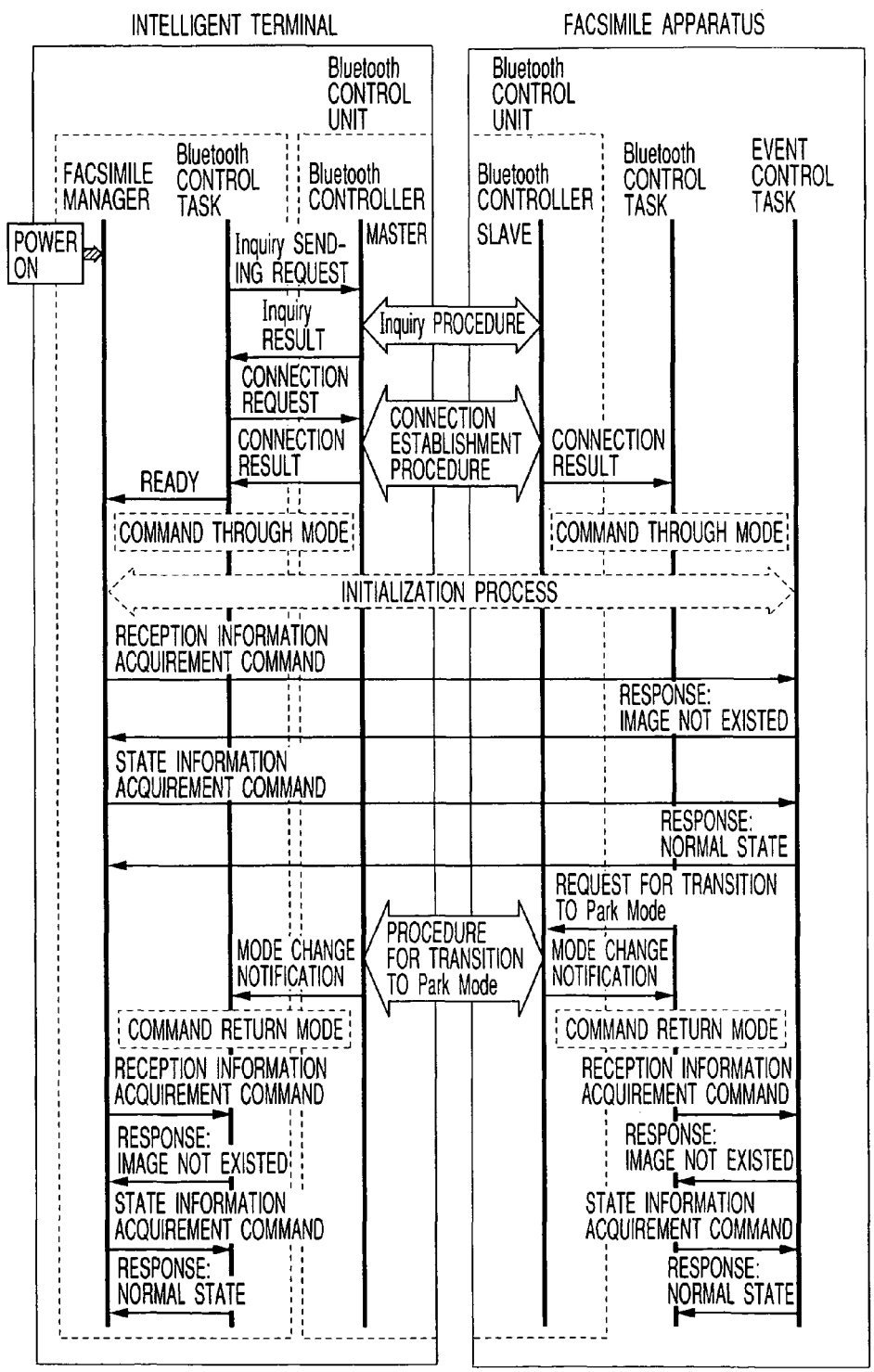
FIG. 5 shows an operation when the facsimile apparatus 201 and the intelligent terminal 202 are started up in the embodiment of the present invention.

FIG. 5 shows an operation at the start up of the above described embodiment, showing an initialization process for the facsimile apparatus 201 and a process until transmission to a stand-by state, when the power of the intelligent terminal 202 is turned on.

Assume that the power of the facsimile apparatus 201 is already turned on at this time.

When the power of the intelligent terminal 202 is turned on, the facsimile manager 401 corresponding to Bluetooth is started to perform processing to make connections with the facsimile apparatus 201.

To ensure that the facsimile apparatus 201 with which a connection is made can perform communication, the Bluetooth control task 409 sends an inquiry sending request to the Bluetooth controller 410. At this time, class of device information in an inquiry command is sent as a serial communication terminal. When receiving the inquiry sending request, the Bluetooth controller 410 carries out an inquiry procedure in accordance with a Bluetooth connection procedure, and notifies the Bluetooth control task 409 of the result thereof (inquiry result).

When receiving the inquiry result, the Bluetooth control task 409 determines from the contents whether or not a connection with the facsimile apparatus 201 can be made, and if it is determined that the connection can be made, it designates an address of the facsimile apparatus 201 and makes a connection request to the Bluetooth controller 410. If the connection is unsuccessful or the facsimile apparatus with which a connection is made is not found, from the contents of the inquiry result, a message showing that fact is displayed on a display unit of the intelligent terminal 202.

When receiving the connection request, the Bluetooth controller 410 establishes a connection using the serial port profile and forms a Piconet, based on the Bluetooth controller 309 of the facsimile apparatus 201 and the specification of Bluetooth.

When the connection is established, notification of the result is provided to the Bluetooth control task 409. When detecting the fact that the connection with the facsimile apparatus 201 could be established from the result of the connection, the Bluetooth control task 409 transmits a ready signal to the facsimile manager 401, and transits the state to the through mode in which the command from the facsimile manager 401 is directly passed to the Bluetooth controller 410.

Also, when receiving a massage showing the fact that establishment of the connection ended in failure from the result of the connection, the Bluetooth control task 409 displays the fact on the display unit of the intelligent terminal 202.

The Bluetooth controller 309 of the facsimile apparatus 201 notifies the Bluetooth control task 308 of the result of the procedure of establishment of the connection with the intelligent terminal 202. When ensuring from the result of the connection establishment that the connection has been established, the Bluetooth control task 308 enters the command through mode to wait for the command from the intelligent terminal 202 in order to pass the command from the intelligent terminal 202 directly to the event control task 307. If connection is unsuccessful, the Bluetooth control task 308 is a wait state until the connection is established.

When receiving the ready signal from the Bluetooth control task 409, the facsimile manager 401 sends to the Bluetooth control task 409 a command to transfer data such as dates of the intelligent terminal 202 and names registered in the facsimile manager 401 to the facsimile apparatus 201.

The Bluetooth control task 409 transfers the received command directly to the Bluetooth controller 410, and the Bluetooth controller 410 transfers it to the facsimile apparatus 201 using the serial port profile.

The Bluetooth controller 309 of the facsimile apparatus 201 sends to the Bluetooth control task 308 the command sent from the intelligent terminal 202 and the Bluetooth control task 308 passes the command directly to the event control task 307. The event control task 307 analyzes the received command and sends the result thereof to the Bluetooth control task 308.

When the initialization process is ended, the facsimile manager 401 issues a reception information acquirement command to check whether or not the facsimile apparatus 201 has a received image. The event control task 307, which receives the reception information acquirement command, searches an image management record stored in the RAM 103 as to whether or not the received image exists.

If the received image is present, a response of "image existed" is given back to the reception information acquirement command issued by the Bluetooth control task 308, and if the received image does not exist, a response of "image not existed" is given back.

Figure 6:
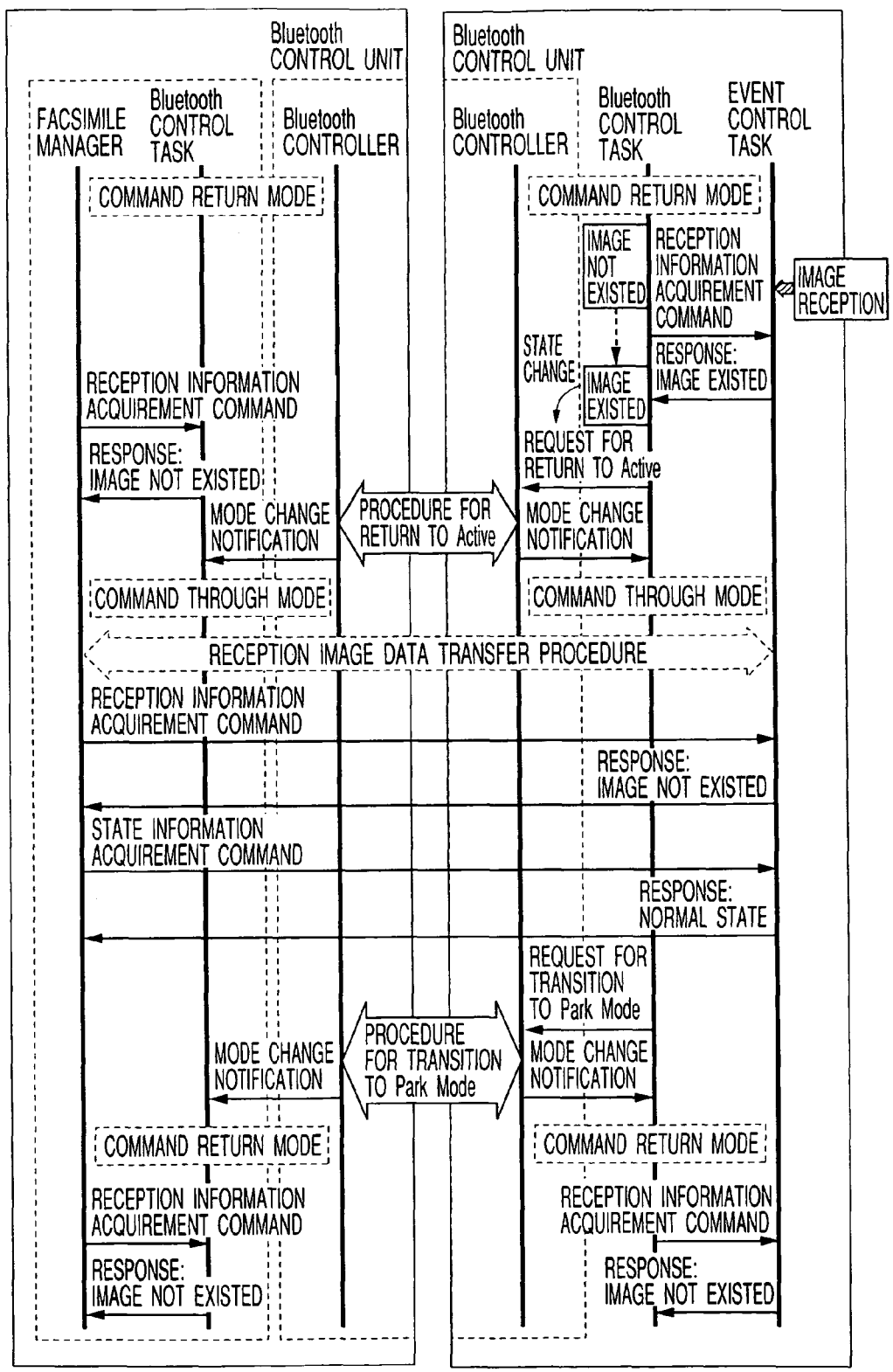
FIG. 6 shows a communication operation when an image is transferred by facsimile apparatus 201 and the intelligent terminal 202 in the embodiment of the present invention.

When the facsimile manager 401 determines by the response of the reception information acquirement command that the image exists, it performs received image transfer processing in accordance with the process in FIG. 6.

If the image does not exist, the facsimile manager 401 issues a state information acquirement command to have the state of the facsimile apparatus 201 stored. The event control task 307, which receives the state information acquirement command, checks states as to the facsimile apparatus 201, such as the state of the printer, the state of the scanner and the state of the memory, and gives back the results.

If the facsimile manager 401 determines from the response of the state information acquirement command that the state of error is found, it displays a message showing the state of error on the display unit of the intelligent terminal 202 and issues periodically the reception information acquirement command and the state information acquirement command to the event control task 307 until the error is corrected.

If the received image does not exist, and the state of the facsimile apparatus 201 is normal, the facsimile apparatus 201 makes transition to the Park mode since the communication between the intelligent terminal 202 and the facsimile apparatus 201 does not need to be connected until reception occurs at the facsimile apparatus 201. The "Park mode" is a Park mode being a low power consumption mode based on the Bluetooth specification, in which the facsimile apparatus 201 that is a slave terminal of the intelligent terminal 202 being a master based on the Bluetooth specification receives a signal from the master only at a certain interval to maintain synchronization in the Piconet. Also, when the transition to the Park mode is made, data communication between the master and the slave cannot be performed, and if data communication is to be performed, the Park mode should be released to make transition to the active mode.

An operation of transition of the facsimile apparatus 201 to the Park mode (low power consumption mode) will now be described. This operation is shown in the latter part of FIG. 5.

First, the Bluetooth control task 308 of the facsimile apparatus 201 requests transition to the Park mode to the Bluetooth controller 309. The Bluetooth controller 309, which receives the request for transition to the Park mode, carries out a procedure for transition to the Park mode based on the specification of the Bluetooth, in concert with the Bluetooth controller 410.

When the procedure for transition to the Park mode is completed, the Bluetooth controllers 309 and 410 notify the Bluetooth control tasks 308 and 409, respectively, of the transition of the facsimile apparatus 201 to the Park mode.

When notified of the transition to the Park mode, the Bluetooth control tasks 308 and 409 go into command return modes, respectively.

The Bluetooth control task 409 of the intelligent terminal 202, which goes into the command return mode, performs processing similar to the processing in the event control task 307 of the facsimile apparatus 201 connected with cables such as a serial interface such as RC232C and a parallel interface such as Centronics (a standard interface defined in IEEE 1284, etc.). The Bluetooth control task 409 gives back responses such as "image presence information" and "normal/abnormal states" to the information acquirement command and the reception information acquirement command that are issued periodically from the facsimile manager 401, based on facsimile status information stored in the RAM 103 of the intelligent terminal 202.

The Bluetooth control task 308 of the facsimile apparatus 201 performs operation similar to the operation in the facsimile manager 401 in the intelligent terminal 202 when it is connected with the above described cable. The Bluetooth control task 308 of the facsimile apparatus 201 issues periodically the reception information acquirement command and the state information acquirement command to the event control task 307 in order to monitor at every time changes of states of the facsimile apparatus 201 and whether or not the image has been received from some other facsimile apparatus via the communication line 203. When receiving the reception information acquirement command and the state information acquirement command from the Bluetooth control task 308, the event control task 307 gives back reception information (for example, image "absent") and state information (for example, "normal state") as a response.

If it is defined that the received image is not transferred to the intelligent terminal 202 during initialization process or when registered data is changed with the intelligent terminal 202 and the registered data is transferred to the facsimile apparatus 201, the facsimile manager 401 and the Bluetooth control task 308 of the facsimile apparatus 201 do not issue the reception information acquirement command and the state information acquirement command.

FIG. 6 shows a communication operation during reception image data transfer procedure in which the facsimile apparatus 201 receives an image from some other facsimile apparatus via the communication line 203, and transfers the image data to the intelligent terminal 202.

The Bluetooth control task 308 of the facsimile apparatus 201 is in the command return mode during stand-by, namely during the Park mode, and issues periodically the state information acquirement command and the reception information acquirement command to the event control task 307 to monitor the state of the facsimile apparatus 201. The event control task 307 searches the image management record stored in the RAM 103 as to whether or not the received image exists. When the received image exists, a response of "image existed" is given back to the reception information acquirement command that is issued by the Bluetooth control task 308.

When receiving the response of "image existed", the Bluetooth control task 308 releases the Park mode to form the Piconet again, and recovers communication between the facsimile apparatus 201 and the intelligent terminal 202 in order to transfer the reception image to the intelligent terminal 202.

For recovering the communication, a request for return to Active is sent to the Bluetooth controller 309. The Bluetooth controller 309, which receives the request for return to Active, communicates with the Bluetooth controller 410 of the intelligent terminal 202 in accordance with a communication recovering procedure of the Bluetooth. When the communication is recovered, the Bluetooth controller 309 gives mode change notification to the Bluetooth control task 308. If the Bluetooth control task 308, which receives the mode change notification, determines form the contents thereof that the communication has been recovered, it makes transition from the command return mode to the command through mode. If determining that the communication cannot be recovered, it keeps the state of the command return mode.

Similarly, the Bluetooth controller 410 of the intelligent terminal 202 gives mode change notification to the Bluetooth control task 409. If the Bluetooth control task 409, which receives the mode change notification, determines from the contents thereof that the communication has been recovered, it makes transition from the command return mode to the command through mode. If determining that the communication cannot be recovered, it keeps the state of the command return mode, and displays a message showing the fact on the display unit of the intelligent terminal 202.

When the communication is recovered, and each of the Bluetooth control tasks 308 and 409 goes into the command though mode, the communication between the facsimile apparatus 201 and the intelligent terminal 202 is performed to carry out reception image data transfer procedure, based on the Bluetooth specification. Furthermore, for the command interface at this time, reception image data transfer procedure is performed with a command interface same as the command interface when connected with cables such as a serial interface such as RS232C and a parallel interface such as Centronics (standard interface defined in IEEE1284, etc.).

When the image data transfer processing is completed, the facsimile manager 401 issues the reception information acquirement command to the facsimile apparatus 201 to check whether or not the received image exists. The event control task 307, which receives the reception information acquirement command searches the image management record stored in the RAM 103 as to whether or not the received image exists. If the received image exists, a response of "image existed" is given back, and if the received image does not exist, a response of "image not existed" is given back.

If determining by the response of the reception information acquirement command that the image existed, the facsimile manager 401 performs again received image transfer processing.

If the received image does not exist, the facsimile manager 401 issues the state information acquirement command to have the state of the facsimile apparatus 201 stored. The event control task 307, which receives the state information acquirement command, checks states as to the facsimile apparatus 201 such as the state of the printer, the state of the scanner and the state of the memory, and gives back the result thereof.

If the facsimile manager 401 determines based on the response of the state information acquirement command that the state of error is found, it displays a message showing the state of error on the display of the intelligent terminal 202 and issues periodically the reception information acquirement command and the state information acquirement command to the event control task 307 until the error is corrected. When it is determined that the state of the facsimile apparatus 201 is normal, the state information acquirement command and the reception information acquirement command are periodically issued until transition is made to the Park mode being a low power consumption mode again.

When determining that the state is normal, the facsimile apparatus 201 makes transition to the Park mode being a low power consumption mode.

The Bluetooth control task 308 of the facsimile apparatus 201 requests transition to the Park mode to the Bluetooth controller 309. The Bluetooth controller 309, which receives the request for transition to the Park mode, carries out a procedure for transition to the Park mode based on the specification of the Bluetooth, with the Bluetooth controller 410.

When the procedure for transition to the Park mode is completed, the Bluetooth controllers 309 and 410 notify the Bluetooth control tasks 308 and 409, respectively, of the transition to the Park mode.

When notified of the transition to the Park mode, the Bluetooth control tasks 308 and 409 go into command return modes, respectively.

Again, the command return mode is maintained until the user starts service such as facsimile transmission, scanning or print at the intelligent terminal 202, or reception occurs at the facsimile apparatus 201.

Figure 7:
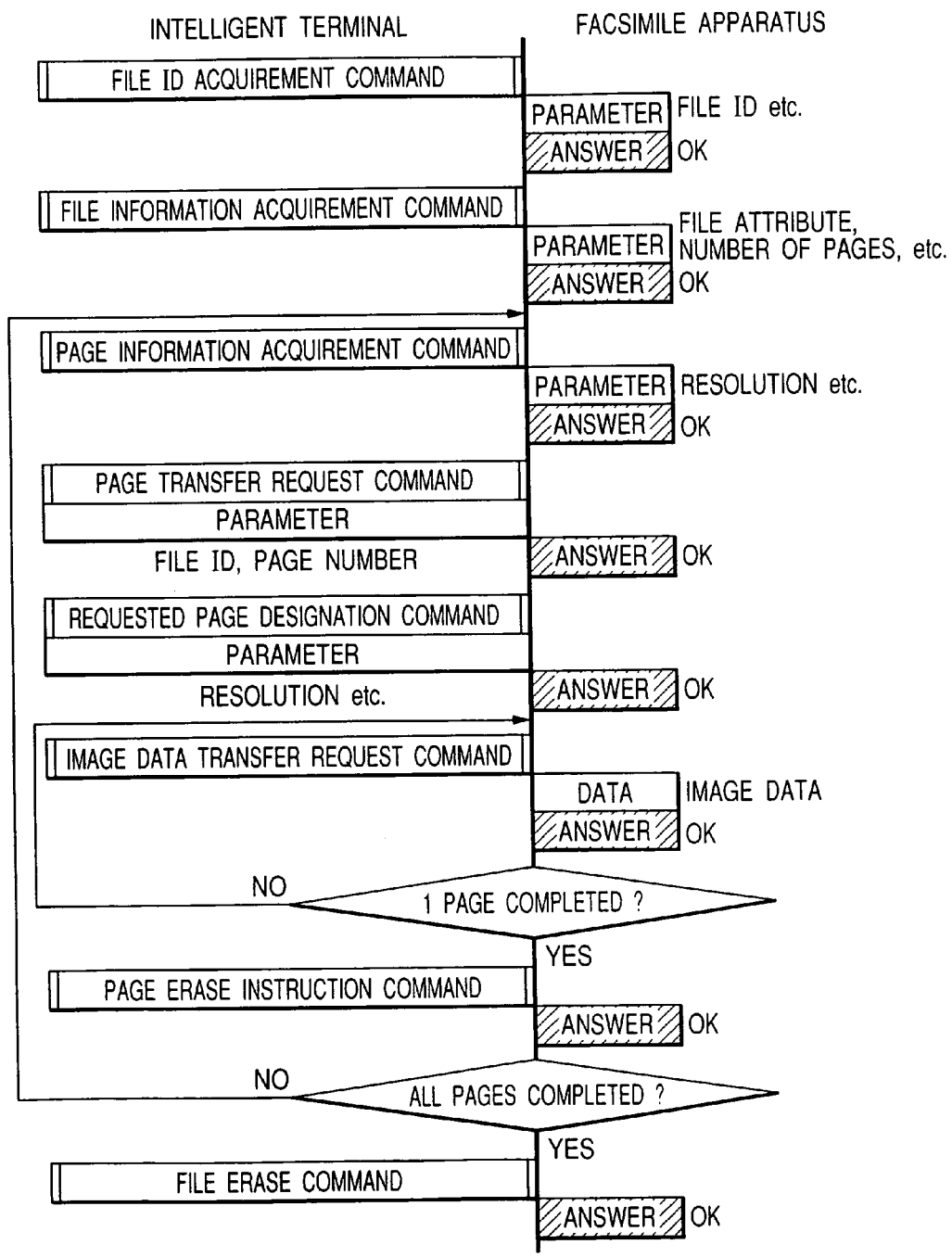
FIG. 7 shows an outlined operation of performing control of transfer of commands and data between the intelligent terminal 202 and the facsimile apparatus 201, in reception data image transfer procedure in the embodiment of the present invention.

FIG. 7 shows an outlined operation of performing transfer control of the command and data between the intelligent terminal 202 and the facsimile apparatus 201 in the reception image transfer data procedure.

In the operation of reception image data transfer service, a file ID acquirement command is first sent from the intelligent terminal 202. When receiving the file ID acquirement command, the facsimile apparatus 201 examines the RAM 103, sets a receipt number associated with reception image data to a parameter as a file ID, and sends the same to the intelligent terminal 202 along with the answer of "OK".

If the file ID is set with the answer parameter of the file ID acquirement command, the intelligent terminal 202 sets a file ID to be transferred, and sends a file information acquirement command. When receiving the file information acquirement command, the facsimile apparatus 201 sets a file attribute of a designated file ID and the number of pages to the parameter, and sends the above described parameter to the intelligent terminal 202 along with the answer of "OK". If the designated file ID do not exist, the answer of "NG" is given back.

Then, when receiving the page information acquirement command in which the file ID and the page number are designated, the facsimile apparatus 201 sets to the parameter information such as main/sub scan resolution of the page designated from management information of the RAM 103, and sends the answer of "OK". If the designated file ID and page do not exist, the answer of "NG" is given back.

When receiving the answer of "OK" for the page information acquirement command, the intelligent terminal 202 sends a page transfer request command, and subsequently sends a parameter to which the file ID and page number to be transferred are set. If the page of the designated file ID is accumulated in the image memory 104, the facsimile apparatus 201 sends the answer of "OK", and if they do not exist in the image memory 104, the facsimile apparatus 201 sends the answer of "NG".

When receiving the answer of "OK" to the page transfer request command, the intelligent terminal 202 sends a requested page designation command, and subsequently sends to the facsimile apparatus 201 a parameter to which the main/sub scan resolution and data format acquired with the page information acquirement command is set. The facsimile apparatus 201 examines whether or not the contents of the received parameter matches the contents of management information of the RAM 103, and sends the answer of "OK" if the contents match each other, and sends the answer of "NG" if the contents do not match each other.

Thereafter, the intelligent terminal 202 issues an image data transfer request. The facsimile apparatus 201 transfers image data of predetermined size to the intelligent terminal 202 from the image memory 104, and along therewith sends the answer of "OK".

After transfer of one page is completed, the intelligent terminal 202 puts the transferred reception image in the inbox 402, and displays the image so that the completion of the transfer of the received image and the contents of the received image can be recognized.

Then, a page erase command is issued. The facsimile apparatus 201 which receives the page erase command erases the image data of the designated page from the image memory 104, modifies the management information of the RAM 103, and sends the answer of "OK".

The above described operation is repeated until reception image data of all pages are transferred, and when reception image data of all pages are transferred, a file erase instruction command is accepted to erase the management information of the designated file, and the process is ended.

Figure 8:
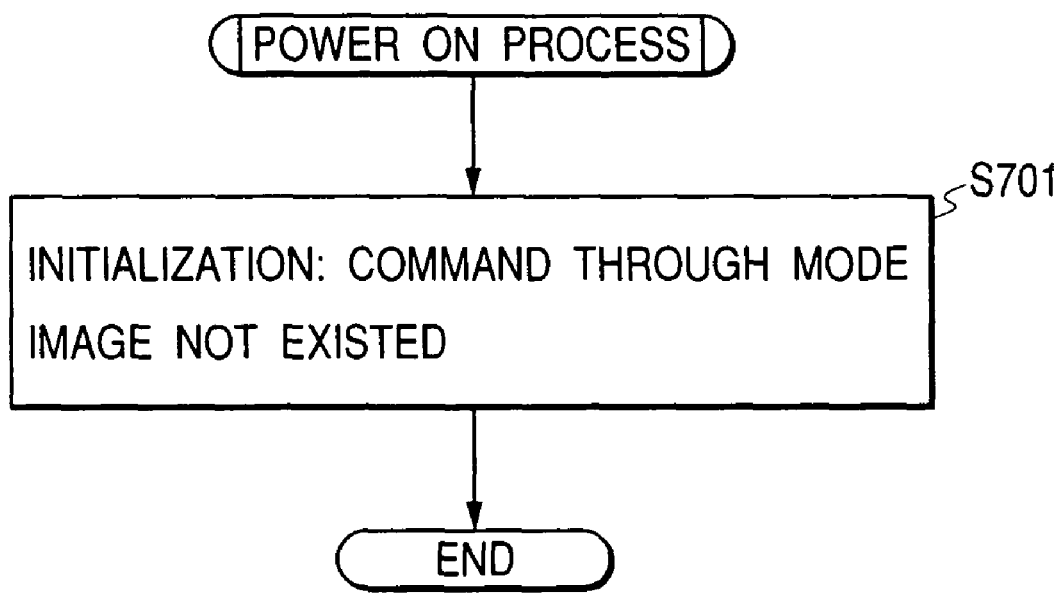
FIG. 8 is a flowchart when the power of the facsimile apparatus 201 is turned on in the embodiment of the present invention.

FIG. 8 is a flowchart when the power of the facsimile apparatus 201 is turned on.

In FIG. 8, when the power of the facsimile apparatus 201 is turned on, initialization process for the Bluetooth control task 308 is performed at step S701. At this time, the operation mode is taken as the "command through mode". Also, the variable for storing the existence/not existence of the received image managed by the Bluetooth control task 308 is taken as image absent.

The above described "command through mode" is an operation mode in which a command is sent to the Bluetooth controller 410 when this command is received from the facsimile manager 401, and a response is sent to the facsimile manager 401 when the response is received from the Bluetooth controller 410.

The above described process is carried out, and start-up of the intelligent terminal 202 is waited.

Figure 9:
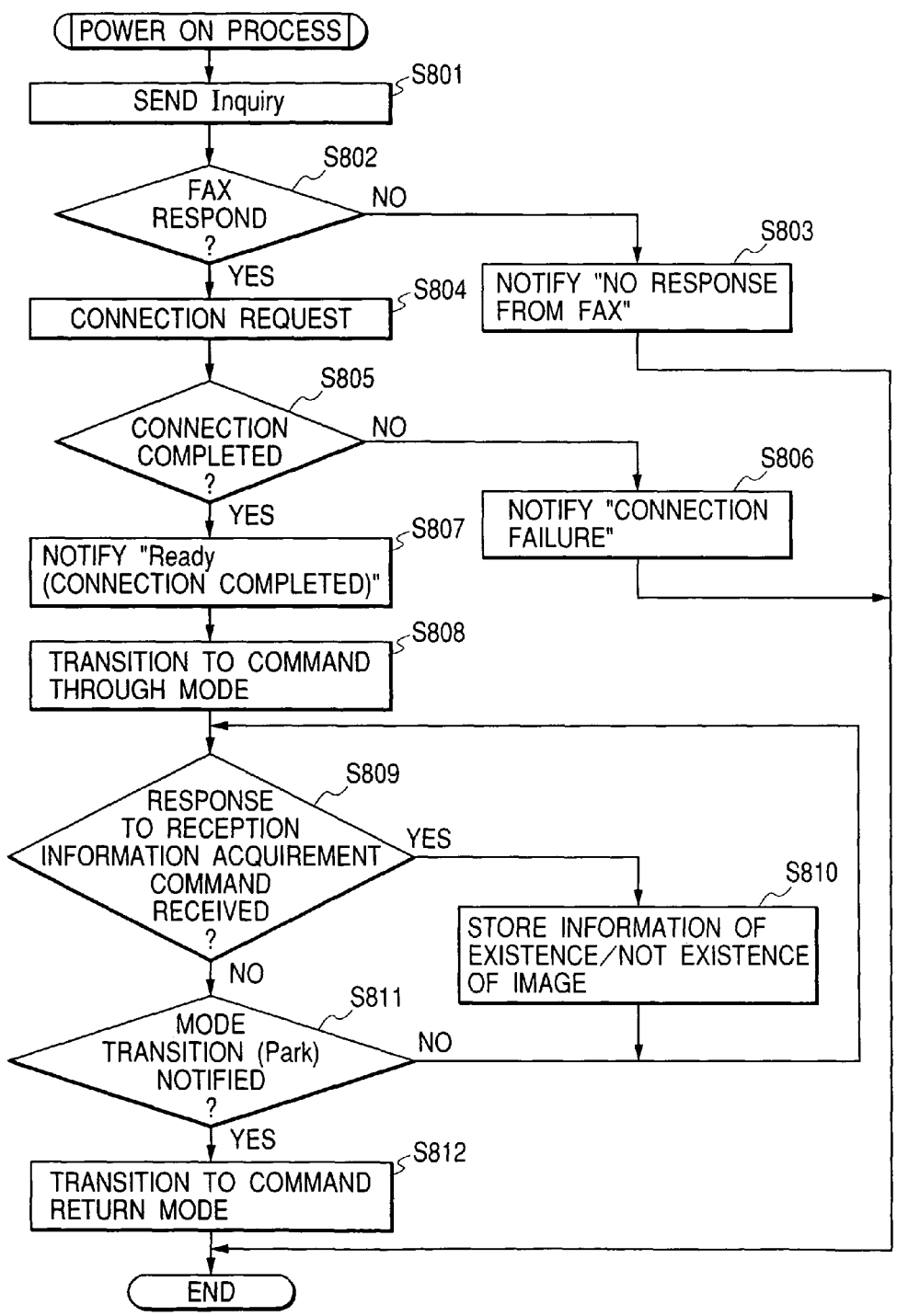
FIG. 9 is a flowchart showing an operation of power on process of a Bluetooth control task 409 in the intelligent terminal 202 in the embodiment of the present invention.

FIG. 9 is a flowchart showing an operation of power ON process of the Bluetooth control task 409 of the intelligent terminal 202.

When the power of the intelligent terminal 202 is turned on, the facsimile manager 401 is started, and the Bluetooth control task 409 sends an Inquiry to the facsimile apparatus 201 via the Bluetooth controller 410 at step S801.

At S802, whether or not the facsimile apparatus 201 has responded to the sent Inquiry, and if it has responded normally, the process proceeds to S804, and if it has not responded normally, the process proceeds to S803.

At S803, by displaying on the display unit of the intelligent terminal 202 the fact that there exists no connectable facsimile apparatus, notification is made and the process is ended.

At S804, a connection request is sent to the Bluetooth controller 410, and the process proceeds to S805.

At S805, a response to the connection request is waited, and the process proceeds to S806 if notification of failure in connection request is given from the facsimile apparatus 201 via the Bluetooth controller 410, and the process proceeds to S807 if notification of success in connection is given.

At S806, notification of the failure in connection to the facsimile apparatus 201 is made using the display unit of the intelligent terminal 202 and the process is ended.

At S807, the Bluetooth control task 409 notifies the facsimile manager 401 of Ready showing that connection to the facsimile apparatus could be established, and at S808, transition to the "command through mode" is made.

As described above, the "command through mode" is an operation mode in which a command is sent to the Bluetooth controller 410 when the Bluetooth control task 409 receives this command from the facsimile manager 401, and a response is sent to the facsimile manager 401 when the response is received from the Bluetooth controller 410.

When receiving the above described Ready signal, the facsimile manager 401 uses the Serial Port Profile to perform initialization process between the facsimile manager 401 and the event control task 307 of the facsimile apparatus 201.

When the initialization process is completed, the facsimile manager 401 periodically sends the reception information acquirement command to the facsimile apparatus 201 via the Bluetooth control task 409 and the Bluetooth controller 410, and monitors whether or not the facsimile apparatus 201 has the received image. At S809, whether or not a response to this reception information acquerment command has been received is determined, and if the response has been received from the facsimile apparatus 201 via the Bluetooth control task 409 and the Bluetooth controller 410, information of existence/not existence of received image therein is stored in the Bluetooth control task 409 at S810.

At S811, as described in the latter half of FIG. 5, whether or not the notification of transition to the Park mode led by the facsimile apparatus 201 has been received from the Bluetooth controller 410 is determined, and if the notification has not been received, the process proceeds to S809, where the command through mode is continued, and if the notification has been received, the process proceeds to S812, where transition to the command return mode is made, and power on process is completed.

The "command return mode of the Bluetooth control task 409" will now be described.

Figure 10:
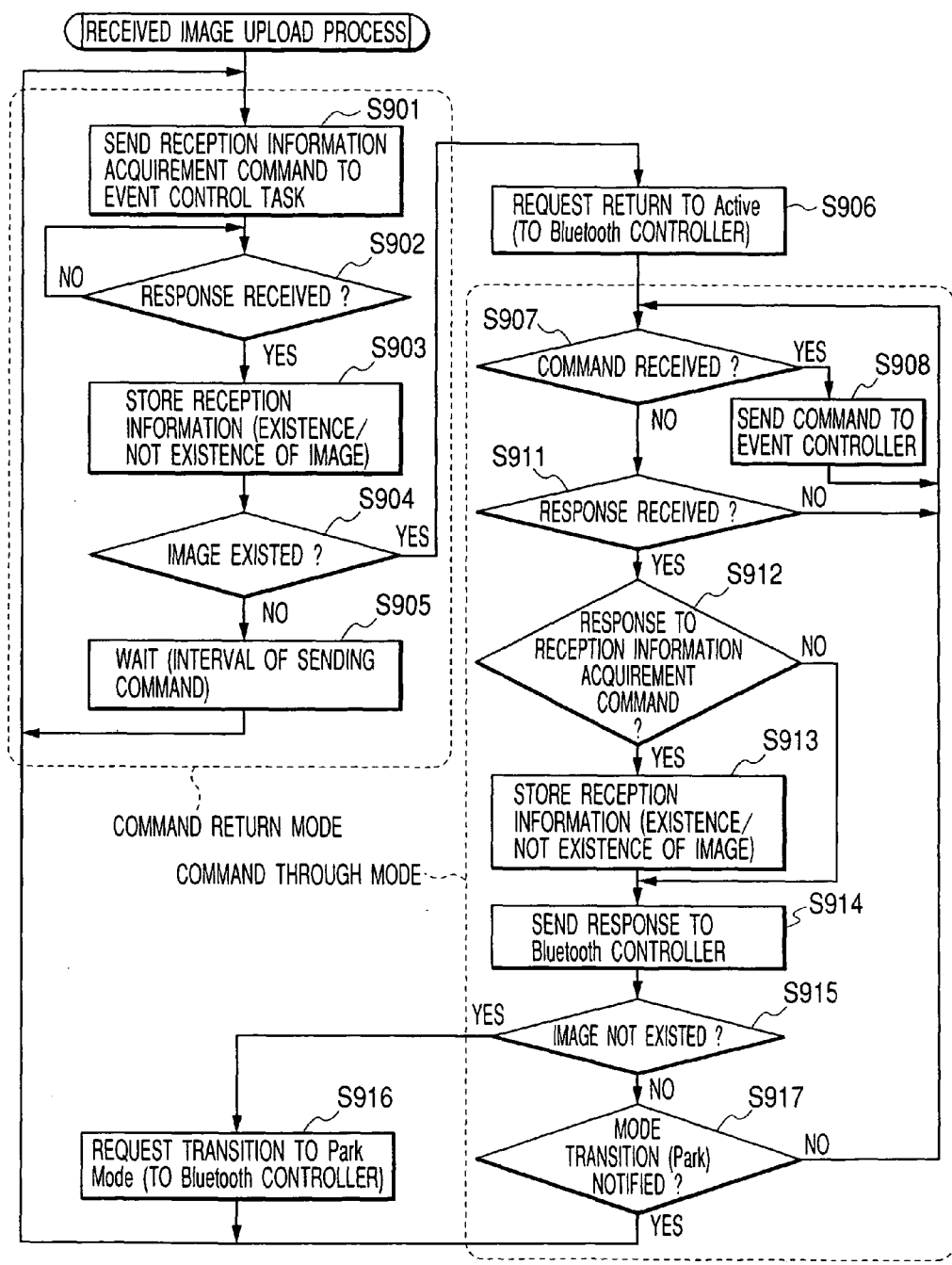
FIG. 10 is a flowchart showing a received image upload process of a Bluetooth control task 308 in the facsimile apparatus 201 in the embodiment of the present invention.

FIG. 10 is a flowchart showing a received image upload process of the Bluetooth control task 308 of the facsimile apparatus 201 in the above described embodiment.

The Bluetooth control task 308 is in the command return mode in the sate where no received image exists.

At S901 of the command return mode, the reception information acquerment command is sent to the event control task 307, and at S902, a response from the event control task 307 is received. When the response is received, reception information (image existed/not existed) stored in the response is stored in the Bluetooth control task 308 at S903.

At S904, whether or not the image exists in the reception information is determined, and if the image exists, the process proceeds to S906, where transition is made from the command return mode to the command through mode. If the image does not exist, the process waits to send the reception information acquerment command periodically at S905, and then the process returns to S901.

At S906, an Active return request is sent to the Bluetooth controller 309, and at S907, whether or not the command has been received is determined. This command is an operation instruction command from the facsimile manager 401 to the event control task 307 as described with FIG. 7. If the command has been received, the process proceeds to S908, where the received command is sent to the event control task 307, and if it has not been received, the process proceeds to S911.

At S911, whether or not the response has been received is determined. This response is a response from the event control task 307 to the facsimile manager 401 as described with FIG. 7. If the response has not been received, the process proceeds to S907, and if it has been received, whether or not the received response is a response to the reception information acquerment command is determined at S912, and if it is a response to the reception information acquerment command, reception information (image existed/not existed) is stored in the Bluetooth control task 308 at S913.

At S914, the received response is sent to the Bluetooth controller 309, and the Bluetooth control task 308 determines whether or not the image exists in the stored reception information at S915, and if the image does not exist, the process proceeds to S916, where transition to the command return mode is made, and if the image exists, the process returns to S907, where the command through mode is continued.

At S916, the request for transition to the Park mode is sent to the Bluetooth controller 309, and transition to the command return mode is made.

At S917, transition to the command return mode is made if notification of Mode transition from the intelligent terminal 202 is received.

Figure 11:
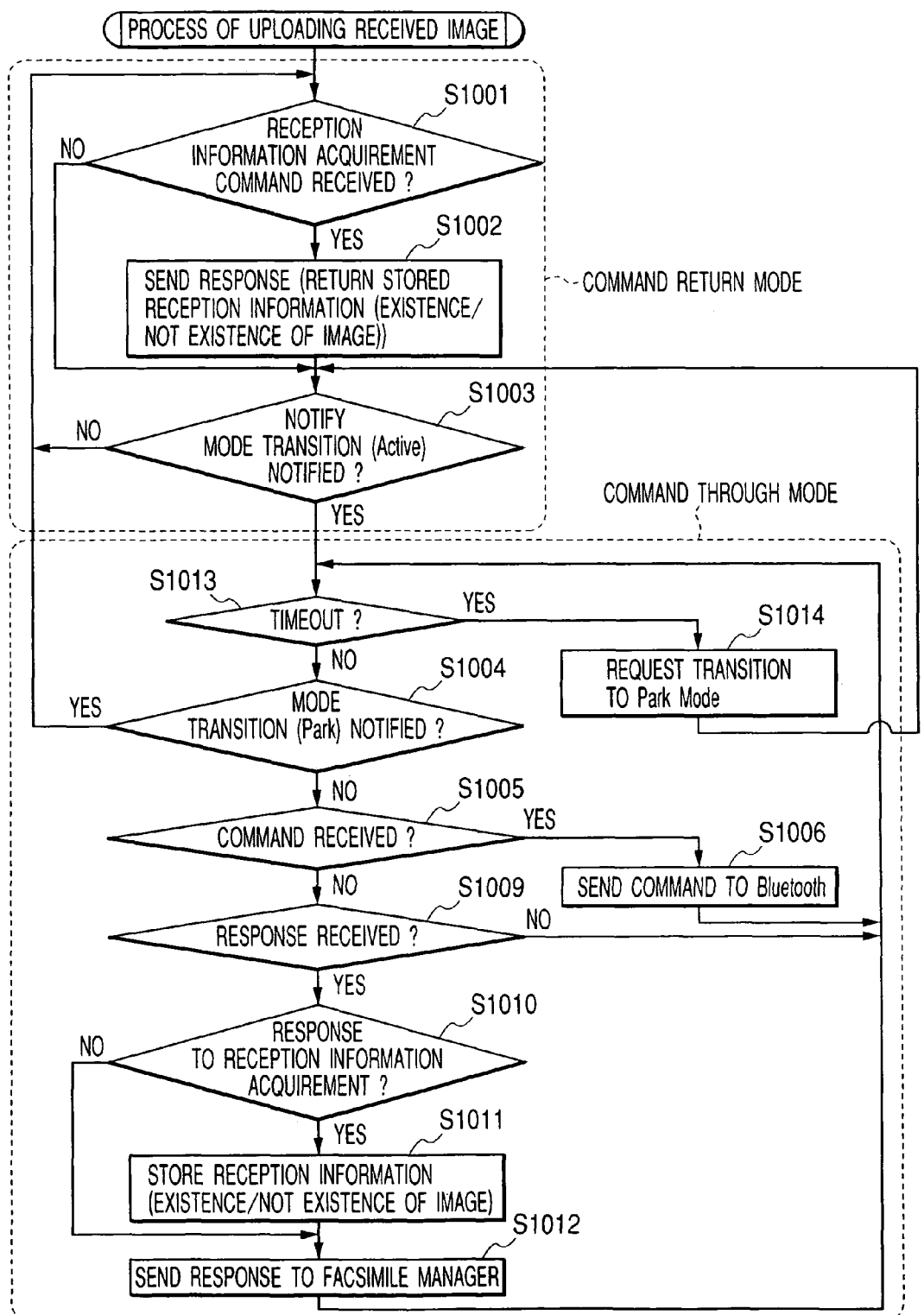
FIG. 11 is a flowchart showing a received image upload process of the Bluetooth control task 409 in intelligent terminal 202 in the embodiment of the present invention.

FIG. 11 is a flowchart showing a received image upload process of the Bluetooth control task 409 of the intelligent terminal 202 in the above described embodiment.

The Bluetooth control task 409 is in the command return mode in the state where no received image exists.

At S1001 of the command return mode, whether or not the reception information acquerment command has been facsimile manager 401 is determined, and if the command has been received, the process proceeds to S1002, and if it has not been received, the process proceeds to S1003.

At S1002, the reception information (image existed/not existed) stored in the Bluetooth control task 409 is sent to the facsimile manger 401 as a response.

At S1003, a procedure for return to Active (procedure for return to Active shown in FIG. 6) led by the facsimile apparatus 201 is carried out, and whether or not the Bluetooth control task 409 has received Mode transition notification from the Bluetooth controller 410 is determined, and if the notification has not been received, the process proceeds to S1001, and if it has been received, the process proceeds to S1004, where transition to the command through mode is made.

At S1004, transition to the Park mode led by the facsimile apparatus 201 is performed, and whether or not the Bluetooth control task 409 has received the Mode transition notification from the Bluetooth 410 is determined, and if the notification has not been received, the process proceeds to S1005, and if it has been received, the process proceeds to S1001, where transition to the command return mode is made.

At S1005, whether or not the command has been received is determined. This command is an operation instruction command from the facsimile manager 401 to the event control task 307 as described with FIG. 7. If the command has been received, the process proceeds to S1006, where the received command is sent to the Bluetooth controller 410, and if it has not been received, the process proceeds to S1009. At S1009, whether or not the response has been received is determined, and if the response has been received, the process proceeds to S1010, and if it has not been received, the process proceeds to S1004. This response is a response from the event control task 307 to the facsimile manager 401 as described with FIG. 7.

At S1010, whether or not the above described response is a response of the reception information acquerment command is determined, and if it is the response of the reception information acquerment command, the process proceeds to S1011, and if not, the process proceeds to S1012. The reception information (image existed/not existed) included in the response is stored in the Bluetooth control task 409 at S1011, and the response is sent to the facsimile manager 401 at S1012.

Timeout is reached when no effective data is available within a predetermined time period in the command through mode at S1013, and a request for transition to the Park mode is sent to the facsimile apparatus at S1014.

Figure 12:
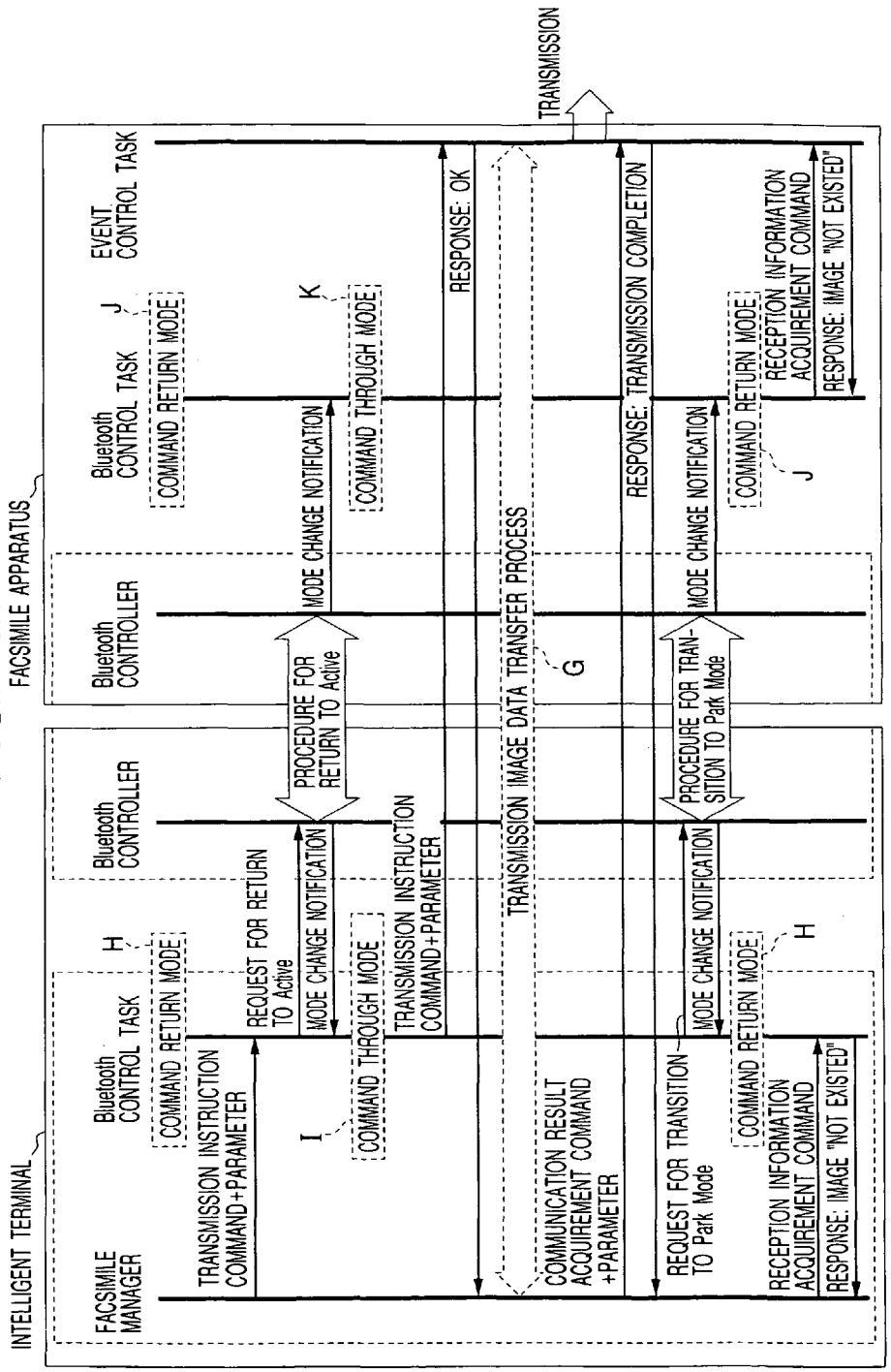
FIG. 12 is a sequence diagram showing an operation procedure of process of transferring a transmission image in the embodiment of the present invention.

FIG. 12 is a sequence diagram showing an operation procedure during transmission image transfer process, and shows the case where this sequence transfers image data stored in the intelligent terminal 202 to the facsimile apparatus 201, and the facsimile apparatus 201 performs facsimile transmission to the designated opposite terminal 204.

That is, the Bluetooth control task 409 of the intelligent terminal 202 is in the command return mode H at the time of stand-by that is in the Park mode, and though not shown, gives answers to the reception information acquerment command and the state information acquerment command sent from the facsimile manager 401 periodically.

Similarly, the Bluetooth control task 308 of the facsimile apparatus 201 is also in the command return mode J at the time of stand-by that is in the Park mode, and issues periodically the reception information command, and the state information acquirement command to the event control task 307 to monitor the state of the facsimile apparatus 201.

Then, when the user operates the operation unit of the intelligent terminal 202 to select a transmission service, the facsimile manager 401 sends to the Bluetooth control task 409 the transmission instruction command and a parameter in which the facsimile number of the opposite terminal 204 is designated.

Then, the Bluetooth control task 409, which receives the transmission instruction command and the parameter (facsimile number), returns the mode between the facsimile apparatus 201 and the intelligent terminal 202 to the Active mode (normal operation mode) in which data communication is possible to provide a transmission service.

That is, the Bluetooth control task 409 of the intelligent terminal 202 sends to the Bluetooth controller 410 a command of request for return to Active, and the Bluetooth controller 410 which receives the command of request for return to Active performs procedure for return to Active in conformity of the Bluetooth specification, with the Bluetooth controller 309, and returns the mode to the Active mode. And thereafter, the Bluetooth controllers 309 and 410 notify the Bluetooth control tasks 308 and 409, respectively, of mode change notification, and transition of the operation mode from command return modes H and J to command through modes I and K is made.

Furthermore, if the communication could not be recovered, the Bluetooth controllers 309 and 410 notify the Bluetooth control tasks 308 and 409 of the fact that the communication could not be recovered. At this time, the Bluetooth control tasks 308 and 409 keep the sate of the command return mode. Also, the Bluetooth control task 409 sends the answer: NG to the facsimile manager 401, and the facsimile manger 401 displays a message that transmission service cannot be performed, when receiving the answer: NG.

Also, if the communication could be recovered, the Bluetooth control task 409 of the intelligent terminal 202 sends directly to the event control task 307 of the facsimile apparatus 201 the transmission instruction command and the parameter (facsimile number) received from the facsimile manager 401.

Then, when the event control task 307 which receives the transmission instruction command and the parameter ensures that the facsimile apparatus 201 is not currently under communication, and is not full of reservations for transmission, it sends the response of "OK" to the facsimile manager 401 of the intelligent terminal 202. Furthermore, when the facsimile apparatus 201 is under communication or full of reservations for transmission, the response of "NG" is sent to the facsimile manager 401.

Then, when receiving the response of "OK" from the event control task 307, the facsimile manager 401 performs transmission image data transfer procedure G with a command interface similar to the cable I/F.

Then, when the transmission image data transfer procedure G is completed, the facsimile manager 401 issues to the facsimile apparatus 201 a transmission result acquirement command and a parameter in which the receipt number is designated to know the transmission result. Then, the event control task 307, which receives the transmission result acquirement command, searches the management information stored in the RAM 103, and checks the transmission result of the indicated receipt number. Thereafter, the event control task 307 sends to the facsimile manager 401 a response showing the completion of transmission together with the transmission result.

Furthermore, the facsimile manager 401 issues the transmission result acquirement command to the facsimile apparatus 201 until it is known from the response to the transmission result acquirement command that transmission is completed.

Then, when the Bluetooth control task 409 of the intelligent terminal 202 determines that transmission has been completed, the wireless communication line goes into the Park mode again.

That is, the Bluetooth control task 409 sends to the Bluetooth controller 410 the command of request for transition to the Park mode. The Bluetooth controller 410, which receives the command of request for transition to the Park mode, carries out procedure for transition to the Park mode, with the Bluetooth controller 309, and when the transition procedure is completed, the Bluetooth controllers 309 and 410 notify the Bluetooth control tasks 308 and 409, respectively, of the transition to the Park mode.

Then, when the Bluetooth control tasks 308 and 409 receive the notification of the transition to the Park mode, the operation modes become command return modes H and J again. That is, the command return modes H and J are continued until the user starts a service such as facsimile transmission, image reading process or printing process at the intelligent terminal 202, or the facsimile apparatus 201 receives image data. Then, in this command return mode, the command and response are exchanged only between the facsimile manager 401 and the Bluetooth control task 409, and between the Bluetooth control task 308 and the event control task 307, the command and response are not exchanged between the intelligent terminal 202 and the facsimile apparatus 201.

Figure 13:
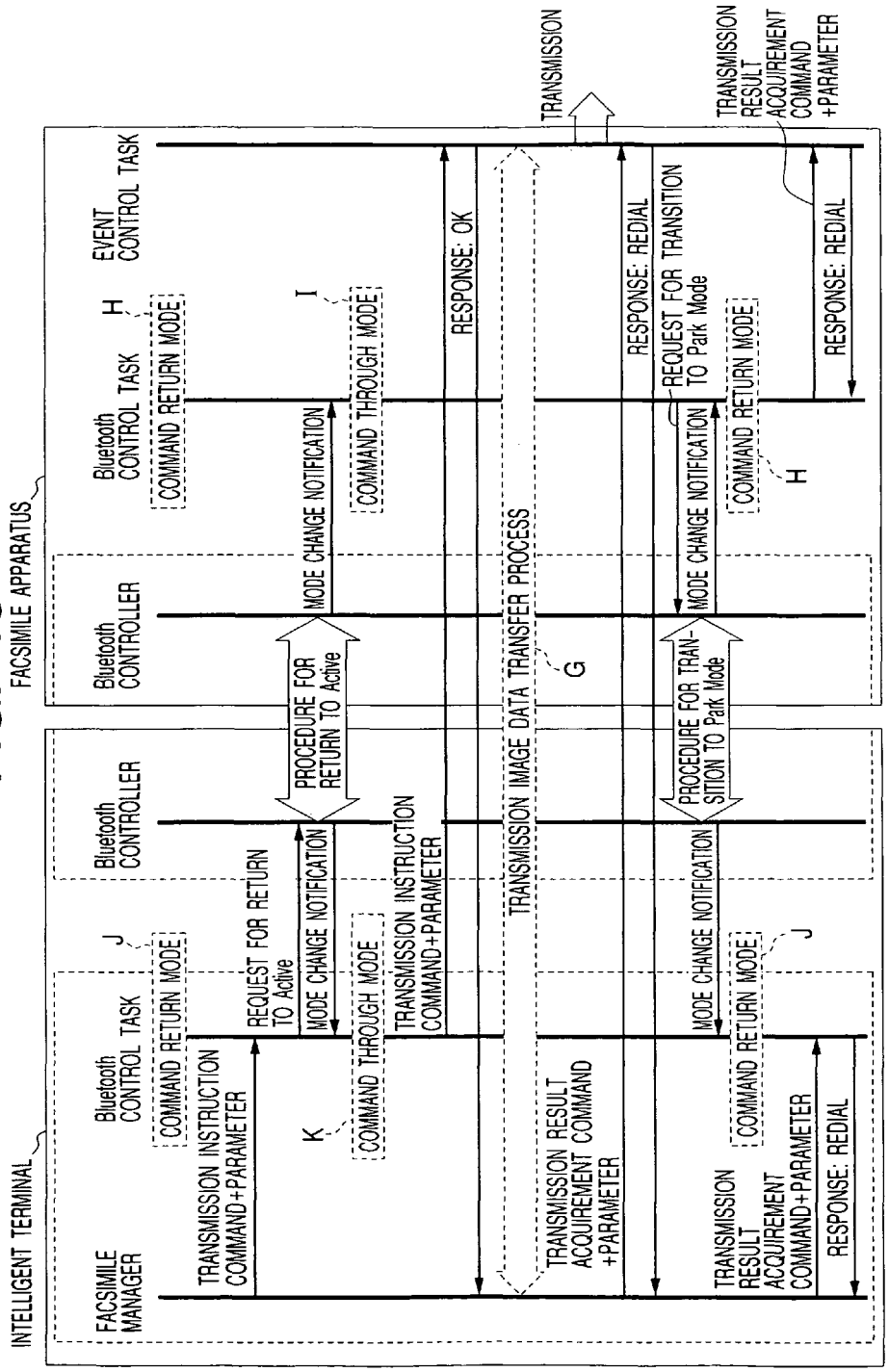
FIG. 13 is a sequence diagram showing an operation procedure of transfer redial process for the transmission image in the embodiment of the present invention.

FIG. 13 is a sequence diagram showing an operation procedure during transfer redial process for the above described transmission image, and this sequence shows an operation during redial process for the transmission service.

That is, as in the case of FIG. 12, transmission modes make transition from command return modes J and H to command through modes K and I, whereby the reception image data transfer procedure G is carried out.

Then, when the transmission image data transfer procedure G is completed, the facsimile manager 401 issues to the facsimile apparatus 201 the transmission result acquirement command and a parameter in which the receipt number is designated to know the transmission result. Then, the event control task 307, which receives the transmission result acquirement command and the above described parameter, searches the management information stored in the RAM 103, and acquires the transmission result of the indicated receipt number to send a response. The facsimile manager 401 of the intelligent terminal 202 is notified of this response. When determining from the response that it is in the redial stand-by state, the facsimile manager 401 displays the fact to notify the user thereof.

Also, when the Bluetooth control task 308 determines that it is in the redial stand-by state from the response sent to the facsimile manager 401 from the event control task 307, it sends to the Bluetooth controller 309 the command of request for transition to the Park mode. Then, the Bluetooth controller 309, which receives the command of request for transition to the Park mode, carries out procedure for transition to the Park mode with the Bluetooth controller 410, and when the procedure for transition is completed, the Bluetooth controllers 309 and 410 notify the Bluetooth control tasks 308 and 409, respectively, of the transition to the Park mode, and after the transition to the Park mode, transition of the operation mode to command return modes J and H is made.

Thereafter, the facsimile manager 401 sends periodically the transmission result acquirement command and the parameter to the Bluetooth control task 409, the Bluetooth task 409 sends to the facsimile manager 401 a response showing that it is in the state of redial standby.

Also, the Bluetooth control task 308 sends periodically the transmission result acquirement and the parameter to the event control task 307, and continues to store transmission results. Then, the event control task 307 sends to the Bluetooth control task 308 a response showing that it is in the state of redial standby.

And thereafter, when the transmission image that was in the state of redial standby is sent to the opposite normally, the event control task 307 gives back the completion of transmission as a response to the transmission result acquirement command and parameter from the Bluetooth control task 308. When the Bluetooth control task 308 determines from the response from the event control task 307 that the transmission process has been completed normally, it returns the mode with intelligent terminal 202 to the Active mode, and waits until the transmission result acquirement command and parameter from the facsimile manager 401 are received.

At this time, the Bluetooth control task 308 and the Bluetooth control task 409 recognize the return to the Active mode, and make transition to the command through node. When the Bluetooth control task 308 receives the transmission result acquirement command and parameter from the facsimile manager 401, it sends the transmission result acquirement command and parameter to the event control task 307. The event control task 307 receives the transmission result acquirement command and parameter, and if there exists a parameter showing the result of the above described transmission process that was in the state of redial standby, it gives back a response showing that the transmission process has been completed normally.

When the facsimile manager 401 recognizes from the response from the event control task 307 that the transmission process that was in the sate of redial standby has been completed normally, it displays the fact to notify the user thereof.

Also, when the Bluetooth control task 308 recognizes from the contents of the response sent from the event control task 307 that the transmission process that was in the sate of redial standby has been completed normally, it lets the mode with the intelligent terminal 202 make transition to the Park mode again. Then, the Bluetooth control task 308 and the Bluetooth control task 409 make transition to the command return mode.

Figure 30:
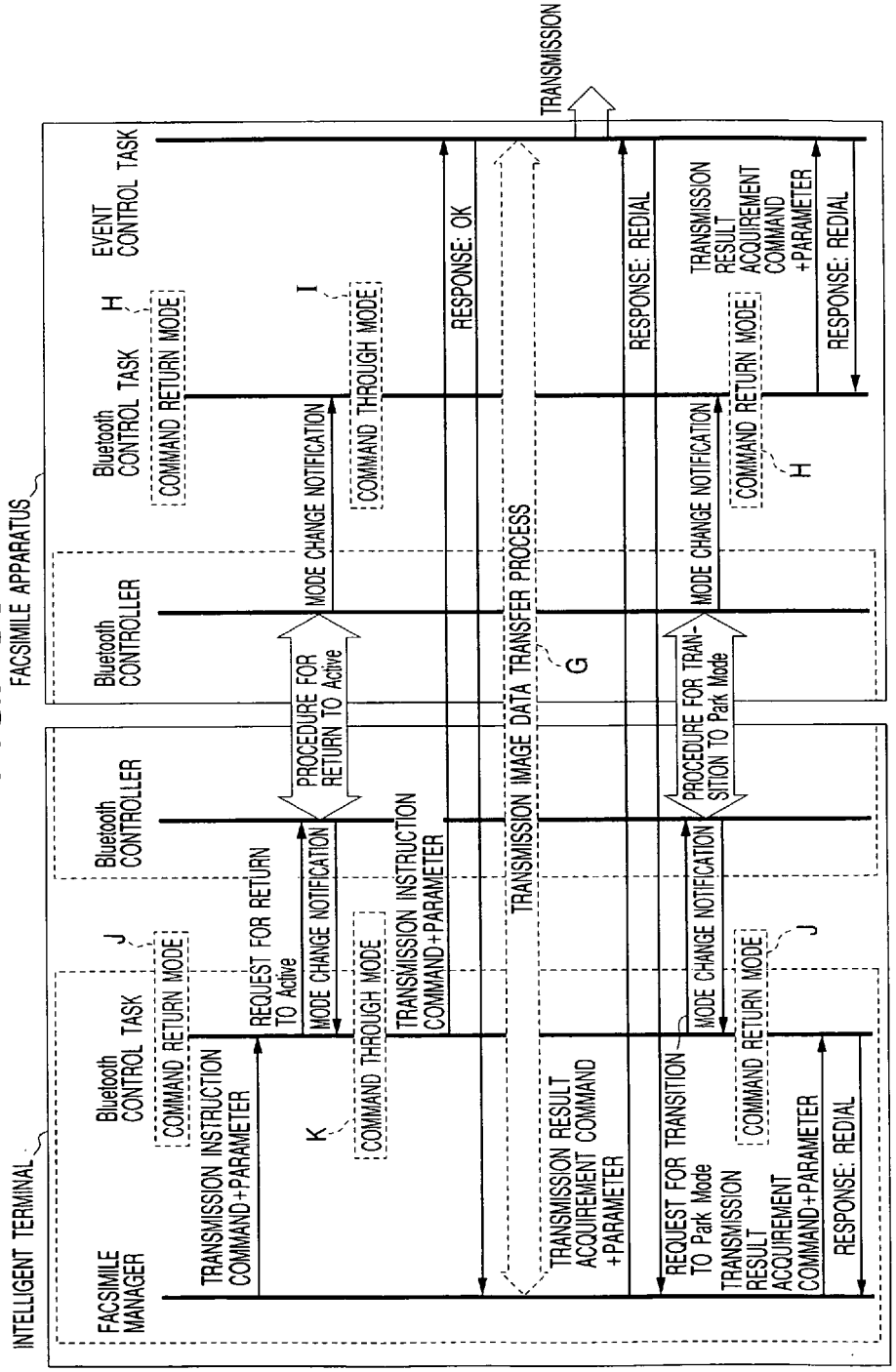
FIG. 30 shows a process where the intelligent terminal 202 requests transition to a Park mode to the facsimile apparatus 201, after completion of redial process, in the embodiment of the present invention.

Furthermore, as the above described operation during transfer redial process for the transmission image in FIG. 13, a request for transition to the Park mode is made from the facsimile apparatus 201 to the intelligent terminal 202 after the transfer process, but as in the case of FIG. 30, a request for transition to the Park mode may be made from the intelligent terminal 202 to the facsimile apparatus 201.

The case where a request for transition to the Park mode is made from the intelligent terminal 202 to the facsimile apparatus 201 after completion of the transfer redial process for the transmission image will now be described below, using FIG. 30.

In FIG. 30, as in the case of FIG. 12, transition of the operation mode make from command return modes J and H to command through modes K and I is made, whereby the reception image data transfer procedure G is carried out.

Then, when the transmission image data transfer procedure G is completed, the facsimile manager 401 issues to the facsimile apparatus 201 the transmission result acquirement command and a parameter in which a receipt number is designated to know the transmission result. The event control task 307, which receives the transmission result acquirement command and the above described parameter, searches the management information stored in the RAM 103, and acquires the transmission result of the designated number to send a response.

Then, when the Bluetooth control task 409 determines from the response from the event control task 307 that it is in the state of redial standby, it sends to the Bluetooth controller 410 the command of request for transition to the Park mode. Then, the Bluetooth controller 410, which receives the command of request for transition to the Park mode, carries out a procedure for transition to the Park mode with the Bluetooth controller 309, and when the procedure for transition is completed, the Bluetooth controllers 309 and 410 notify the Bluetooth control tasks 308 and 409, respectively, of the transition to the Park mode, and after the transition to the Park mode, transition of the operation mode to command return modes J and H is made.

Thereafter, the facsimile manager 401 sends periodically the transmission result acquirement command and the parameter to the Bluetooth control task 409, the Bluetooth control task 409 sends to the facsimile manager 401 a response showing that it is in the state of redial standby.

Also, the Bluetooth control task 308 sends periodically the transmission result acquirement command and the parameter to the event control task 307, and continues to store transmission results in the RAM 103. Then, the event control task 307 sends to the Bluetooth control task 308 a response showing that it is in the state of redial standby.

Furthermore, if the transmission image that was in the state of redial standby can be sent normally, the same process as described above is applied.

Figure 14:
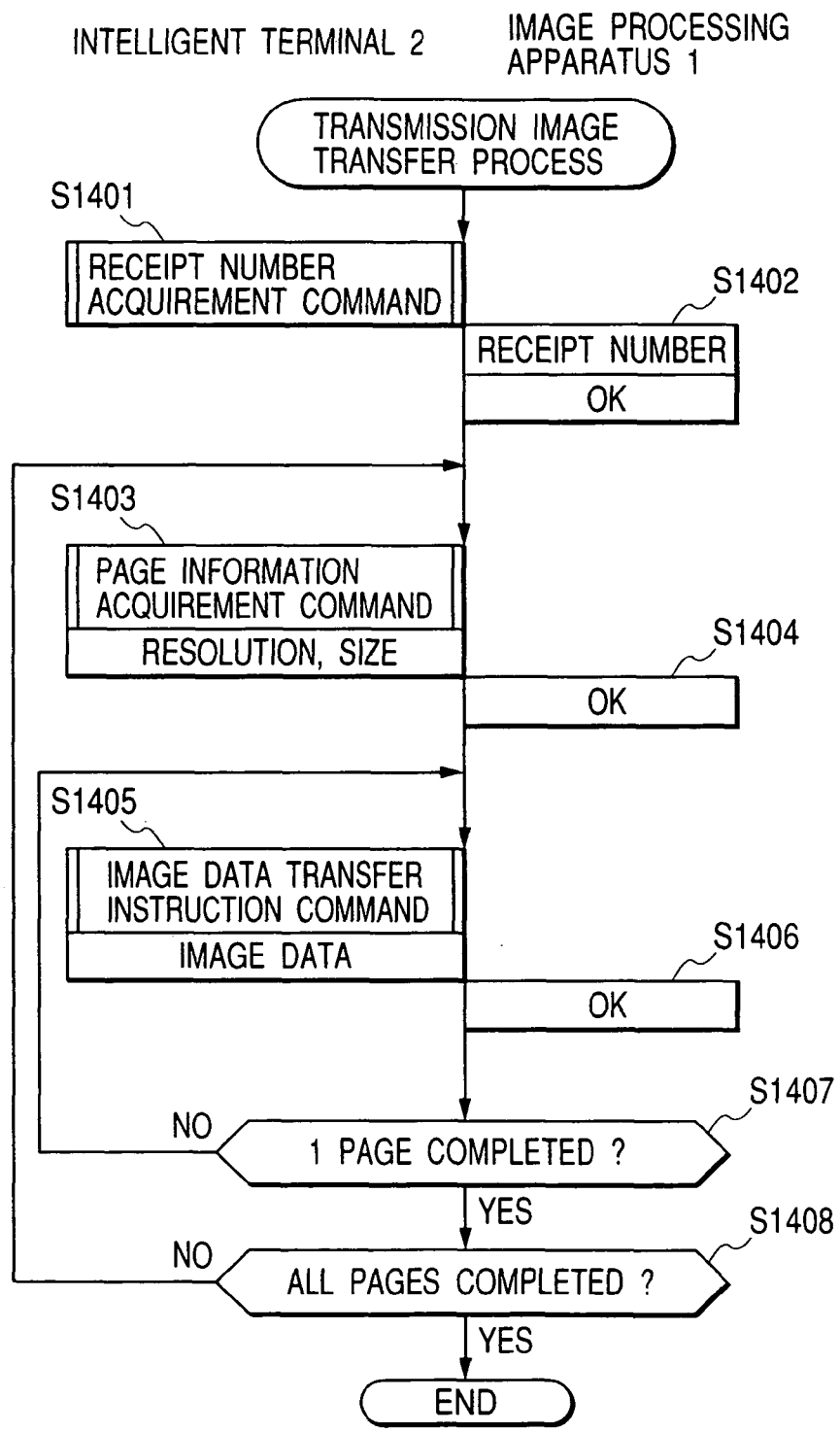
FIG. 14 shows a procedure of the transmission image data transfer process in FIGS. 12, 13 and 30 in the embodiment of the present invention.

FIG. 14 shows a process procedure of the transmission image data transfer procedure G in FIGS. 12, 13 and 30.

First, the intelligent terminal 202 sends a receipt number acquirement command to the facsimile apparatus 201 (step S1401). When the facsimile apparatus 201 receives the receipt number acquirement command, it sends to the intelligent terminal 202 the receipt number stored in the RAM 103 together with the answer of "OK" (step S1402).

Then, the intelligent terminal 202 sends a page information acquirement command to the facsimile apparatus 201, and sends to the facsimile apparatus 201 a parameter in which the main/sub scan resolution and the image size of image data to be sent is set (step S1403). The facsimile apparatus 201 determines based on the received parameter whether or not transmission is possible, and if transmission is possible, it sets each parameter to the management information of the RAM 103 and sends the answer of "OK" to the intelligent terminal 202 (step S1404). On the other hand, if transmission is not possible, the answer of "NG" is sent to the intelligent terminal 202.

Then, when the intelligent terminal 202 receives the answer of "OK" to the page information acquirement command, it sends an image data transfer instruction command, and image data and the image data size to the facsimile apparatus 201 (step S1405).

Then, the facsimile apparatus 201 receives image data by the image data transfer instruction command, accumulates the same in the image memory 104, and sends the answer of "OK" to the intelligent terminal 202 (step S1406). Furthermore, in this case, if there is no free space in the image memory 104, the answer of "NG" is sent to end the process.

Then, the intelligent terminal 202 sends image data of one page to the facsimile apparatus 201 during reception of the answer of "OK" to the image data transfer instruction command. Also, when the answer of "OK" is received to the image data transfer instruction command, transmission of the image data is stopped, and the abnormal end is displayed on the display unit.

Then, when a predetermined amount of transmission image data is accumulated in the image memory 104, the facsimile apparatus 201 originates a call to the destination facsimile number received with the transmission instruction command and performs facsimile transmission. Furthermore, each time facsimile transmission of one page is completed, the corresponding region of the image memory 104 is erased.

Then, whether or not image data transmission of one page has been completed is determined (step S1407), and if it has been completed, whether or not image data transmission of all pages has been completed is determined (step S1408), and if the answer thereto is negative (No), the process returns to S1403 to repeat the above described process, and if the answer thereto is positive (Yes), the process is ended.

Figure 15:
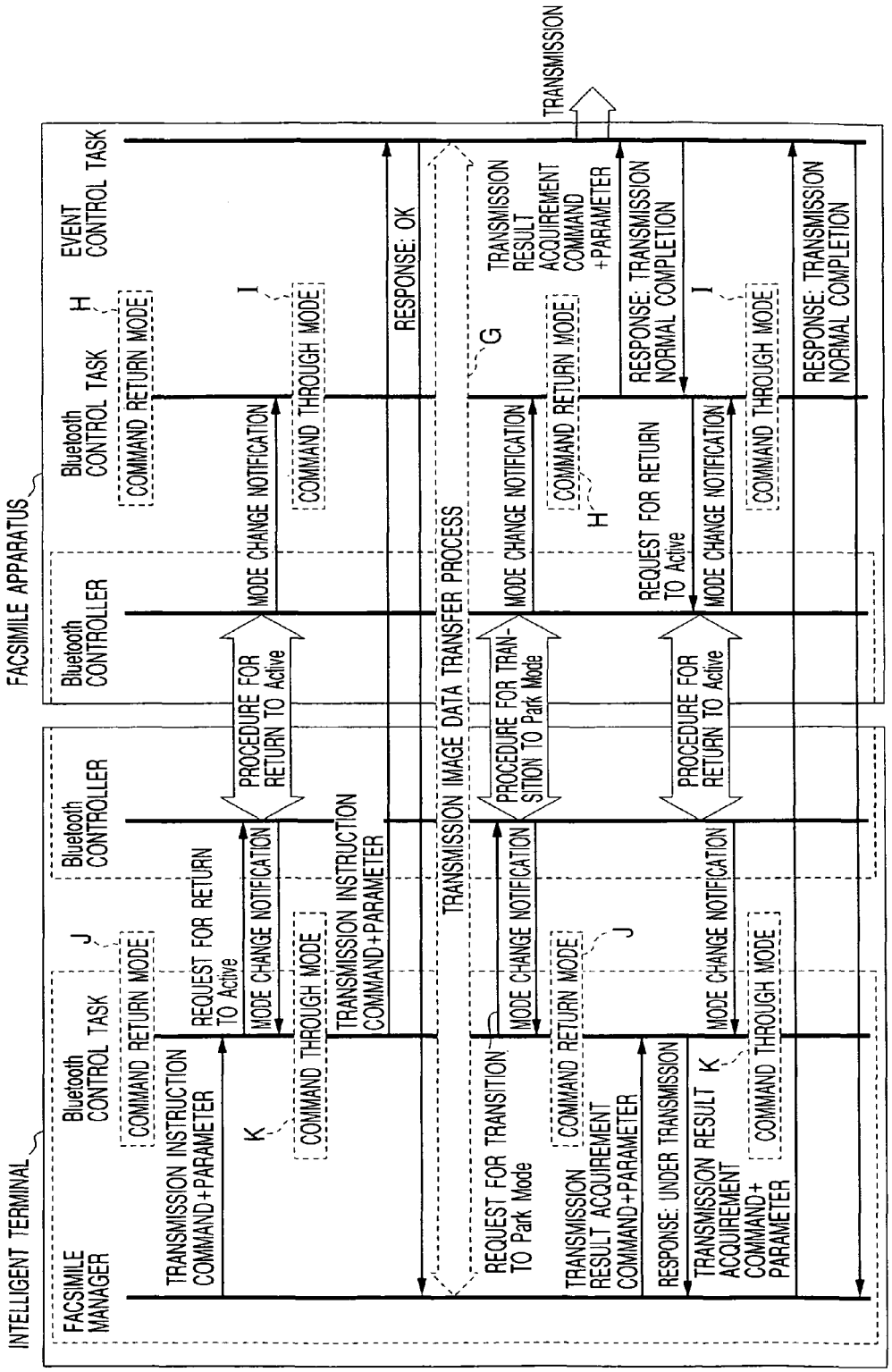
FIG. 15 is a sequence diagram of an operation procedure of process of transfer of the transmission image in the embodiment of the present invention.

FIG. 15 is a sequence diagram showing another embodiment of operation procedure during transmission process for the transmission image, and in this embodiment, when the transmission image data transfer procedure G is completed, the Bluetooth control task 409 of the intelligent terminal 202 makes transition to the Park mode immediately after storing the receipt number and the transmission result: sending state, without inquiring the facsimile apparatus 201 of the transmission result.

That is, as in the case of FIG. 12, after the operation modes are made to make transition from command return modes J and H to command through modes K and I, the transmission image data transfer procedure G similar to that in FIG. 14 is carried out.

Then, when the transmission image data transfer procedure G is completed, the Bluetooth control task 409 sends to the Bluetooth controller 410 a command of request for transition to the Park mode, and the Bluetooth controller 410, which receives the command of request for transition to the Park mode, carries out a procedure for transition to the Park mode with the Bluetooth controller 309, and when the transition procedure is completed, the Bluetooth controllers 309 and 410 notify the Bluetooth controller 308 and 409, respectively, of the transition to the Park mode, and the operation modes become command return modes J and H.

Then, when the operation modes become command return modes J and H, the Bluetooth control task 409 reads the transmission information (the transmission result acquirement command, the receipt number, etc.) stored in a RAM (not shown) of the intelligent terminal 202 and sends a response to the facsimile manager 401.

Also, the Bluetooth control task 308 of the facsimile apparatus 201 periodically sends to the event control task 307 the transmission result acquirement command and the receipt number of the transmission result that it wants to acquire. Then, the event control task 307 retrieves the transmission result of the corresponding receipt number from the management information stored in the RAM 103, and gives back the same as a response. The Bluetooth control task 308 continues this process until it is determined that the image data transmission process is completed.

Then, when the Bluetooth control task 308 receives from the event control task 307 a transmission completion response showing the completion of transmission of image data, the Bluetooth control task 308 sends to the Bluetooth controller 309 the command of request for return to Active to recover communication with the intelligent terminal 202.

The Bluetooth controller 309, which receives the request for return to Active, carries out the procedure for return to Active with the Bluetooth controller 410, and when the Active communication is returned, the Bluetooth controllers 309 and 410 give mode change notification to the Bluetooth control tasks 308 and 409, respectively, and make transition to command through modes K and I.

When transition to command through modes K and I is made in this way, the Bluetooth control task 409 sends directly to the Bluetooth controller 410 the transmission result acquirement command from the facsimile manager 401 and a parameter in which the receipt number of the transmission result that it wants to acquire is set, which are sent to the Bluetooth controller 309 via the Bluetooth controller 410, and are sent to the event control task 307 via the Bluetooth control task 308. Also, the event control task 307 sends the transmission result of the designated receipt number to the facsimile manager 401 as a response, and ends the process.

The process procedure during the above described transmission image transfer will now be described for the intelligent terminal 202 from which the image is transferred and the facsimile apparatus 201 to which the image is transferred, separately.

Figure 16:
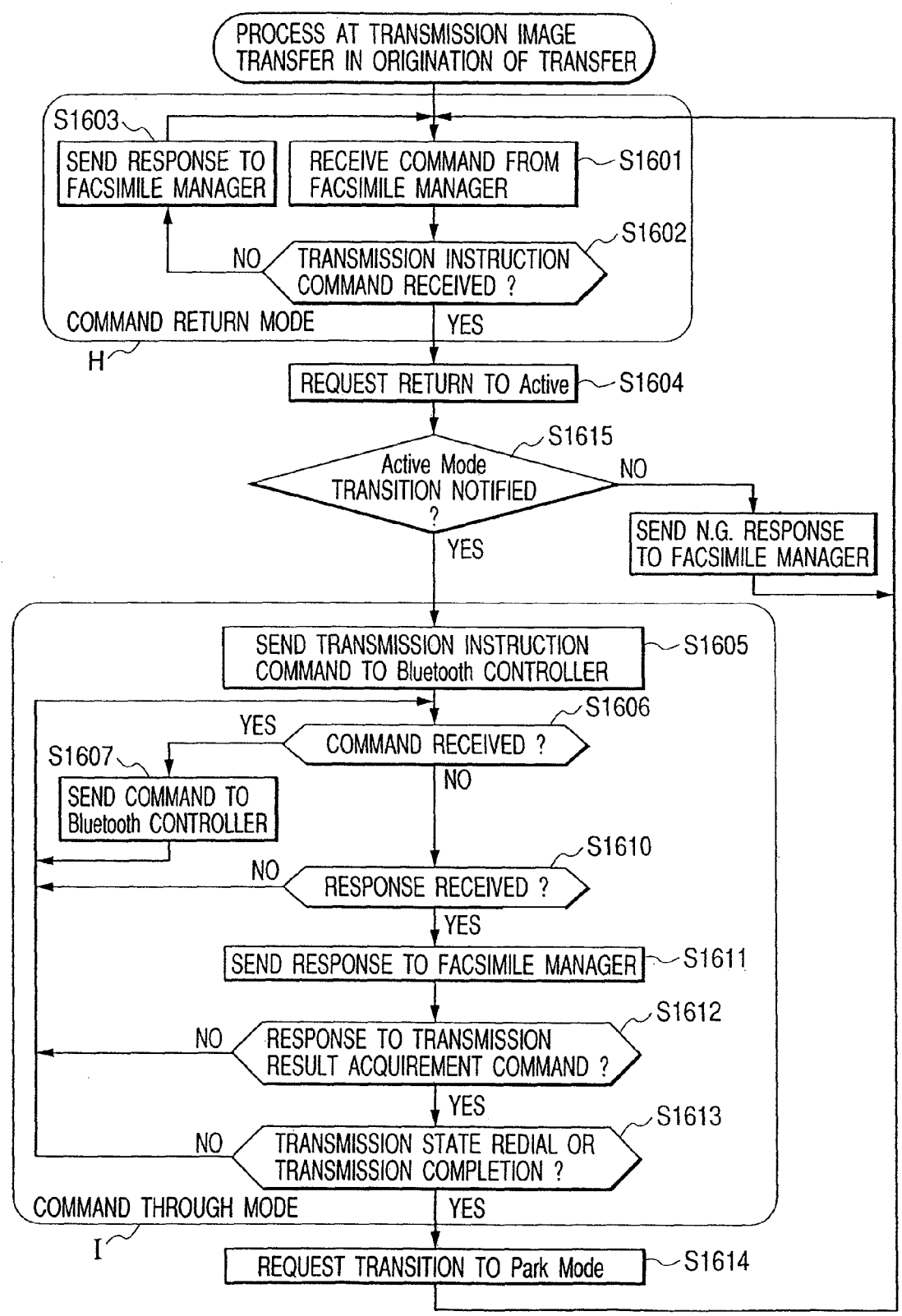
FIG. 16 is a flowchart showing a procedure of transfer process of the intelligent terminal 202 being a transfer origination in the embodiment of the present invention.

FIG. 16 is a flowchart showing a process procedure during transfer for the intelligent terminal 202 from which the image is transferred, and this program is executed with the Bluetooth control task 409.

The Bluetooth control task 409 is in the command return mode H, when no received image exists, or in the state where the transmission instruction command from the facsimile manager 401 is not received.

Then, when the command from the facsimile manager 401 is received at step S1601, whether or not the received command is a transmission instruction command is determined at subsequent step S1602, and if the answer thereto is negative (No), the process proceeds to step S1603, where a needed response out of the information stored in the RAM is sent to the facsimile manager 401 in accordance with the received command, and the process returns to step S1601 to wait a command from the facsimile manager 401.

On the other hand, if the command from the facsimile manager 401 is a transmission instruction command, the answer at step S1602 is positive (Yes), and the process proceeds to step S1604, where the transmission instruction command and parameter received from the facsimile manager 401 are stored in the RAM, and thereafter the request for return to Active is sent to the Bluetooth controller 410. Then, at subsequent step S1615, whether or not mode transition notification could be received to perform return to Active is determined, and if the answer thereto is negative (No), a "NG" response is sent to the facsimile manager 401 and the process returns to step S1601 to execute the above described command return mode.

Also, when the answer at step S1615 is positive (Yes), namely if return to Active could be performed and mode transition notification was received, transition of the operation mode to the command through mode I, and the process proceeds to step S1605.

Then, at step S1605, the transmission instruction command and parameter from the facsimile manager 401, stored in the RAM, is sent to the Bluetooth controller 410, and the process proceeds to step S1606.

At step S1606, whether or not the command has been received is determined, and if the command has been received, the process proceeds to step S1607, where the command is sent to the Bluetooth controller 410, and thereafter the process returns to step S1606 to repeat the above described process. On the other hand, if the reception of the command has not occurred, the process proceeds to step S1610 to determine whether or not a response has been received from the Bluetooth controller 410. Then, when the answer thereto is negative (No), the process returns to step S1606 to repeat the above described process, while when the answer is positive (Yes), the process proceeds to step S1611, where the received response is sent to the facsimile manager 401, and at subsequent step S1612, whether or not the above described response is a response to the transmission result acquirement command is determined. Then, if the answer is negative (No), the process returns to step S1606 to repeat the above described process, while if the answer is positive (Yes), the response is stored in the RAM, and the process proceeds to step S1613.

Then, at step S1613, whether the transmission state is of redial standby or completion is determined based on the transmission result stored in the RAM, and if the answer thereto is negative (No), the process returns to step S1606, where the command through mode I is continued, while if the answer is positive (Yes), the process proceeds to step S1614, where the command of request for transition to the Park mode is sent to the Bluetooth controller 410, and thereafter the process returns to step S1601 to make transition to the command return mode H.

Figure 17:
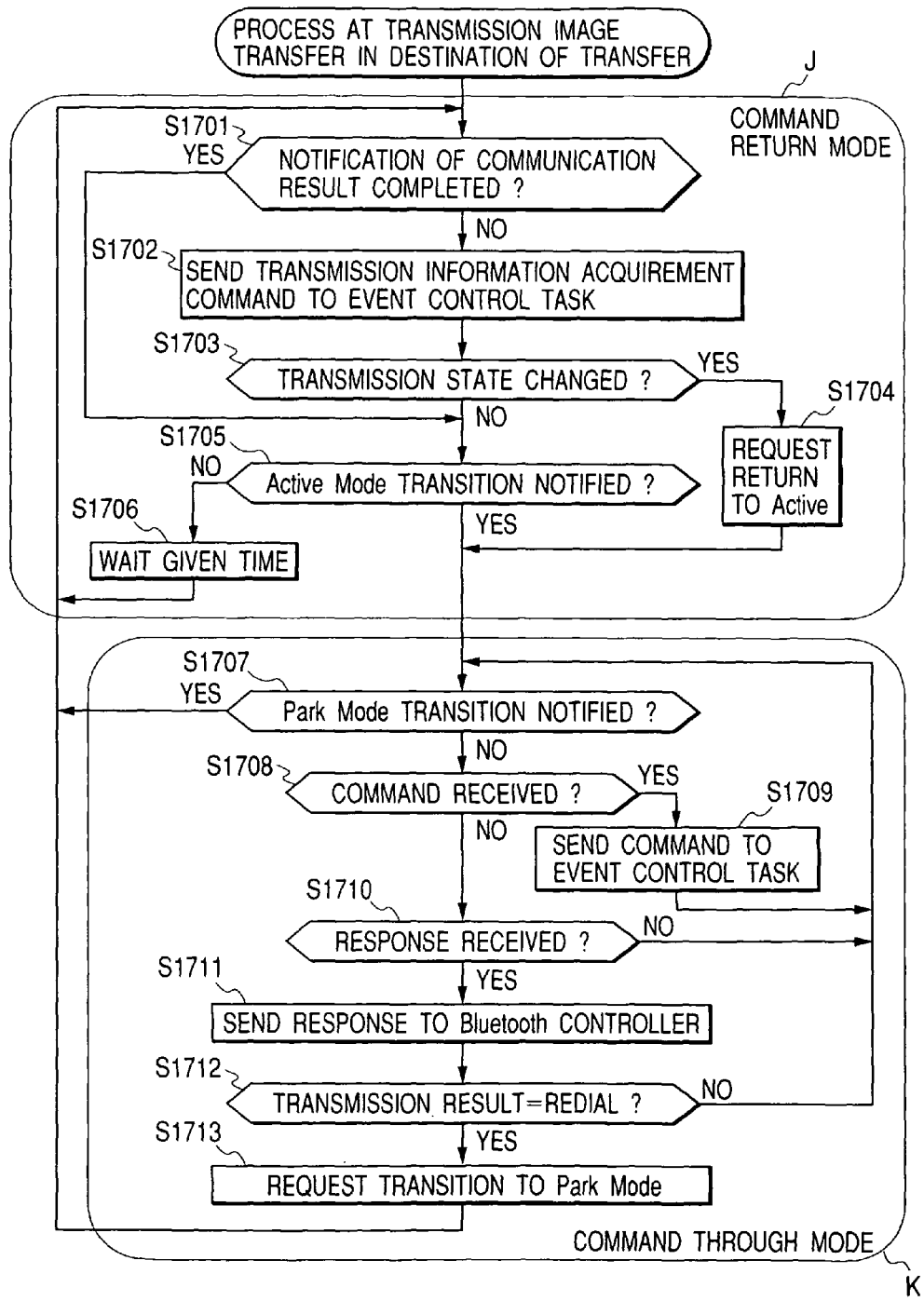
FIG. 17 is a flowchart showing a procedure of transfer process of the facsimile apparatus 201 being a transfer destination in the embodiment of the present invention.

FIG. 17 is a flowchart showing a process procedure during transfer for the facsimile apparatus 201 to which the image is transferred, and this program is executed with the Bluetooth control task 308.

The Bluetooth control task 308 is in the command return mode J in the state where neither a received image nor transmission instruction request from the intelligent terminal 202 exists.

That is, at step S1701, whether or not the intelligent terminal 202 has been already notified of the transmission result is determined, and if the answer thereto is positive (Yes), the process proceeds to step S1705, while if the answer is negative (No), the process proceeds to step S1702, where the transmission information acquirement command is sent to the event control task 307, and at subsequent step S1703, the response to the transmission information acquirement command from the event control task 307 is stored in the RAM 103, and the contents of the response are analyzed to determine whether or not the transmission state has changed to completion of transmission is determined. Then, if the transmission state has not changed, the process proceeds to step S1705, where transition to the Active mode led by the intelligent terminal 202 is performed, and whether or not notification of the mode transition has been made is determined. Then, if the answer thereto is negative (No), the process waits for a predetermined time period to send a command such as the transmission information acquirement command and the reception information acquirement command periodically to the event control task 307, and thereafter the process the process returns to step S1701 to continue the command return mode J. On the other hand, if the answer is positive (Yes), the process proceeds to step S1707, where transition to the command return mode K is made.

Also, if the answer at step S1703 is positive (Yes) and thus the transmission state has changed, the process proceeds to step S1704, where the command of request for return to Active is sent to the Bluetooth controller 309, and connection to the intelligent terminal 202 is recovered, and the process proceeds to step S1707, where transition to the command return mode K is made.

That is, whether or not notification of the transition to the Park mode led by the intelligent terminal 202 has been made is determined at step S1707, and if the answer thereto is negative (No), the process proceeds to step S1708 to determine whether or not the command has been received, and if the command has been received, the process proceeds to step S1709 to send the command to the event control task 307, and thereafter the process returns to step S1707 to repeat the above described process. On the other hand, if the command has not been received, the process proceeds to step S1710, where whether or not a response from the event control task 307 has been received is determined. Then, when the answer thereto is negative (No), the process returns to step S1707 to repeat the above described process, while when the answer is positive (Yes), the process proceeds to subsequent step S1711. At step S1711, the received response is stored in the RAM 103 and is sent to the Bluetooth controller 309, and the process proceeds to step S1712.

At step S1712, the transmission result state stored in the RAM 103 is observed to whether or not the transmission is in the sate of redial standby, and when it is not in the sate of redial standby, the process returns to step S1707 to repeat the above described process. In this case, when it is completion of transmission, for example, the process of transition to the Park mode led by the intelligent terminal 202 is carried out and notification of the transition to the Park mode is given from the Bluetooth controller 309 to the Bluetooth control task 308, and therefore the answer at step S1707 is positive (Yes) and the process returns to step S1701, transition to the command return mode J is made for the operation mode.

Also, if the answer at step S1712 is positive (Yes), namely if it is determined that the transmission is in the state of redial standby, the process proceeds to step S1713, where the command of request for transition to the Park mode is sent to the Bluetooth controller 309 to perform transition to the Park mode led by the facsimile apparatus 201, and when the transition to the Park mode is confirmed, the process returns to step S1701, and transition to the command return mode J is made for the operation mode.

In the above described FIG. 17, the case where transmission result information of the facsimile apparatus 201 is acquired has been described, but a process for transferring a transmission image from the intelligent terminal 202 to the facsimile apparatus 201 will be described, using FIG. 31.

Figure 31:
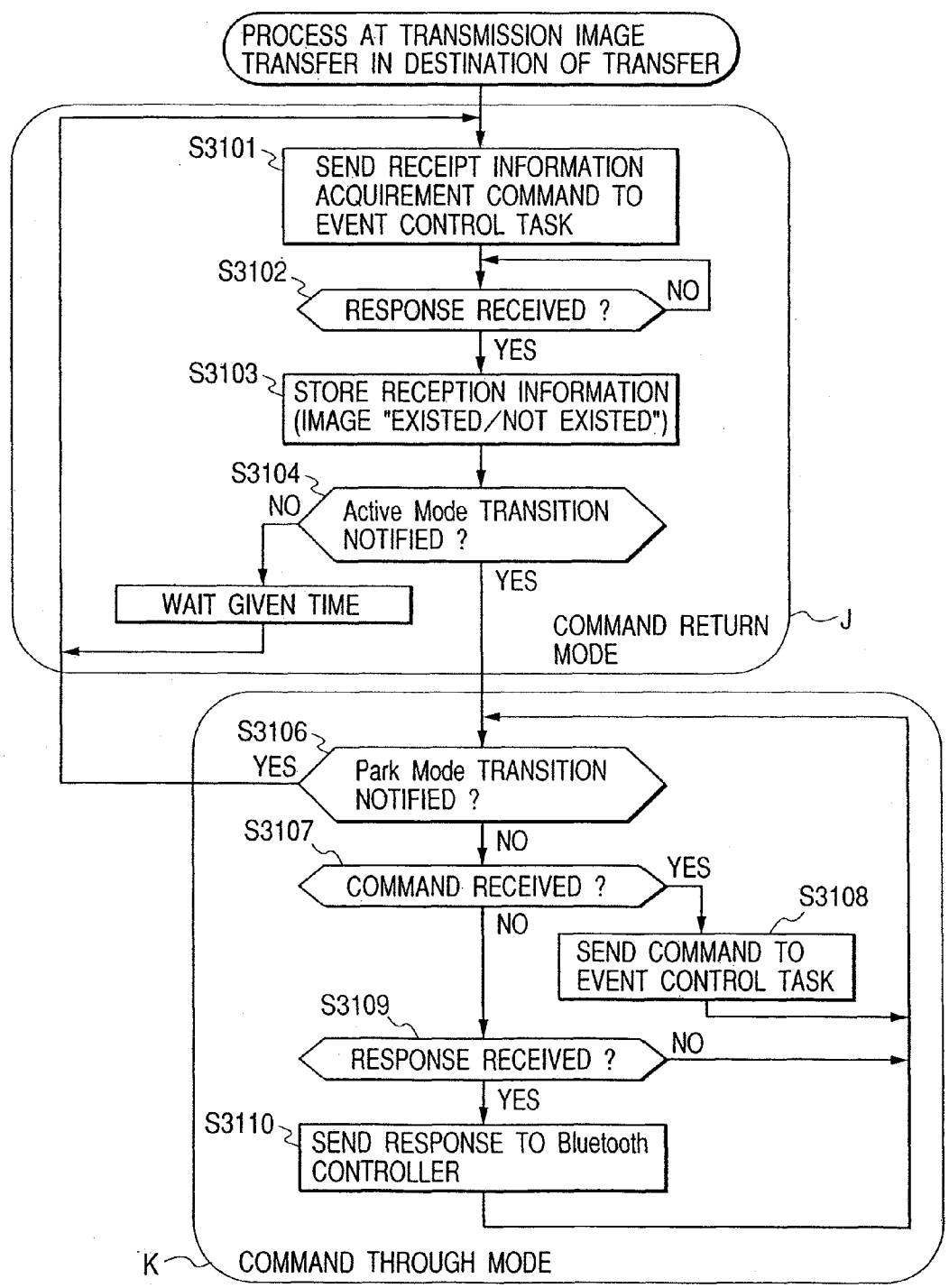
FIG. 31 shows a process when the transmission image is transferred from the intelligent terminal 202 to the facsimile apparatus 201 in the embodiment of the present invention.

FIG. 31 is a flowchart showing a process for transferring the transmission image from the intelligent terminal 202 to the facsimile apparatus 201, and this program is executed with the Bluetooth control task 308.

The Bluetooth control task 308 is in the command return mode J in the state where neither a received image nor transmission instruction request from the intelligent terminal 202 exists.

That is, the reception information acquirement command is sent to the event control task 307 at step S3101, and when a response from the event control task 307 is received at step S3102, the received image information (information of existence/not existence of image) in the response is stored in the RAM 103 at subsequent step S3103, and then the process proceeds to step S3104.

At step S3104, transition to the Active mode led by the intelligent terminal 202 is performed, and whether or not notification of the mode transition has been made is determined. Then, if the answer thereto is negative (No), the process waits for a predetermined time period to send periodically a command such as the transmission information acquirement command and the reception information acquirement command to the event control task 307, and thereafter the process returns to step S3101 to continue the command return mode J. On the other hand, if the answer at step S3104 is positive (Yes), the process proceeds to step S3106, where transition to the command through mode K is made.

That is, whether or not notification of the transition to the Park mode led by the intelligent terminal 202 has been made is determined at step S3106, and if the answer thereto is negative (No), the process proceeds to step S3107 to determine the command has been received, and if the command has been received, the process proceeds to step S3108 to send the command to the event control task 307, and thereafter the process returns to step S3106 to repeat the above described process. On the other hand, if the command has not been received, the process proceeds to step S3109, where whether or not a response from the event control task 307 has been received is determined. Then, when the answer thereto is negative (No), the process returns to step S3106 to repeat the above described process, while when the answer is positive (Yes), the received response is stored in a RAM 103 and is sent to the Bluetooth controller 309 at subsequent step S3110, and the process returns to step S3106.

And thereafter, when due to the case where no transmission image exists and so on, transition to the Park mode led by the intelligent terminal 202 is performed, and consequently notification of the transition to the Park mode is made from the Bluetooth controller 309, the answer at step S3106 is positive (Yes), and the process returns to step S3101, where transition to the command return mode J is made for the operation mode.

Furthermore, the present invention should not be limited to the above described embodiment, and the wireless state at the above described command return mode is not limited to the Park mode, but may be a Standby mode in which the wireless link is opened, and other low power consumption modes such as Sniff Mode and Hold Mode in the Bluetooth specification.

Also, instead of facsimile apparatuses, other image formation apparatuses such as personal computers having image communication functions may be applied to the above described embodiment.

Also, for example, the image formation apparatus may comprise an electronic mail send/receive function in addition to the above described functions.

According to the above described embodiment, in the standby state, consumption of electric power and also occupation of the wireless channel, due to send/receive of a command to poll the state of the image formation apparatus such as a facsimile apparatus and a response thereto, is eliminated.

Also, since the state of low power consumption occurs automatically in the state where no service carries out, a wireless connection processing unit goes into the low power consumption state even without depending on an arrangement and command for transition to the low power consumption state, thus making it possible to reduce traffic of wireless communication, alleviate limitation for performing other services with other apparatuses through wireless communication, and reduce power consumption during the standby state.

Second Embodiment

The configuration of the facsimile apparatus in this embodiment is same as that of the first embodiment, and thus description thereof is omitted.

Figure 18:
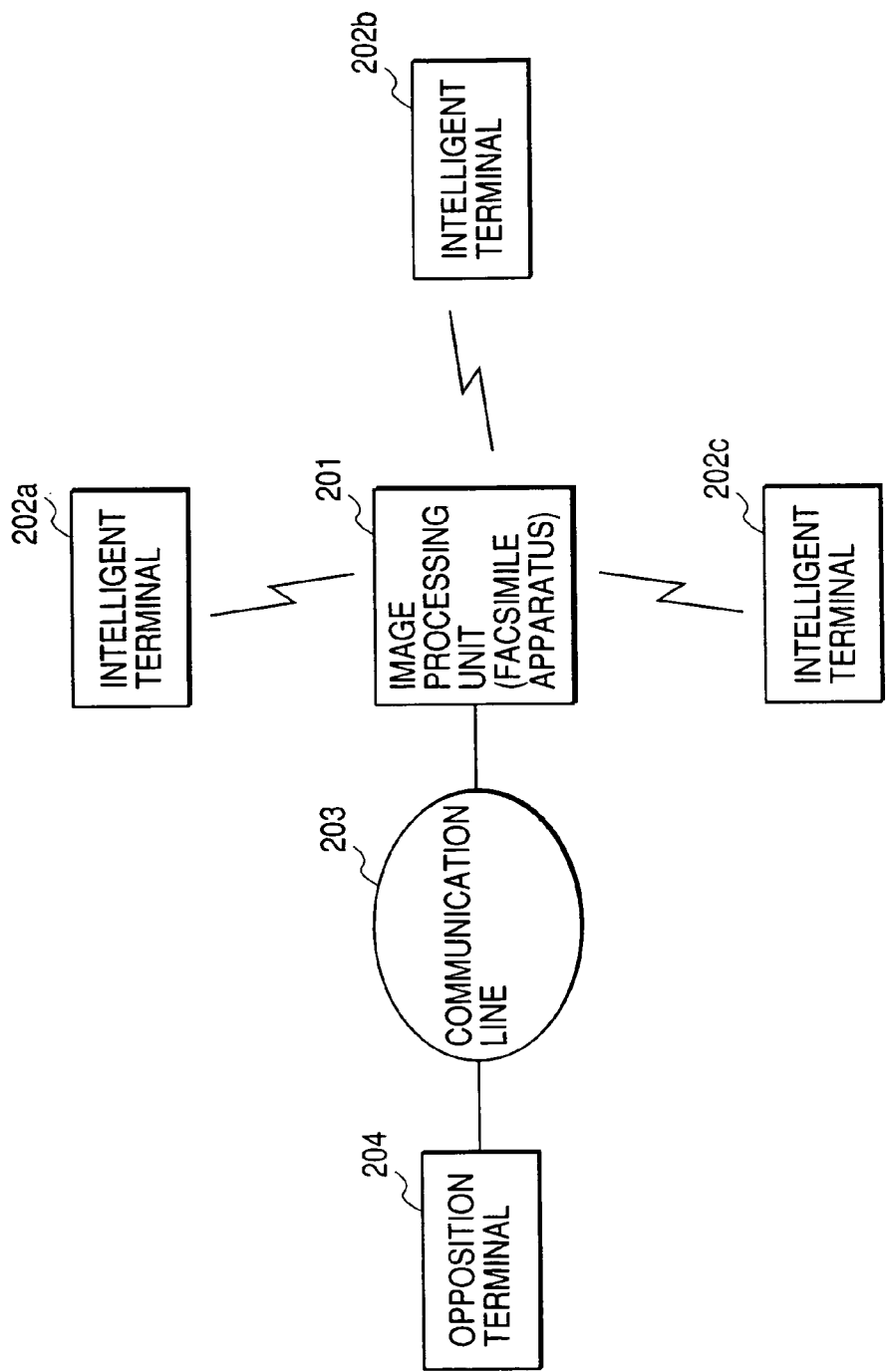
FIG. 18 is a block diagram showing one example of system configurations in the embodiment of the present invention.

FIG. 18 is a block diagram showing one example of the system configuration of this embodiment. Furthermore, for configurations same as those in FIG. 2, symbols same as those in FIG. 2 are assigned.

As shown in FIG. 18, the system of this embodiment is constituted by a facsimile apparatus 201, a plurality of intelligent terminals 202a to 202c (three intelligent terminals in this embodiment) represented by personal computers (PC), the above described communication line 203, and an opposite terminal 204 (for example, facsimile apparatus, PC, etc.) connected to this communication line 203.

The facsimile apparatus 201 is connected to the communication line 203, and can communicate with the opposite terminal 204. Also, the facsimile apparatus 201 can be wirelessly connected to respective intelligent terminals 202a to 202c. In this embodiment, since the wireless part is treated as Bluetooth, send/receive of image data and exchange of various kinds of data and programs can be performed with the intelligent terminals 202a to 202c if units for Bluetooth communication are included in the intelligent terminals 202a to 202c, respectively, or units for Bluetooth communication are connected to the intelligent terminals 202a to 202c. In addition, in this embodiment, a facsimile apparatus is employed as an image processing apparatus 201, but the image processing apparatus is not limited the facsimile apparatus, and it may be, for example, a multifunction apparatus comprising a scanner function and printer function, or it may be some other image processing apparatus such as an E-Mail terminal with a scanner or printer function added thereto, not causing departure from the nature of the present invention.

Also, the hierarchy of software for the facsimile apparatus 201 and the hierarchy of software for the intelligent terminals 202a to 202c are similar to the hierarchy of software described with FIGS. 3 and 4, and description thereof is thus omitted.

In addition, the process at the time of turning on the power of the intelligent terminals 202a to 202c, respectively, and the process at the time of turning on the power of the facsimile apparatus 201 are also similar to those of the embodiment described above, and thus description thereof is omitted.

Furthermore, in the following description, the process at the time of turning on the power of the intelligent terminals 202a to 202c is completed, and each of the intelligent terminals 202a to 202c is in the Park mode.

Figure 19:
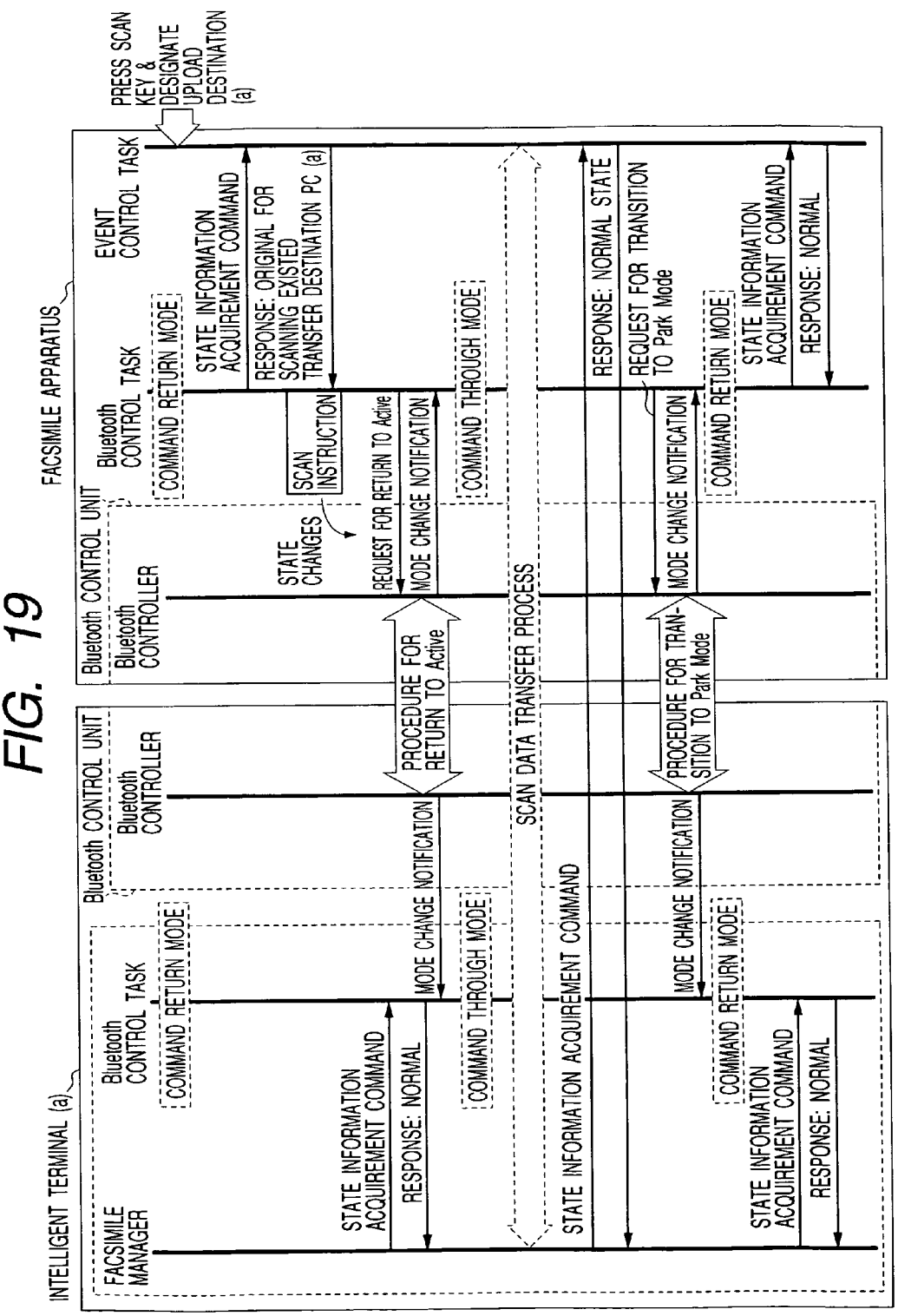
FIG. 19 shows a communication flow of scan data transfer process of transferring a scanned original from the facsimile apparatus 201 to the intelligent terminal 202a, in the embodiment of the present invention.

FIG. 19 shows a communication flow during scan data transfer process in the facsimile apparatus 201 in which the user sets an original and presses a scan key to transfer the scanned original to the intelligent terminal 202a.

The Bluetooth control task 308 of the facsimile apparatus 201 is in the command return mode during standby, and issues periodically the state information acquirement command to the event control task 307 to monitor the state of the facsimile apparatus 201.

The event control task 307 checks whether or not the state of the facsimile apparatus has changed. In the facsimile apparatus 201, if the original is set in the reader unit 107, and the scan key is pressed, display is provided for selecting a transfer destination to which the scanned image is uploaded, and the user is asked to input a transfer destination. If the user selects, for example, PC (a) (intelligent terminal 202a) being a transfer destination, a flag indicating the existence of an image to be scanned and PC (a) as a destination to which the scanned image is uploaded are stored in the RAM 103. The event control task 307 checks this area to recognize that there exists an image to be transferred to PC (a), and gives back a response of existence of an original for scanning and a parameter to the state information acquirement command.

When receiving the response of existence of an original for scanning, the Bluetooth control task 308 recovers communication between the facsimile apparatus 201 and the intelligent terminal 202a to transfer the scanned image data to the intelligent terminal 202a. At this time, commands of request for return to Active, etc. from the intelligent terminals 202b and 202c are ignored.

The Bluetooth control task 308 sends a request for return to Active to the Bluetooth controller 309 to recover the communication. The Bluetooth controller 309, which receives the request for return to Active, communicates with the Bluetooth controller 410 of the intelligent terminal 202a, in accordance with the communication recovery procedure of Bluetooth. When the communication is recovered, the Bluetooth controller 309 gives mode change notification to the Bluetooth control task 308. The Bluetooth control task 308, which receives the mode change notification, makes transition from the command return mode to the command through mode when it determines from the contents of the notification that the communication has been recovered, while the Bluetooth task 308 maintains the state of the command return mode when it determines that the communication cannot be recovered.

Similarly, the Bluetooth controller 410 of the intelligent terminal 202a gives mode change notification to the Bluetooth control task 409. The Bluetooth control task 409, which makes transition from the command return mode to the command though mode when it determines from the contents of the notification that the communication has been recovered, while the Bluetooth control task 409 maintains the state of the command return mode and displays a message as such on the above described display unit of the intelligent terminal 202a when it determines that the communication cannot be recovered.

When the communication is recovered, each of the Bluetooth control tasks 308 and 409 goes into the command though mode, scan image data transfer process is carried out with a command interface same as the interface for connection with cables such as a parallel interface such as Centronics (standard interface defined in IEEE 1284, etc.). The scan image data transfer process will be described later.

When the scan image data transfer process is completed, the facsimile manager 401 issues the state information acquirement command to the facsimile apparatus 201. The event control task 307, which receives the state information acquirement command, makes a search as to whether or not a scan image exists with the flag, etc. stored in the RAM 103, and when the scan image exists, it gives back a response of "scan image existed".

When the facsimile manager 401 determines from the response to the state information acquirement command that a scan image exists, it carries out the scan image data transfer process again, in accordance with the scan image data transfer process described later.

If no scan image exists, the event control task 307 that receives the state information acquirement command checks states associated with the facsimile apparatus 201 such as the state of the printer, the state of the scanner and the state of the memory, and gives back a response of normal state.

If the facsimile manager 401 determines from the response to the state information acquirement command that the state of error occurs, it displays a message showing the state of error on the above described display unit of the intelligent terminal 202a, and issues periodically the reception information acquirement command and the state information acquirement command to the event control task 307 until the state of error is corrected. On the other hand, when the facsimile manager 401 determines that the state of the facsimile apparatus 201 is normal, it issues periodically the state information acquirement command and the reception information acquirement command again until it makes transition to the Park mode being a power consumption mode.

The facsimile apparatus 201 makes again transition to the Park mode being a power consumption mode when it determines that the state is normal.

Then, the Bluetooth control task 308 of the facsimile apparatus 201 requests transition to the Park mode to the Bluetooth controller 309. The Bluetooth controller 309, which receives the request for transition to the Park mode carries out procedure of transfer to the Park mode with the Bluetooth controller 410 in accordance with the specification of Bluetooth.

When the transition procedure is completed, the Bluetooth controllers 309 and 410 notify the Bluetooth control tasks 308 and 409, respectively, of the transition to the Park mode.

When receiving the notification of the transition to the Park mode, the Bluetooth control tasks 308 and 409 go into command return modes, respectively.

Then, again, the command return mode is maintained until the user starts a service such as facsimile transmission, scan instruction or print in the intelligent terminals 202a to 202c, or scan operation and facsimile reception occur in the facsimile apparatus 201.

Figure 20:
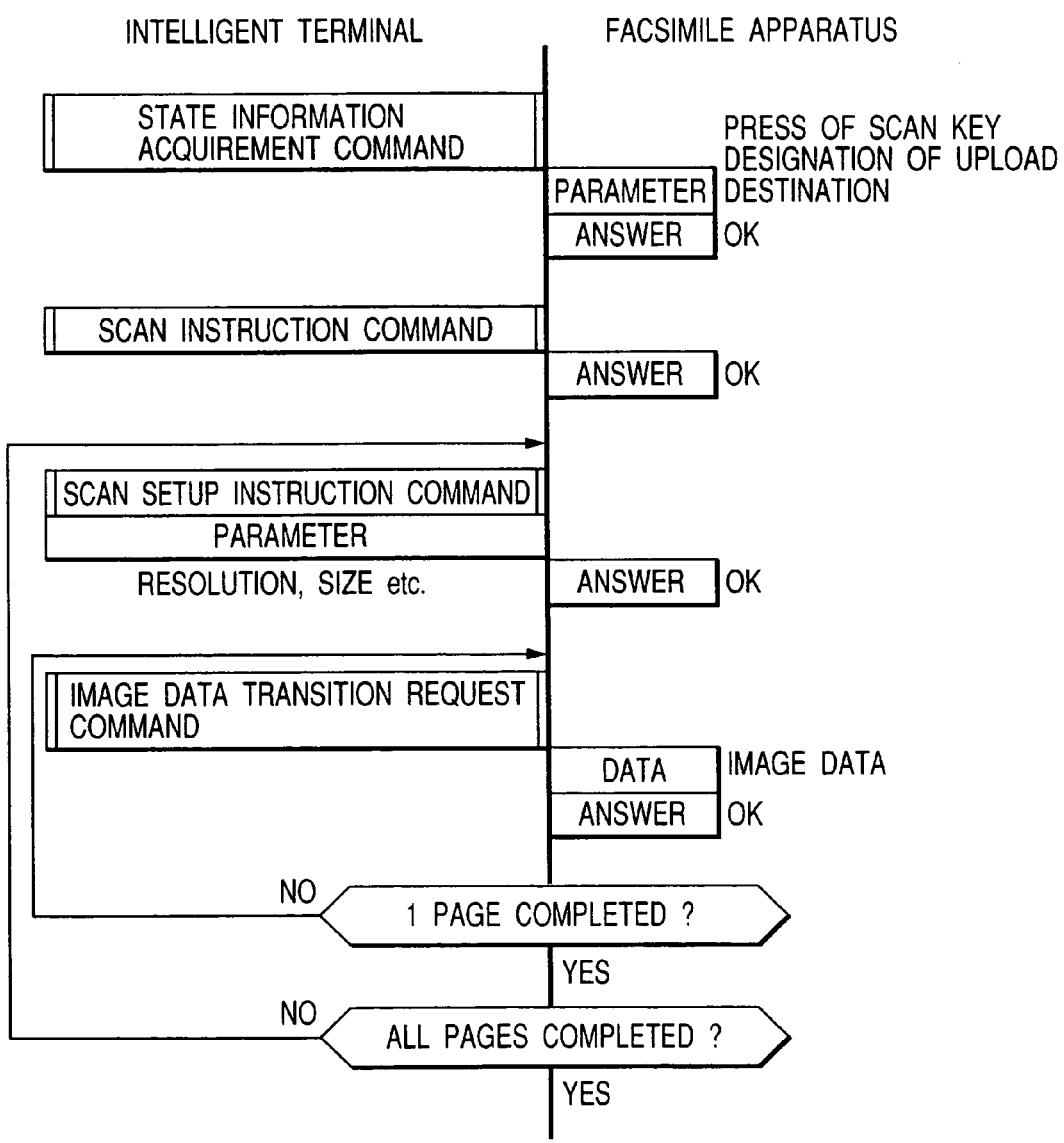
FIG. 20 shows a brief overview of transfer process of the command and data between the facsimile apparatus 201 and the intelligent terminal 202a in the scan image data transfer process, in the embodiment of the present invention.

FIG. 20 shows an outline of control of transfer of commands and data between the facsimile apparatus 201 and the intelligent terminal 202a in the scan image data transfer process of FIG. 19.

In the facsimile apparatus 201, when an original to be scanned is set on the reader unit 107, and the scan key is pressed, a flag showing that an original for scanning exists is set. Then, display is provided on the display unit of the operation unit 108 for selecting a transfer destination to which data is uploaded and the user is asked to select the transfer destination. When the transfer destination is selected, the transfer destination is stored in a predetermined area of the RAM 103 as in the case of the above described flag.

If it is known that an original for scanning exists from the above described area, a response of "original for scanning existed" is given back to the state information acquirement command from the intelligent terminal 202a.

Then, a scan instruction command is sent from the intelligent terminal 202a, and the facsimile apparatus 201 that receives this command gives back the answer of "OK" when the reader unit 107 is operable, and gives back the answer of "NG" when the reader unit 107 is not operable. When the answer to the scan instruction command is "OK", the intelligent terminal 202a sends a scan setup instruction command, and subsequently a setup parameter such as read main/sub scan resolution. The facsimile apparatus 201 that receives those sends the answer of "OK" if read control in accordance with the parameter is possible, while it sends the answer of "NG" if read control in accordance with the parameter is impossible.

If the answer of "OK" is sent, the facsimile apparatus 201 reads the original with the reader unit 107, accumulates encoded data in the image memory (DRAM) 104, and transfers image data of predetermined size from the image memory (DRAM) 104 to the intelligent terminal 202 together with the answer of "OK" if a request for transfer of image data is made from the intelligent terminal 202a. If meanwhile, an interruption by a stop key (not shown) from the operation unit 108 or an error of the read system such as an original jam occurs, the facsimile apparatus 201 sends the answer of "NG". Then, the facsimile apparatus 201 transfers original read image data of one page, examines whether or not a next original for reading exists after transfer of one page is completed, notifies the intelligent terminal 202a thereof, and waits for the scan setup instruction command from the intelligent terminal 202a if a next original for reading exists. On the other hand, if a next original for reading does not exist, the process is ended.

Figure 21:
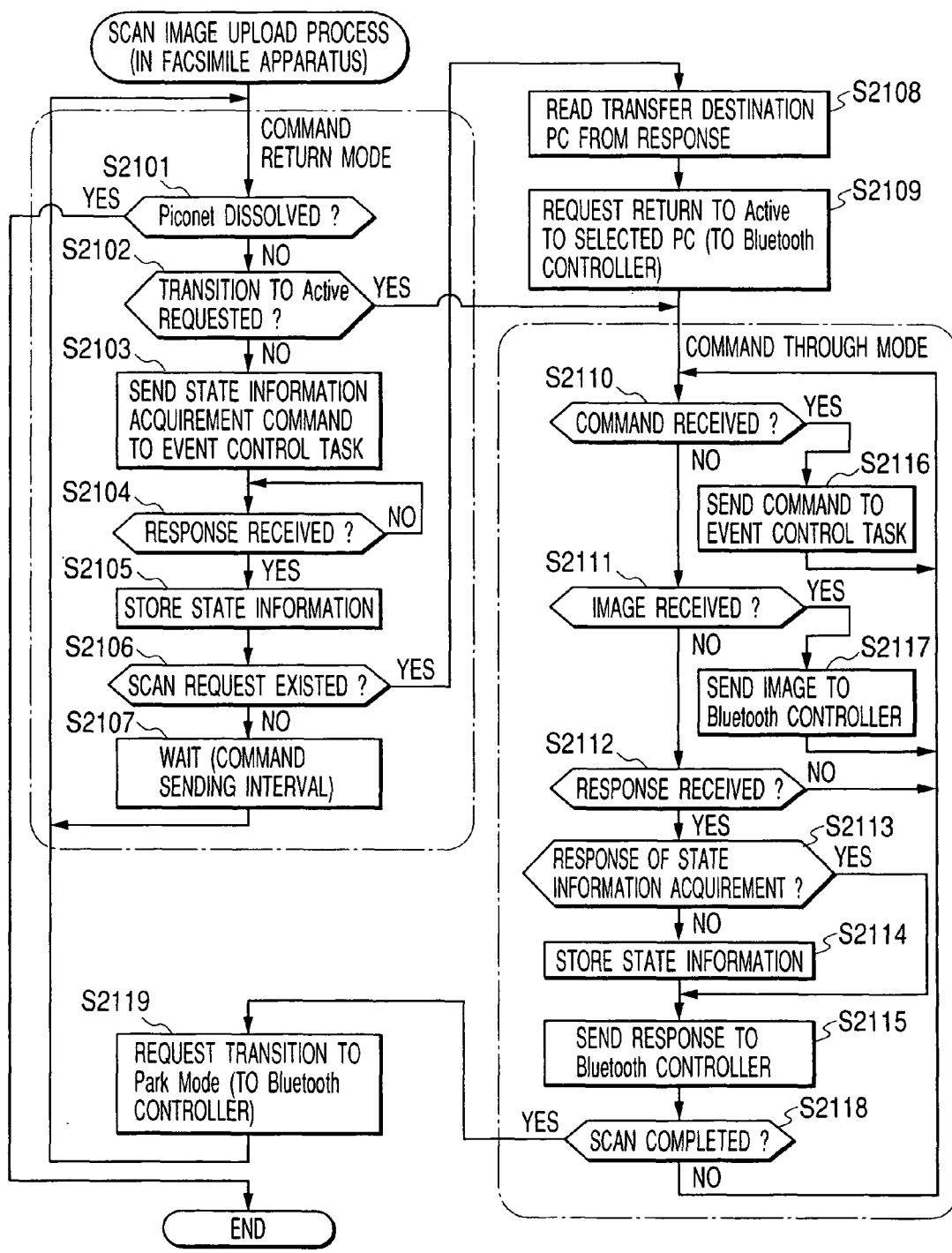
FIG. 21 is a flowchart showing a scan image upload procedure carried out by the Bluetooth control task 308 of the facsimile apparatus 201 in the embodiment of the present invention.

FIG. 21 is a flowchart showing a scan image upload process carried out by the Bluetooth control task 308 of the facsimile apparatus 201. Furthermore, the mode between the facsimile apparatus 201 and the intelligent terminal 202a is the Park mode, and the Bluetooth control task 308 is in the command return mode.

In FIG. 21, at step S2101, whether or not Piconet with the intelligent terminal 202a has been eliminated by the mode change notification from the Bluetooth controller 309 is determined. If the Piconet has been eliminated, sending of the command to the event control task 307 is stopped, and this scan image upload process is ended.

On the other hand, if the Piconet has not been eliminated, the process proceeds to step S2102, where whether or not a request for transition to Active is made is determined by the mode change notification from the Bluetooth controller 309. If the request for return to Active is made, the process proceeds to step S2110, where transition to the command through mode is made, while if the request for return to Active is not made, the process proceeds to step S2103.

The state information acquirement command is sent to the event control task 307 at step S2103, and a response is received at step S2104.

When the response is received, the state information included in the response is stored in the Bluetooth control task 308 at step S2105.

Whether or not a request for scanning is made is determined from the stored state information at step S2106, and if the request for scanning is not made, the process proceeds to S2107, where the process waits to send the information acquirement command periodically, and thereafter the process returns to step S2101. On the other hand, if the request for scanning is made, the process proceeds to step S2108, where the intelligent terminal (for example, intelligent terminal 202a) that is a transfer destination is read from the stored state information, and at step S2109, in order to make a request for return to Active to the intelligent terminal that is a transfer destination, such a request for return to Active is sent to the Bluetooth controller 309. Then, the process proceeds to step S2110, where transition is made from the command return mode to the command through mode.

At step S2110, whether or not a command has been received is determined, and the process proceeds to step S2116, where the command is sent to the event control task 307 if the command has been received, and the process proceeds to step S2111 if the command has not been received.

Whether or not an image has been received is determined at step S2111, and the process proceeds to step S2117, where the image is sent to the Bluetooth controller 309 if the image has been received, and the process proceeds to step S2112 if the image has not been received.

Whether or not a response has been received is determined at step S2112, and the process returns to step S2110 id the response has not been received, while the process proceeds to step S2113 if the response has been received.

When the response is received, the state information included in the response is stored in the Bluetooth control task 308 at step S2114. Then, the response received from the event control task 307 is sent to the Bluetooth controller 309 at step S2115.

Then, whether or not upload of the scanned image has been completed is determined at step S2118, and the process returns to step S2110 if it has not been completed yet, and the process proceeds to step S2119 if it has been completed.

At step S2119, a request for transition to the Park mode is sent to the Bluetooth controller 309 to make transition to the Park mode, and transition to the command return mode is made, and the process returns to step S2101.

Figure 22:
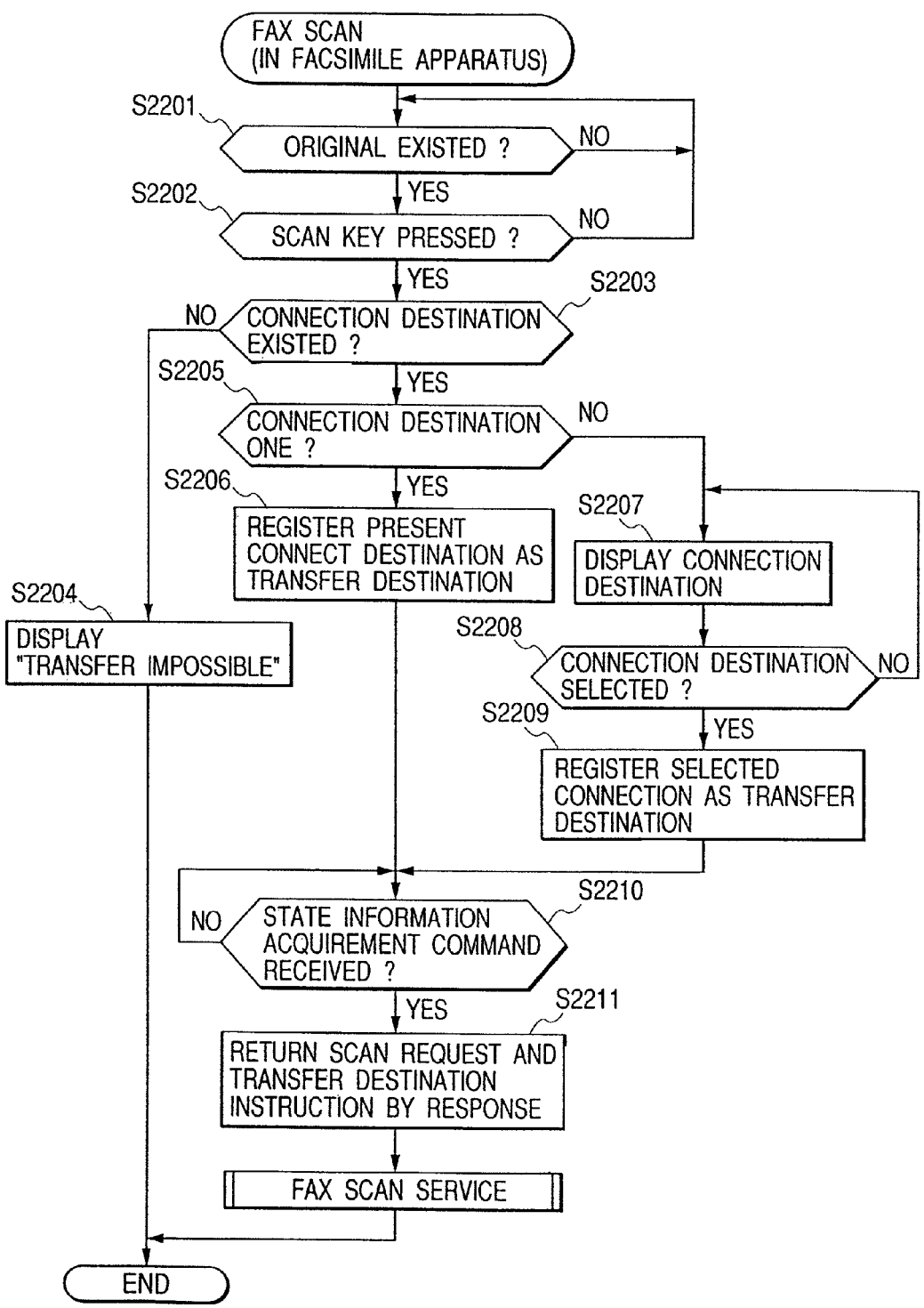
FIG. 22 is a flowchart showing a procedure of scan process carried out by a CPU 101 of the facsimile apparatus 201 in the case where the image is scanned is response to a scan request from the facsimile apparatus 201 in the embodiment of the present invention.

FIG. 22 is a flowchart showing a procedure of scan process that the CPU 101 of the facsimile apparatus 201 carries out when the image is scanned upon request for scanning from the facsimile apparatus 201.

In FIG. 22, whether or not an original exists in the reader unit 107 is first detected at step S2201, and step S2201 is repeated if the original does not exist, and the process proceeds to S2202 if the original exists.

Whether or not a scan key (not shown) existing in the operation unit 108 has been pressed is determined at step S2202, and the process returns to step S2201 if it has not been pressed, and the process proceeds to step S2203 if it has been pressed.

At step S2203, whether or not intelligent terminals connected with Bluetooth exist is determined from the connection destination list stored in the RAM 103. If no connection destinations exist, the process proceeds to step S2204, where display of "transfer impossible" is provided on the LCD display unit (not shown) of the operation unit 108, and this image scan process is ended. Furthermore, display showing that a connection destination does not exist is not limited to display by the LCD display unit, but may be the light of an error lamp, for example.

If connection destinations exist at step S2203, the process proceeds to step S2205, where whether or not there exists only one connection destination is determined. If there exists a plurality of connection destinations, the process proceeds to step S2207, where the current connection destinations are displayed on the LCD display unit of the operation unit 108, and the user is prompted to select which intelligent terminal the scanned image is to be sent to.

Then, whether or not the intelligent terminal being a transfer destination has been selected with the operation in the operation unit 108 is checked at step S2208, and the process returns to step S2207 if the intelligent terminal being a transfer destination has not been selected, while if the intelligent terminal being a transfer destination has been selected, the process proceeds to step S2209, where the selected intelligent terminal being a transfer destination is registered being a transfer destination.

Then, the state information acquirement command from the Bluetooth control task 308 is waited at step S2210, and when the state information acquirement command is received, the process proceeds to step S2211, where "scan request existed" and the information of the intelligent terminal being a transfer destination are given back to the Bluetooth control task 308 as a response to the state information acquirement command, and the above described FAX scan service process (scan image data transfer process) is carried out.

If there exists only one connection destination at the above described step S2205, the process proceeds to step S2206, where the intelligent terminal that the current transfer destination is registered being a transfer destination without carrying out processes such as display of a connection destination, and the process proceeds to step S2210, where the aforesaid process is carried out.

Figure 23:
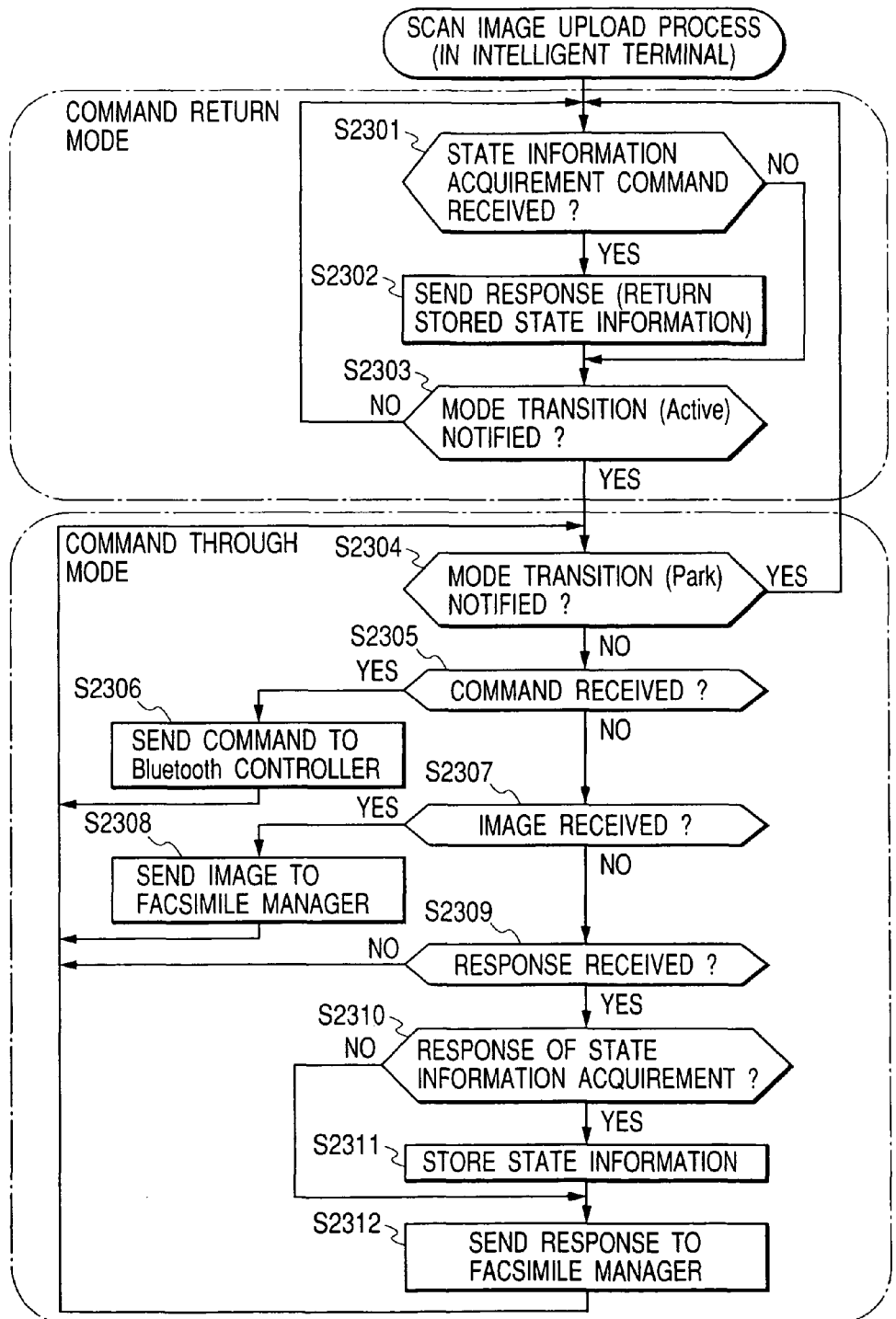
FIG. 23 is a flowchart showing a scan image upload procedure carried out by the Bluetooth control task 409 of the intelligent terminal 202a in the embodiment of the present invention.

FIG. 23 is a flowchart showing a scan image upload process carries out by the Bluetooth control task 409 of the intelligent terminal 202a. Furthermore, the Bluetooth control task 409 is in the command return mode in the state where no received image exists (step S2301 to step S2303).

In FIG. 23, whether or not the state information acquirement command has been received from the facsimile manager 401 is determined at step S2301, and the process proceeds to step S2302 if it has been received, while the process proceeds to step S2303 if it has not been received.

The state information stored in the Bluetooth control task 409 is sent to the facsimile manager 401 as a response at step S2302.

At step S2303, transition to the Active mode led by the facsimile apparatus 201 is performed, and whether or not mode transition notification has been received is determined, and if it has not been received, the process returns to step S2301, and if it has been received, the process proceeds to step S2304, where transition to the command through mode is made.

At step S2304, transition to the Park mode led by the facsimile apparatus 201 is performed, and whether or not mode transition notification has been received is determined, and if it has not been received, the process proceeds to step S2305, and if it has been received, the process returns to step S2301, where transition to the command return mode is made.

At step S2305, whether or not a command has been received is determined, and if it has been received, the process proceeds to step S2306, where the command is sent to the Bluetooth controller 410, and if it has not been received, the process proceeds to step S2307.

At step S2307, whether or not an image has been received is determined, and if it has been received, the process proceeds to step S2308, where the image is sent to the facsimile manager 401, and if it has not been received, the process proceeds to step S2309.

At step S2309, whether or not a response has been received is determined, and if it has been received, the process proceeds to step S2310, and if it has not been received, the process returns to step S2304.

At step S2310, whether or not the response is a response to the state information acquirement command is determined, and if it is a response to the state information acquirement command, the process proceeds to step S2311, and if it is not a response to the state information acquirement command, the process proceeds to step S2312.

At step S2311, the state information included in the response is stored in the Bluetooth control task 409, and the process proceeds to step S2312.

At step S2312, the response is sent to the facsimile manager 401.

Figure 24:
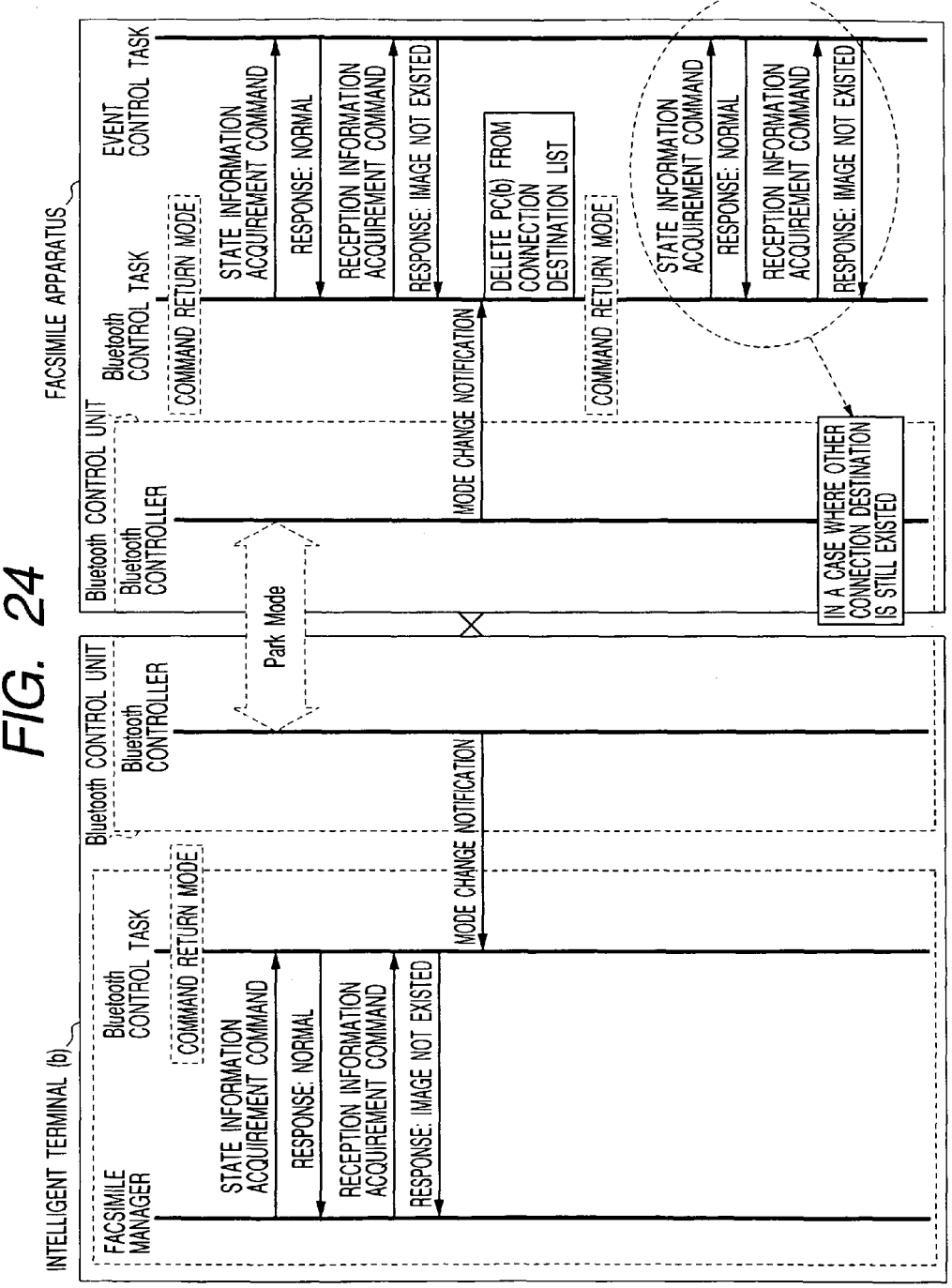
FIG. 24 shows a communication flow in the case where the intelligent terminal 202b has Piconet with the facsimile apparatus 201 canceled in the embodiment of the present invention.

FIG. 24 shows a communication flow in the case where Piconet with the intelligent terminal 202b of the intelligent terminals 202a to 202c to which the facsimile apparatus 210 is connected with Bluetooth to establish Piconet is eliminated, for example because the power of intelligent terminal 202b is turned off, it moves to a dead spot outside the space to which the radio wave reaches or the like. Furthermore, when transition to the Park mode is made, the facsimile apparatus 201 maintains Piconet synchronization by receiving beacons sent from each of the intelligent terminals 202a to 202c being master terminals.

The Bluetooth control task 308 of the facsimile apparatus 201 is in the command return mode during standby, and issues periodically the state information acquirement command and the reception information acquirement command to the event control task 307 to monitor the state of the facsimile apparatus 201. The event control task 307, which receives the state information acquirement command, checks states associated with the facsimile apparatus 201 such as the state of the printer, the state of the scanner and the state of the memory, and sends back a response as such. Also, for the reception information acquirement command issued by the Bluetooth control task 308, the event control task 307 makes a search as to whether the received image exists in the image management record stored in the RAM 103, and sends a response as such.

Similarly, the facsimile manager 401 of the intelligent terminal 202b is in the command return mode during standby, and issues periodically the state information acquirement command and the reception information acquirement command to the Bluetooth control task 409. The Bluetooth control task 409, which receives the state information acquirement command, sends back the stored state associated with the facsimile apparatus 201 as a response. For the reception information acquirement command, a search is made as to whether the received image exists in the stored image management record, and sends back a response as such.

By the way, in the case where reception of beacons becomes impossible and the Park mode cannot be maintained because the power of the intelligent terminal 202b is turned off, it moves to a dead spot outside a space to which the radio wave reaches, and so on, the Bluetooth controller 309 of the facsimile apparatus 201 sends mode change notification of elimination of Piconet to the Bluetooth control task 308.

The Bluetooth control task 308 receives the notification, and deletes the intelligent terminal 202b from the connection destination list in the RAM 103. At this time, if other connection destination intelligent terminals (the intelligent terminal 202a or 202c in this embodiment), the state information acquirement command and the reception information acquirement command are sent periodically to the event control task 307 as ever. On the other hand, in the case where the intelligent terminal 202b is deleted from the connection destination list, whereby connection destinations no longer exist, the Bluetooth control task 308 stops sending the state information acquirement command and the reception information acquirement command.

Also, the Bluetooth controller 410 in the intelligent terminal sends mode change notification of elimination of Piconet to the Bluetooth control task 409, and thereafter stops sending the state information acquirement command and the reception information acquirement command. However, in the case where Piconet is eliminated because the power of the intelligent terminal is turned off, this process is not (cannot be) carried out.

The present invention should not be limited to the above described embodiment, and the wireless state at the above described command return mode is not limited to the Park mode, but may be a standby state in which the wireless link is opened, and other modes such as Sniff Mode and Hold Mode in the Bluetooth.

Third Embodiment

The above described each embodiment represents an example in which the Park mode is maintained when no command is exchanged between the facsimile apparatus and the intelligent terminal, but in this case, an example in which the Standby mode is maintained when no command is exchanged between the facsimile apparatus and the intelligent terminal will be described. In the Standby mode referred herein, since synchronization of clock is not retained between the master and the slave, Piconet can no longer be retained. This embodiment will be described in detail below, based on the drawings.

The image processing apparatus constituting the image processing system of this embodiment, the configuration of the image processing system, and the hierarchy of control software thereof are similar to those of the above described embodiment, and thus description thereof is omitted.

Figure 25:
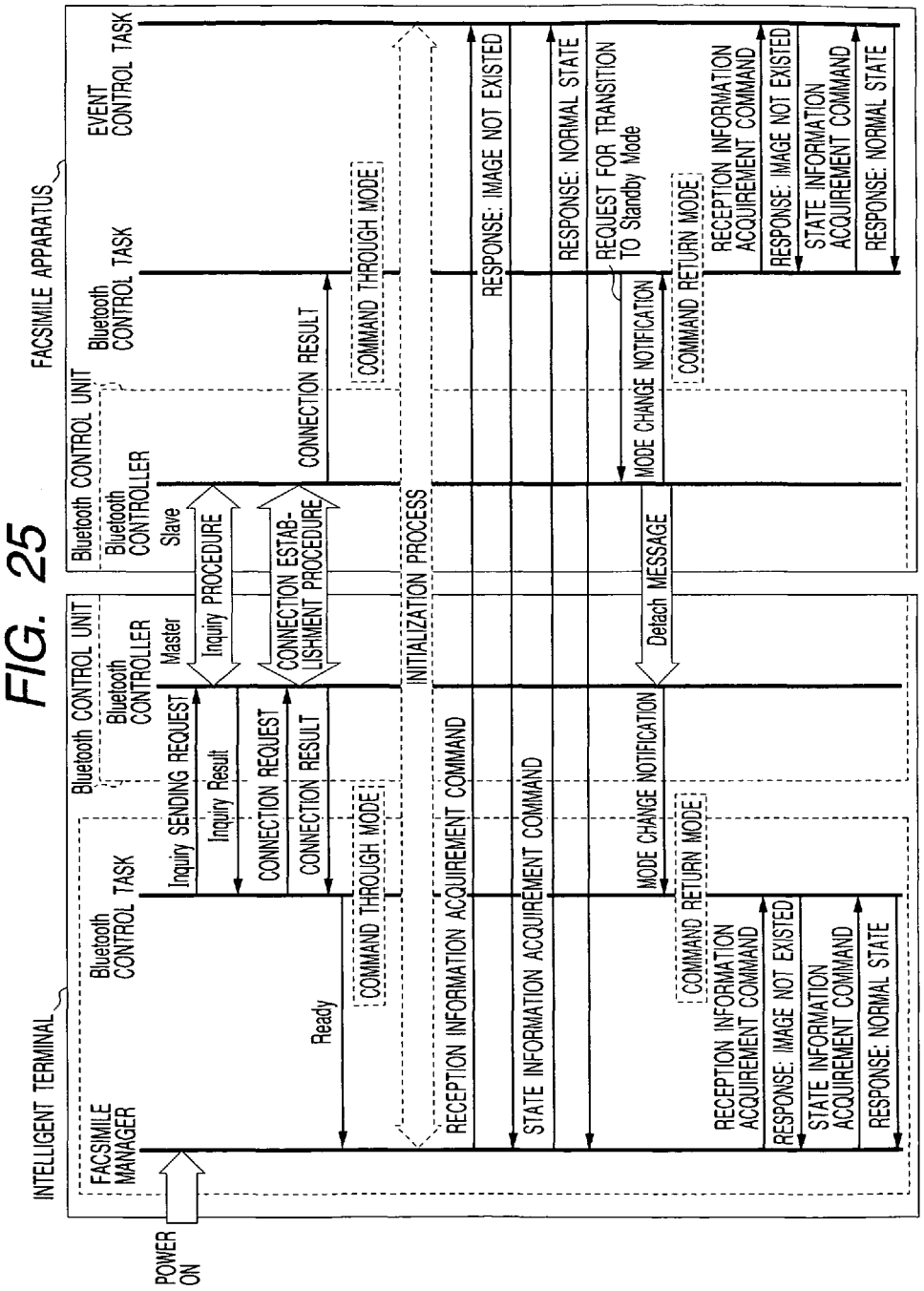
FIG. 25 shows a communication flow when an image processing system is started in the embodiment of the present invention.

FIG. 25 shows a communication flow when the image processing system of this embodiment is started, showing initialization process that is performed by the intelligent terminal 202a in concert with the facsimile apparatus 201 when the power of any intelligent terminal (for example, intelligent terminal 202a) of the above described plurality of intelligent terminals 202a to 202c in FIG. 18 is turned on, and process until transition to the standby state is made. Only aspects different from those in FIG. 5 will be described.

The process after the intelligent terminal 202a is turned on until process for connecting it to the facsimile apparatus 201 is carried out is same as that in FIG. 5. If no received image exists and the state of the facsimile apparatus 201 is normal after connection, the facsimile apparatus makes transition to the Standby mode. That is, the Bluetooth control task 308 of the facsimile apparatus 201 requests transition to the Standby mode to the Bluetooth controller 309. The Bluetooth controller 309, which receives the request for transition to the Standby mode, sends a Detach message to the Bluetooth controller 410 of the intelligent terminal 202a, makes transition to the Standby mode, and notifies the Bluetooth control task 308 of the transition to the Standby mode.

Also, the Bluetooth controller 410, which receives the Detach message, makes transition to the Standby mode, and notifies the Bluetooth control task 409 of the transition to the Standby mode.

When the Bluetooth control tasks 308 and 409 are notified of the transition to the Standby mode, they make transition to the command return mode, respectively.

Figure 26:
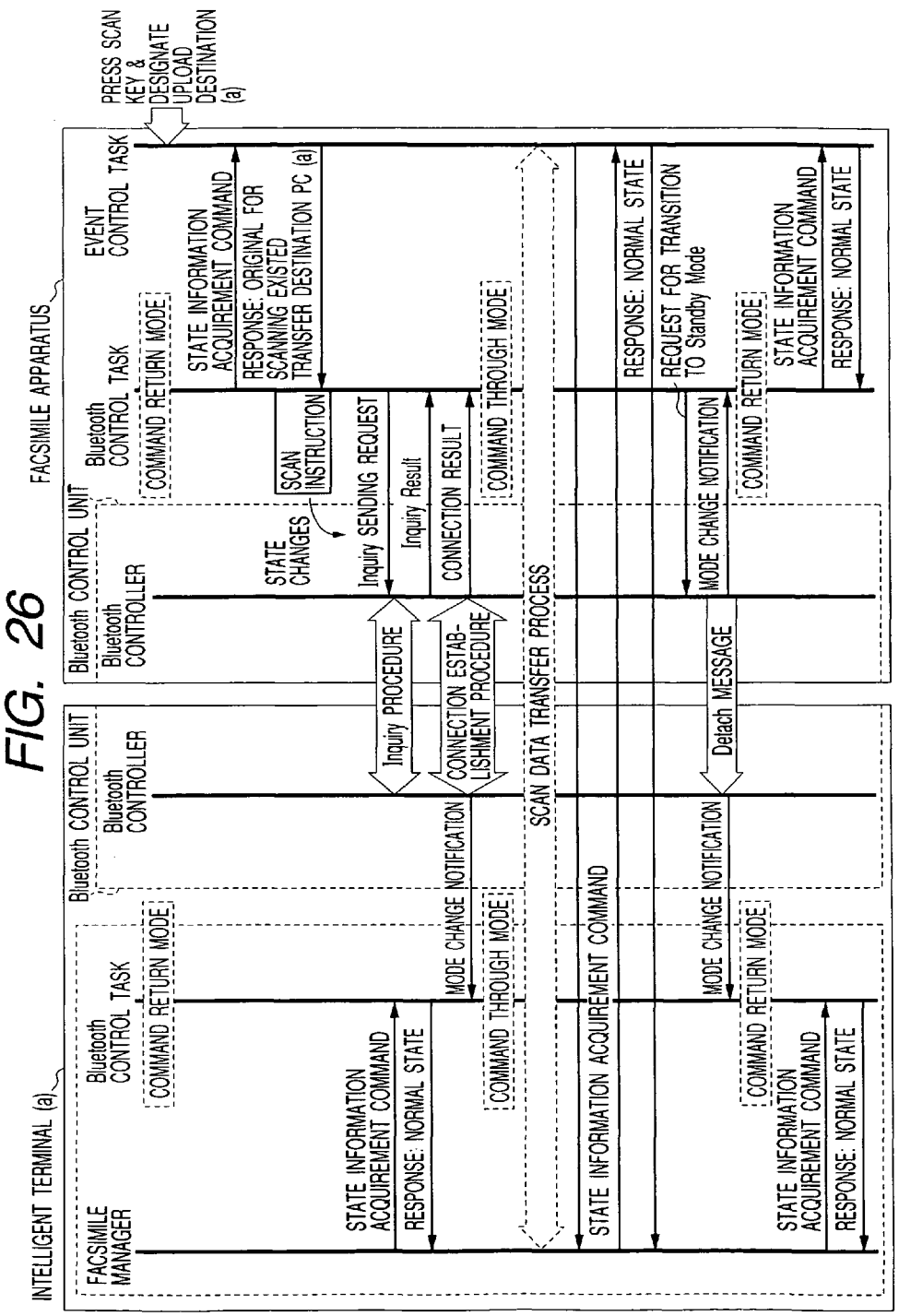
FIG. 26 shows a communication flow of scan data transfer process in the embodiment of the present invention.

FIG. 26 shows a communication flow during scan data transfer process.

The Bluetooth control task 308 of the facsimile apparatus 201 is in the command return mode during standby, and issues periodically the state information acquirement command to the event control task 307 to monitor the state of the facsimile apparatus 201.

The event control task 307 checks whether or not the state of the facsimile apparatus has changed. In the facsimile apparatus 201, if the original is set in the reader unit 107, and the scan key is pressed, display is provided for selecting a transfer destination to which the scanned image is uploaded, and the user is asked to input a transfer destination. If the user selects, for example, PC (a) (intelligent terminal 202a) as a transfer destination, a flag indicating the existence of an image to be scanned and PC (a) as a destination to which the scanned image is uploaded are stored in the RAM 103. The event control task 307 checks this area to recognize that there exists an image to be transferred to PC (a), and gives back a response of "original for scanning existed" to the state information acquirement command as a parameter.

When receiving the response of existence of an original for scanning, the Bluetooth control task 308 recovers communication between the facsimile apparatus 201 and the intelligent terminal 202a to transfer the reception image data to the intelligent terminal 202a. At this time, commands from the intelligent terminals 202b and 202c are ignored.

An Inquiry sending request is sent to the Bluetooth controller 309 to recover communication. The Bluetooth controller 309, which receives the Inquiry sending request, carries out an Inquiry procedure in accordance with the connection procedure of Bluetooth, and notifies the Bluetooth control task 308 of the result thereof. When the Bluetooth control task 308 receives the "Inquiry Result", it determines from the contents thereof whether or not connection to the intelligent terminal 202a is possible, and designates an address of the intelligent terminal 202a and makes a connection request to the Bluetooth controller 309 when the connection is possible.

When the Bluetooth controller 309 receives the connection request, it performs establishment of a connection using "Serial Port Profile" for the Bluetooth controller 410 of the intelligent terminal 202a, based on the specification of Bluetooth. Then, when the connection is established, the Bluetooth controller 309 notifies the Bluetooth control task 308 of the result thereof.

When the Bluetooth control task 308 detects from the connection result that the connection could be established, it makes transition to the command through mode.

The Bluetooth controller 410 of the intelligent terminal 202a also notifies the Bluetooth control task 409 of the connection result. When the Bluetooth control task 409 ensures from the connection result that the connection has been established, it makes transition to the command through mode.

When the communication is recovered, and each of Bluetooth control tasks 308 and 409 goes into the command through mode, the scan data transfer process is carried out as described above.

When the scan data transfer process is completed and it is determined that the state of the facsimile apparatus 201 is normal, the facsimile apparatus 201 makes transition to the Standby mode as described with FIG. 25, and the intelligent terminal 202 also makes transition to the Standby mode. When receiving notification of the transition to the Standby mode, each of the Bluetooth control tasks 308 and 409 goes into the command return mode.

The control of transfer commands and data between the facsimile apparatus 201 and the intelligent terminal 202a in the scan image data transfer process is similar to the process of transfer control described above, and thus description thereof is omitted.

Also, the process at the time when the power of the facsimile apparatus 201 is turned on is similar to that of the above described embodiment, and thus description thereof is omitted.

Figure 27:
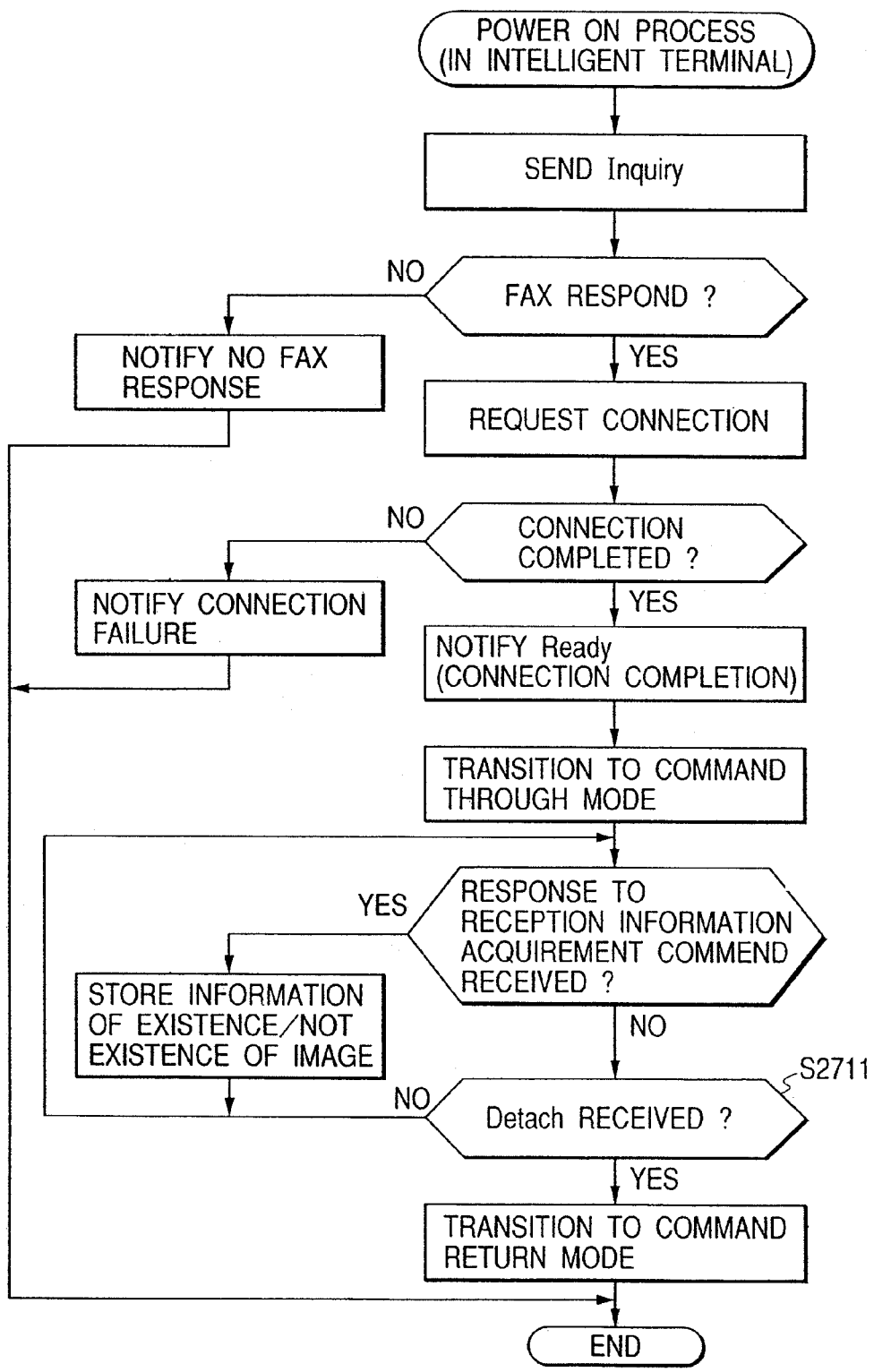
FIG. 27 is a flowchart showing a power on process carried out by the Bluetooth control task 409 of the intelligent terminal 202a in the embodiment of the present invention.

FIG. 27 is a flowchart showing a procedure of power on process carried by the Bluetooth control task 409 of the intelligent terminal 202a.

It is identical to FIG. 9 except that whether or not notification of transition to the Standby mode, not to Park mode, has been received is determined at step S2711.

Figure 28:
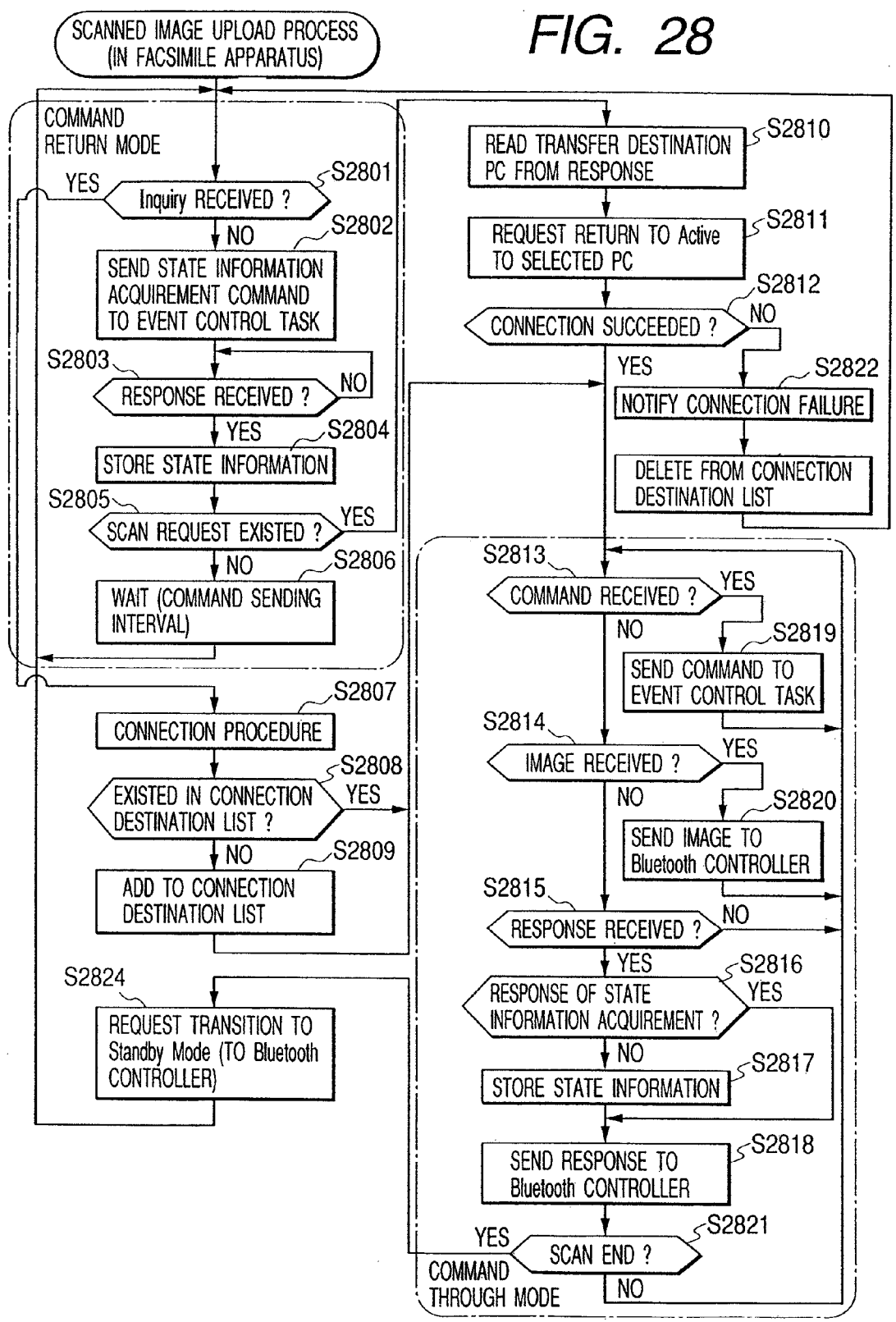
FIG. 28 is a flowchart showing a scan image upload procedure carried out by the Bluetooth control task 308 of the facsimile apparatus 201 in the embodiment of the present invention.

FIG. 28 is a flowchart showing a procedure of scan image upload process carried out by the Bluetooth control task 308 of the facsimile apparatus 201. Furthermore, the mode between the facsimile apparatus 201 and the intelligent terminal 202a is the Standby mode, and the Bluetooth control task 308 is in the command return mode.

At step S2801, whether or not notification of the reception of "Inquiry" is given from the Bluetooth controller 309 is determined. If the Bluetooth controller 309 has received the "Inquiry", the process proceeds to step S2807, where connection procedure is carried out with the opposite sending the "Inquiry" based on the specification of Bluetooth. Then, whether or not the opposite sending the "Inquiry" is included in the connection destination list is determined at step S2808, and if it is not included in the connection destination list, the process proceeds to step S2809, where the opposite sending the "Inquiry" is added in the connection destination list, and the process moves to the process of the command through mode described later. If it is included in the connection destination list, the process skips step S2809 and moves to the process of the command thorough mode described later. On the other hand, if notification of the reception of the "Inquiry" is not given from the Bluetooth controller 309 at step S2801, the process proceeds to step S2802.

At step S2802, the state information acquirement command is sent to the event control task 307, and at step S2803, a response is received.

When the response is received, the state information included in the response is stored in the Bluetooth control task 308 at step S2804.

At step S2805, whether or not a scan request is made is determined from the stored state information, and if the scan request is not made, the process proceeds to step S2806, where the process waits to send the information acquirement command periodically, and thereafter returns to step S2801.

On the other hand, if the scan request is made, the process proceeds to step S2810, where the intelligent terminal being a transfer destination (for example, intelligent terminal 202a) is read from the stored state information, and at step S2811, the Inquiry sending request is sent to the Bluetooth controller 309 to send the "Inquiry" to the intelligent terminal being the transfer destination. Then, at step S2812, whether or not connection has been established is determined. If the connection is established, the process proceeds to step S2813, where transition is made form the command return mode to the command through mode.

If notification of the establishment of the connection is not received at step S2812, and the connection is unsuccessful, the process proceeds to step S2822, where notification of the unsuccessful connection is made, and the intelligent terminal being the transfer destination is deleted from the connection destination list, and the process returns to step S2801.

The process steps S2813 to S2821 in the command through mode are same as the above described steps S2110 to S2118 of FIG. 21.

At step S2821, whether or not upload of the scanned image has been completed is determined as in the case of step S2118, and if the upload has not been completed yet, the process returns to step S2813, and if it has been completed, the process proceeds to step S2824.

At step S2824, a request for transition to the Standby mode is sent to the Bluetooth controller 309 to make transition to the Standby mode, and transition to the command return mode is made, and the process returns to step S2801.

The procedure of scan process carried by the CPU 101 of the facsimile apparatus 201 when the image is scanned in response to the scan request from the facsimile apparatus 201 is same as the above described procedure in FIG. 22, and thus description thereof is omitted.

Figure 29:
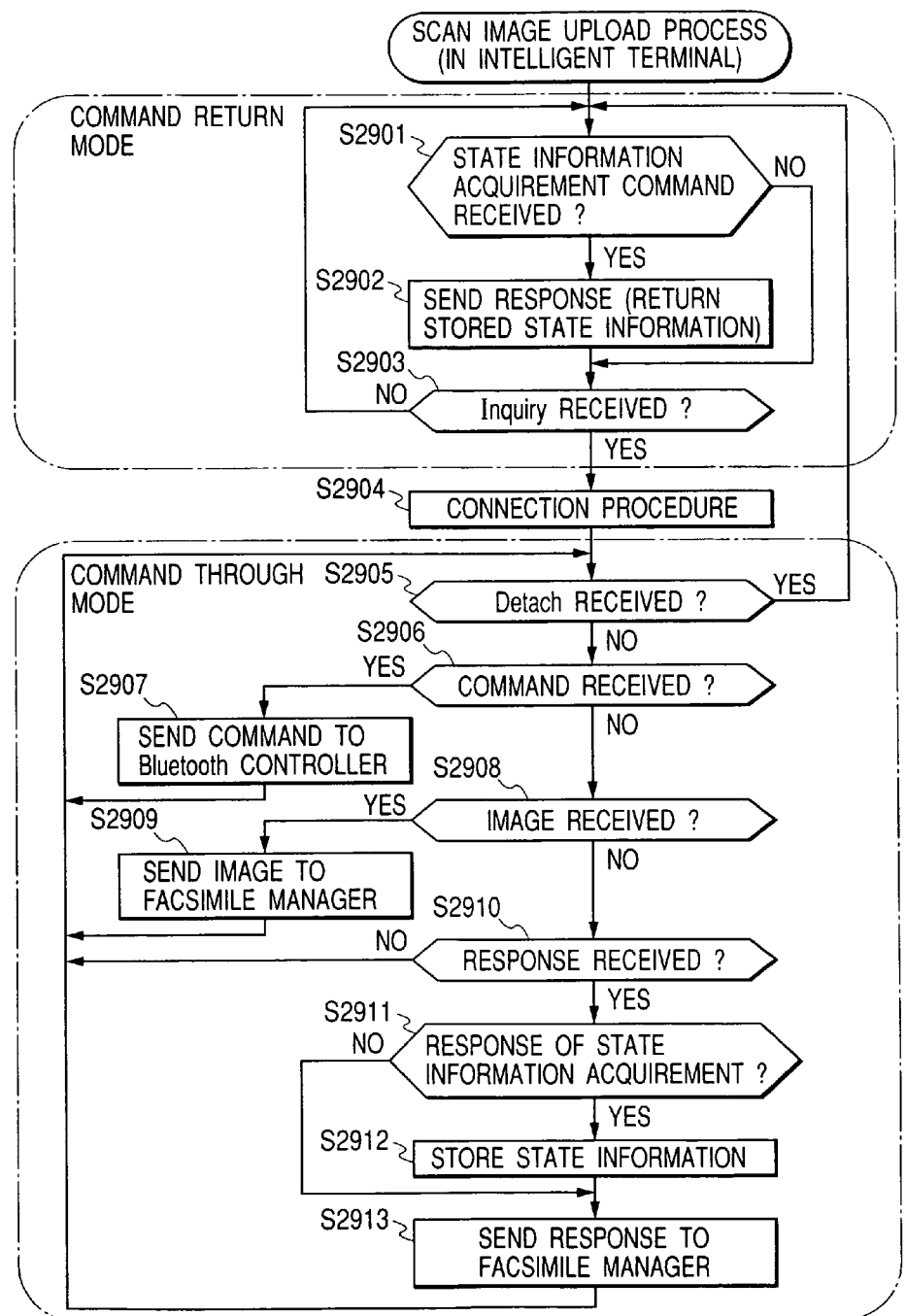
FIG. 29 is a flowchart showing a scan image upload procedure carried out by the Bluetooth control task 409 of the intelligent terminal 202a in the embodiment of the present invention.

FIG. 29 is a flowchart showing the procedure of scan image upload process carried by the Bluetooth control task 409 of the intelligent terminal 202a. Furthermore, the Bluetooth control task 409 is in the command return mode in the state where no received image exists.

In FIG. 29, whether or not the state information acquirement command has been received from the facsimile manager 401 at step S2901, and if the command has been received, the process proceeds to step S2902, while if the command has not been received, the process returns to step S2903.

At step S2902, the state information stored in the Bluetooth control task 409 is sent to the facsimile manager 401 as a response.

Whether or not the Bluetooth controller 410 has received the "Inquiry" is determined at step S2903, and if it has not received the "Inquiry", the process returns to step S2901, and if it has received the "Inquiry" the process proceeds to step S2904, where the connection procedure for establishment of connection is carried out based on the specification of Bluetooth, and transition to the command through mode is made.

At step S2905, whether or not the Bluetooth controller 410 has received from the facsimile apparatus 201 a Detach command providing instructions to make transition to the Standby mode is determined, and if it has not received the command, the process proceeds to step S2906, and if it has received the command, the process returns to step S2901, where transition to the command return mode is made.

The subsequent step S2906 and the steps thereafter are same as the above described steps S2305 to S2312 in FIG. 23.

As described above, according to the above described second and third embodiments, it is made possible to select which information processing apparatus the scan image is transferred to, when the scan image is transferred to the information processing apparatus under the situation in which a plurality of information processing apparatuses is wirelessly connected to the image processing apparatus.

Also, when the situation occurs in which there is one information processing apparatus that is wirelessly connected to the image processing apparatus, this situation is detected, and the scan image is transferred to this information processing apparatus automatically, thus making it possible to transfer the scan image immediately without performing needless operations.

In addition, when the situation occurs in which there is no information processing apparatus that is wirelessly connected to the image processing apparatus, this situation is detected, and the fact that no information processing apparatus to which the scan image is transferred exists is displayed before the image scanned, thus making it possible to eliminate needless scanning by the user.

Also, after instructions for scanning of the image and the selection of the information processing apparatus are determined, the connection mode in Piconet of Bluetooth with the information processing apparatus is returned from the power consumption mode and the state where Piconet is eliminated to the state where communication is possible, thus making it possible to perform transfer of the scan image to the designated destination information processing apparatus without delay, even when the connection to the information processing apparatus is in the power consumption mode and in the state where Piconet is eliminated. Also, the connection to the information processing apparatus can go into the power consumption mode and the state where Piconet is eliminated, thus making it possible to reduce wireless traffic and achieve low power consumption.

In addition, in Piconet with a plurality of information processing apparatuses, if the Park mode is retained with at least one information processing apparatus, exchange of commands with a pseudo information processing apparatus in the image processing apparatus is continued, but if Piconet with all information processing apparatuses is eliminated, the exchange of commands with the above described pseudo information processing apparatus in the image processing apparatus is stopped, thus making it possible to prevent useless processes and alleviate loads on the image processing apparatus.

Fourth Embodiment

In this embodiment, various kinds of states are displayed in the facsimile apparatus 201 to enhance ease of use of the facsimile apparatus 201 described in the above described embodiments. Furthermore, description of operations similar to those in the above described respective embodiments is omitted, and different operations will be described below.

Figure 32:
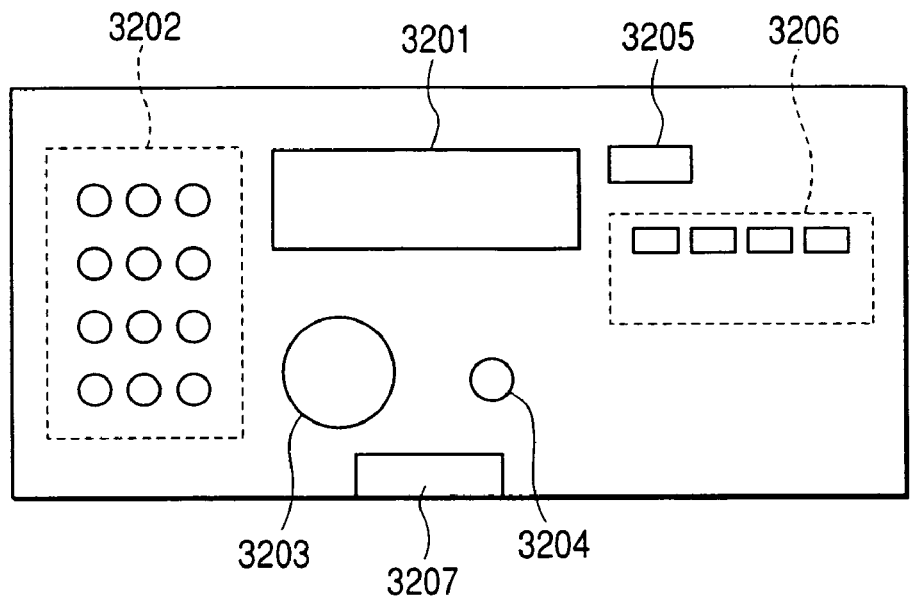
FIG. 32 shows an operation unit 108 of the facsimile apparatus 201 in the embodiment of the present invention.

FIG. 32 shows the operation unit 108 of the facsimile apparatus 201.

The operation unit 108 is constituted by various kinds of keys, an LED, an LCD, etc., by which the operator performs various kinds of input operations, and display of operation states of the image processing apparatus, etc. are performed.

That is, the operation unit 108 has an LCD 3201 for displaying time and dial numbers, the mode of the facsimile apparatus 201 (standby, Park, Active) in Bluetooth Piconet, etc., a ten key 3202 for performing input of dial numbers, etc., a "start key" 3203 for starting transmission and starting copy, and performing forced printout, a "stop key" 3204 for forced end of communication, etc., a "registration key" 3205 for various kinds of registrations, a "one touch key" 3206 for use also in data registration in the case of the registration mode, and a "memory lamp" 3207 that lights up when images exist in the image memory.

Furthermore, for example, since communication of Bluetooth is in the Active mode when the facsimile apparatus 201 goes into the command through mode, the above described LCD 3201 displays Active mode, and switches the display of mode from the display of Active mode to the display of Park mode when the mode is changed from the command through mode to the command return mode.

In the above described embodiment, when the facsimile apparatus is in the state of standby (the state where there exists no original in the reader unit, and none of send/receive, scanning, printing and input of dials and registration information are being performed), the start key 3203 operates as a forced printout key. If the start key 3203 is entered in the state where the memory lamp 3207 lights up, namely the image is stored in the image memory at standby, the image in the image memory can be printed out.

Figure 33:
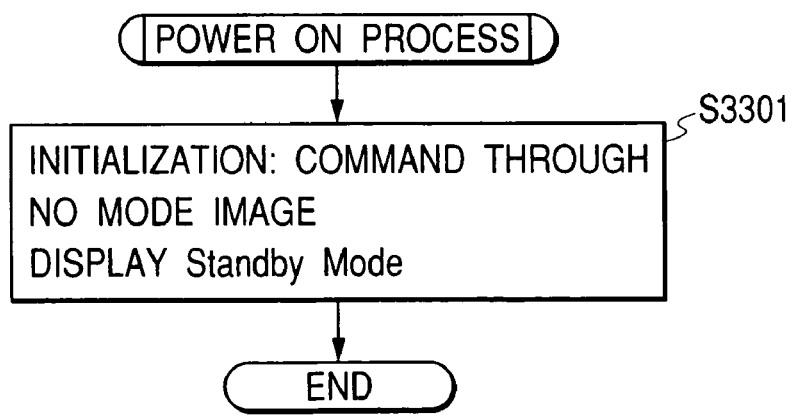
FIG. 33 is a flowchart when the power of the facsimile apparatus 201 is turned on in the embodiment of the present invention.

FIG. 33 is a flowchart when the power of the facsimile apparatus 201 is turned on.

In FIG. 33, when the power of the facsimile apparatus 201 is turned on, process for initialization of the Bluetooth control task 308 is performed at step S3301. At this time, the operation mode is set at the "command though mode".

Then, the variable for storing existence/not existence of received images, which is managed by the Bluetooth control task 308, is set at "not existence of received images". In addition, since the facsimile apparatus 201 does not participate in Piconet of Bluetooth yet when the power is turned on, a Bluetooth control unit 115 of the facsimile apparatus is in the Standby mode. Therefore, Standby mode is displayed on the LCD 3201 of the operation unit 108.

The above described processes are performed, and startup of the intelligent terminal 202 is waited.

Figure 34:
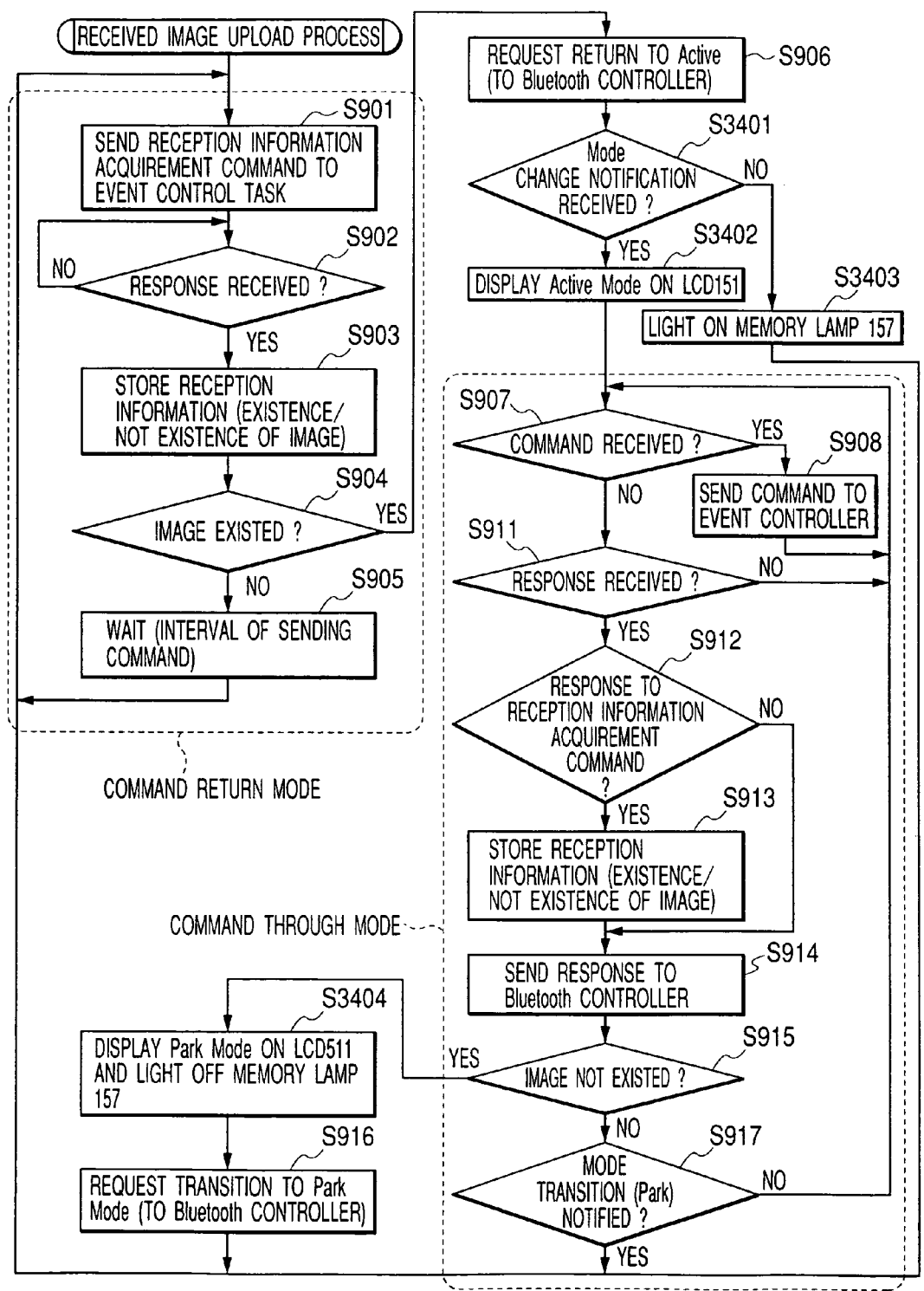
FIG. 34 is a flowchart showing a received image upload procedure of the Bluetooth control task 308 in facsimile apparatus 201 in the embodiment of the present invention.

FIG. 34 is flowchart showing a received image upload process of the Bluetooth control task 308 in the facsimile apparatus 201 in this embodiment. Only processes different from those in FIG. 10 will be described below.

As described in FIG. 10, processes of S901 to S906 are carried out, and when a request for return to Active is sent to the Bluetooth controller 309 at S906, whether or not the Bluetooth controller 309 has received mode change notification to the request for return to Active is checked at S3401. If it has received the mode change notification, Active mode is displayed on the LCD 3201 at S3402, and the process returns to S907. In contrast, if it has not received the mode change notification, it means that transition to the Active mode was impossible for some reason, and thus the process is moved to a next process with the image stored in the image memory. Therefore, at S3403, the memory lamp 3207 is lighted up, and the process returns to S901.

Thereafter, processes of S907 to S915 are carried out as in the case of FIG. 10, and whether or not the reception information stored in the Bluetooth control task 308 is "not existence of image" is determined at S915, and if it is "not existence of image", Park mode is displayed on the LCD 3201 and the memory ramp 3207 is lighted off at S3404, followed by proceeding to S916, where transition to the command return mode is made. If the image exists and Mode transition notification is not made at S915, the process returns to S907, where the command through mode is continued, and if the image exists and Mode transition notification is made at S915, the process returns to S901.

According to this embodiment, since the mode of the radio unit of the facsimile apparatus is displayed, the user can easily understand reasons why the wireless channel cannot be used, and so on.

Also, if the image to be transferred to the intelligent terminal remains in the facsimile apparatus for some reason, this situation can be displayed in an easy-to-understand manner.

In addition, if it is found by display that the image to be transferred to the intelligent terminal remains in the facsimile apparatus for some reason, this image can be printed out forcefully.

Fifth Embodiment

Another embodiment will be described below.

The configurations of the facsimile apparatus and the intelligent terminal, and the configuration of software are similar to those in the first embodiment.

Figure 35:
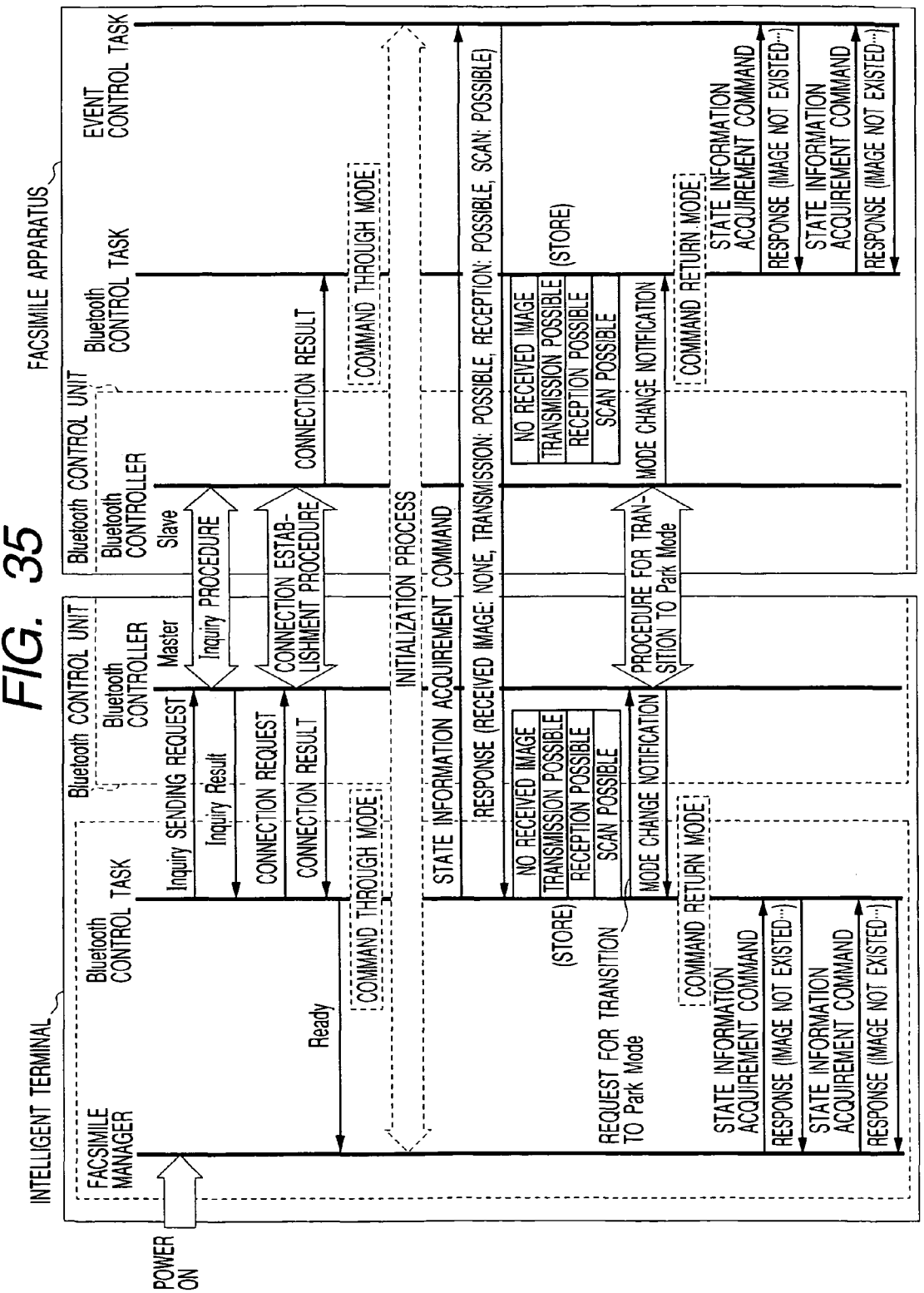
FIG. 35 shows a communication flow between the intelligent terminal 202 and the facsimile apparatus 201 when the power of the intelligent terminal 202 is turned on, in the embodiment of the present invention.

FIG. 35 shows a communication flow between the intelligent terminal 202 and the facsimile apparatus 201 when the power of the intelligent terminal 202 is turned on, and this Figure shows transition of operation states of the apparatuses 201 and 202 from initialization process to the standby state of the apparatuses 201 and 202. At this time, the power of the facsimile apparatus 201 is already turned on.

When the power of the intelligent terminal 202 is turned on, the Bluetooth compatible facsimile manager 401 is started up to carry out process for connection to the facsimile apparatus 201.

That is, the Bluetooth control task 409 sends an Inquiry sending request to the Bluetooth controller 410 in order to ensure that the facsimile apparatus 201 being a connection destination is ready for communication. At this time, "Class of Device" information in the Inquiry command is sent as a "serial communication terminal".

When receiving the Inquiry sending request, the Bluetooth controller 410 carries out "Inquiry" procedure in accordance with the connection procedure of Bluetooth, and notifies the Bluetooth control task 409 of the result ("Inquiry Result"). When the Bluetooth control task 409 receives the "Inquiry Result", it determines based on the contents thereof whether or not connection to the facsimile apparatus 201 is possible, and if the connection is possible, it designates the address of the facsimile apparatus 201 and makes a connection request to the Bluetooth controller 410, while if connection is not successful, or the facsimile apparatus being a connection destination is not found from the contents of the "Inquiry Result", it displays a message as such on the display unit (not shown) of the intelligent terminal 202.

When the Bluetooth controller 410 receives the connection request, it establishes connection using "Serial Port Profile" to the Bluetooth controller 309 of the facsimile apparatus 201, based on the specification of Bluetooth. Then, when the connection is established, the Bluetooth controller 410 notifies the Bluetooth control task 409 of the result thereof.

When the Bluetooth control task 409 detects from the connection result that the connection to the facsimile apparatus 201 could be established, it sends a ready signal to the facsimile manager 401, passes directly to the Bluetooth controller 410 the command from the facsimile manager 401, and makes transition in state to the command though mode.

Also, when the Bluetooth control task 409 receives from the connection result a message showing failure in establishment of connection, it displays the message on the above described display unit of the intelligent terminal 202.

The Bluetooth controller 309 of the facsimile apparatus 201 notifies the Bluetooth control task 308 of the result of the procedure of establishment of the connection to the intelligent terminal 202. When the Bluetooth control task 308 ensures from the result of the connection establishment procedure that the connection has been established, it enters the command through mode, and waits for a command from the intelligent terminal 202 to pass the command from the intelligent terminal 202 directly to the event control task 307. On the other hand, in case of failure in connection, the Bluetooth control task 308 is in the state of standby until the connection is established.

When the facsimile manager 401 receives the Ready signal from the Bluetooth control task 409, it sends to the Bluetooth control task 409 a command for transferring to the facsimile apparatus 201 data such as date information possessed by the intelligent terminal 202 and names registered in the facsimile manager 401.

The Bluetooth control task 409 transfers the received command directly to the Bluetooth controller 410, and the Bluetooth controller 410 uses the "serial Port profile" to transfer the command to the facsimile apparatus 201.

The Bluetooth controller 309 of the facsimile apparatus 201 sends to the Bluetooth control task 308 the command sent from the intelligent terminal 202, and the Bluetooth control task 308 passes the command directly to the event control task 307.

The event control task 307 analyzes the received command, and sends the result thereof to the Bluetooth control task 308.

When the initialization process is completed in this way, the Bluetooth control task 409 sends to the facsimile apparatus 201 the state information acquirement command for acquiring the sate of the facsimile apparatus 201. When receiving this state information acquirement command, the event control task 307 checks whether or not the received image exists, and states associated with the facsimile apparatus 201 such as the state of the printer, the state of the scanner and the state of the memory, and gives back information corresponding to the check result to the intelligent terminal 202 as a response. When the Bluetooth control task 409 receives the response to the state information acquirement command, it stores this state information, for example, in a RAM (not shown).

When storing the state information, the Bluetooth control task 409 requests transition to the Park mode to the Bluetooth controller 410 in order to enter the Park mode being one of low power consumption modes. The Bluetooth controller 410 that receives the request for transition to the Park mode carries out procedure for transition to the Park mode, with the Bluetooth controller 309, based on the specification of Bluetooth. When the transition procedure is completed, the Bluetooth controllers 309 and 410 notify the Bluetooth control tasks 308 and 409, respectively, of the transition to the Park mode.

When receiving the notification of the transition to the Park mode, the Bluetooth control tasks 308 and 409 go into the command return mode, respectively.

Furthermore, in this embodiment, the Park mode is selected as a low power consumption mode, but being not limited thereto, any one of other low power consumption modes, namely Sniff mode or Hold mode and modes in which Piconet is released may be selected.

Going into the command return mode, the Bluetooth control task 409 of the intelligent terminal 202 performs processes similar to those of the event control task 307 of the facsimile apparatus 201 when connected with cables such as serial interfaces such as RS40132C, and parallel interfaces such as Centronics (standard interface defined in IEEE 1284, etc.). That is, the Bluetooth control task 409 gives back a response to the state acquirement command issued periodically from the facsimile manager 401, based on the state information stored in the above described RAM of the intelligent terminal 202.

The Bluetooth control task 308 of the facsimile apparatus 201 performs operations similar to those of the facsimile manger 401 of the intelligent terminal 202 when connected with cables described above. The Bluetooth control task 308 of the facsimile apparatus 201 issues periodically the state information acquirement command to the event control task 307 to monitor at all times the state of the facsimile apparatus 201, and whether or not the image has been received from other facsimile apparatuses through the communication line 203.

Figure 36:
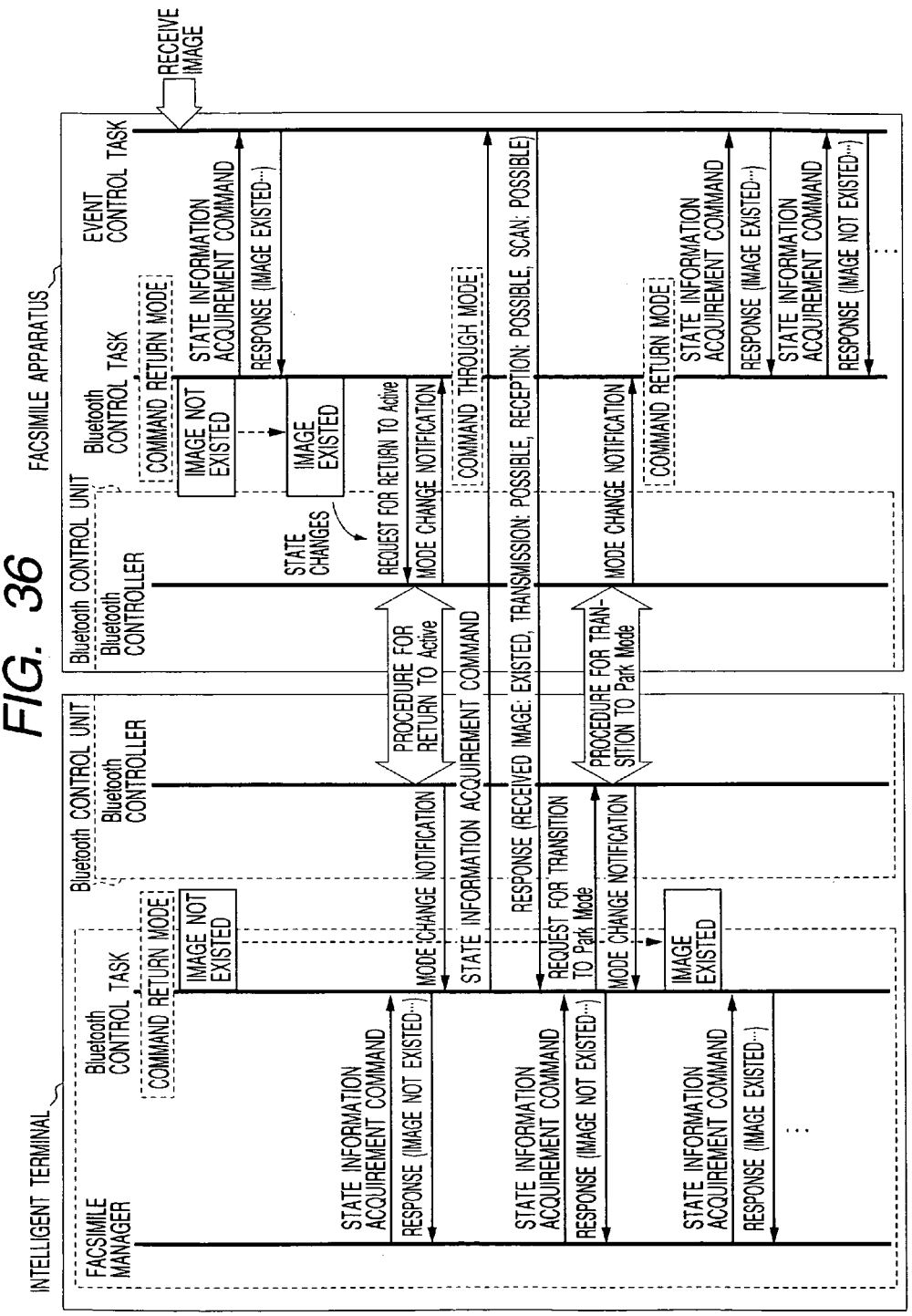
FIG. 36 shows a communication flow between the facsimile apparatus 201 and the intelligent terminal 202 when the operation state of the facsimile apparatus 201 is changed in the embodiment of the present invention.

FIG. 36 shows a communication flow between the facsimile apparatus 201 and the intelligent terminal 202, when the operation state of the facsimile apparatus 201 is changed due to reception of the image by the facsimile apparatus 201, and the Bluetooth control task 409 of the intelligent terminal 202 of the change of the operation state.

In FIG. 36, the Bluetooth control task 308 of the facsimile apparatus 201 is in the command return mode during standby, and issues periodically the state acquirement command to the event control task 307 to monitor the state of the facsimile apparatus 201. The event control task 307 searches the image management record stored in the RAM 103 as to whether or not the received image exists, and performs detection of the usage situation and abnormalities for the facsimile apparatus 201 to send back state information such as existence/not existence of received images, possibility/impossibility of reception, possibility/impossibility of transmission and possibility/impossibility of scan to the Bluetooth control task 308 as a response to the state information acquirement command. The Bluetooth control task 308 determines from the received response whether or not the state of the facsimile apparatus 201 has changed. If it has not changed, the Bluetooth control task 308 issues periodically the state information acquirement command to continue the monitoring of the facsimile apparatus 201. On the other hand, if the state of the facsimile apparatus 201 has changed, for example, if "not existence" of the received image is changed to "existence" thereof due to reception of the image, the Bluetooth control task 308 recovers communication between the facsimile apparatus 201 and the intelligent terminal 202 to notify the intelligent terminal 202 of state information.

The Bluetooth control task 308 sends to the Bluetooth controller 309 a request for return to Active to recover the communication. The Bluetooth controller 309, which receives the request for return to Active, communicates with the Bluetooth controller 410 of the intelligent terminal 202 in accordance with the communication recovery procedure of Bluetooth. When the communication is recovered, the Bluetooth controller 309 gives mode change notification to the Bluetooth control task 308. The Bluetooth control task 308, which receives the mode change notification, makes transition from the command return mode to the command through mode when it determines from the contents of the notification that the communication has been recovered, while it retains the state of the command return mode as ever when it determines that the communication cannot be recovered.

Similarly, the Bluetooth controller 410 of the intelligent terminal 202 gives mode change notification to the Bluetooth control task 409. The Bluetooth control task 409, which receives the mode change notification, makes transition from the command return mode to the command through mode when it determines from the contents of the notification that the communication has been recovered, while it retains the state of the command return mode as ever when it determines that the communication cannot be recovered. When the Bluetooth control task 409 that makes transition to the command through mode receives the state information acquirement command from the facsimile manager 401, it passes the state information acquirement command to the Bluetooth controller 410 to send the same to the facsimile apparatus 201. The event control task 307 of the facsimile apparatus 201 that receives the state information acquirement command searches the image management record stored in the RAM 103 as to whether or not the received image exists, and performs detection of the usage situation and abnormalities for the facsimile apparatus 201 to send back state information such as existence/not existence of received images, possibility/impossibility of reception, possibility/impossibility of transmission and possibility/impossibility of scan to the Bluetooth control task 409 as a response to the state information acquirement command. The Bluetooth control task 409, which receives the response of the state information acquirement command, stores the received state information in a temporary area (for example, a work area of the above described RAM). The Bluetooth control task 409, which receives the state information, requests transition to the Park mode to the Bluetooth controller 410 in order to make transition to the Park mode being a low power consumption mode, and the Bluetooth controller 410, which receives the request for transition to the Park mode, carries out procedure for transition to the Park mode with the Bluetooth controller 309. The Bluetooth controllers 309 and 410 notify the Bluetooth control tasks 308 and 409, respectively, of the transition to the Park mode. When the Bluetooth control task 308 receives the notification of the transition to the Park mode, it makes transition to the command return mode, sends again the reception information acquirement command periodically to the event control task 307, and monitors the state of the facsimile apparatus 201.

Also, the Bluetooth controller 410, which receives the notification of the transition to the Park mode, writes in a normal area the state information stored in the above described temporary area, and updates the state information of the facsimile apparatus 201.

In shown example, the state change is that of reception of the image, and the received image part of the state information stored by the Bluetooth control task 409 is updated from "image not existed" to "image existed" at this time. The received image part of the response to the state information acquirement command from the facsimile manager 401 thereafter is "image existed".

Figure 37:
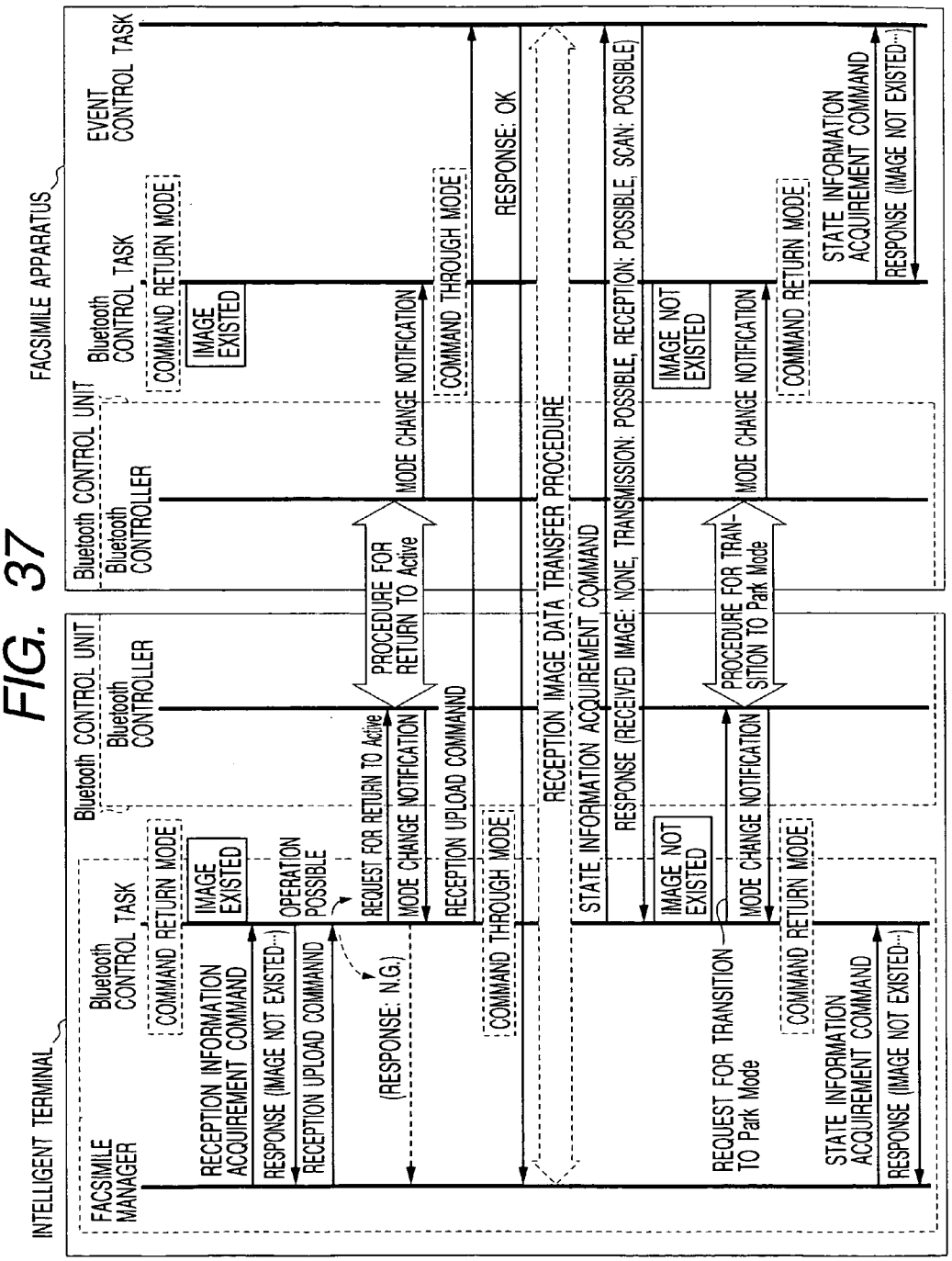
FIG. 37 shows a communication flow between the facsimile apparatus 201 and the intelligent terminal 202 when state information of the intelligent terminal 202 is changed in the embodiment of the present invention.

FIG. 37 shows a communication flow between the facsimile apparatus 201 and the intelligent terminal 202 during received image transfer procedure for transferring reception image data to the intelligent terminal 202, when a change is made from "not existence" of the received image to "existence" of the received image in the state information of the Bluetooth control task 409 of the intelligent terminal 202.

As described using FIG. 36, if the facsimile apparatus 201 receives the image, and the Bluetooth control task 409 of the intelligent terminal 202 is notified of the fact that the received image exists, and the fact is stored, after which the Bluetooth control task 409 of the intelligent terminal 202 receives the state information acquirement command from the facsimile manager 401, the Bluetooth control task 409 sends back the stored state information to the facsimile manager 401 as a response. The facsimile manager 401 sends a reception upload command to the Bluetooth control task 409 to start upload process for the received image, if it is set for uploading the received image when information of "existence of received image" is received from the Bluetooth control task 409.

When the Bluetooth control task 409 receives the reception upload command, it determines from the stored state information of the facsimile apparatus 201 whether or not reception upload is possible. If the received image part of the state information is "image not existed", the Bluetooth control task 409 determines that reception upload is not possible, and sends a response of "NG" directly to the facsimile manager 401 without sending a command to the facsimile apparatus 201. On the other hand, if the received image part of the state information is "image existed", the Bluetooth control task 409 determines that reception upload is possible, and requests return to the Active mode enabling communication from the Park mode being a low power consumption mode, to the Bluetooth controller 410 so that communication with the facsimile apparatus 201 can be performed.

The Bluetooth controller 410, which receives the request for return to the Active mode, carries out communication recovery procedure of Bluetooth, with the Bluetooth controller 309. When the communication is recovered, the Bluetooth controller 309 gives mode change notification to the Bluetooth control task 308, and the Bluetooth control task 308 that receives the mode change notification makes transition to the command though mode. Also, the Bluetooth controller 410 gives mode change notification to the Bluetooth control task 409, and the Bluetooth control task 409 that receives the mode change notification makes transition to the command though mode, and sends to the facsimile apparatus 201 the reception upload command previously received from the facsimile manager 401.

The event control task 307, which receives the reception upload command, sends back a response of "OK" to the intelligent terminal 202 because the received image exists.

When each of the Bluetooth control tasks 308 and 409 goes into the command though mode in this way, the reception image data transfer procedure is carried out using the "Serial Port Profile" based on the specification of Bluetooth, by the command interface same as that when connected with cables such as serial interfaces such as RS40132C, and parallel interfaces such as Centronics (standard interface defined in IEEE 1284, etc.) Furthermore, control of transfer of commands and data between the facsimile apparatus 201 and the intelligent terminal 202 in the reception image data transfer procedure is similar to that in FIG. 7 described above.

When the reception image data transfer procedure is completed, the Bluetooth control task 409 sends the state information acquirement command to the facsimile apparatus 201 for synchronization with the operation sate of the facsimile apparatus 201. The event control task 307 that receives the state information acquirement command checks state information such as existence/not existence of received image, and possibility/impossibility of transmission/reception/scan, and sends the same to the intelligent terminal 202 as a response.

The Bluetooth control task 409 stores the received state information. The Bluetooth control task 409 that receives the state information determines that a series of processes have been completed, and requests transition to the Park mode being a low power consumption mode to the Bluetooth controller 410 to return to the stationary state. The Bluetooth controller 410 that receives the request for transition to the Park mode carries out procedure for transition to the Park mode with the Bluetooth controller 309, in accordance with the specification of Bluetooth.

When the transition procedure is completed, the Bluetooth controllers 309 and 410 notify the Bluetooth control tasks 308 and 409, respectively, of the transition to the Park mode.

When the Bluetooth control tasks 308 and 409 receive the notification of the transition to the Park mode, each of them goes into the command return mode.

Figure 38:
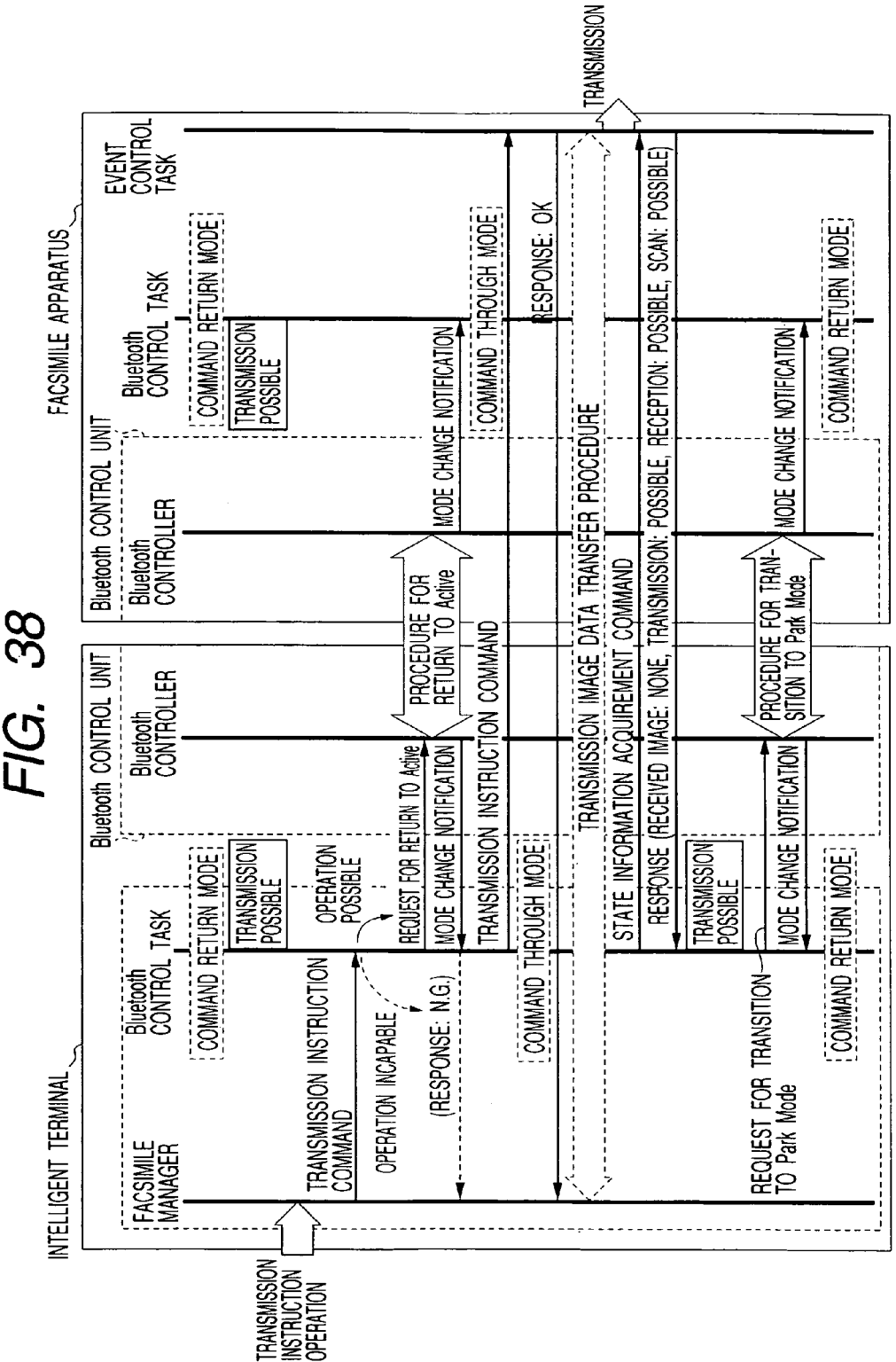
FIG. 38 shows a communication flow between the facsimile apparatus 201 and the intelligent terminal 202 when the facsimile apparatus 201 performs facsimile transmission to a designated destination in the embodiment of the present invention.

FIG. 38 shows a communication flow between the facsimile apparatus 201 and the intelligent terminal 202, when the image data stored in the intelligent terminal 202 is transferred to the facsimile apparatus 201, and the facsimile apparatus 201 performs facsimile transmission to a designated destination.

In the shown example, the facsimile apparatus 201 is in the sate where transmission is possible, and the transmission possible/impossible part of the state information stored by the Bluetooth control task 409 of the intelligent terminal 202 through the process described using FIG. 36 is transmission possible. At this time, when a transmission instruction operation is done to the facsimile manager 401, the facsimile manager 401 sends the transmission instruction command to the Bluetooth control task 409.

When the Bluetooth control task 409 receives the transmission instruction command being an operation instruction request, it determines from the stored state information whether or not transmission can be performed. When the transmission possible/impossible part of the state information is "impossible", the Bluetooth control task 409 sends a response of "NG" directly to the facsimile manager 401 without sending a command to the facsimile apparatus 201, and the facsimile manager 401 displays "transmission impossible" when it receives the response of "NG". When the transmission possible/impossible part of the state information is "possible" the Bluetooth control task 409 sends to the Bluetooth controller 410 a request for return to Active to communicate with the facsimile apparatus 201.

The Bluetooth controller 410, which receives the request for return to Active, communicates with the Bluetooth controller 309 of the facsimile apparatus 201 in accordance with the communication recovery procedure of Bluetooth. When the communication is recovered, the Bluetooth controller 410 sends mode change notification to the Bluetooth control task 409. When the Bluetooth control task 409, which receives the mode change notification, determines from the contents thereof that the communication has been recovered, it sends the transmission instruction command to the facsimile apparatus 201, and thereafter makes transition from the command return mode to the command through mode.

When it is determined from the contents of the mode change notification that the communication cannot be recovered, or no response is given from the Bluetooth controller 410 for a predetermined time period or more, the Bluetooth control task 409 retains the state of the command return mode as ever, and sends the answer of "NG" to the facsimile manager 401. When the facsimile manager 401 receives the answer of "NG", it displays on the display unit a message showing that a transmission service is impossible.

Similarly, the Bluetooth controller 309 of the facsimile apparatus 201 sends mode change notification to the Bluetooth control task 308. When the Bluetooth control task 308, which receives the mode change notification, determines from the contents thereof that the communication has been recovered, it makes transition from the command return mode to the command through mode, and goes into the state of waiting for a command from the intelligent terminal 202. On the other hand, when it is determined that the communication cannot be recovered, the Bluetooth control task 308 retains the sate of the command return mode as ever.

The event control 307 that receives the transmission instruction command sends a response of "OK" to the intelligent terminal 202 when it ensures that the facsimile apparatus 201 is not currently under communication, and is not full of reservations for transmission, while it sends a response of "NG" when these conditions are not satisfied.

When the facsimile manager 401 receives the response of "OK" from the facsimile apparatus 201, it carries out transmission image data transfer procedure by the command interface same as that when connected with cables such as serial interfaces such as RS40132C, and parallel interfaces such as Centronics (standard interface defined in IEEE 1284, etc.). Furthermore, the transmission image data transfer procedure is similar to that in FIG. 14 described above, and thus description thereof is omitted.

When the Bluetooth control task 409 of the intelligent terminal 202 determines that transmission has been completed, it sends the state information acquirement command to the facsimile apparatus 201, and stores the state information included in the response, whereby the stored state information is made to follow the state change of the facsimile apparatus 201 after operation instruction. When receiving this response, the Bluetooth control task 409 requests transition to the Park mode to the Bluetooth controller 410 to make transition of communication with the facsimile apparatus 201 to the Park mode being a low power consumption mode again. The Bluetooth controller 410, which receives the request for transition to the Park mode, carries out procedure for transition to the Park mode based on the specification of Bluetooth, with the Bluetooth controller 309 of the facsimile apparatus 201. When the transition procedure is completed, the Bluetooth controllers 309 and 410 notify the Bluetooth control tasks 308 and 409, respectively, of the transition to the Park mode. When the Bluetooth control tasks 308 and 409 receive the notification of the transition to the Park mode, each of them makes transition to the command return mode.

Again, the command return mode is retained until the user starts a service such as facsimile transmission, scan or print at the intelligent terminal 202, or the state of the facsimile apparatus 201 changes.

Figure 39:
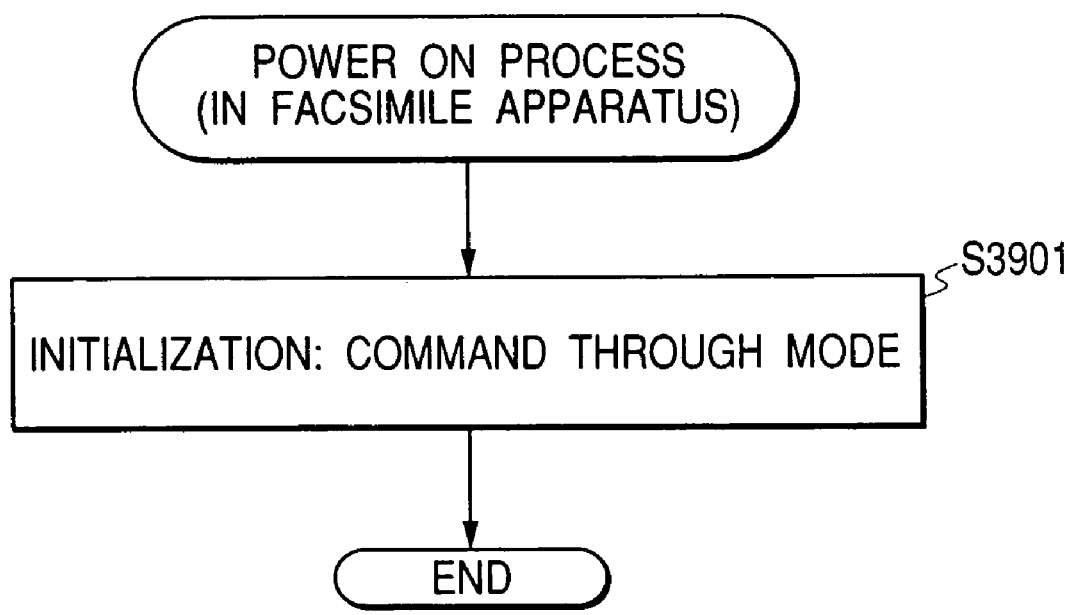
FIG. 39 is a flowchart showing a procedure of power on process carried out by the Bluetooth control task 308 of the facsimile apparatus 201 in the embodiment of the present invention.

FIG. 39 is a flowchart showing a procedure of power on process carried out by the Bluetooth control task 308 of the facsimile apparatus 201 in this embodiment.

When the power of the facsimile apparatus 201 is turned on, the process in FIG. 39 is started, and initialization process of the Bluetooth control task 308 is performed (step S3901). Process of transition of the operation mode to the command through mode is also included in this initialization process. The facsimile apparatus 201 completes this initialization process, and waits the startup of the intelligent terminal 202 in the state where the operation mode is the command through mode.

Figure 40:
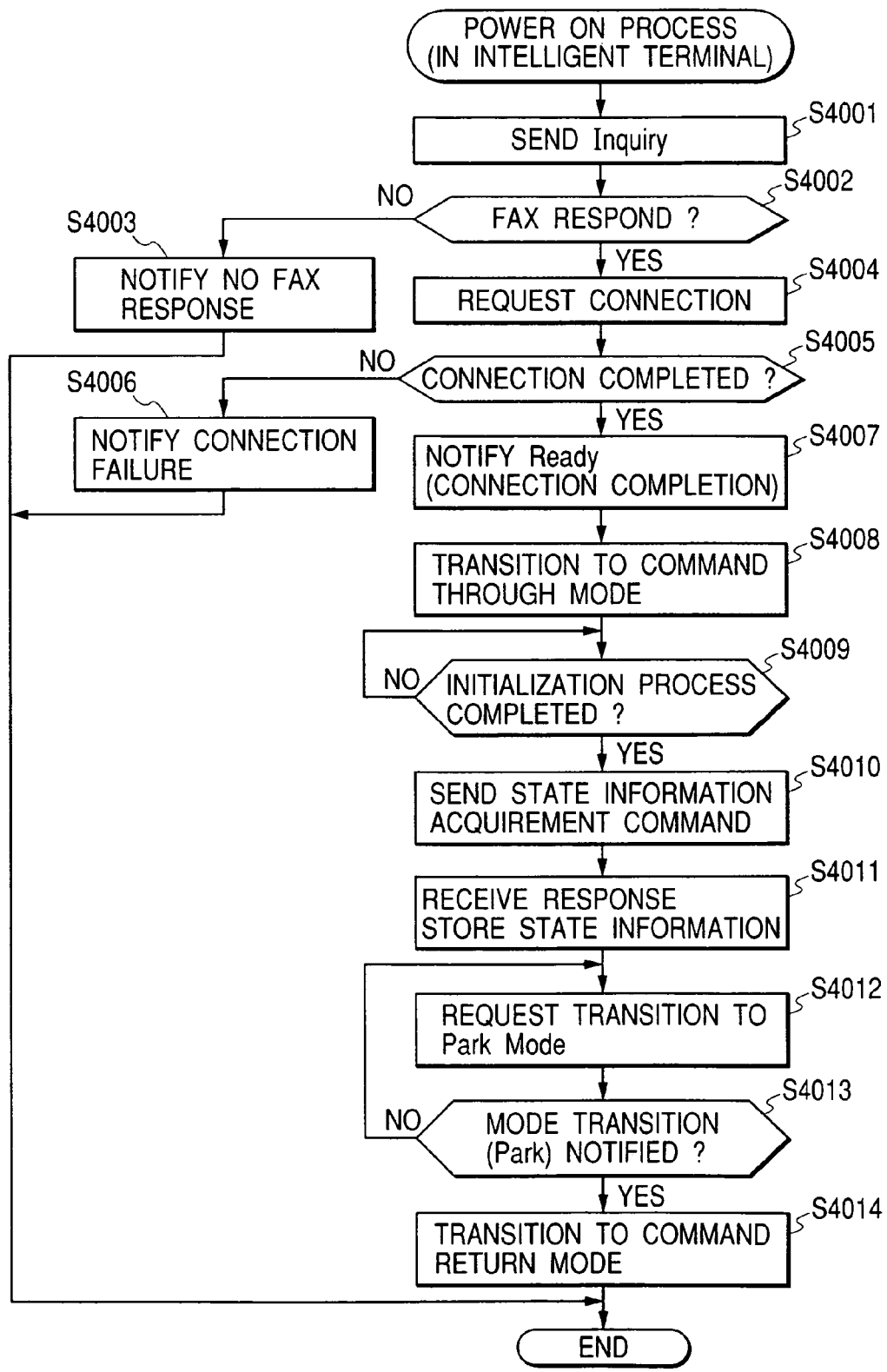
FIG. 40 is a flowchart showing a procedure of power on process carried out by the Bluetooth control task 409 of the intelligent terminal 202 in the embodiment of the present invention.

FIG. 40 is a flowchart showing a procedure of power on process carried by the Bluetooth control task 409 of the intelligent terminal 202.

When the power of the intelligent terminal 202 is turned on, the facsimile manager 401 is started, and the Bluetooth control task 409 sends "Inquiry" to the Bluetooth controller 410 at step S4001.

At step S4002, whether or not the facsimile apparatus 201 responded to the sent "Inquiry" is determined, and if it responded normally, the process proceeds to step S4004, and if it did not respond normally, the process proceeds to step S4003.

At step S4003, the display unit of the intelligent terminal 202 is notified of the fact that there exists no facsimile apparatus that can be connected, followed by ending this process.

At step S4004, a connection request is sent to the Bluetooth controller 410, and the process proceeds to step S4005.

At step S4005, a response to the connection request is waited, and when notification of "failure in connection request" is given from the Bluetooth controller 410, the process proceeds to step S4006, and when notification of "success in connection" is given, the process proceeds to step S4007.

At step S4006, the display unit of the intelligent terminal 202 is notified of the failure in connection to the facsimile apparatus 201, followed by ending this process.

At step S4007, "Ready" showing that connection to the facsimile apparatus 201 could be done is transmitted to the facsimile manager 401, and the process proceeds to step S4008, where transition to the command through mode is made. At this time, the command through mode is an operation mode in which when the Bluetooth control task 409 receives a command from the facsimile manager 401, this command is sent to the Bluetooth controller 410, and when a response is received from the Bluetooth controller 410, this response is sent to the facsimile manager 401.

When the facsimile manager 401 receives the above described Ready signal, it uses "Serial Port Profile" to carry out the initialization process between the facsimile manager 401 and the event control task 307 of the facsimile apparatus 201.

At step S4009, completion of the initialization process is waited, and when the initialization process is completed, the process proceeds to step S4010.

The Bluetooth control task 409 sends the reception information acquirement command at step S4010, and a response to the command is received, and state information included therein is stored at step S4011. At step S4012, transition to the Park mode is requested to the Bluetooth controller 410 to make transition of communication with the facsimile apparatus 201 to the Park mode being a low power consumption mode. At step S4013, whether or not notification of transition to the Park mode has been received is determined, and if the transition notification has not been received, the process proceeds to Step S4012, where the request for transition to the Park mode is made again. At this time, error display may be provided to end the process after several retries.

If the notification of transition to the Park mode has been received, the process proceeds to step S4014 to make transition to the command return mode, and notification of this power on process is given.

Furthermore, the command return mode of the Bluetooth control task 409 will be described later using FIG. 42.

Figure 41:
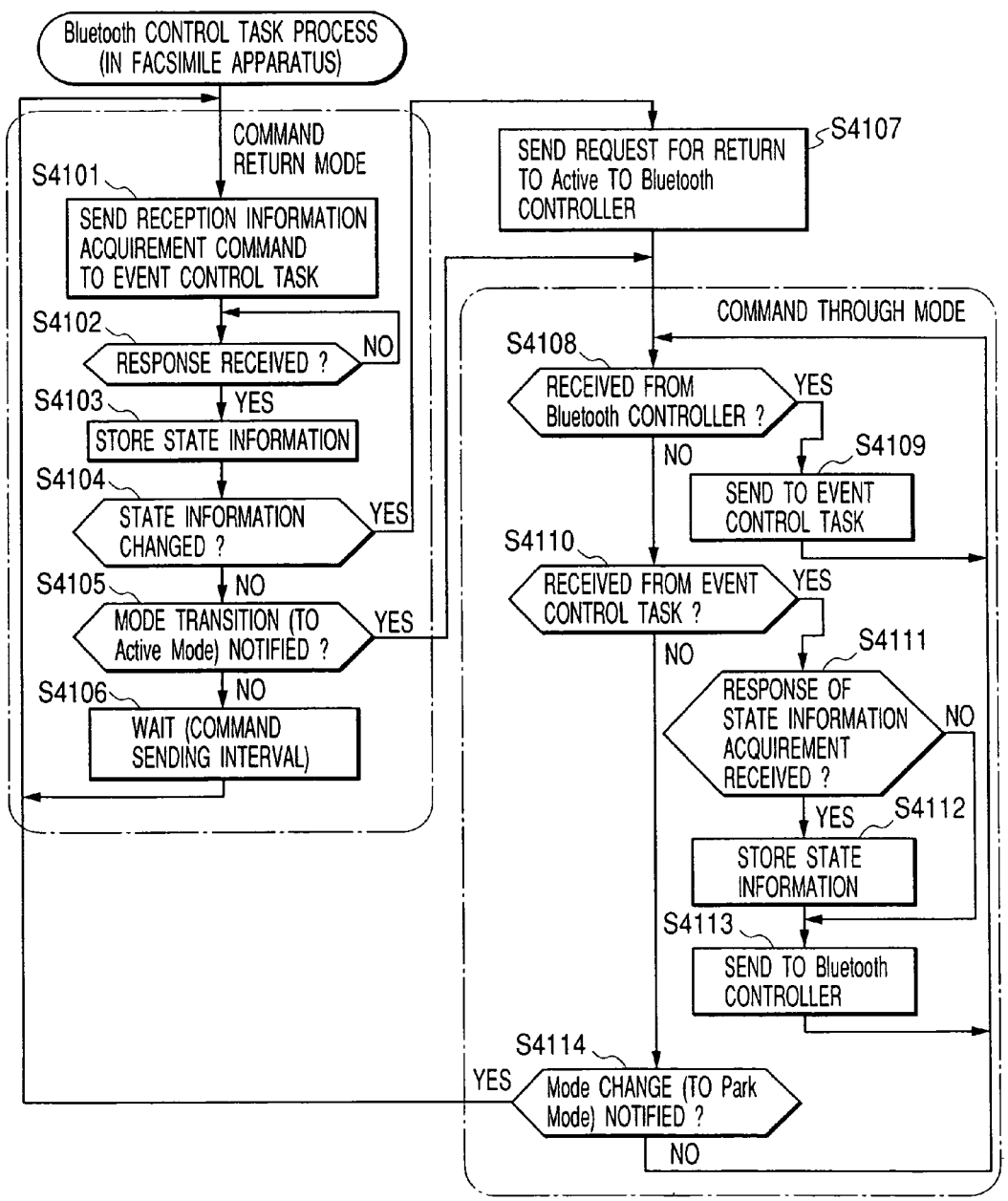
FIG. 41 is a flowchart showing a procedure of process carried out by the Bluetooth control task 308 of the facsimile apparatus 201 in the embodiment of the present invention.

FIG. 41 is a flowchart showing a procedure of process carried out by the Bluetooth control task 308 of the facsimile apparatus 201. According to this flowchart, all of "notification of state change" of FIG. 36, "received image upload" of FIG. 37 and "transmission service" of FIG. 38 can be explained.

In FIG. 41, the Bluetooth control task 308 is in the command return mode in the state of standby, and the mode between the facsimile apparatus 201 and the intelligent terminal 202 is the Park mode being a low power consumption mode. In the command return mode, the state information acquirement command is sent to the event control task 307 at step S4101 at the interval of wait at step S4106, a response thereto is waited at step S4102, and state information is stored at step S4103 when the response is received.

First, "notification of state change" will be described.

Whether or not state information has changed from the state information stored theretofore is determined (step S4104) to know whether or not the state of the facsimile apparatus 201 has changed, and if it has changed, the process proceeds to step S4106 to notify the intelligent terminal 202 of the state information. At step S4106, return to the Active mode is requested to the Bluetooth controller 309 so that communication with the intelligent terminal 202 can be performed.

When communication with the intelligent terminal 202 becomes possible, transition to the command through mode is made, and each of checks at step S4108, step S4110 and step S4114 is repeated. In the command through mode, as suggested by its name, the command and data received from the Bluetooth controller 310 at step S4108 are sent to the event control task 307 (step S4109), and the response and data received from the event control task 307 are sent to the Bluetooth controller 310 (step S4113).

A request for return to Active is made from the facsimile apparatus 201 only in the case of the "notification of state change", and the intelligent terminal 202 sends the state information acquirement command for this request. When the facsimile apparatus 201 sends back a response of this command, this is detected at step S4111, and the state information included in the response is stored (step S4112), followed by sending the same to the intelligent terminal 202. When the intelligent terminal 202 receives the response of this command, it requests transition of the operation mode to the Park mode. When the transition to the Park mode is completed, the Bluetooth control task 308 is given mode change notification, and thus detects this at step S4114, and returns to the command return mode to go into the standby state.

The "notification of state change" process of the facsimile apparatus 201 has been described above, and if the state of the facsimile apparatus 201 changes, both the Bluetooth control task 308 of the facsimile apparatus 201 and the Bluetooth control task 409 of the intelligent apparatus 202 are notified of the change of the state.

The case will now be described where "received image upload" and "transmission instruction command", namely "operation instruction request command" are sent from the intelligent terminal 201.

Before sending "operation instruction request command", the intelligent terminal 201 requests return to Active. When the facsimile apparatus 201 receives the request for return to Active, procedure for return to Active is carried out between the Bluetooth controllers 309 and 410. When returning to the Active mode, the Bluetooth controller 309 sends mode change notification to the Bluetooth control task 308. When the Bluetooth control task 308 of the facsimile apparatus 201 receives the mode change notification in the standby state, namely in the command return mode, it detects this notification at step S4105, and proceeds to step S4107 to make transition to the command through mode.

After transition to the command through mode, the command and data sent from the intelligent terminal 202 are received from the Bluetooth controller 309 at step S4108, and are sent to the event control task 307 at step S4109, and the response and data thereto are received from the event control task 307 at step S4110 and are sent to the Bluetooth controller 309 at step S4113. Thereby, a series of commands and data of requested operations can be exchanged between the facsimile manager 401 of the intelligent terminal 202 and the event control task 307 of the facsimile apparatus 201.

When this process is completed, the state information acquirement command is sent from the Bluetooth control task 409 of the intelligent terminal 202 to update the state information. When the event control task 307 sends a response thereto to the Bluetooth control task 308, this response is detected at step S4111, and is stored at step S4112. By this process, the Bluetooth control task 308 can store the latest state information after requested operation.

When the Bluetooth control task 409 of the intelligent terminal 202 receives the response to the state information acquirement command, it requests transition to the Park mode to the Bluetooth controller 410, and procedure for transition to the Park mode is carried out between the Bluetooth controllers 309 and 410. When the transition to the Park mode is completed, mode change notification is sent from the Bluetooth controller 309 to the Bluetooth control task 308. The Bluetooth control task 308 detects this notification at step S4114, and returns to the command return mode to go into the standby state.

Figure 42:
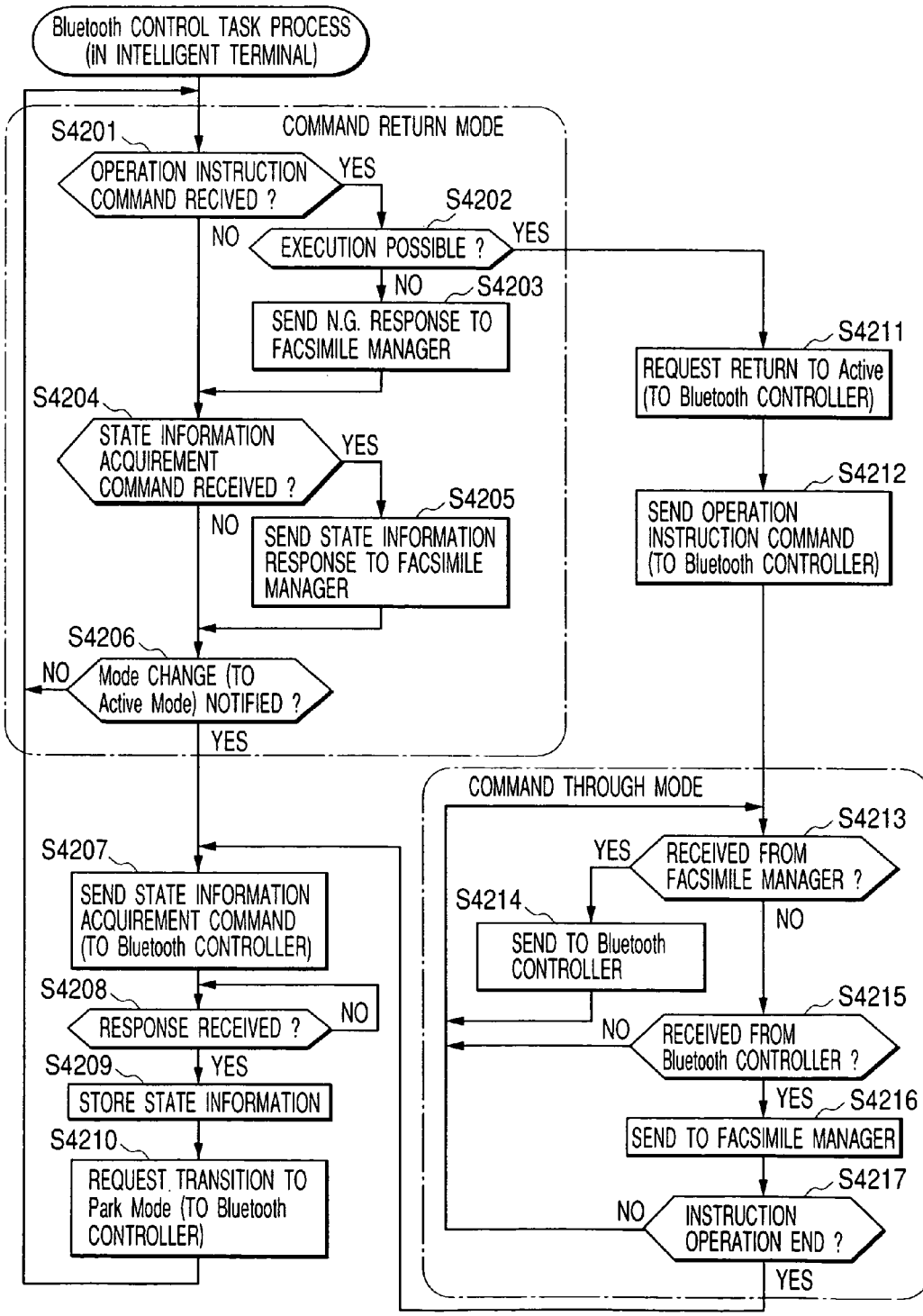
FIG. 42 is a flowchart showing a procedure of process carried out by the Bluetooth control task 409 of the intelligent terminal 202 in the embodiment of the present invention.

FIG. 42 is a flowchart showing a procedure of process carried out by the Bluetooth control task 409 of the intelligent terminal 202 according to this flowchart, all of the operations of "notification of state change" of FIG. 36, "received image upload" of FIG. 37 and "transmission service" of FIG. 38 can be explained.

In FIG. 42, the Bluetooth control task 409 is in the command return mode in the state of standby, the mode between the facsimile apparatus 201 and the intelligent terminal 202 is the Park mode being a low power consumption mode. Commands that are sent form the facsimile manager 401 in the state of standby include two commands, namely the "state information acquirement command" to acquire state information of the facsimile apparatus 201, and the "operation instruction command" such as the "received image upload command" and "transmission instruction command" to provide instructions to the facsimile apparatus 201 for operations.

When receiving the "state information acquirement command" at step S4204, the Bluetooth control task 409 creates a response with the stored state information, and sends the response to the facsimile manager 401 at step S4205.

The state information that is used at this time is the information that was transmitted from the facsimile apparatus 201 when connection to the facsimile apparatus 201 was recovered, and was stored. If the state of the facsimile apparatus 201 changes, a request for return to Active from the facsimile apparatus 201 to provide notification thereof. When return to the "Active" state is made, mode change notification is sent from the Bluetooth controller 410 to the Bluetooth control task 409.

When the Bluetooth control task 409 receives the request for return to Active from the facsimile apparatus 201, it detects the mode change notification at step S4206 to check whether or not the state of the facsimile apparatus 201 has changed, and then sends the state information acquirement command to the Bluetooth controller 410 at step S4207. At step S4208, response from the facsimile apparatus 201 is waited, and when the response is received, the state information is stored at step S4209. When the update of the state information is completed, transition to the Park mode is requested to make transition to the state of standby at step S4210.

The case will now be described where the "operation instruction command" such as the "received image upload command" and "transmission instruction command" is sent from the facsimile manager 401.

When the "operation instruction command" is received at step S4201, the Bluetooth control task 409 determines from the stored state information of the facsimile apparatus 201 whether or not execution of the operation for which instructions are provided is possible at step S4202. If it is determined that execution is not possible, a response of "NG" is sent to the facsimile manager 401 at step S4203 without sending the "operation instruction command" to the facsimile apparatus 201. On the other hand, if it is determined that execution is possible, a request for return to "Active" is sent to the Bluetooth controller 410 at step S4211, and when return to "Active" is made, transition to the command through mode is made, and the operation instruction command is sent to the Bluetooth controller 410 at step S4212.

In the command through mode, a series of command and data of instruction operations received from the facsimile manager 401 at step S4213 are sent to the Bluetooth controller 410 at step S4214, and the response and data received from the Bluetooth controller 410 at step S4215 are sent to the facsimile manager 401 at step S4216.

At this time, when exchange of a series of commands, responses and data of instruction operations is completed, this completion is detected at step S4217, and the process proceeds to step S4207.

The state information acquirement command is sent to the Bluetooth controller 410 at step S4207, a response is received at step S4208, state information is stored at step S4209, transition to the Park mode is requested to the Bluetooth controller 410 at step S4210, and transition to the command return mode is made to return to the standby state.

In this way, the state information of the facsimile apparatus 201 is stored in the Bluetooth control tasks 308 and 409 by the processes described using FIGS. 39 and 40 when the power is turned on, the state information stored in the respective Bluetooth control tasks 308 and 409 is updated to the changed state by the processes described using FIGS. 41 and 42 when the state of the facsimile apparatus changes, for example when an image is received or a scan button is pressed, a response is sent back with the stored state information without sending the command to the facsimile apparatus 201 by the process described using FIG. 42 when the "state information acquirement command" is sent from the facsimile manager 401 to the Bluetooth control task 409, and a "NG" response is sent back to the facsimile manager 401 without sending the command to the facsimile apparatus 201 if execution of operation is not possible, and the operation instruction command is sent to the facsimile apparatus 201 if execution of operation is possible, by the processes described using FIGS. 41 and 42, when the "operation instruction command" such as the "received image upload command" and "transmission instruction command" is sent from the facsimile manger 401 to the Bluetooth control task 409, thus making it possible to reduce power consumption without occupying the radio channel.

As described above, also in this embodiment, it is made possible to reduce power consumption by send/receive of commands to poll the state of the image processing apparatus and responses thereto, without occupying the radio channel.

Sixth Embodiment

<Configuration of Entire Apparatus>

Figure 43:
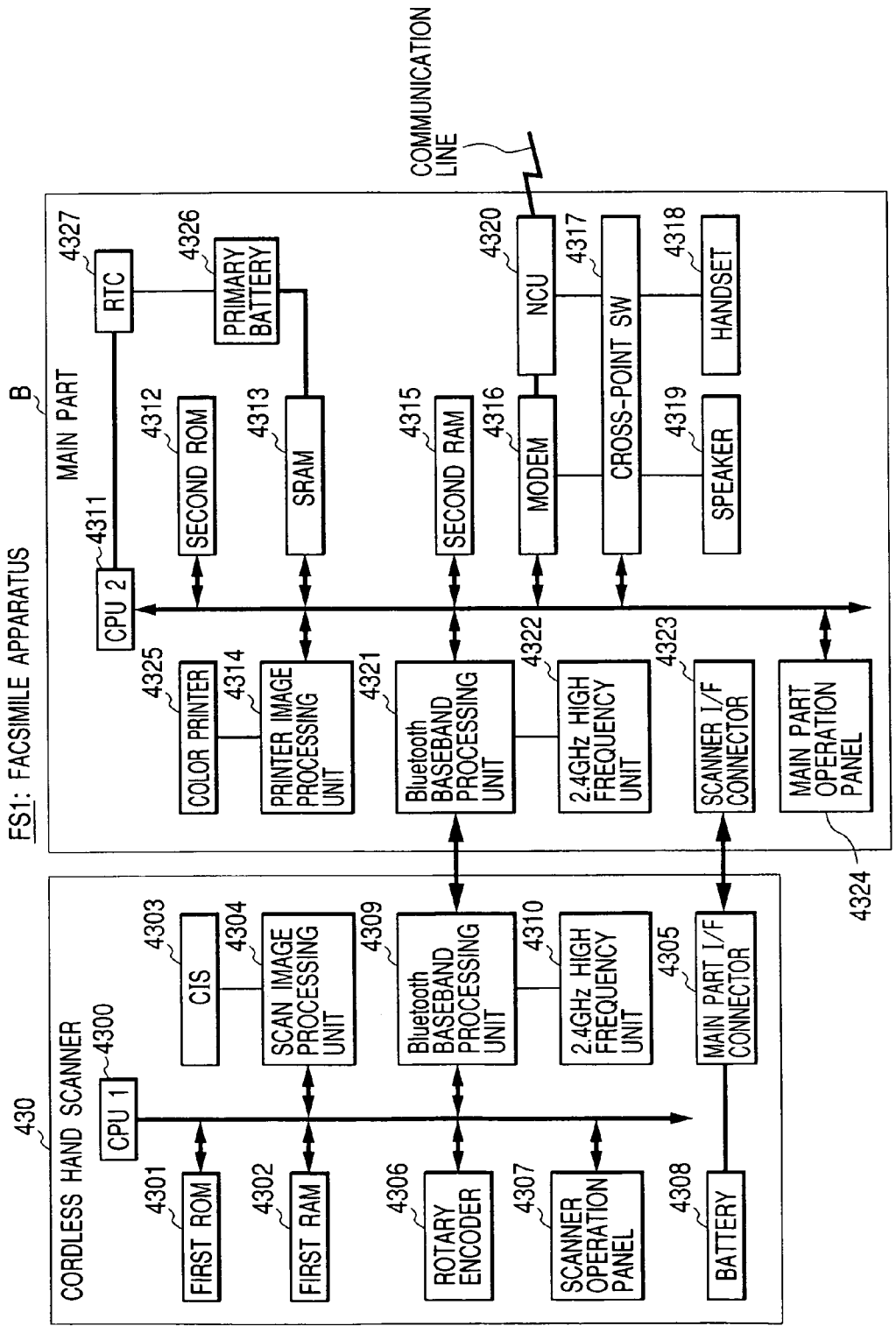
FIG. 43 is a block diagram showing a facsimile apparatus FS1 in the embodiment of the present invention.

FIG. 43 is a block diagram showing a facsimile apparatus FS1 that is one embodiment of the present invention.

Figure 44:
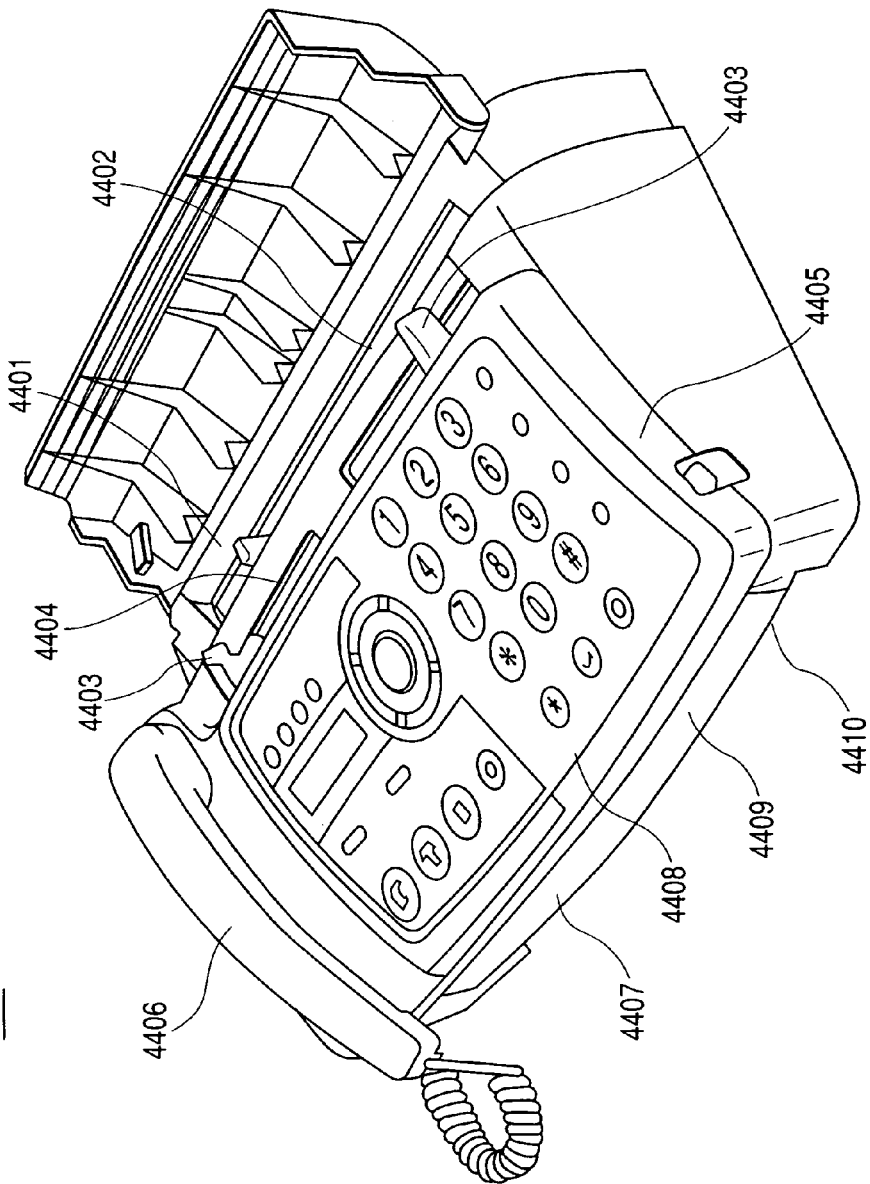
FIG. 44 is a perspective view showing the facsimile apparatus FS1 in the embodiment of the present invention.

FIG. 44 is a perspective view showing the facsimile apparatus FS1.

The facsimile apparatus FS1 is constituted by a cordless hand scanner 430 and a main part B, has a function to satisfy ITU-T Recommendation G3 Specification, is capable of color reading and color recording, and has a color copy function and a function of sending/receiving color images. The cordless hand scanner 430 is a detachable scanner.

The cordless hand scanner 430 is a cordless hand scanner that is totally separated from the main part B and is capable of reading.

In the facsimile apparatus FS1, as shown in FIG. 44, a paper guide 4401 has a guide mechanism that is set in accordance with the wide of the paper. The record sheet is inserted from a paper inlet 4402, the original guide 4403 is set in accordance with the wide of the original, and the original guide 4403 has a position sensor added thereto and detects the size of the original depending on the set position of the original.

When taking out originals/record sheets which are inserted from an original inlet 4404, transported and then jam in the equipment, and when exchanging a cartridge of the printer unit, a top cover 4405 can be opened in upper direction. A top cover unit includes an operation panel in main part and a handset plate.

A handset 4318 is used during a telephone conversation. A contact color image sensor CIS (Contact Image Sensor) 4303 in the cordless hand scanner 430 is a contact color image sensor with read wide of B4 and main scan direction read resolution of 8 pel/mm, which outputs each RGB color in line order, and can be taken out from the main part B when the top cover is opened.

An original outlet 4409 ejects the original that is sheet-read in the main part B. A paper outlet 4410 ejects the record sheet printed by the printer unit 4325.

Figure 45:
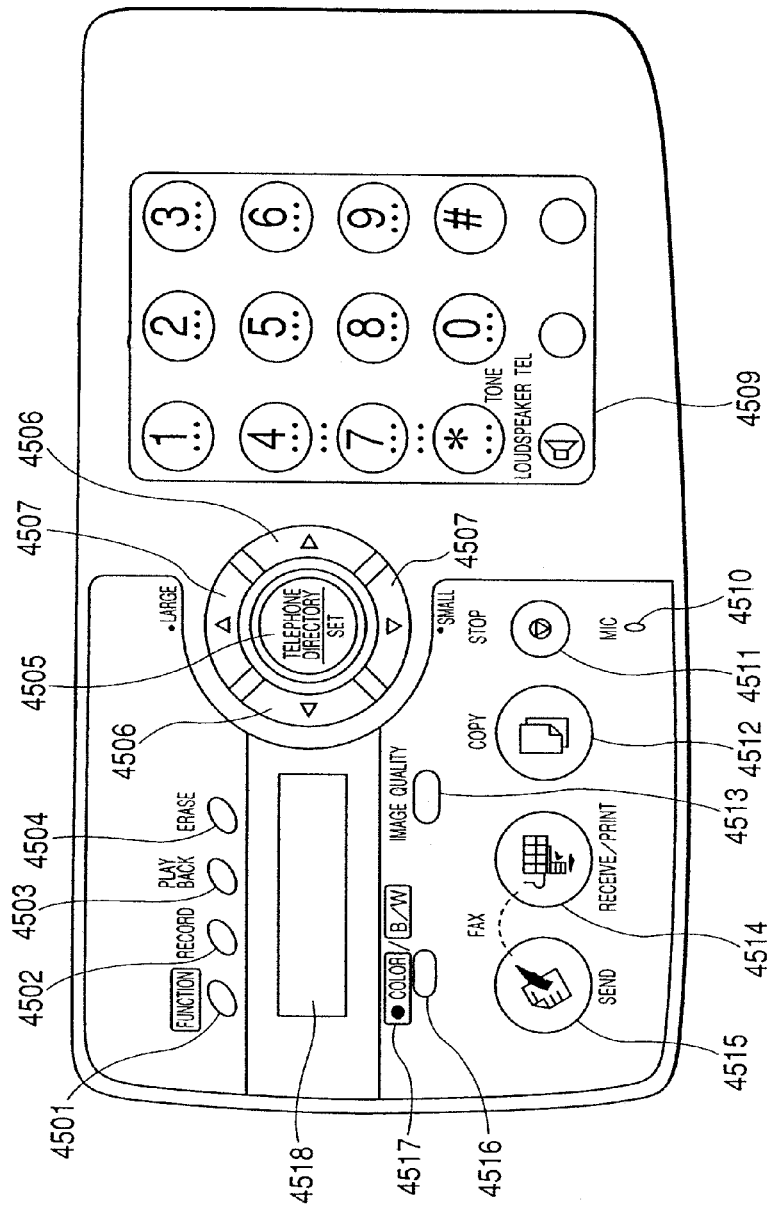
FIG. 45 is a plan view showing an operation panel in main part 4324 of the facsimile apparatus in the embodiment of the present invention.

FIG. 45 is a plan view showing an operation panel in main part 4324 in this embodiment.

In the operation panel in main part 4324, a function button 4501 is a button that is used when setting and recording is started, a recording button 4502 is a button that is used when memorized voice is recorded, and a playback button 4503 is a button that is used when one hears voice recorded in absence and memorized voice. An erase button 4504 is a button that is used when recorded voice in absence and memorized voice and facsimile are erased from the memory, and a telephone directory/set button 4505 is a button that is used when a setting is fixed in the case where dialing is performed with the telephone directory.

A left/right button 4506 is a button that is used when letters are entered in the case where a function item is selected, an up/down button 4507 is a button that is used when the function item is displayed and when a volume is adjusted in the case where the telephone directory is searched, a loudspeaker tel button 4509 is a button that is used when a conversation is held without picking up a receiver, and a microphone 4510 is a microphone that is used when a conversation is held without picking up a receiver.

A stop button 4511 is a button that is used when operations such as facsimile transmission/reception, copy, playback and setting are stopped, and when operation is stopped in progress, a copy button 4512 is a button that is used when copy is performed, and an image quality button 4513 is a button that is used when small letters and photographs are sent. A reception/print button 4514 is a button that is used when a facsimile message is received and printed, a transmission button 4515 is a button that is used when a facsimile message is sent, and color/black and white button 4516 is a button that is used when the color mode of copy and facsimile is switched.

A color lamp 4517 lights up when the color mode is selected. A display 4518 has a current state and a registration menu displayed thereon, and a date, time and the number of recorded voices in absence are usually displayed thereon.

Figure 46:
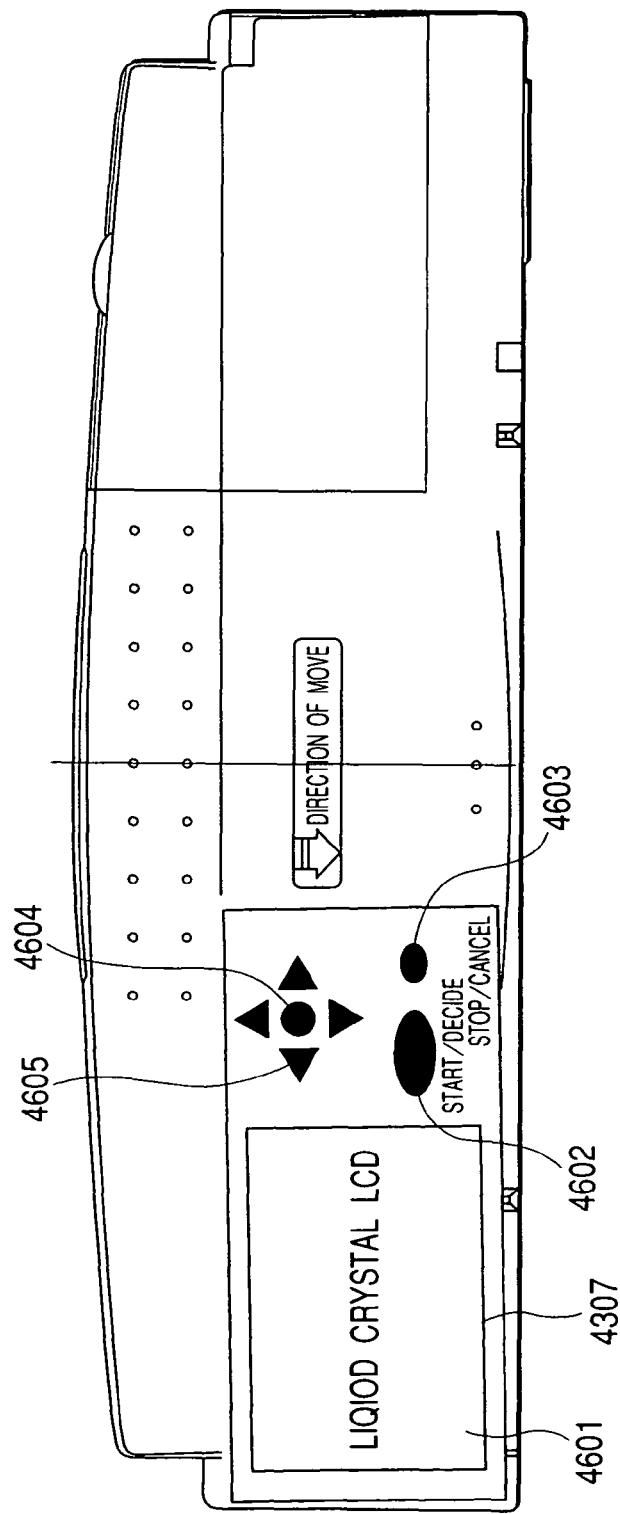
FIG. 46 is a top view of a cordless hand scanner 430 of the facsimile apparatus FS1 in the embodiment of the present invention.

FIG. 46 is a top view of the cordless hand scanner 430 after it is taken out from the main part B of the facsimile apparatus FS1.

Furthermore, the surface shown in FIG. 46 is a top surface when the cordless hand scanner 430 is used, and is an undersurface when the cordless hand scanner 430 is attached to the main part B.

The cordless hand scanner 430 has a scanner operation panel 4307. In the scanner operation panel 4307, a "liquid crystal LCD" 4601 has various information of the hand scanner 430 displayed thereon. Furthermore, as various information of the hand scanner 430, the memory level, read wide, Bluetooth link state, read speed, image color information and the like can be considered.

A "start/decision" button 4602 is a button that is used when reading is started or stopped (completed establishment), and is selected by the function menu and used when decision is made.

A "stop/cancellation" button 4603 is a button when reading is stopped, and selection by the function menu is canceled. A "function" button 4604 is a button when transition is made from a waiting state to a function menu for performing erase of images and facsimile transmission, copy and the like. An "up/down/left/right cursor" button 4605 is a button that is used during selection operation in the function menu.

Figure 47:
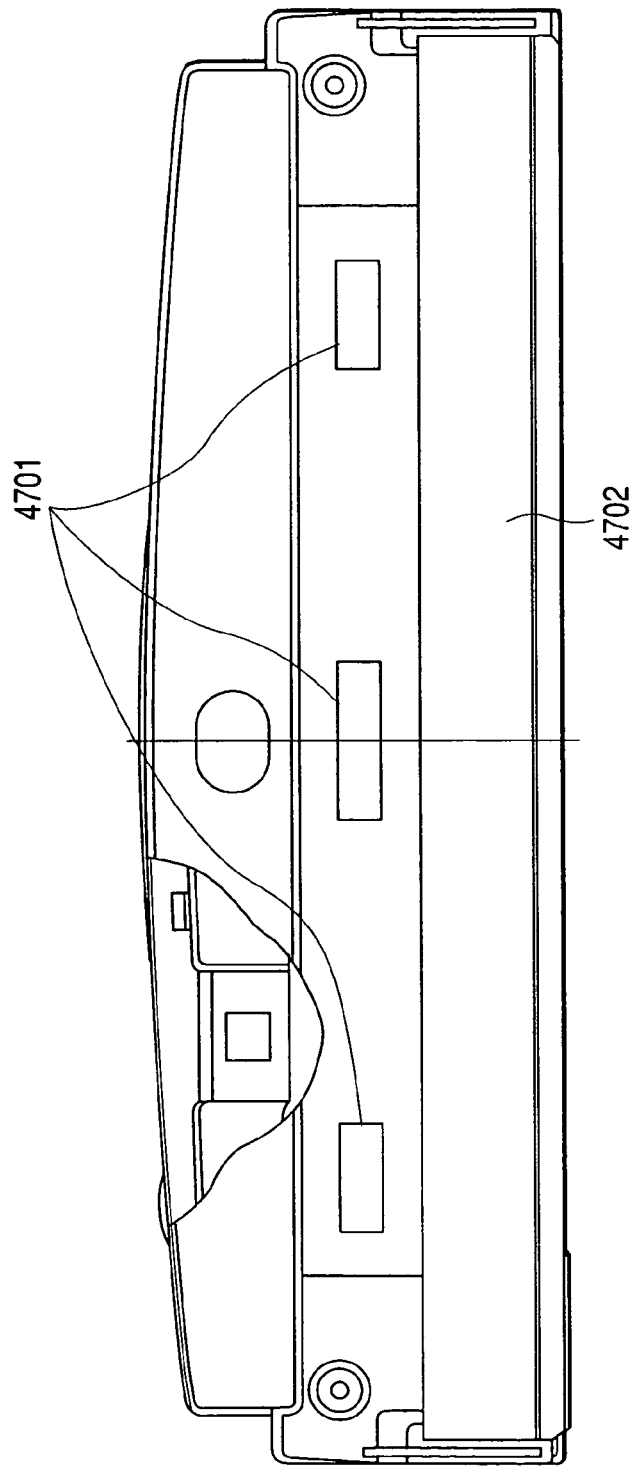
FIG. 47 is a bottom view showing the cordless hand scanner 430 of the facsimile apparatus FS1 in the embodiment of the present invention.

FIG. 47 is a bottom view showing the cordless hand scanner 430 taken out from the main part B of the facsimile apparatus FS1.

Furthermore, the surface shown in FIG. 47 is an undersurface during usage, and is a top surface when the cordless hand scanner 430 is attached to the main part B.

In the cordless hand scanner 430, as the surface shown in FIG. 47 slides on the original, a roller 4701 rotates and a rotary encoder unit (not shown) detects rotation information. A contact sensor glass face 4702 intimately contacts the original, and reads image information optically by an image sensor placed on the undersurface of the glass face 4702.

The cordless hand scanner 430 in the facsimile apparatus FS1 will now be described.

The cordless hand scanner 430 constitutes the facsimile apparatus FS1, together with the main part B.

As shown in FIG. 43, the cordless hand scanner 430 has a first CPU 4300 having a function for subjecting digital image data to JPEG compression/expansion by middleware, a first ROM 4301 storing various kinds of programs of the first CPU 4300 and fixed data, a first RAM 4302 that is used as a work memory of various kinds of programs of the first CPU 4300 and an accumulation memory of image data in the cordless hand scanner 430, etc., and a contact color image sensor CIS (Contact Image Sensor) 4303 that reads image data in line unit.

The contact color image sensor CIS 4303 includes therein LED arrays of red (R), green (G) and blue (B), and is synchronized with a timing signal to output a video signal when a read timing signal is inputted.

An image processing unit 4304 is an image processing unit that outputs the read timing signal to the CIS 4303, and subjects to A/D conversion the video signal outputted by the CIS 4303, and then performs shading correction and gamma conversion of brightness/concentration to make conversion into digital multiple value/binary data, and performs scaling and resolution conversion of images. Image data converted into digital data is stored in the first RAM 4302, and is thereafter sent to the main part B via the wireless line as necessary.

A main body interface 4305 is constituted by a connector connected to the main part B, and a battery 4308 is charged through this connector.

A detection output unit 4306 is a detection output unit of the rotary encoder monitoring the rotation state of the read roller of the cordless hand scanner 430, and during reading, the first CPU 4300 calculates data of movement distance of the cordless hand scanner 430 (information of the number of rotations of the rotary encoder) from the above described detection output, and reading of the image is performed by the image processing unit 4304.

The scanner operation panel 4307 is constituted by the liquid crystal display unit having the state of the cordless hand scanner 430 and various kinds of data displayed thereon, and a key entry unit for making various kinds of settings such as selection of a read mode and erase of images in the memory.

The battery 4308 is a battery to drive the entire system of the cordless hand scanner 430 when the cordless hand scanner 430 is taken out from the main part B and used alone, and is always supplied with electric power from the main part B and charged when the cordless hand scanner 430 is attached to the main part B.

The wireless interface unit is constituted by a Bluetooth baseband processing unit 4309 and a frequency unit 4310 of 2.4 GHz band, is a wireless interface unit of the cordless hand scanner 430 and the main part B, performs wireless communication based on the Bluetooth specification between the main part B and the cordless hand scanner 430 to send/receive a packet, and is constituted by a command/response interface for designating an operation mode and exchanging state information, and an image data interface for exchanging image data in two directions, wherein the main part B is a master and a cordless hand scanner 430 is a slave.

Bluetooth baseband processing unit 4309 is a Bluetooth baseband unit carrying out frequency hopping process of Bluetooth and process of assembly and decomposition of frames. Also, the frequency unit 4310 of 2.4 GHz sends and receives radio waves.

The main part B in this embodiment will now be described.

The main part B has a second CPU 4311 being a control unit thereof, a second ROM 4312 storing various kinds of programs of the second CPU 4311 and fixed data, and an SRAM 4313 registering and recording registration data needed for the system (various kinds of soft switches, communication destination data, ID information such as the telephone number and abbreviation of the apparatus). The SRAM 4313 is backed up with a primary battery 4326 so that the data is not lost by shutdown of the main power supply.

A printer image processing unit 4314 performs image processing required by the main part B, such as binarization process of converting multi-valued image data into a binary image and scaling of images, performs image resolution conversion for converting the resolution of image data into the resolution of the printer 4325, 360 dpi, and transfers print data to the color printer. The second RAM 4315 is used as a work memory of various kinds of programs, and an accumulation memory accumulating voice data, image data, etc. in the main part B. For the second RAM 4315, a nonvolatile memory such as a flash memory is assumed here.

A modem 4316 is a modem for performing facsimile transmission with a known G3 mode, etc., and comprises a DTMF signal recognition function, and a voice codeck function for recording voice in the second RAM 4315 and playing back voice from the second RAM 4315, in addition to V. 29, V. 21 and V. 27 ter.

During facsimile transmission, a monochrome image and color image are transmitted at the maximum transmission speed of 9600 bps, in accordance with ITU-T Recommendation G3 Specification. For transmission of color images, color images can be transmitted in a "specific mode" shared by such apparatuses with one another, in addition to G3 specification (hereinafter referred to as "ITU-T color mode").

The "specific mode" here means, for example, color communication using BFT (Binary File Transfer) as described later. For color communication by G3 Specification, 200 dpi of main/sub resolution and JPEG coding in the Lab color space are required as an image standard on the transmission pass. Also, for color communication in the specific mode, a function of 90 dpi of main/sub resolution and DPCM coding in the RGB color space is held for the image.

The operation panel in main part 4324 is constituted by a key entry unit for performing dial operations and providing various kinds of operation instructions, and making various kinds of settings, a liquid crystal display unit having the state of the apparatus and various kinds of data displayed thereon, and a LED. A speaker 4319 outputs various kinds of alarm sounds and calling sounds, and audio signals on the line. An NCU 4320 acts as an interface of the analog telephone line and the apparatus. The handset 4318 has a voice input/output unit for using this apparatus to hold a conversation. A connection switch for analog signals (cross point switch) 4317 is a known circuit that freely switches analog signal connection among a handset, a speaker, an NCU and a modem according to setting from the second CPU 4311.

The color printer 4325 is a known color printer of ink discharge type being the printer unit of this apparatus, and records binary data on the record sheet in record resolution of 360 dpi while making a cartridge having an ink tank and an ink discharge combined move in the main scan direction of the record sheet.

There are color cartridges having the ink tank of respective CMYK colors and the ink discharge unit combined, and monochrome cartridges having the ink tank of only monochrome ink and the ink discharge unit combined, and which of the color cartridge and monochrome cartridge is inserted can be determined by the second CPU 4311 from the configuration of electric contacts of the above described cartridge.

The record wide during monochrome recording is B4 at the maximum, the maximum record wide is A4 during color recording when the color cartridge is inserted.

The primary battery 4326 is a primary battery providing battery backup to registration data of the SRAM 4313 and the operation of the IC 4327 for clocks. The RTC 4327 is an IC for clocks that can count time by a second and can operate even when main power supply is shut down, and a scanner interface connector 4323 is a scanner interface connector providing a channel for supplying electric power from the main part B to the cordless hand scanner 430, and detecting attachment/nonattachment of the hand scanner 430.

The wireless interface unit is constituted by the Bluetooth baseband processing unit 4321 and the high frequency unit 4322 of 2.4 GHz band, is a wireless interface unit of the cordless hand scanner 430 and the main part B, and carries out wireless communication based on the Bluetooth specification between the main part B and the cordless hand scanner 430 to transmit packets. Also, it is constituted by a command/response interface, etc. for designating an operation mode and exchanging state information.

A Bluetooth baseband processing unit 4321 is a Bluetooth baseband processing unit carrying out frequency hopping process of Bluetooth and process of assembly and decomposition of frames. Also, a frequency unit 4322 of 2.4 GHz sends and receives radio waves.

<Initialization Operation of Cordless Hand Scanner 430>

The initialization operation of the cordless hand scanner 430 in this embodiment will now be described.

Figure 48:
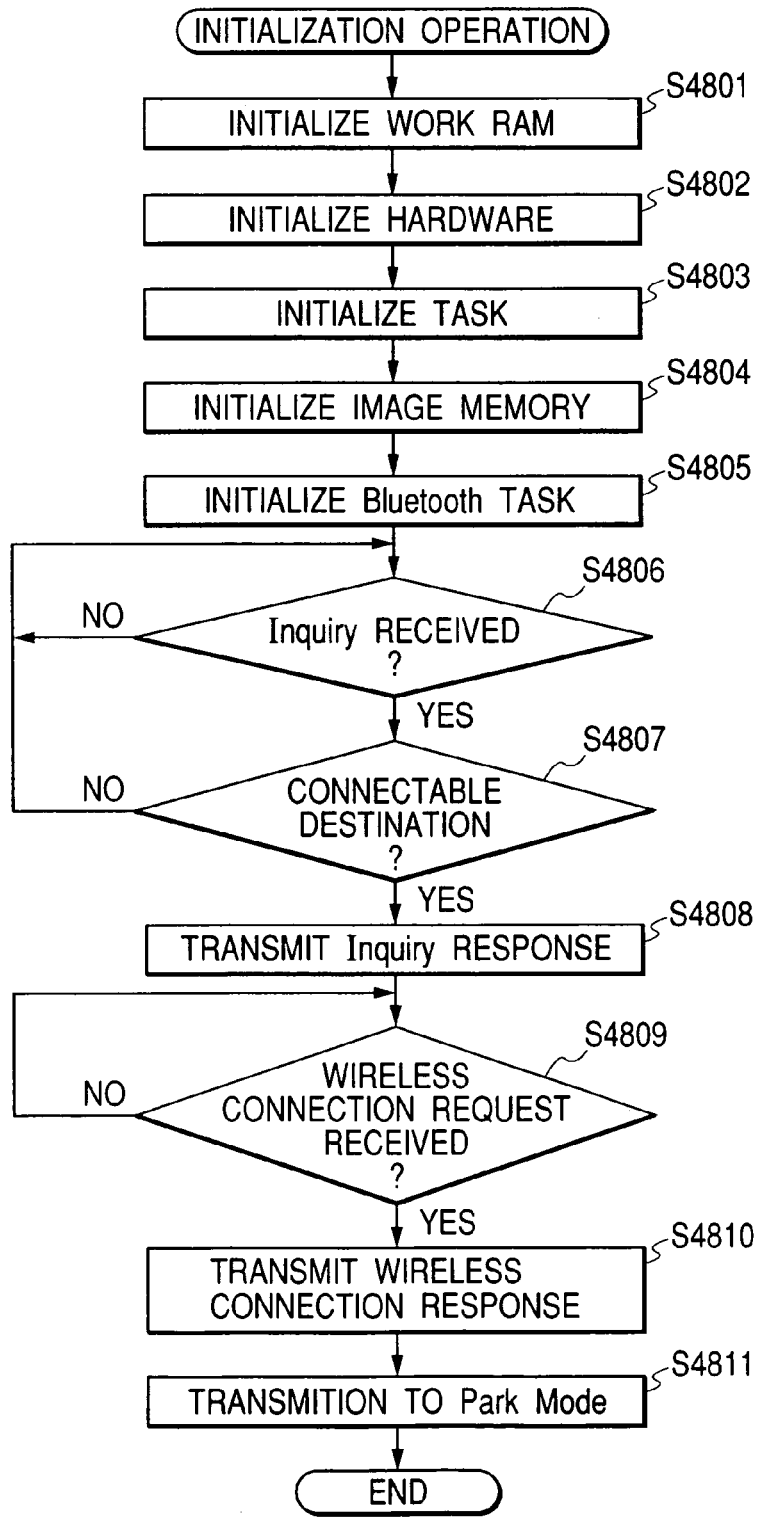
FIG. 48 is a flowchart showing initialization operation when the power of the cordless hand scanner 430 is turned on in the embodiment of the present invention.

FIG. 48 is a flowchart showing an initialization operation when the power of the cordless hand scanner 430 is turned on.

First, a work area in the first RAM 4302 shown in FIG. 43 is initialized (S4801), and then peripheral hardware is initialized (S4802). Thereafter, each task controlled by the OS is initialized (S4803), the image memory in the first RAM 4302 is initialized (S4804), and subsequently the Bluetooth control task is initialized (S4805) to go into the state of waiting the link establishment of Bluetooth (S4806).

In this condition, when an Inquiry command based on the Bluetooth specification is received from the main part B, the ID number of the main part B in the command (Bluetooth device address) is compared with the ID number of the connectable main part B stored in advance (Bluetooth device address) (S4807). If the result of this comparison shows that they match each other, an Inquiry Response including an Inquiry access code of the hand scanner is sent to the main part B (S4808).

Then, when a Paging message (wireless connection request signal) including the device access code of the hand scanner 430 is received from the main part B (S4809), a wireless connection response signal is sent to the main part B (S4810) to establish a wireless link. Furthermore, the link type that is used in this embodiment is an asynchronous connectionless link (ACL). Unless an effective command is received from the main part B within a predetermined time period after the establishment of the wireless link, the Bluetooth baseband processing unit 4309 and the 2.4 GHz high frequency unit 4310 enters the Park mode (S4811).

Furthermore, the "Park mode" is a low power consumption standby state in which the connection of Bluetooth remains established.

Figure 49:
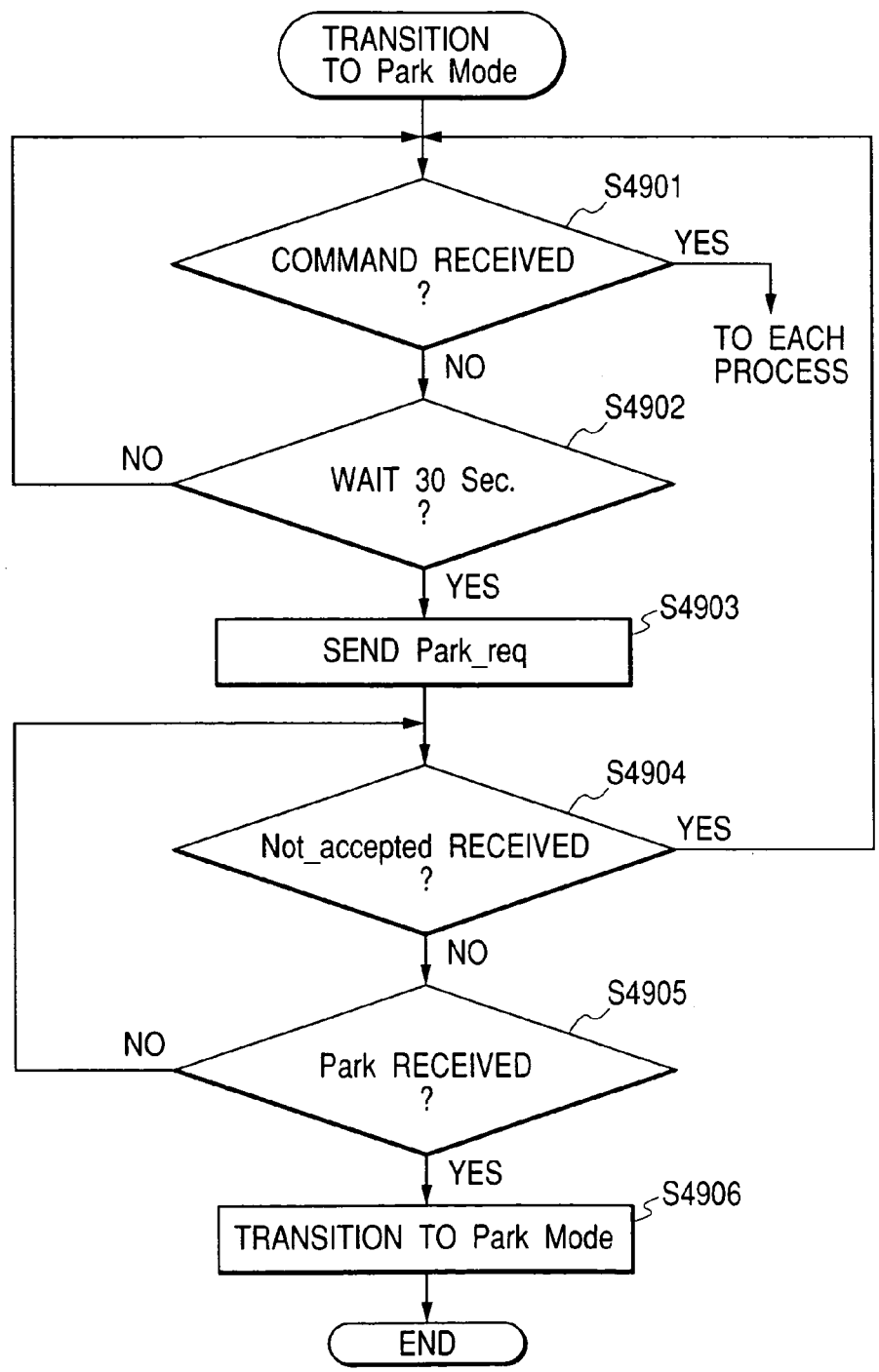
FIG. 49 is a flowchart illustrating operation for transition of the hand scanner 430 to the Park mode of the hand scanner 430 in the embodiment of the present invention.

FIG. 49 is a flowchart illustrating an operation for transition to the Park mode of the hand scanner 430.

As described with FIG. 48, after the wireless link is established between the hand scanner 430 and the main part B, the hand scanner 430 sends a Park_req message to the main part B (S4903) to make transition to the Park mode unless it receives an effective command from the main part B for a certain time period (thirty seconds in this embodiment) (S4901, S4902). If a Not_accepted message showing that transition is not permitted is received from the main part B (S4904), return to the command standby state is made (S4901). Also, if a Park message showing that transition is permitted is received from the main part B (S4905), transition to the Park mode is made (S4906).

<Initialization Operation of Main Part B>

An initialization operation of the main part B in this embodiment will now be described.

Figure 50:
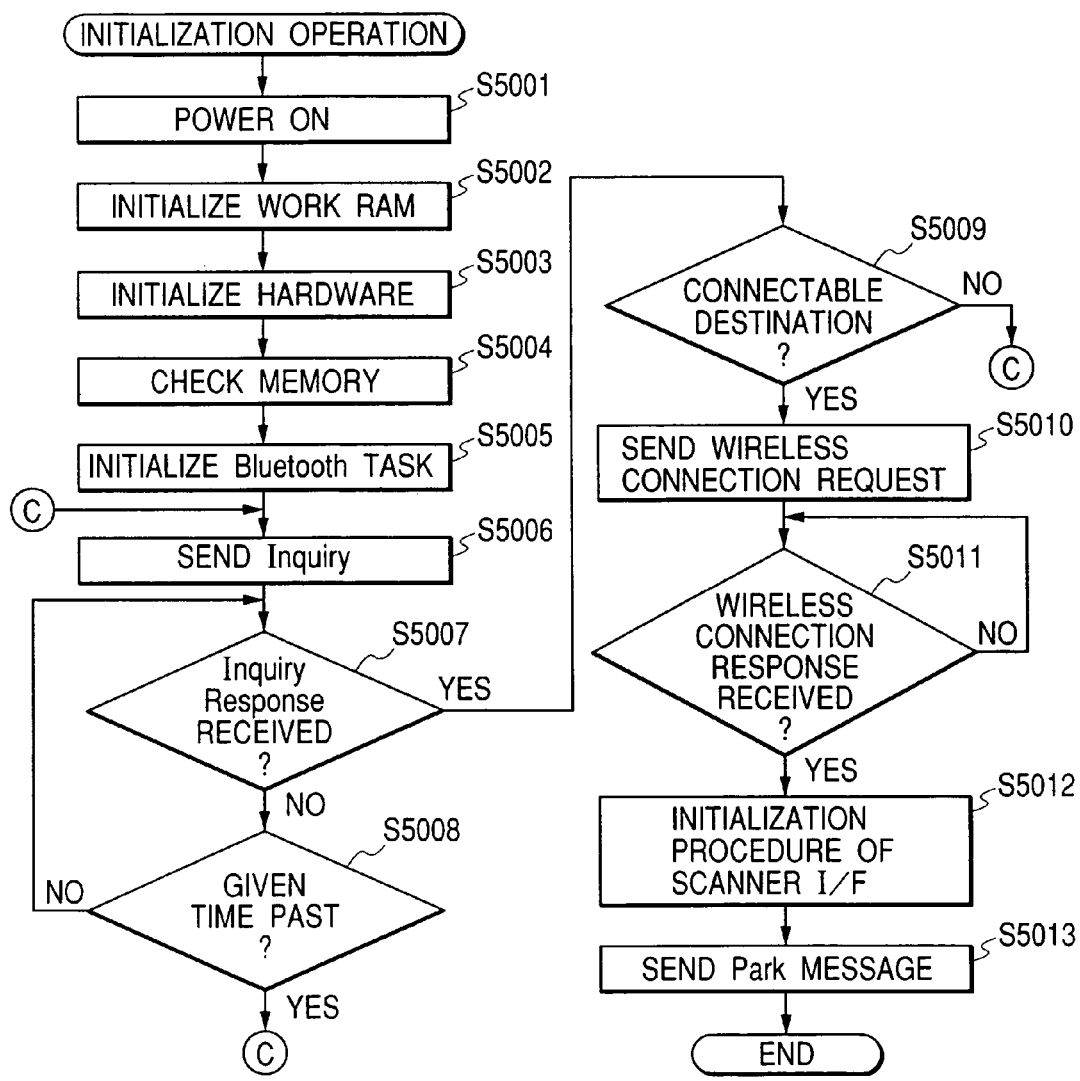
FIG. 50 is a flowchart showing initialization operation of a main part B in the embodiment of the present invention.

FIG. 50 is a flowchart showing the initialization operation of the main part B.

When the power of the main part B is turned on, a power on operation is performed in the following procedure.

When the main power supply is turned on (S5001), the work RAM is initialized (S5002), and peripheral hardware is initialized (S5003). Thereby, the display of the operation panel in main part 4324 is initialized.

Then, backup data in the SRAM 4313, and the image memory and the voice memory in the second RAM are checked (S5004). Subsequently, the Bluetooth control task is initialized (S5005), and an Inquiry command including the Inquiry access code of the main part B is sent to establish the link of Bluetooth with the cordless hand scanner 430 (S5006).

At this time, if the cordless hand scanner 430 is in the state of waiting establishment of the link of Bluetooth, an Inquiry Response including the Inquiry access code of the cordless hand scanner 430 is sent. If the Inquiry Response is received within a predetermined time period (S5007 to S5008), the main part B compares the Inquiry access code of the connectable hand scanner stored in advance with the received ID number (S5009), and makes transition to the Paging mode if the comparison result shows that they match each other.

That is, the device access code of the cordless hand scanner 430 is designated, and wireless connection using the Serial Port Profile is requested based on Bluetooth connection standard (S5010).

When a response signal to the wireless connection request is received from the cordless hand scanner 430 (S5011), the link of Bluetooth (Piconet) is established between the main part B and the cordless hand scanner 430, and thus a scanner interface initialization process shown in FIG. 53 and described later is carried out (S5102). After the scanner interface initialization procedure is carried out, a Park message is sent to make the cordless hand scanner 430 being a slave go into the standby state of low power consumption (Park mode) with the connection of Bluetooth established as ever, and the initialization operation is ended (S5013).

Furthermore, if a response to the connection request is not received from the cordless hand scanner 430 after predetermined time elapses, impossibility of establishment of the wireless link is displayed on the display unit.

Also, if the Inquiry Response cannot be received within a predetermined time period after the Inquiry command is sent (NO at S5008) and if the Inquiry Response is received from an opposite with which connection cannot be made (NO at S5009), the process returns to S5006 to send the Inquiry command again.

<Operation of Interface Between Main Part B and Hand Scanner>

First, the structure of a packet that is exchanged between the cordless hand scanner 430 and the main part B will be described.

Figure 51:
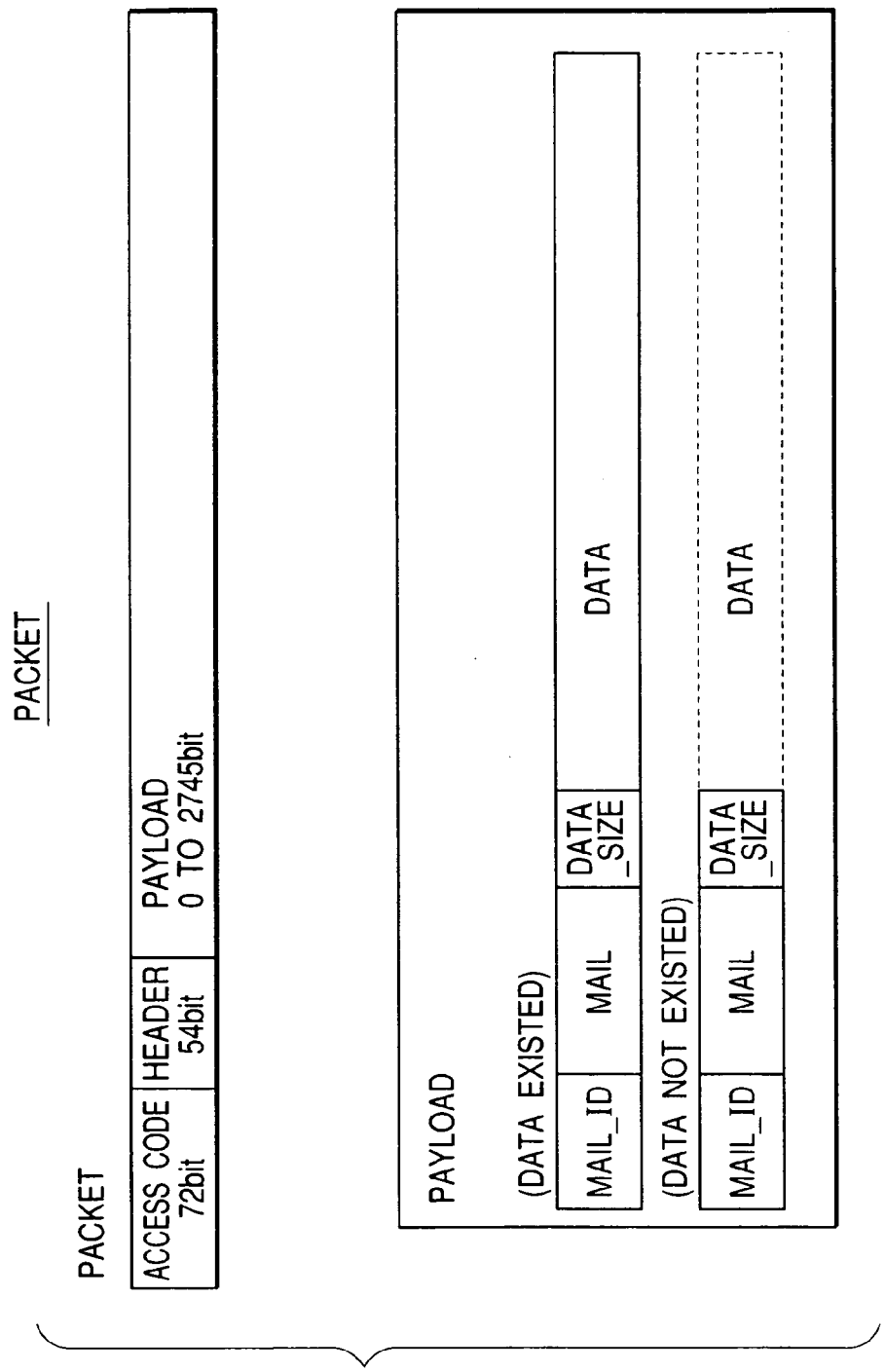
FIG. 51 shows the structure of a packet exchanged between the cordless hand scanner 430 and the main part B in the embodiment of the present invention.

FIG. 51 shows the structure of the packet that is exchanged between the cordless hand scanner 430 and the main part B in this embodiment.

According to the specification of Bluetooth, one packet is divided into an access code portion, a header portion and a payload portion, and the access code portion and header portions are used for Bluetooth communication, and the payload portion is used for the interface command/response between the main part B and the hand scanner unit. The payload portion is further constituted by a Mail_ID portion, a MAIL portion, a DATA_SIZE portion and DATA portion.

The MAIL_ID portion is used for managing matching of the interface command/response such as the MAIL name and version information of the interface command/response described later. In the MAIL portion are stored information (image number and color, effective time for waiting the command/response, etc.) needed for a predetermined interface command/response between the main part B and the hand scanner, and detailed instructions (instructions of what, how, etc.) of the command/response.

The Data_Size portion is used for managing the size of the DATA portion described later. For example, when there exists no DATA, NULL (Zero) is stored in the DATA_SIZE portion. DATA portion is used for storing therein data (for example, image data) that is not included in the MAIL portion.

Figure 52:
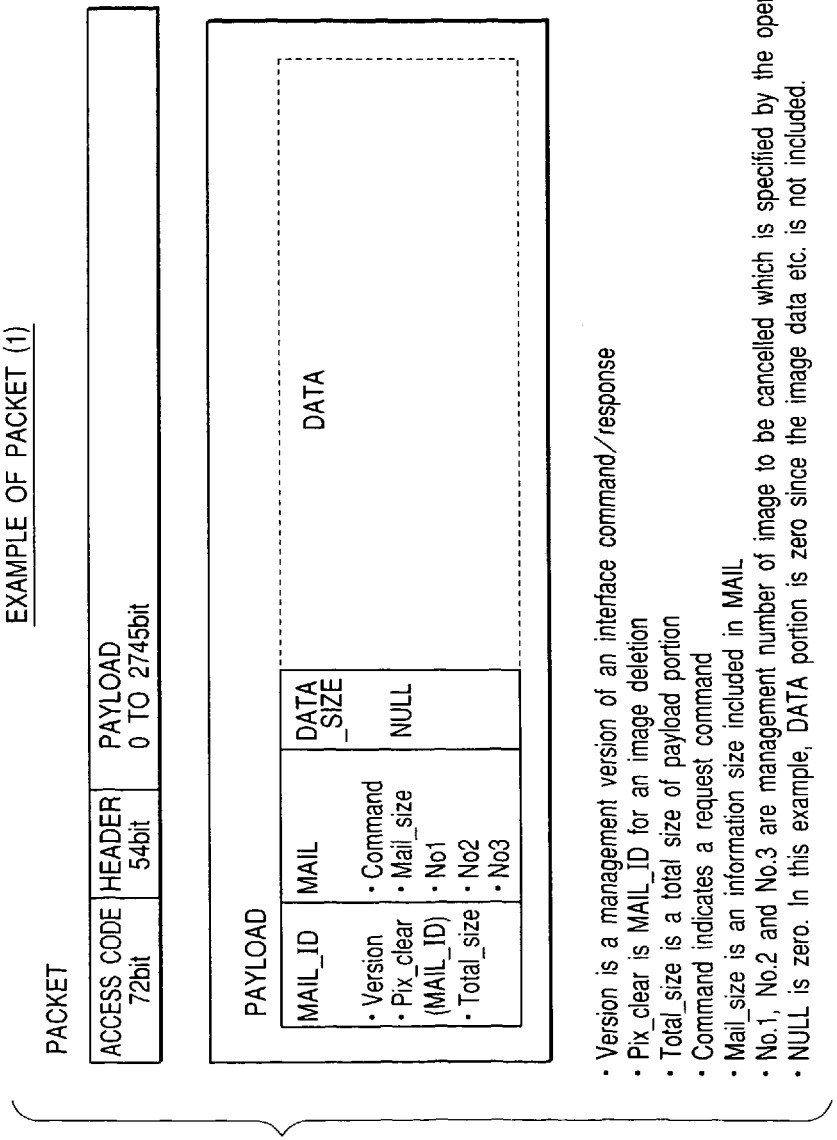
FIG. 52 shows an example of the packet in the embodiment of the present invention.

FIG. 52 shows an example of a packet being an interface that does not include image data generated when the memory image in the cordless hand scanner 430 is erased by the operation unit of the main part B.

In FIG. 52, Version is a management version of an interface command/response, Pix_clear is MAIL_ID for an image deletion, Total_size is a total size of the payload portion, and Command indicates a request command (request pairs up with command). Mail_size is an information size included in MAIL, No. 1, No. 2 and No. 3 are management numbers of the images to be erased, which are designated from the operation in the main part B, and NULL is zero. The packet shown in FIG. 52 does not include image data, etc., and thus the DATA portion is zero.

Figure 53:
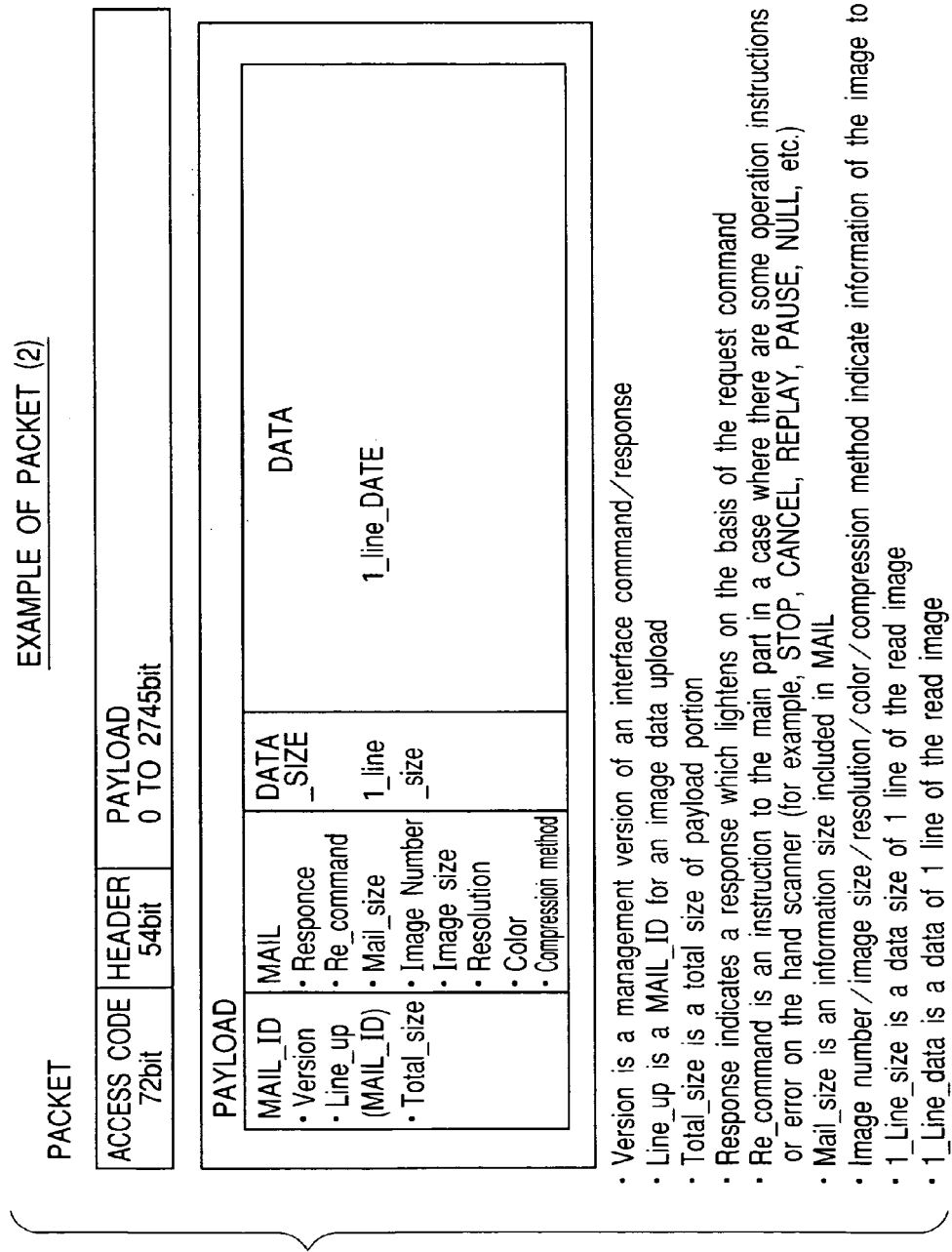
FIG. 53 shows an example of the packet in the embodiment of the present invention.

FIG. 53 shows an example of a packet an example of a packet being an interface including image data generated when image line data read from the hand scanner unit is transferred to the main part B in this embodiment.

Version is a management version of an interface command/response, Line_up is MAIL_ID for an image data upload, Total_size is a total size of the payload portion, and Response indicates a response that is issued on the basis of the request command. Also, Re_command is an instruction to the main part B in a case where there are some operation instructions or error on the hand scanner, for example instructions of STOP, CANCEL, REPLAY, PAUSE, NULL and the like.

Mail_size is an information size included in MAIL, the image number/image size/resolution/color/compression mode indicate information of the image to be transferred, 1_Line_size is a data size of 1 line of the read image, and 1_Line_data is data of 1 line of the read image.

Figure 54:
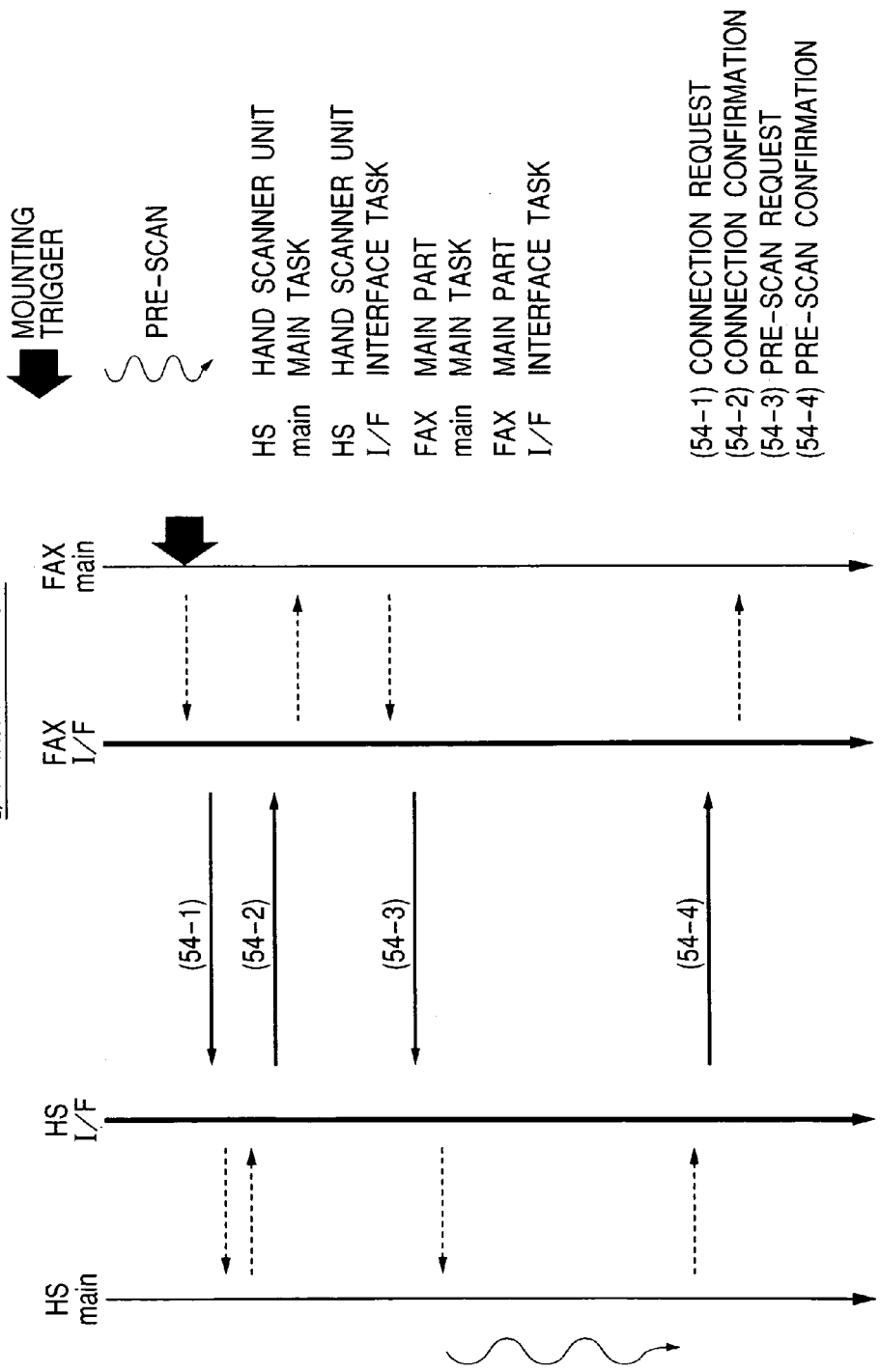
FIG. 54 is a chart showing a scanner interface initialization procedure in the embodiment of the present invention.

FIG. 54 is a flowchart showing a scanner interface initialization procedure in this embodiment, and shows relationship between the processes of the cordless hand scanner 430 and the main part B, and so on.

(54-1) and (54-2) ensure that the interface command/response can be exchanged between the main part B and the hand scanner unit. For example, version information, etc. of the interface command/response is exchanged, thereby managing mutual matching.

Figure 55:
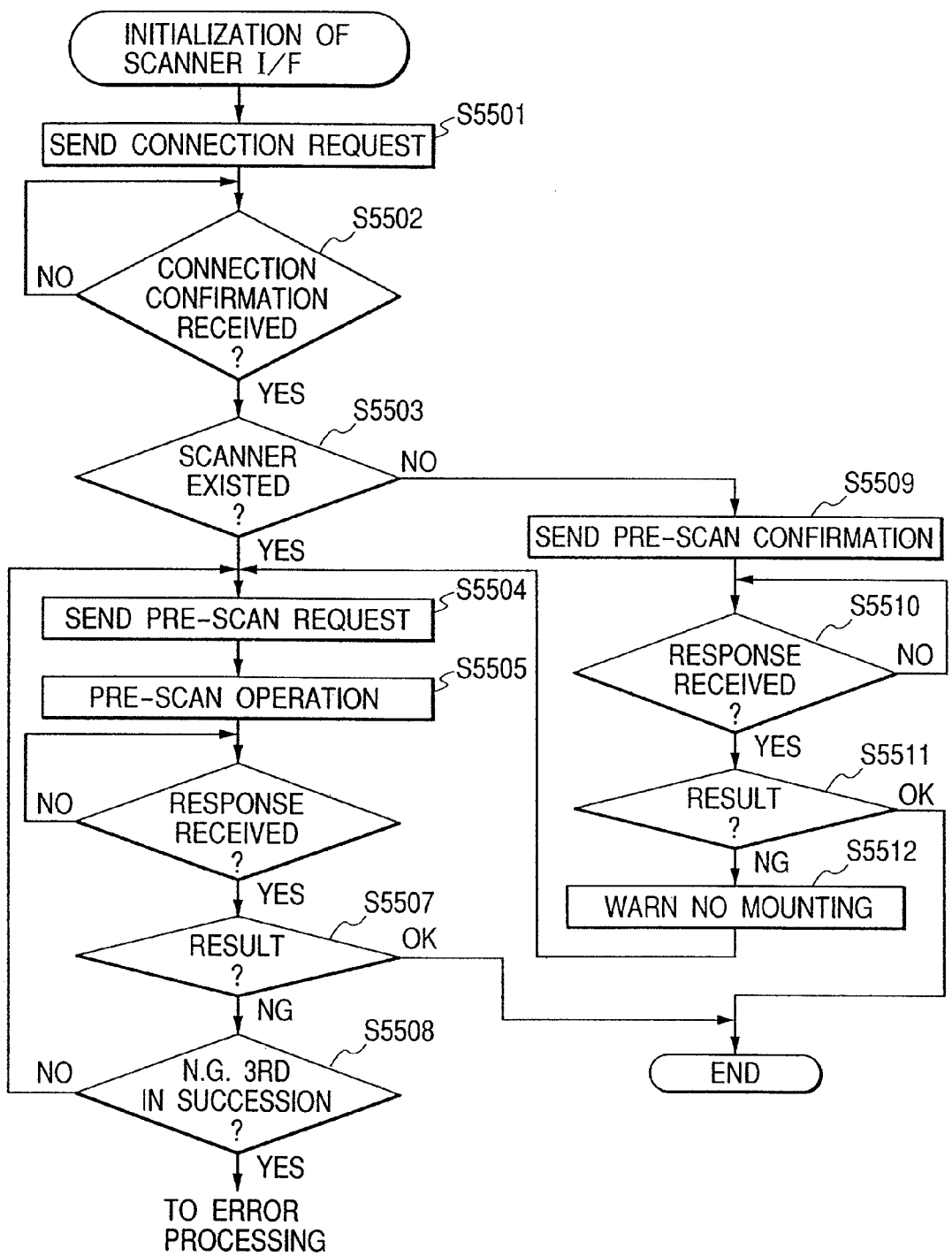
FIG. 55 is a flowchart illustrating the operation of the chart shown in FIG. 54 in the embodiment of the present invention.

FIG. 55 is a flowchart illustrating an operation of the chart shown in FIG. 54.

At S5501, a connection request command (54-1) is sent to the cordless hand scanner 430, and a connection confirmation response (54-2) is received from the cordless hand scanner 430 (S5502), and then the main part B ensures that the cordless hand scanner 430 has been connected normally. At this time, whether or not the cordless hand scanner 430 is mounted on the main part B is determined, on the basis of the level of a signal that is inputted from the scanner interface connector 4323 (S5503), and if the cordless scanner 430 is mounted on the main part B, a pre-scan request command (54-3) is sent to the cordless hand scanner 430 (S5504).

When the cordless hand scanner 430 receives the pre-scan request command, it performs a pre-scan operation. Specifically, it performs light adjustment to determine lighting time of a light source, and stores the determined lighting time of the light source and shading data in the first RAM 4302 (S5505). The result of performing the pre-scan is sent back to the main part B as a pre-scan confirmation response (54-4).

For this response, OK is written in MAIL if pre-scan could be performed normally, and NG is written in MAIL if failed in pre-scan, in command.

When the main part B receives the pre-scan confirmation response (54-4) (S5507), the hand scanner initialization procedure is completed. In case of NG, pre-scan is performed again, and error processing is performed in case of three NGs in succession (S5508).

When the above described process is carried out, the inside of the cordless hand scanner 430, the inside of the main part B and the scanner interface between the cordless hand scanner 430 and the main part B are initialized, thus bringing about a situation in which various kinds of operations can be performed on the basis of instructions by the user.

Also, if the cordless hand scanner 430 is not mounted on the main part B at S5503, a pre-scan confirmation command is sent from the main part B to the cordless hand scanner 430 at S5509. When the cordless hand scanner 430 receives the pre-scan confirmation command, it confirms the contents of the first RAM 4302, and sends back to the main part B the pre-scan confirmation response (54-4) having MAIL with OK written therein if normal pre-scan is already performed and its data is correctly retained in the cordless hand scanner 430, while it send back to main part B the pre-scan confirmation response (54-4) having MAIL with NG written therein if pre-scan is not performed yet or data is not correctly retained (S5510).

The main part B ends the process (S5511) if receiving OK, while it warns no scanner mounting described below to prompt the user to mount the cordless hand scanner 430 on the main part B for performing pre-scan (S5512).

A specific operation thereof will now be described using FIG. 56.

Figure 56:
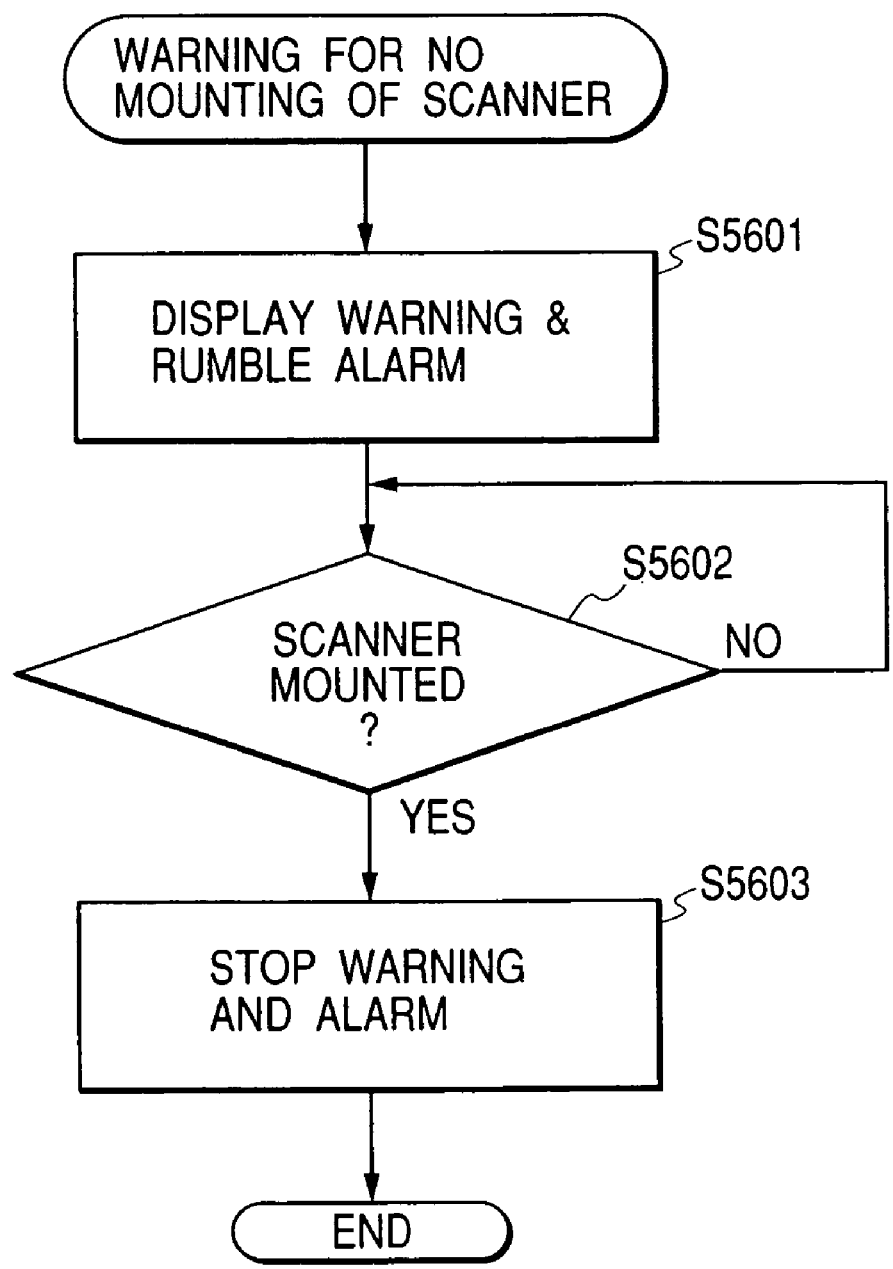
FIG. 56 is a flowchart showing the operation of warning for no mounting of scanner in the embodiment of the present invention.

FIG. 56 is a flowchart showing the operation of warning no scanner mounting in this embodiment.

Alarm display for prompting the user to mount the cordless hand scanner 430 on the main part B is provided using the operation panel in main part 4324, and the cross point switch 4317 is set to rumble an alarm sound (S5601). Thereafter, the level of a signal to be inputted in the scanner interface connector 4323 is monitored, and when the cordless hand scanner 430 is mounted on the main part B (S5602), alarm rumbling and alarm display are stopped (S5603) to complete the operation.

The process returns to FIG. 55, and when the operation of warning no scanner mounting is completed (S5512), the pre-scan request command (54-3) is sent back to the cordless hand scanner 430 as in the case of the above described operation of S5504. Subsequent operations are just same as those described above.

Furthermore, as described with FIG. 49, the hand scanner unit B makes transition to the Park mode (the low power consumption standby state where the connection of Bluetooth remains established) if it does not receive an effective command within 30 seconds.

<Operation During Sheet Copy>

Figure 57:
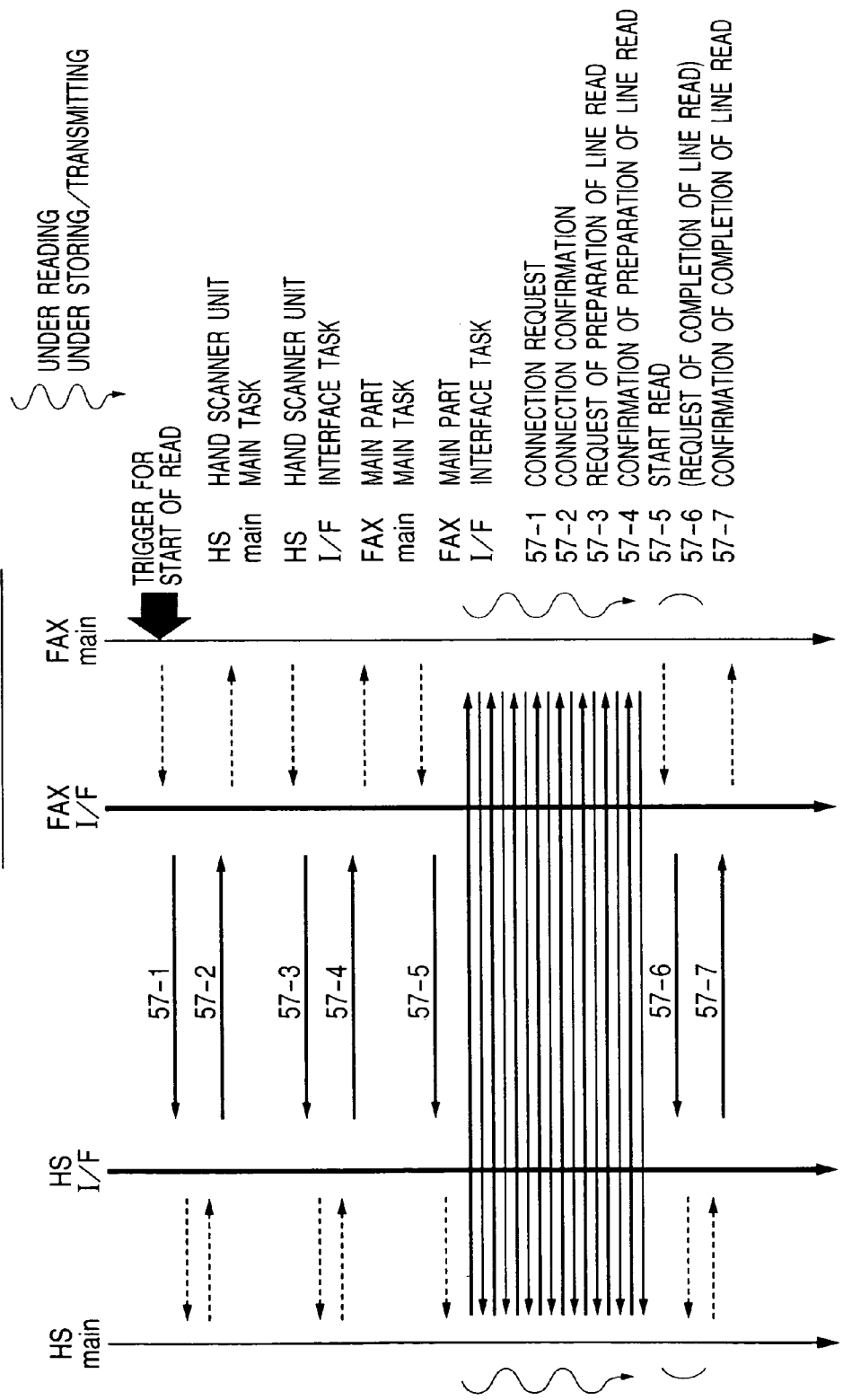
FIG. 57 is an interface chart of sheet copy in the embodiment of the present invention.

FIG. 57 is an interface flowchart of sheet copy, and shows relationship between the processes of the cordless hand scanner 430 and the main part B, and so on.

Figure 58:
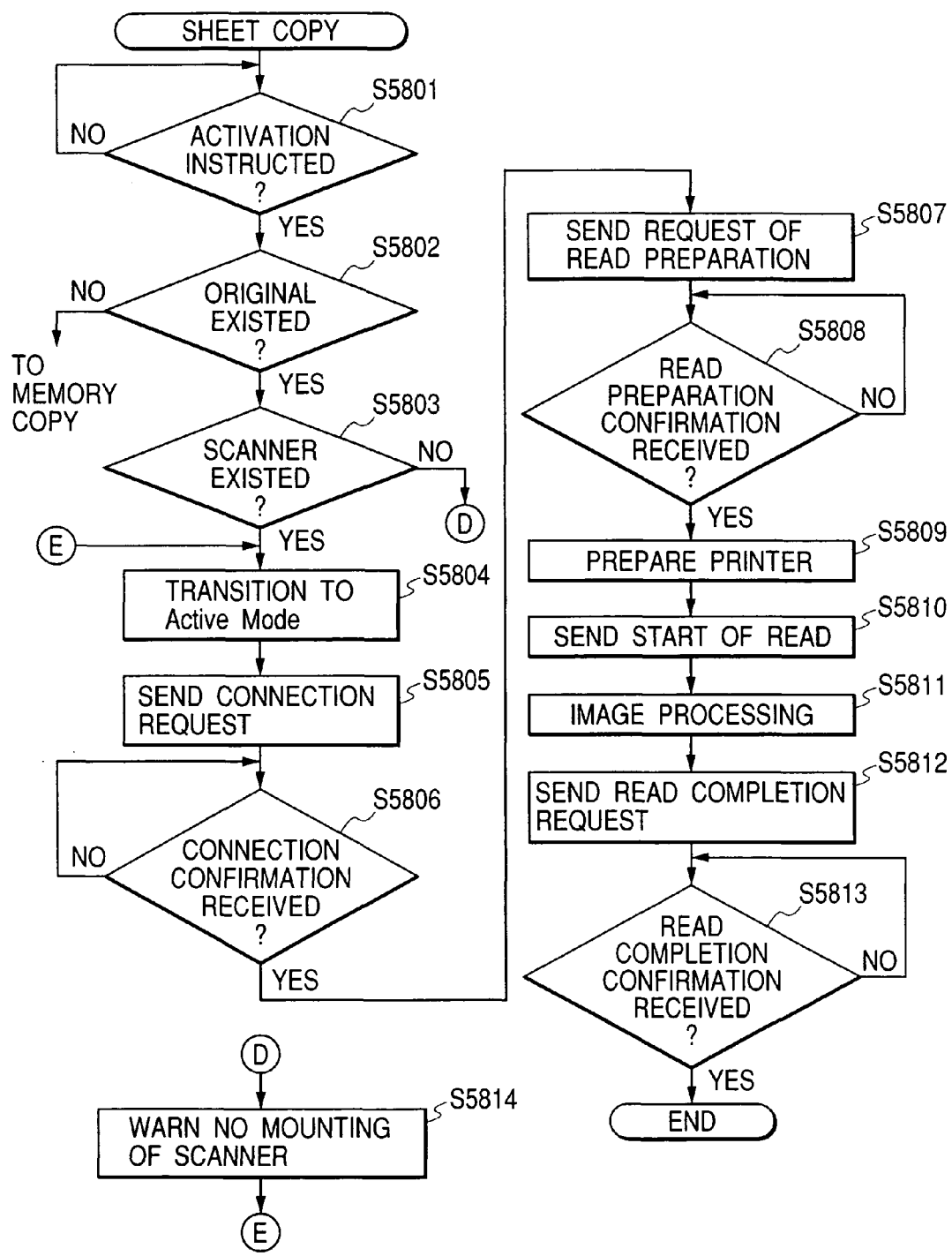
FIG. 58 is a flowchart showing operation of sheet copy in the embodiment of the present invention.

FIG. 58 is a flowchart showing an operation during sheet copy in this embodiment.

When copy instructions are provided from the operation panel in main part 4324 (S5801), a sensor placed in the original inlet 4404 detects existence/not existence of original (S5802), and assumes a sheet copy mode if the original exists. Whether or not the cordless hand scanner 430 is mounted on the main part B is determined based on the level of the signal inputted from the scanner interface connector 4323 (S5803), and if the cordless hand scanner 430 is mounted on the main part B, a procedure for transition to the Active mode is carried out (S5804) to make transition of the cordless hand scanner 430 from the Park mode (low power consumption standby state) to the Active mode for establishing the wireless link.

Figure 59:
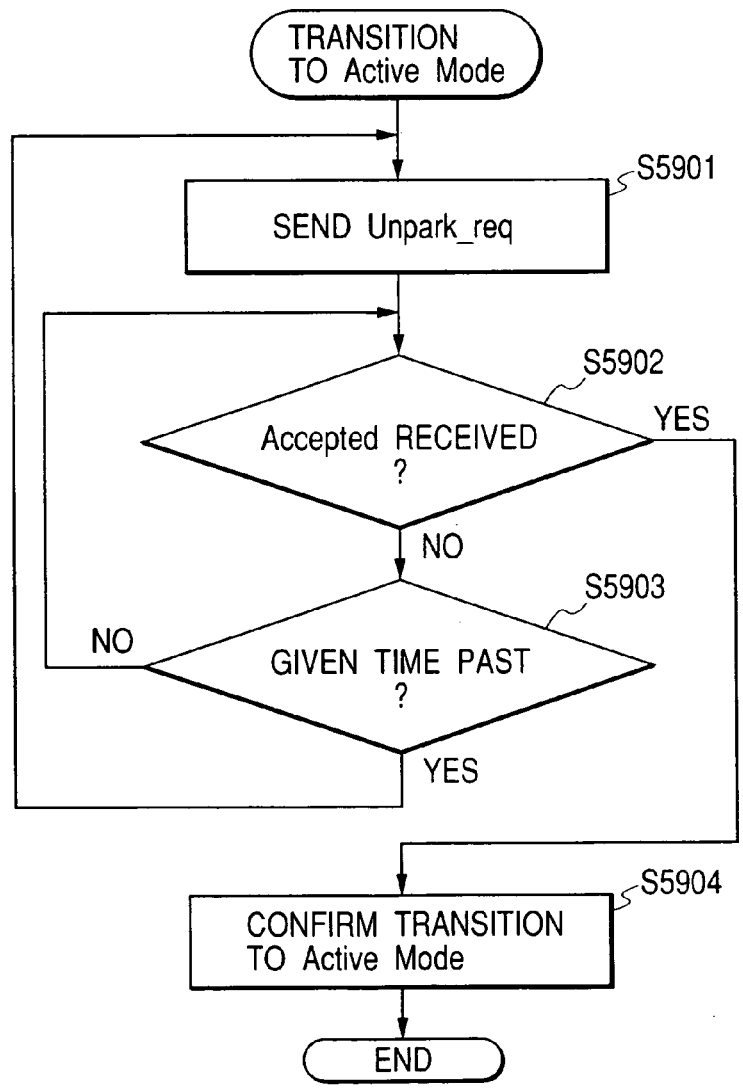
FIG. 59 is a flowchart showing a procedure for transition of the cordless hand scanner 430 from the Park mode to the Active mode of the cordless hand scanner 430 in the embodiment of the present invention.

FIG. 59 is a flowchart showing a procedure for transition of the cordless hand scanner 430 from the Park mode (low power consumption standby state) to the Active mode in this embodiment.

At S5901, the main part B sends an Unpark_req command being a request for transition to the Active mode to the cordless hand scanner 430. An Accepted response being notification of completion of transition to the Active mode from the cordless hand scanner 430 is waited for a predetermined time period, and when the Accepted response is received (S5902), the transition of the cordless hand scanner 430 to the Active mode is confirmed (S5904), and the process is ended. Furthermore, if the Accepted response cannot be received within a predetermined time period (S5903), the process returns to S5901, where an Unpark_req command is sent again.

Returning back to FIG. 58, the connection request command (57-1) is sent to the cordless hand scanner 430 (S5805) when the procedure for transition to the Active mode is completed (S5804). When the connection confirmation response (57-2) from the cordless hand scanner 430 is received (S5806), a command of request of preparation of line read (57-3) is sent from the main part B to the cordless hand scanner 430 (S5807).

At S5808, when a response of confirmation of preparation of line read (57-4) with OK/NG written in MAIL is received from the cordless hand scanner 430 (S5808), the printer is prepared (S5809).

When printer preparation is completed, a read start command (57-5) is sent to the cordless hand scanner 430 at S5810. Then, transportation of the original is started, image data is transferred from the cordless hand scanner 430 to the main part B, and record data subjected to necessary image processing is recorded by the printer 4325 in succession (S5811). The image data is stored in the DATA portion, an image data size for one interface command/response is each stored in the DATA_SIZE portion. Also, instructions for operations are each time stored in the MAIL portion, and thus when a stop key is pressed in the main part B, for example, the instructions there of are stored in the MAIL portion and are sent to the hand scanner.

When transportation of all originals is completed, a command of request of completion of line read (57-6) is sent to the cordless hand scanner 430 at S5812. However, the above described command of completion of line read may be stored in the MAIL portion of interface command/response, to which the last record data is sent.

At S5813, when a response of confirmation of completion of line read (57-7) is received from the cordless hand scanner 430, the operation of sheet copy is ended.

Furthermore, at S5803, if the cordless hand scanner 430 is not mounted on the main part B, the user is prompted to mount the cordless hand scanner 430 on the main part B (S5814), but this operation has been described with FIG. 56.

Also, at S5802, an operation of hand scanner memory copy is performed if there exits no original, but this operation will be described in detail later.

<Operation During Sheet Transmission>

Figure 60:
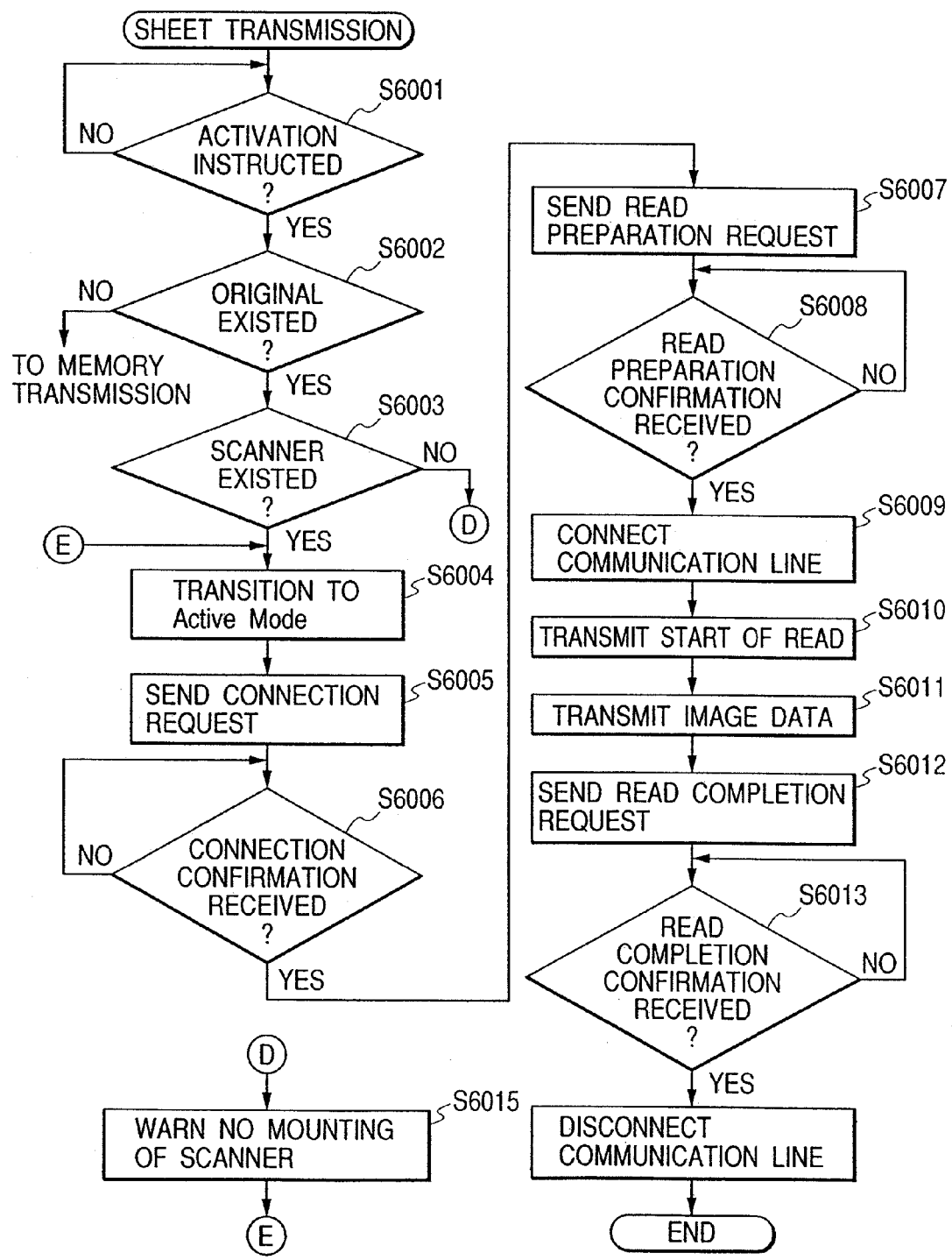
FIG. 60 is a flowchart illustrating operation of performing facsimile transmission of a sheet original through the operation of the main part B in the embodiment of the present invention.

FIG. 60 is a flowchart illustrating an operation of performing facsimile transmission of sheet originals by operation of the main part B.

The interface chart of this operation is identical to that in FIG. 57 used with description of the operation of sheet copy.

The key of the operation panel in main part 4324 is used to select the opposite from the telephone directory stored in the SRAM 4313, and if FAX transmission instructions are provided (S6001), a sensor (not shown) provided in the original inlet 4404 detects existence/not existence of original (S6002), and a sheet transmission mode is assumed if there exists a original. Whether or not the cordless hand scanner 430 is mounted on the main part B based on the level of the signal inputted from the scanner interface connector 4323 is determined (S6003), and if the cordless hand scanner 430 is mounted on the main part B, a procedure for transition to the Active mode is performed (S6004) to make the cordless hand scanner 430 in the Park mode (low power consumption state) to the Active mode for establishing the wireless link. The specific procedure is same as that described using FIG. 59 in the section of sheet copy.

When the procedure for transition to the Active mode is completed, the connection request command (57-1) is sent to the cordless hand scanner 430 (S6005). When the connection confirmation response (57-2) is received from the cordless hand scanner 430 (S6006), the command of request of preparation of line read (57-3) is sent to the cordless hand scanner 430 (S6007) from the main part B.

At S6008, when the response of confirmation of preparation of line read (57-4) with OK/NG written in MAIL is received from the cordless hand scanner 430 (S6008), an origination operation is performed to connect to the communication line (S6009). When connection to the communication line is established, and a response is given from the opposite of FAX transmission destination, the read start command (57-5) is sent to the cordless hand scanner 430 at S6010. Then, transportation of the original is started, image data is transferred from the cordless hand scanner 430 to the main part B, and the transferred image data is demodulated with the facsimile modem 4316 before it is sent to the communication line (S6011). The method for transferring image data has been described in the section of sheet copy.

When transportation of all originals is completed, the command of request of completion of line read (57-6) is sent to the cordless hand scanner 430 at S6012. However, the above described command of completion of line read may be stored in the MAIL portion of interface command/response, to which the last record data is sent.

When the response of confirmation of completion of line read (57-7) is received from the cordless hand scanner 430 at S6013, the communication line is disconnected (S6015), and the operation of facsimile transmission of the sheet original is completed.

Furthermore, at S6003, if the cordless hand scanner 430 is not mounted on the main part B, the user is prompted to mount the cordless hand scanner 430 on the main part B (S6015), but this operation is same as that described with FIG. 56.

Also, at S6002, an operation of hand scanner memory transmission is performed if there exists no original, but this operation will be described in detail later.

<Operation During Hand Scanner Copy by Operation of Main Part B>

Figure 61:
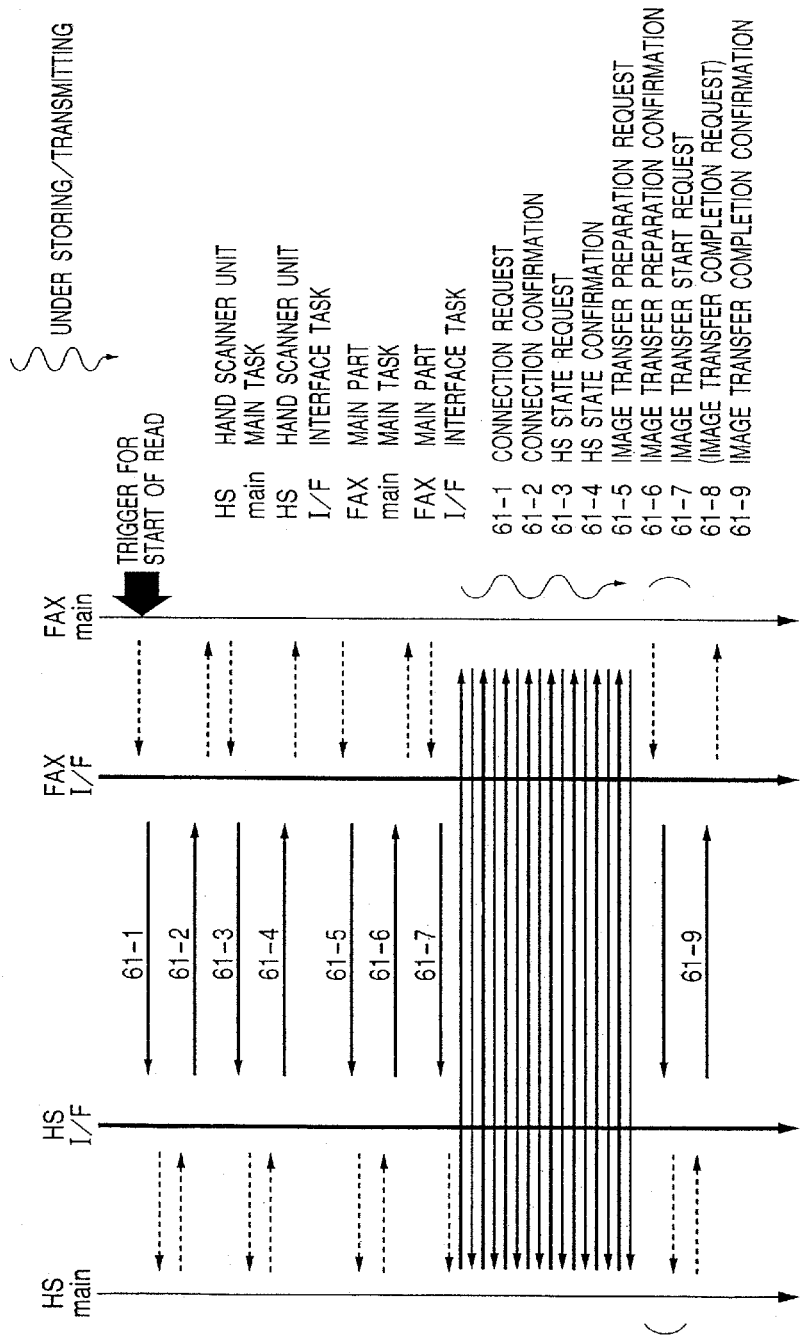
FIG. 61 shows an interface chart when the image read by the hand scanner is copied through the operation of the main part B in the embodiment of the present invention.

FIG. 61 shows an interface chart when the image read by the hand scanner is copied by the operation of the main part B in this embodiment, showing relationship between the processes of the cordless hand scanner 430 and the main part B, and so on.

Figure 62:
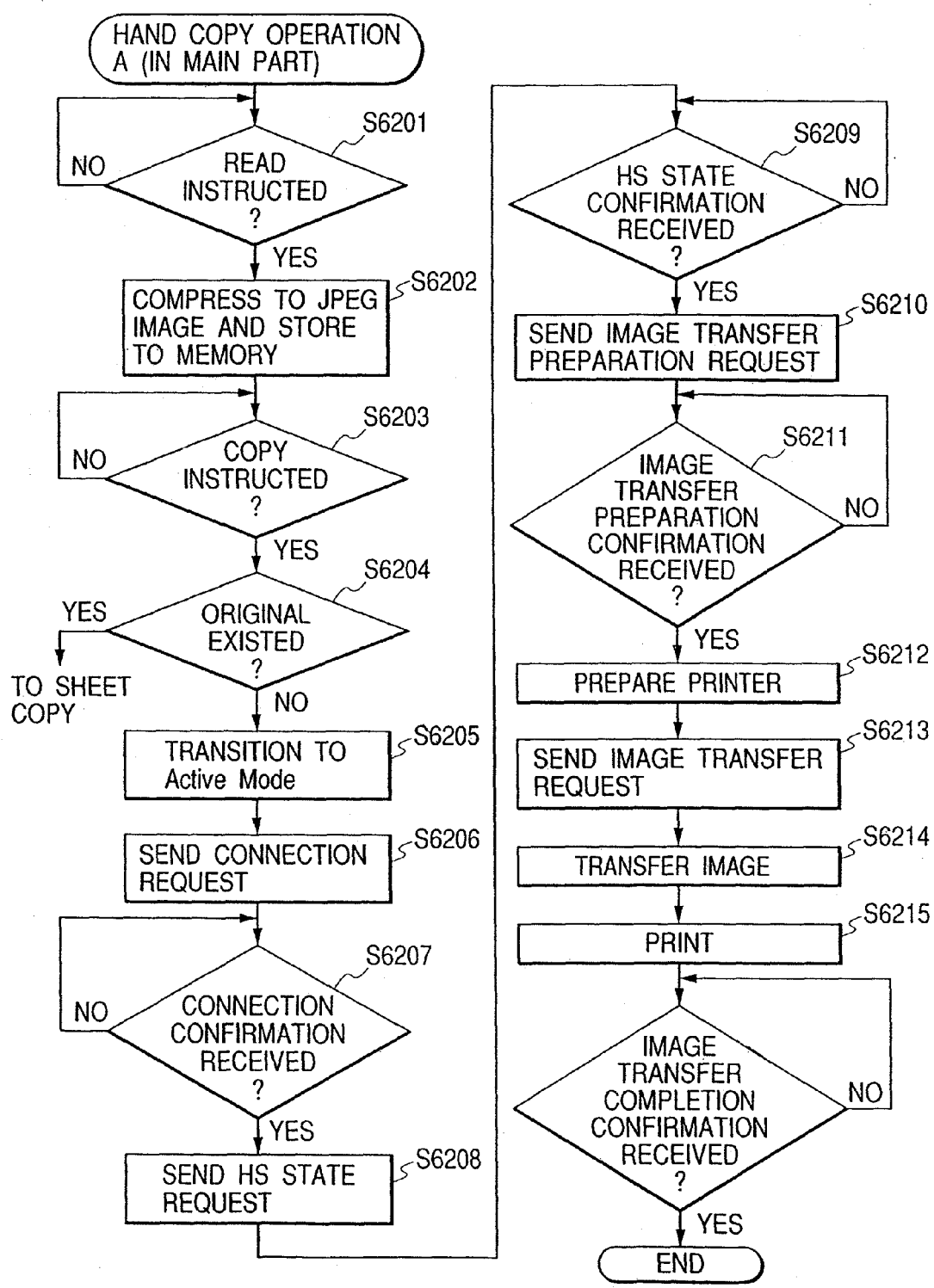
FIG. 62 shows a flowchart illustrating an operation when the image read by the hand scanner is copied through the operation of the main part B in the embodiment of the present invention.

FIG. 62 is a flowchart illustrating the above described operation.

In the hand scanner operation panel 4307, when read start instructions are provided (S6201), the image data read in accordance with movement of the scanner is compressed to JPEG image data and stored in the memory (S6202). This operation is continued in the hand scanner operation panel until read stop instructions are provided.

Then, when copy instructions are provided from the operation panel in main part 4324 (S6203), a sensor (not shown) existing in the original inlet 4404 detects existence/not existence of original (S6204), and if the original exists, the previously described sheet copy mode is assumed. If no original exists, it is assumed that the image data stored in the hand scanner is printed, and a process for transition to the Active mode is carried out (S6205) to make transition of the cordless hand scanner 430 in the Park mode to the Active mode as described with FIG. 59, for establishing the wireless link to transfer the image data to the main part B.

When the procedure for transition to the Active mode is completed, a connection request command (61-1) is sent to the cordless hand scanner 430 (S6206). When a connection confirmation response (61-2) from the cordless hand scanner 430 is received (S6207), a hand scanner state request command (61-3) is sent to the cordless hand scanner 430 (S6208) to receive the image information (monochrome/color, etc.) in the hand scanner.

When a hand scanner state confirmation response (61-4) is received (S6209), an image transfer preparation request command (61-5) is sent from the main part B to the cordless hand scanner 430 (S6210). When an image transfer preparation confirmation response (61-6) with OK/NG written in MAIL is received from the cordless scanner 430 (S6211), the printer is prepared (S6212).

When preparation of the printer is completed, an image transfer start request command (61-7) is sent to the cordless hand scanner 430 (S6213). The image data that has been stored in the memory of the cordless hand scanner 430 is stored in the DATA portion of the interface command. In addition, command data is transferred to the Bluetooth baseband processing unit, and is sent to the main part B via the 2.4 GHz high frequency unit (S6214). The main part B that receives the image data converts the received image data into 360 dpi print data to perform color printing (S6215).

When an image transfer completion confirmation command is received from the cordless hand scanner 430 to complete print of all the data, the copy operation is completed.

When given time passes after the operation is completed, the cordless hand scanner 430 sends a Park_req message to the main part B, and makes transition to the Park mode.

<Operation During Hand Scanner/Facsimile Transmission by Operation of Main Part B>

Figure 63:
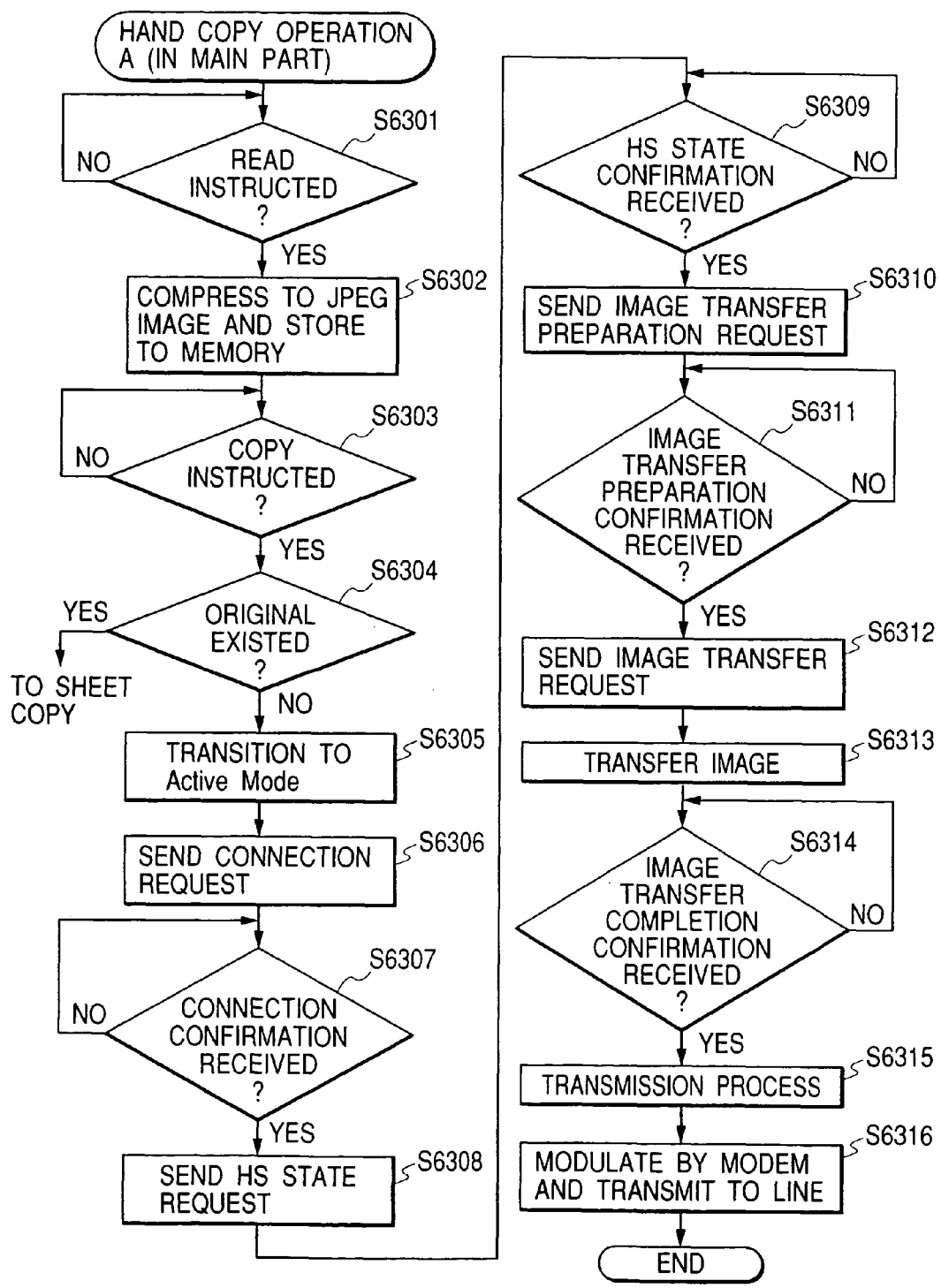
FIG. 63 is a flowchart showing an operation of performing facsimile transmission of the image read by the hand scanner through the operation of the main part B in the embodiment of the present invention.

FIG. 63 is a flowchart showing an operation of performing facsimile transmission of the image read with the hand scanner by the operation of the main part B in this embodiment.

The interface chart of this operation is similar to that in FIG. 61.

In the hand scanner operation panel 4307, when read start instructions are provided (S6301), the image data read in accordance with movement of the scanner is compressed to JPEG image data and stored in the memory (S6302). This operation is continued in the hand scanner operation panel until read stop instructions are provided.

Then, when a facsimile transmission operation is performed using a telephone directory button on the operation panel in main part 4324 (S6303), existence/not existence of original is detected by a sensor (not shown) existing in the original inlet 4404 (S6304), and if the original exists, the previously described sheet transmission mode is assumed. If no original exists, it is assumed that the image data stored in the hand scanner is subjected to facsimile transmission, and a process for transition to the Active mode is carried out (S6305) to make transition of the cordless hand scanner 430 in the Park mode to the Active mode as described with FIG. 59, for establishing the wireless link to transfer the image data to the main part B.

When the procedure for transition to the Active mode is completed, the connection request command (61-1) is sent to the cordless hand scanner 430 (S6306). When the connection confirmation response (61-2) from the cordless hand scanner 430 is received (S6307), the hand scanner state request command (61-3) is sent to the cordless hand scanner 430 (S6308) to receive the image information (monochrome/color, etc.) in the hand scanner.

When a hand scanner state confirmation response (61-4) is received (S6309), the image transfer preparation request command (61-5) is sent from the main part B to the cordless hand scanner 430 (S6310). When the image transfer preparation confirmation response (61-6) with OK/NG written in MAIL is received from the cordless scanner 430 (S6311), the image transfer start request command (61-7) is sent (S6312).

The hand scanner, which receives the image transfer start request command, starts an operation of sending to the main part B the image data stored in the memory (S6313). The image data is stored in the DATA portion of an interface command/status. Specifically, JPEG compression image data stored in the memory is transferred to the Bluetooth baseband processing unit, and is sent to the main part B via the 2.4 GHz high frequency unit.

In the main part B that receives the image data, the received image data is stored in the memory. When an image transfer completion confirmation response (61-9) is received (S6314) from the hand scanner, an operation of transmission to the partner defined by the telephone directory is performed (S6315). When the response is received from the transmission partner, the image data stored in the memory is modulated by the facsimile modem and sent to the communication line (S6316). When all the image data is sent, the communication line is opened, and the operation is completed.

When given time passes after the operation is completed, the cordless hand scanner 430 sends a Park_req message to the main part B, and makes transition to the Park mode.

<Operation During Hand Scanner Copy by Operation of Hand Scanner 430>

Figure 64:
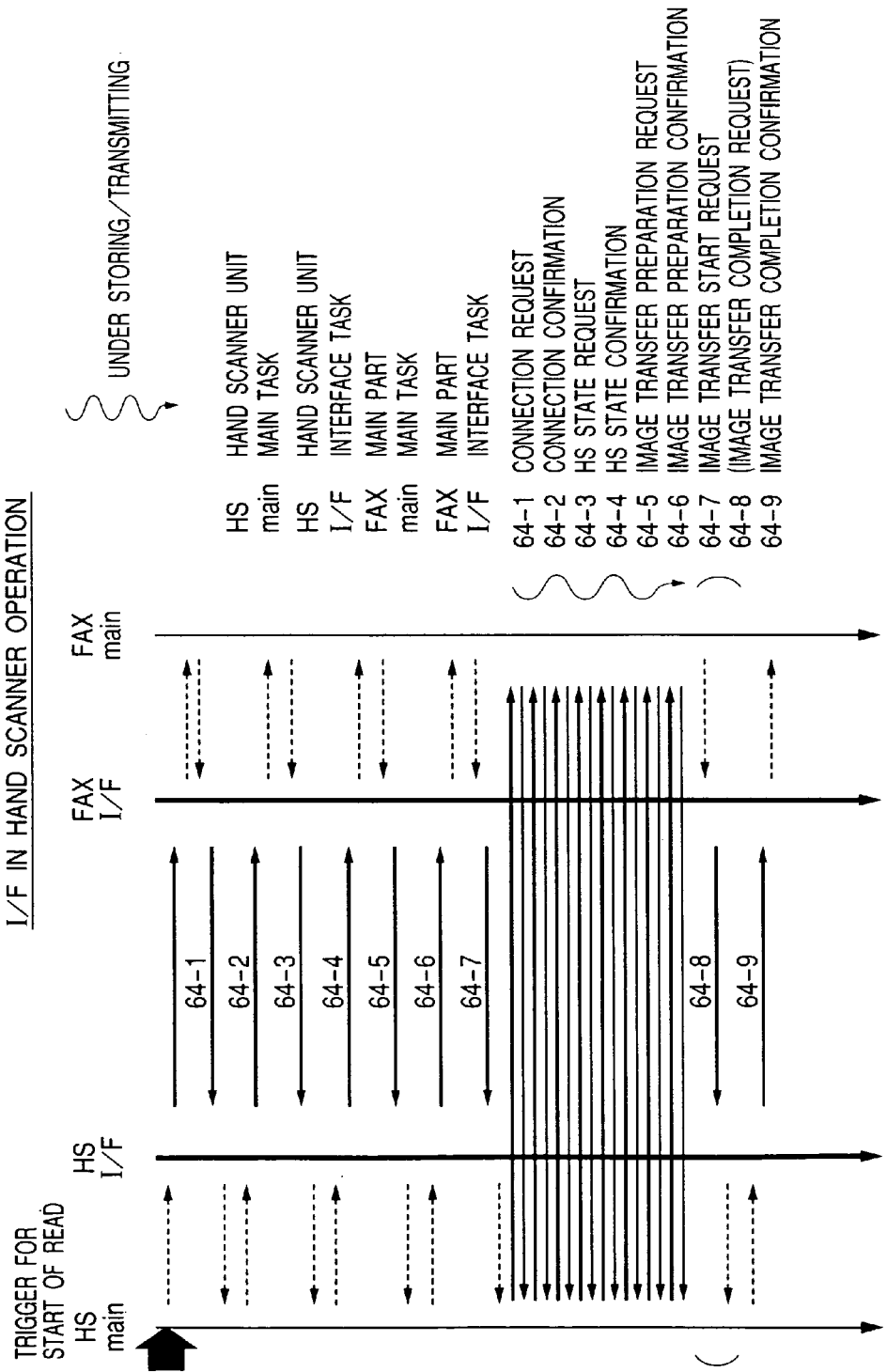
FIG. 64 shows an interface chart when the image read by the hand scanner 430 is copied through the operation of the hand scanner 430 in the embodiment of the present invention.

FIG. 64 shows an interface chart when the image read by the hand scanner 430 is copied through the operation of the hand scanner 430, and shows relationship among the process of the cordless hand scanner 430, the process of the main part B and the like.

Figure 65:
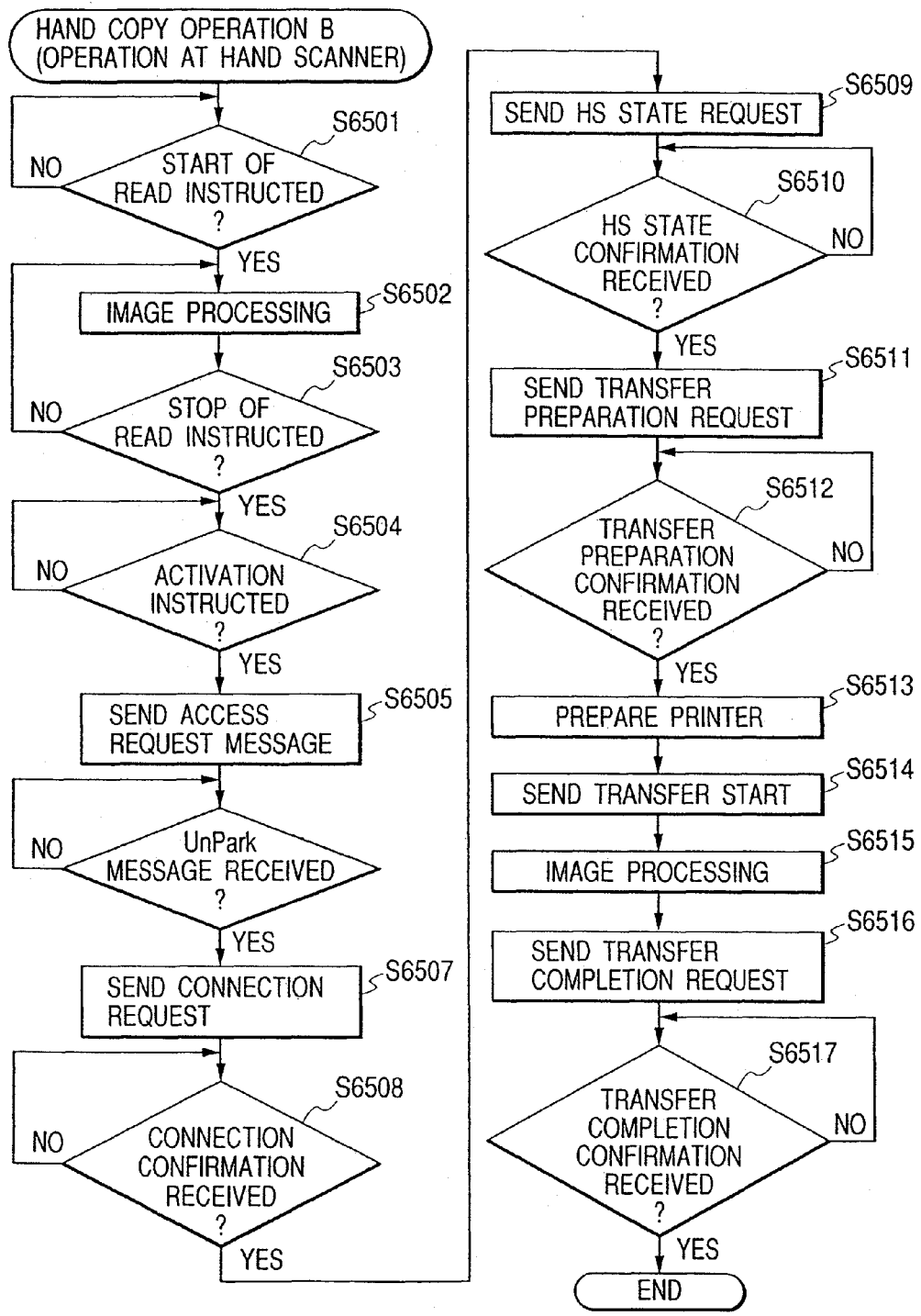
FIG. 65 is a flow chart illustrating an operation when the image read by the hand scanner 430 is copied through the operation of the hand scanner 430 in the embodiment of the present invention.

FIG. 65 is a flowchart illustrating the above described operation.

Figure 66:
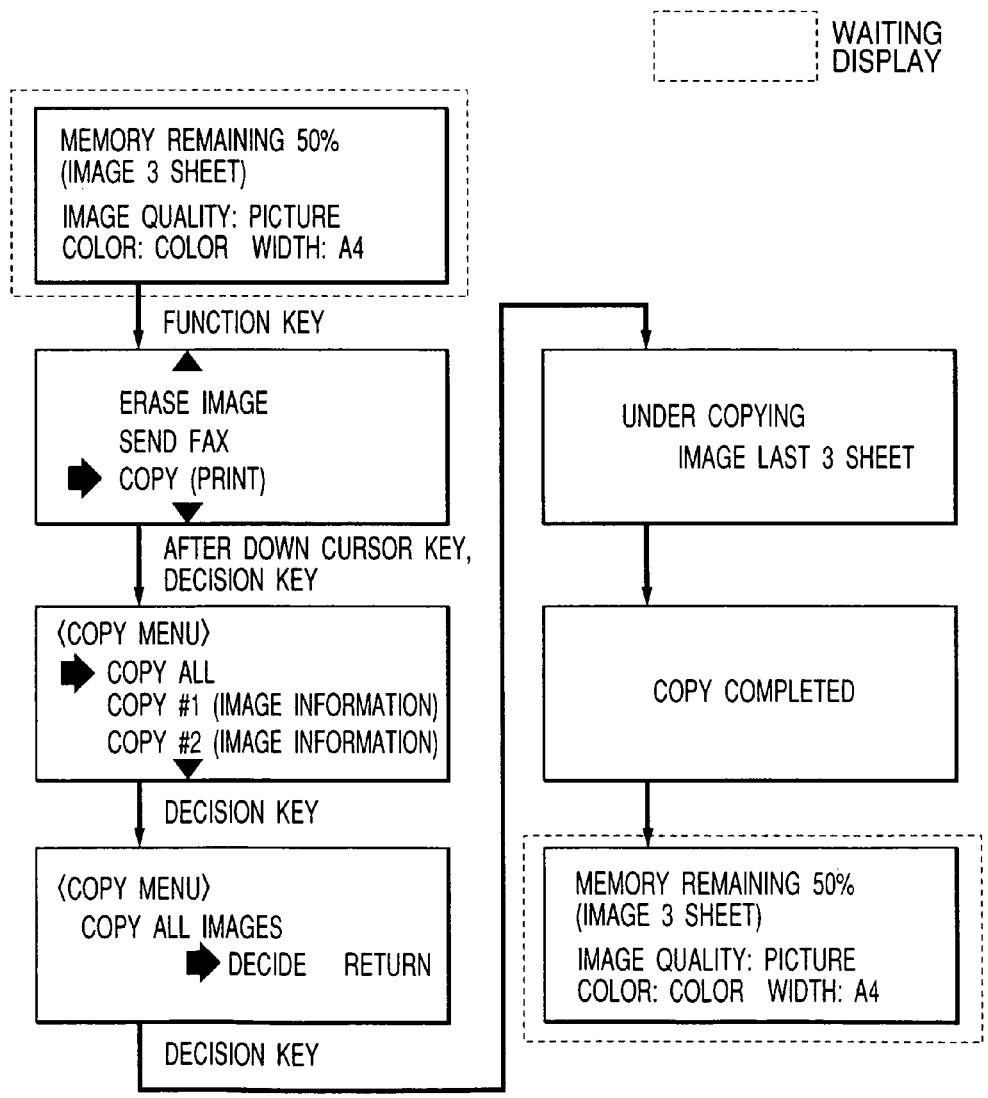
FIG. 66 shows an operation of the operation and a display of the hand scanner 430 when the image read by the hand scanner 430 is copied through the operation of the hand scanner 430, in the embodiment of the present invention.

FIG. 66 shows an operation of the above described operation and a display of the hand scanner 430.

In the operation panel 4307 of the hand scanner 430, when read start instructions are provided (S6501), the image data read in accordance with movement of the hand scanner 430 is compressed to JPEG image data and stored in the memory (S6502). This operation is continued in the operation panel 4307 of the hand scanner 430 until read stop instructions are provided (S6503).

Then, when copy instructions are provided from the operation panel 4307 of the hand scanner 430 (S6504), an access request message requesting transition to the Active mode is sent to the main part B to establish the wireless link for transferring the stored image data to the main part B (S6505).

When a command of response of notification of transition to the Active mode (UnPark message), the establishment of the wireless link is confirmed.

Subsequently, a connection request command (64-1) is sent from the main part B to the cordless hand scanner 430 (S6507). The cordless hand scanner 430 sends a connection confirmation response (64-2) to the main part B, and when the main part B receives this command and the connection confirmation response (S6508), it sends to the cordless hand scanner 430 a hand scanner state request command (64-3) for receiving image information (monochrome/color, etc.) in the hand scanner 430 (S6509). When the hand scanner state confirmation response (64-4) is received (S6510), an image transfer preparation request command (64-5) is sent from the main part B to the cordless hand scanner 430 (S6511).

When an image transfer preparation confirmation response (64-6) with OK/NG written in MAIL is received from the cordless scanner 430 (S6512), the printer is prepared (S6513), and the hand scanner 430 starts an operation of sending to the main part B the image data stored in the memory (S6514). The image data is stored in the DATA portion of an interface command/status. Specifically, JPEG compression image data stored in the memory is transferred to the Bluetooth baseband processing unit 4309, and is sent to the main part B via the 2.4 GHz high frequency unit. The main part B that receives the image data converts the received image data into 360 dpi print data to perform color printing (S6515). When transfer of image data is completed, a transfer completion request command (64-8) is sent from the cordless hand scanner 430 (S6516). When this command is received (S6517) and print of all the data is completed, the copy operation is completed.

When given time passes after the operation is completed, the cordless hand scanner 430 sends a Park_req message to the main part B, and makes transition to the Park mode. A series of operation theretofore is similar to the operation shown in FIG. 66, for example.

In the above operation, the case is assumed where a copy instruction operation is performed after the image is read by the hand scanner 430. However, the copy instruction operation may be performed before the image is read. In this case, particularly, it is also possible to read images while transferring the read images to the main part B and has the images printed. Specifically, when the copy instruction operation is performed by the hand scanner 430, the access request message requesting transition to the Active mode is sent to the main part B. When the command of response of notification of transition to the Active mode (UnPark message) is received, the transition to the Active mode can be confirmed. Subsequently, the image data transmission request-command is sent from the main part B.

When the hand scanner 430 receives an image data transmission permission command from the main part B, it provides a display permitting the start of reading of images (display such as "Start reading"). When reading is started according to the read permission display, the read image data is subjected to JPEG compression and stored in the memory.

If the amount of image data stored in the memory reaches a certain level or higher, the image data is transferred to the Bluetooth baseband processing unit 4309, and is sent to the main part B via the 2.4 GHz high frequency unit 4310. The main part B that receives the image data converts the resolution of the received image data, and print can be started.

When read by the hand scanner 430 is completed, and read completion command instructions are provided, the hand scanner 430 sends an image data transmission completion notification command to the main part B. The main part B transfers the image data that is received until the image data transmission completion notification command to the printer unit to print the image data. When print of all the data is completed, a print completion notification command is sent to the hand scanner 430. The hand scanner 430, which receives the print completion notification command displays "Copy is completed" on the display unit, and the copy operation in the hand scanner 430 is completed.

When given time passes after the operation is completed, the cordless hand scanner 430 sends a Park_req message to the main part B, and makes transition to the Park mode.

Furthermore, image data that is newly read can be stored in the area of the memory 4302 in the hand scanner 430 storing the image data of which transmission has been completed. In this way, by performing read and transmission of image data at a time, the memory amount can be reduced, and time for copy can be reduced as well.

<Operation During Hand Scanner/Facsimile Transmission by Operation of Hand Scanner 430>

Figure 67:
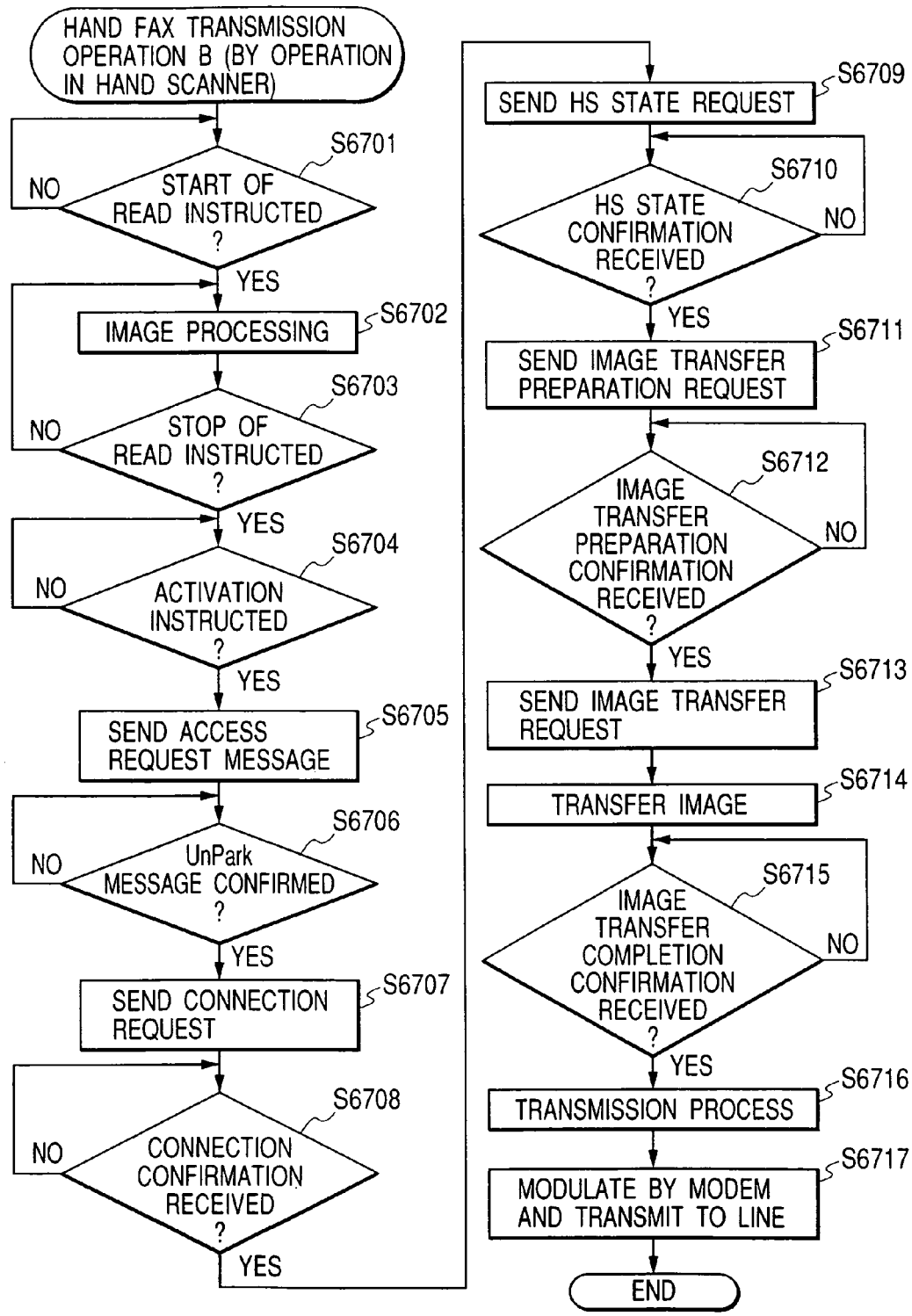
FIG. 67 is a flowchart showing an operation of performing facsimile transmission of the image read by the hand scanner 430 through the operation of the hand scanner 430 in the embodiment of the present invention.

FIG. 67 is a flowchart showing an operation of performing facsimile transmission of the image read with the hand scanner 430 by the operation of the hand scanner 430 in this embodiment.

The interface chart of this operation is similar to that in FIG. 64

Figure 68:
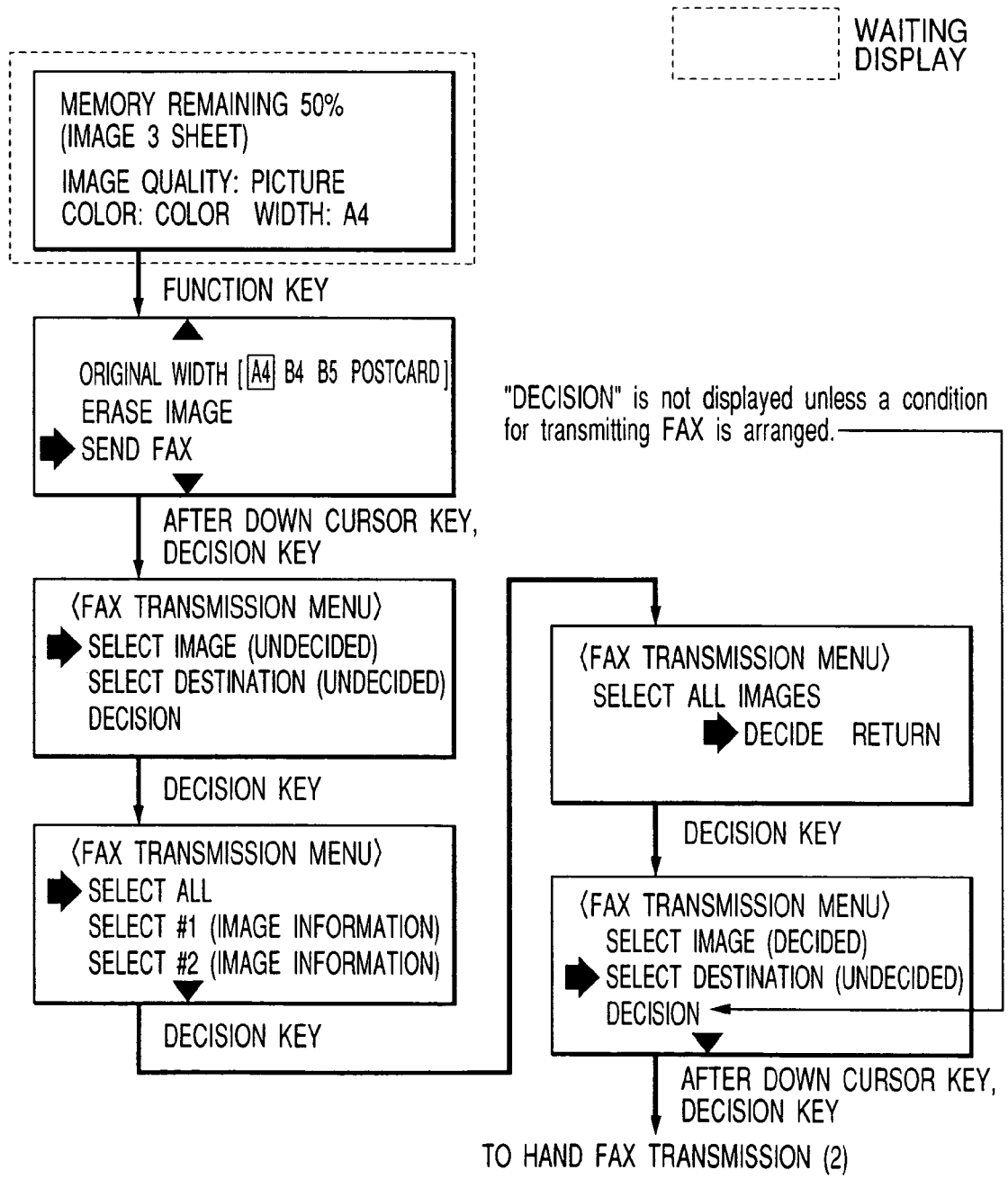
FIG. 68 is an operation of the operation and a display representation when facsimile transmission of the image read by the hand scanner 430 is performed through the operation of the hand scanner 430 in the embodiment of the present invention.
Figure 69:
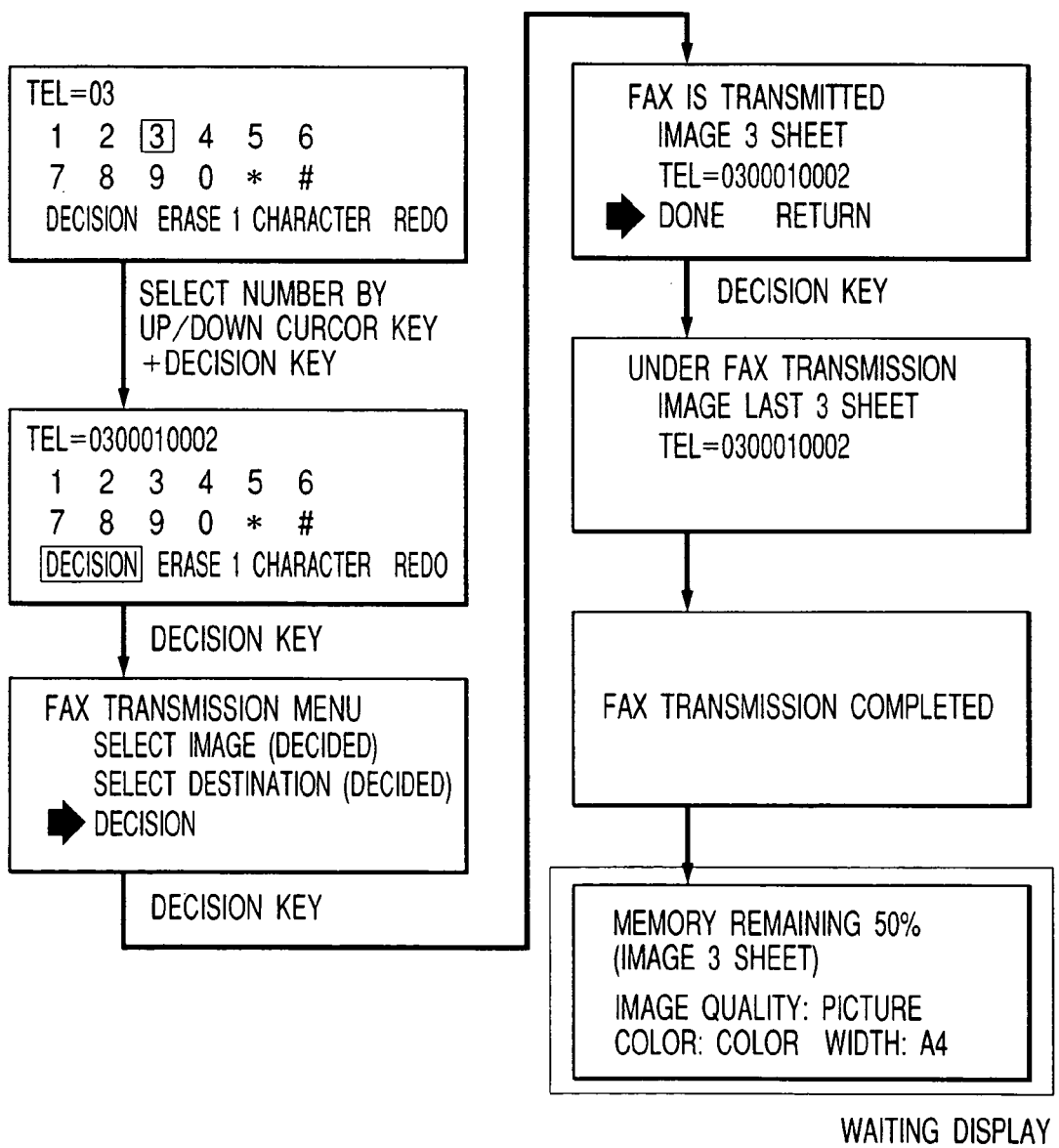
FIG. 69 shows an operation of the operation and a display representation when facsimile transmission of the image read by the hand scanner 430 is performed through the operation of the hand scanner 430 in the embodiment of the present invention.

FIGS. 68 and 69 show the operation and display representation of the above described operation.

In the operation panel 4307 of the hand scanner 430, when read start instructions are provided (S6701), the image data read in accordance with movement of the hand scanner is compressed to JPEG image data and stored in the memory (S6702). This operation is continued in the operation panel 4307 of the hand scanner 430 until read stop instructions are provided (S6703).

Performing thereafter FAX transmission only by the operation of the hand scanner 430 requires notification and designation of the telephone number of the partner to the main part B. Data of telephone number can be sent to the main part B if it is stored in the DATA portion of the interface command/status, but an operation of designating the number itself by the hand scanner 430 occurs.

An operation of designating the FAX number of the transmission destination using the operation unit of the hand scanner 430 will now be described using FIG. 68.

First, FAX transmission is selected from the function menu, and the user optionally designates an image to be sent. Thereafter, the FAX number of the partner being a transmission destination is designated, as shown in FIG. 69. In this case, the cursor key is used to input the FAX number directly. When image selection and the FAX number of the partner are decided, transmission of Facsimile can be performed from the hand scanner 430 at any time.

Then, when the send image and the FAX number of the partner are decided using the operation panel 4307 of the hand scanner 430 as described above, and a facsimile transmission operation is performed (S6704), the access request message requesting transition to the Active mode is sent to the main part B (S6705). When the command of response of notification of transition to the Active mode (UnPark message) is received, the establishment of the wireless link is confirmed (S6706). When the procedure for transition to the Active mode is completed, the connection request command (64-1) is sent to the cordless hand scanner 430 (S6707). The cordless hand scanner 430 sends the connection confirmation response to the main part B, along with the transmission instruction command including instructions of facsimile transmission and the FAX number of the partner. When the main part B receives the transmission instruction command and the connection confirmation response (64-2) from the cordless hand scanner 430 (S6708), it sends to the hand scanner 430 the hand scanner state request command (64-3) for receiving image information (monochrome/color, etc.) in the hand scanner 430 (S6709).

When the hand scanner 430 receives the above described hand scanner state request command (64-3), it sends the hand scanner state confirmation response (64-4). When the main part B receives the above described hand scanner state confirmation response (64-4) (S6710), the image transfer preparation request command (64-5) is sent from the main part B to the cordless hand scanner 430 (S6711).

When the image transfer preparation response (64-6) with OK/NG written in MAIL is received from the cordless hand scanner 430 (S6712), an image transfer start request command (64-7) is sent (S6713).

The hand scanner 430 that receives the image transfer start request command starts an operation of sending the image data stored in the memory to the main part B (S6714). The image data is stored in the DATA portion of the interface command/status. Specifically, the JPEG compression data stored in the memory is transferred to the Bluetooth baseband processing unit 4309, and is sent to the main part B via the 2.4 GHz high frequency unit 4310.

In the main part B that receives the image data, the received image data is stored in the memory. When an image transfer completion confirmation response (64-9) is received from the hand scanner 430 (S6715), an operation of transmission to the FAX number of the partner previously received from the cordless hand scanner 430 is performed (S6716). When a response is received from the transmission destination, the image data stored in the memory is modulated by the facsimile modem, and is sent to the communication line (S6717). When all the image data is sent, the communication line is opened, and the operation is completed.

When given time passes after the operation is completed, the cordless hand scanner 430 sends a Park_req message to the main part B, and makes transition to the Park mode.

For the above described operation, transmission of image data is started by transmission instructions with the operation panel 4307 of the hand scanner 430 after read of the image data by hand scanner 430 is completed. However, transmission instructions may be provided with the operation panel 4307 of the hand scanner 430 before read by the hand scanner 430 is started. In this case, particularly, it is also possible to send the read image data to the opposite terminal while the image is read.

Specifically, when a facsimile transmission instruction operation is performed in the hand scanner 430, the access request message requesting transition to the Active mode is sent to the main part B. When the command of response of notification of transition to the Active mode (UnPark message) is received, the transition to the Active mode is confirmed. When the hand scanner 430 confirms the transition to the Active mode, it sends to the main part B a transmission instruction command including instructions of facsimile transmission and the FAX number of the partner. The main part B sends back a response to the transmission instruction command, and sends the image data transmission request command to the cordless hand scanner 430. When the hand scanner 430 receives the image data transmission permission command from the main part B, it provides a display permitting the start of reading of images (display such as "Start reading"). When reading is started according to the read permission display, the read image data is subjected to JPEG compression and stored in the memory.

If the amount of image data stored in the memory reaches a certain level or higher, the image data is transferred to the Bluetooth baseband processing unit 4309, and is sent to the main part B via the 2.4 GHz high frequency unit 4310.

The main part B that receives a certain amount or more of image data stores the image data in the memory, and performs transmission to the previously received FAX number of the transmission destination. When a response is given from the transmission destination, the image data stored in the memory is modulated by the facsimile modem, and is sent to the communication line.

When the read by the hand scanner is completed, and read completion instructions are provided, the hand scanner 430 sends the image data transmission completion notification command to the main part B. The main part B sends to the communication line the image data received before receiving the image data transmission completion notification command, and then sends the transmission completion notification command to the hand scanner 430 when transmission of all the data is completed. The hand scanner 430 that receives the transmission completion notification command displays "Communication is completed" on the display unit to complete the facsimile transmission operation.

When given time passes after the operation is completed, the cordless hand scanner 430 sends a Park_req message to the main part B, and makes transition to the Park mode.

Furthermore, image data that is newly read can be stored in the memory area storing therein the image data of which transmission from the hand scanner 430 to the main part B has been completed. In this way, by performing read and line transmission of image data at a time, the memory amount can be reduced, and time for copy can be reduced as well.

<Image Erase Operation of Hand Scanner by Operation of Main Part B>

Figure 70:
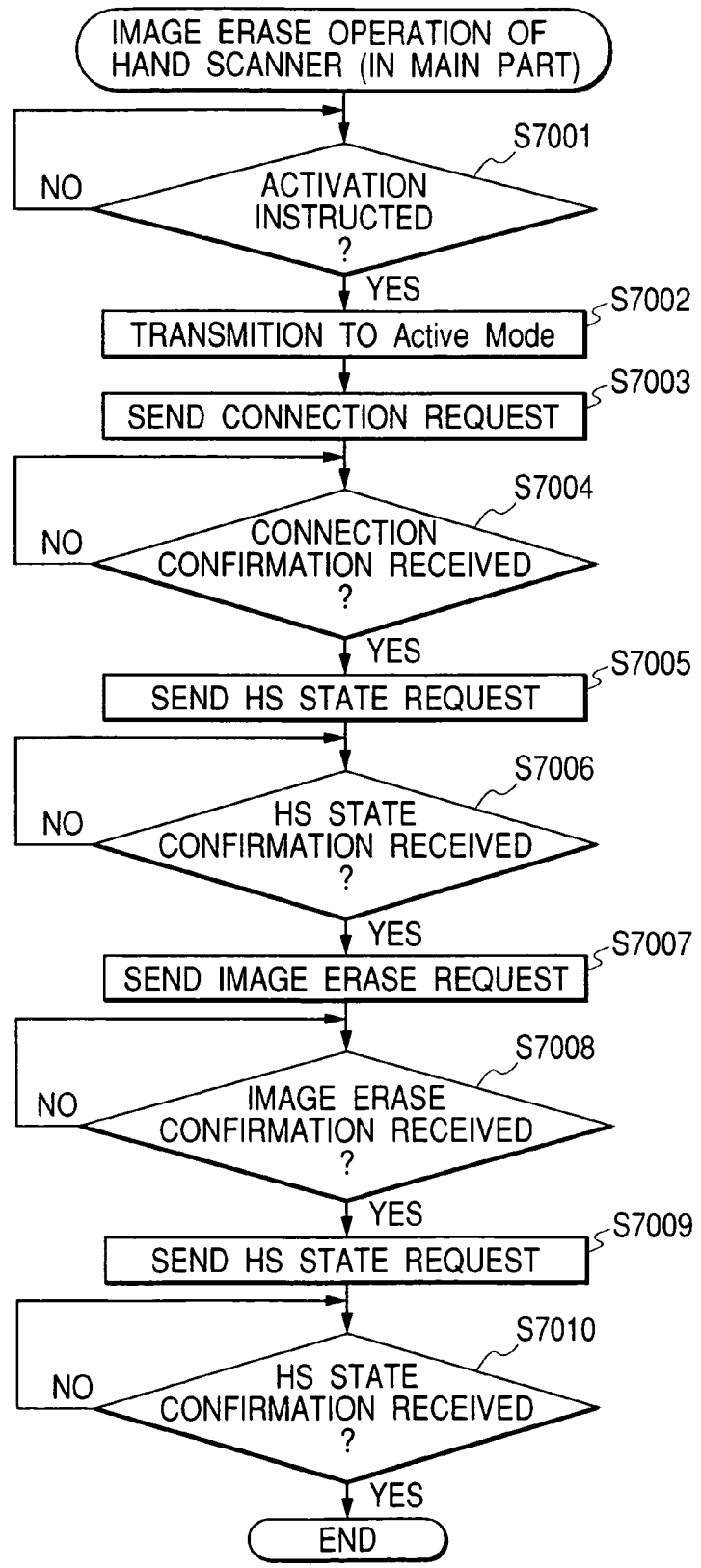
FIG. 70 is a flowchart showing an operation of erasing a memory image in the hand scanner 430 through the operation of the main part B in the embodiment of the present invention.

FIG. 70 is a flowchart showing an operation of erasing memory images in the hand scanner 430 by an operation of the main part B in this embodiment.

Figure 71:
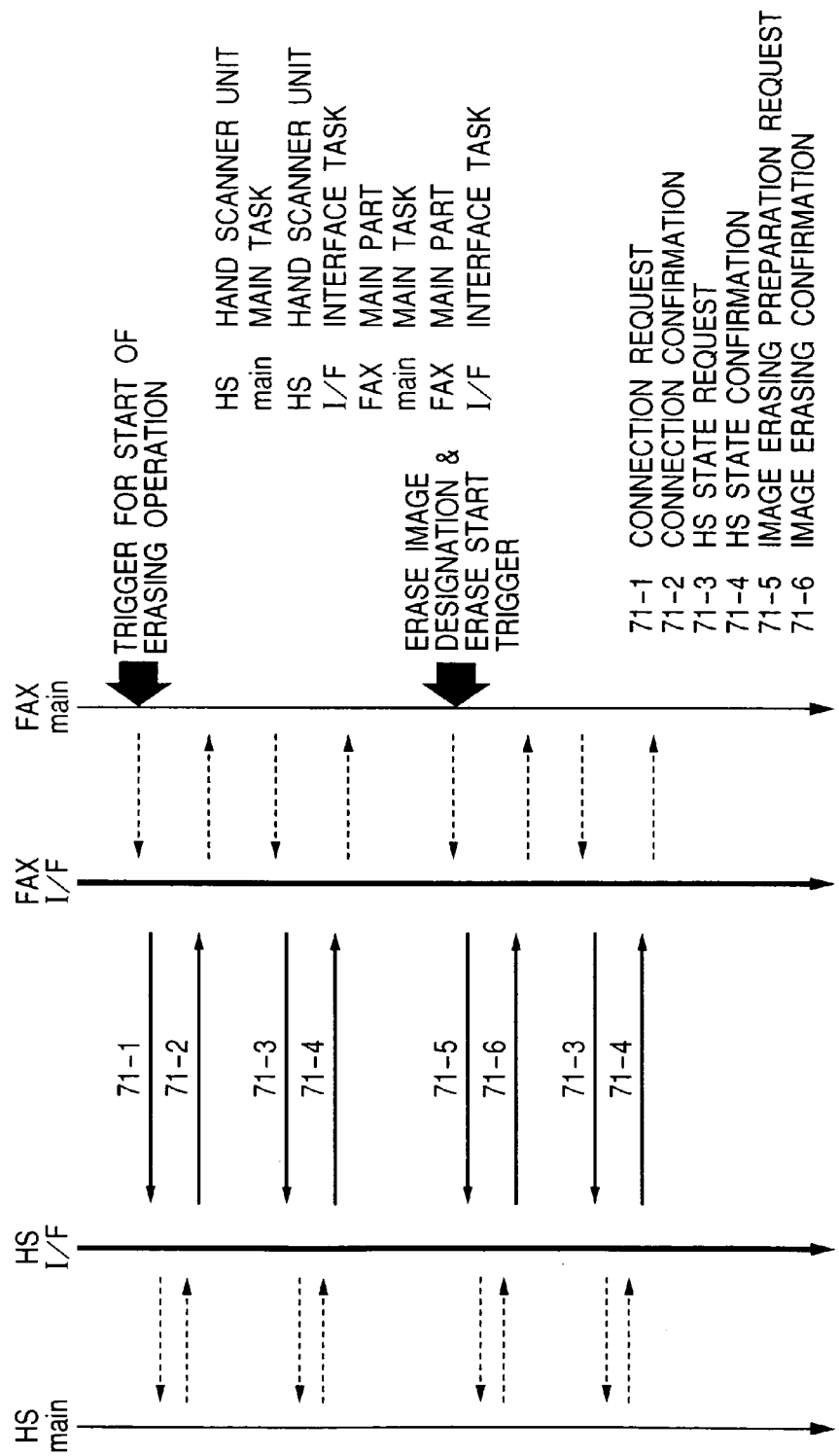
FIG. 71 is an interface chart showing the relationship among the process of the cordless hand scanner 430, the process of the main part B and the like as to the operation of erasing the memory image in the hand scanner 430 through the operation of the main part B in the embodiment of the present invention.

FIG. 71 is an interface chart showing a relationship between the processes and the like in the cordless hand scanner 430 and the main part B in the above-described operation.

Figure 72:
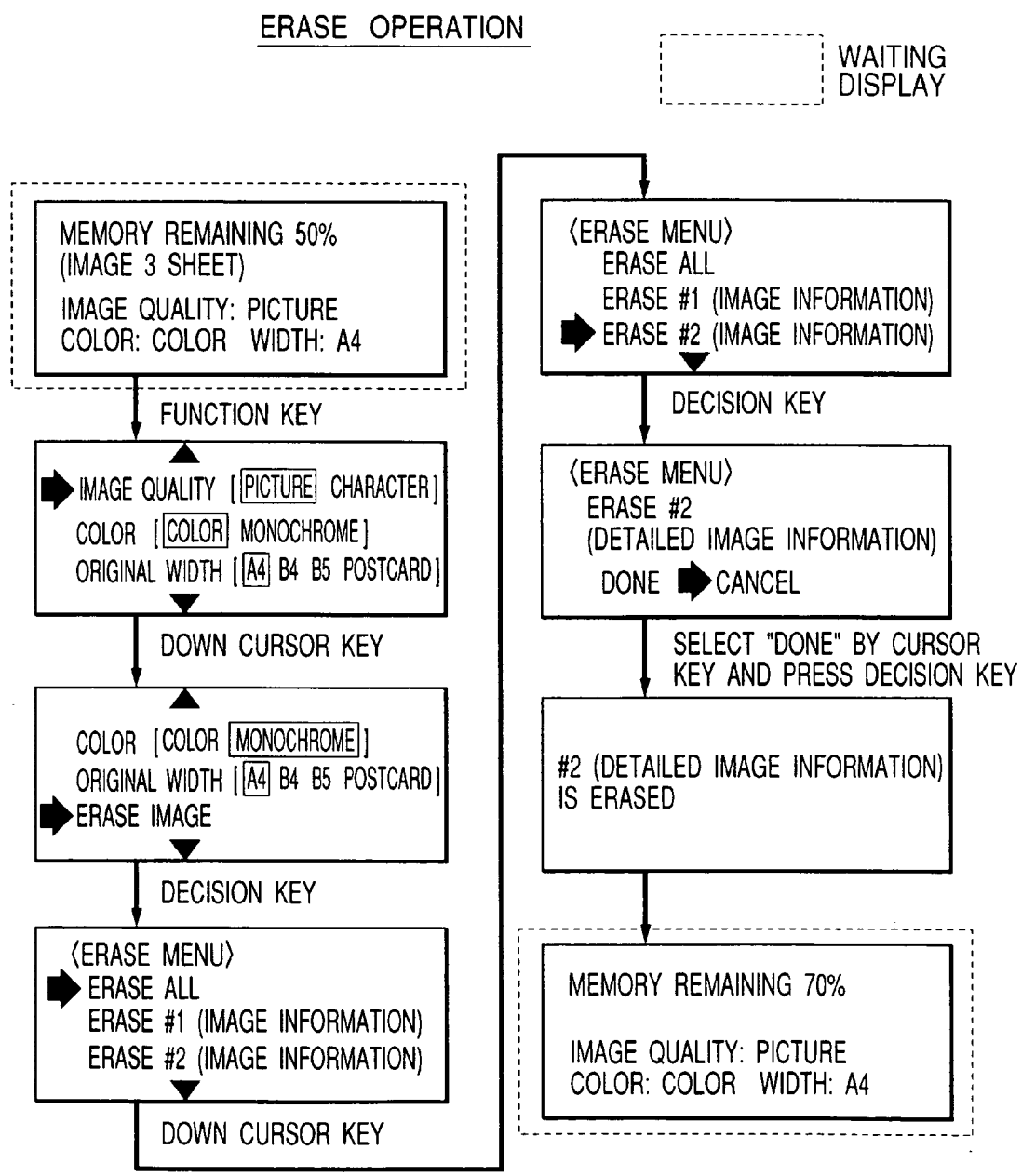
FIG. 72 shows an operation of the operation and a display representation of the hand scanner 430 when the memory image in the hand scanner 430 is erased through the operation of the main part B in the embodiment of the present invention.

FIG. 72 shows an operation of the above described operation and a display of the hand scanner 430.

In the operation in the main part B, when image erase instructions are provided (S7001), a procedure for transition to the Active mode is carried out to make transition of the cordless hand scanner 430 in the Park mode to the Active mode for establishing a wireless link to erase image data in the hand scanner 430 as described using FIG. 59 (S7002).

When the procedure for transition to the Active mode is completed, a connection request command (71-1) is sent to the cordless hand scanner 430 (S7003). When a connection confirmation response (71-2) from the cordless hand scanner 430 is received (S7004), a hand scanner state request command (71-3) for confirming the state of the hand scanner 430 is sent to the cordless hand scanner 430 (S7005).

When a hand scanner state confirmation response (71-4) is received (S7006), an image erasing request command (71-5) indicating instructions to erase an image and information for identifying the image to be erased is sent from the main part B to the cordless hand scanner 430 (S7007). When an image erasing confirmation response (71-6) with OK/NG written in MAIL is received from the cordless hand scanner 430 (S7008), the hand scanner state request command (71-3) for confirming the result of erasing the image is sent to the cordless hand scanner 430 (S7009).

When the hand scanner state confirmation response (71-4) including information indicating that erase of the designated image has been completed (S7010), completion of the image erase operation is confirmed.

When a given time passes after the operation is completed, the cordless hand scanner 430 sends a Park_req message to, the main part B, and makes transition to the Park mode.

<Operation at the Time of Dropping of Battery Voltage in Hand Scanner 430>

Figure 73:
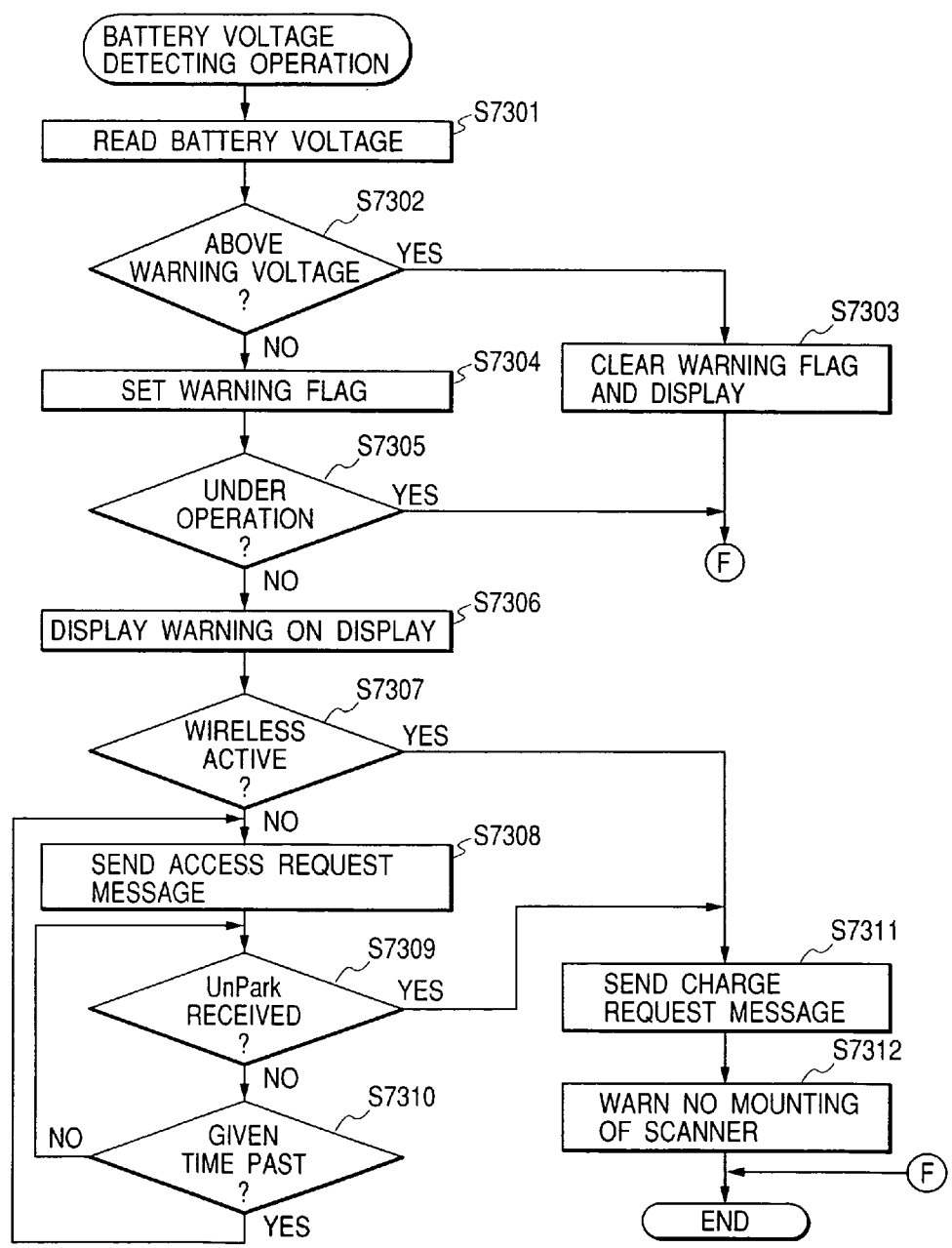
FIG. 73 is a flowchart showing a battery detection operation of the hand scanner 430 in the embodiment of the present invention.

FIG. 73 is a flowchart showing a battery voltage detecting operation in the hand scanner 430 in this embodiment.

As described above, the cordless hand scanner 430 is driven by a battery 4308 charged by the main part B. Therefore, if the voltage of the battery 4308 drops, the cordless hand scanner 430 should be mounted on the main part B for charging it. For this charge, in the cordless hand scanner 430, by a task activated at an interval of 5 milliseconds, a battery voltage detecting circuit (not shown) reads the voltage of the battery 4308, and if it is equal to or higher than a preset warning start voltage (1.9 V in this embodiment) it is considered as normal (S7302), a warning flag is cleared, and a warning display of the LCD 4601 on the scanner operation unit 4307 is cleared (S7303) to complete the operation.

If the voltage of the battery 4308 is equal to or lower than a warning start voltage at S7302, the battery warning flag is set (S7304) and the operation is temporarily stopped if the hand scanner 430 is under operation (S7305). If the hand scanner 430 is not under operation at S7305, a warning display is provided on the LCD 4601 on the scanner operation unit 4307 (S7306). At this time, the display is highlighted by flashing or reversing the display. Then, if the wireless interface with the main part B is not in the Active state (S7307), the access request message is sent (S7308) to make transition to the Active mode, and when the Unpark message from the main part B is received within a predetermined time period (S7309), a charge request message is inputted in the payload portion of the response packet and is sent (S7311). The main part B that receives the charge request message warns no scanner mounting described with FIG. 56 (S7312). Thereby, an alarm rumbles from the speaker 4319 of the main part B as well, and thus the effect of giving an alarm to the user is increased.

Furthermore, the Unpark message from the main part B cannot be received within a predetermined time period (S7310), the process returns to S7308, where the access request message is sent again. Also, if the wireless interface with the main part B is in the Active state at S7307, the charge request message is sent immediately (S7311).

If the cordless hand scanner 430 is mounted on the main part B for changing, a warning displayed on the LCD 4601 on the scanner operation unit 4307 may be cleared.

Also, in FIG. 56, when it is detected that the cordless hand scanner 430 is mounted on the main part B for changing (S5602), a warning display and alarm rumble are stopped, but instead of stopping the above described warning display and alarm rumble, an alarm indicating that it is being charged may be given. In this case, at the time when the battery voltage exceeds the warning voltage (S7302) after the charge request message is sent from the cordless hand scanner 430 (S7312), the alarm indicating that it is being charged may be stopped.

Furthermore, the facsimile apparatus in this embodiment also performs a reception operation, but since this operation is based on a known process, description of thereof is omitted.

Seventh Embodiment

In the sixth embodiment, the wireless connection between the main part B and the hand scanner 430 is performed by exchanging the Inquiry command during initialization. That is, the inquiry command is exchanged, whereby the ID number can be exchanged among Bluetooth devices. However, in a usual facsimile apparatus, the main part B and the hand scanner 430 are manufactured and sold as a set.

Therefore, the seventh embodiment is an embodiment in which the ID number of the cordless hand scanner 430 is stored in the nonvolatile memory of the main part B in advance, and conversely the ID number of the main part B is stored in the nonvolatile memory of the cordless hand scanner 430 in advance, thereby making it possible to omit the exchange with the Inquiry command.

In this case, the main part B designates the ID number of the cordless hand scanner 430, and makes the wireless connection request using Serial Port Profile, based on the Bluetooth connection specification. When the cordless hand scanner 430 ensures that its ID number is included, it sends a wireless connection response signal, and the wireless link (Piconet) is established.

Furthermore, by storing the hopping sequence of the initialization setting operation in the nonvolatile memory in advance, the wireless link can be established quickly.

Thereafter, it operates based on a procedure similar to the procedure in the sixth embodiment.

Eighth Embodiment

In the sixth embodiment, transition to the Active mode is made when the operation is started, and transition to the Park mode is made when the operation is completed.

By the way, in the Park mode, power is also consumed because radio waves are exchanged regularly.

Then, the eighth embodiment is an embodiment in which sending of the radio wave is fully stopped in the case where wireless data communication is not performed for long hours, thereby making it possible to reduce power consumption.

Specifically, according to the third embodiment, as shown in FIG. 74, a copy or facsimile transmission operation are completed (S7401), after which a timer included in the first CPU 4300 or the second CPU 4311 is activated (S7402), and if after a lapse of five minutes or more, no operation requiring wireless data communication is performed (S7403 to S7404), then a Detach message is sent (S7405) to open Piconet to stop sending the radio wave, and a process is carried out so as to make transition to the idle mode. In this case, when an operation of copy or facsimile transmission is detected, Piconet is newly established as shown in S4805 and the following steps of FIG. 48 and S5005 and the following steps of FIG. 50.

Furthermore, in FIG. 74, transition to the idle mode is made directly after the operation is completed, but as described in the first embodiment, it is also possible to make transition to the Park mode temporarily and then make transition to the idle mode after a predetermined time period.

Also, if the send of the radio wave is stopped during a predefined time frame such as nighttime, and Piconet is reestablished in the morning, power consumption can be reduced.

Also, in the above described embodiment, the Park mode has been described as a low power consumption standby state, but power consumption can also be reduced similarly in the Hold mode or Sniff mode.

Ninth Embodiment

In the above described embodiment, in the case where the image read by the hand scanner 430 is transmitted to the communication line, only facsimile transmission is assumed.

This ninth embodiment is an embodiment in which the image read by the hand scanner 430 is converted into an electronic mail format to send the same as an electronic mail in the case where the image read by the hand scanner 430 is transmitted to the communication line. Also in this case, processes of timing of control of Bluetooth are identical to the processes in the above described respective embodiments.

As described above, according to the above sixth to ninth embodiments, since timing of the send of the radio wave is changed after a wireless data send/receive operation is completed, communication in the Piconet between the image communication apparatus and the portable scanner, etc. is curbed or stopped to curb the send of the radio wave or emit no radio wave when given time passes after the operation is completed, thus making it possible to reduce power consumption and use effectively frequency resources, and reducing a possibility that interference occurs when other terminals communicate.

Also, because the send/stop of the radio wave is switched depending on time, quick wireless connection can be achieved when the possibility of using wireless communication is high, while power consumption can be reduced as much as possible when the possibility of using wireless communication is low.

Also, because the mode of wireless communication can be changed depending on predetermined operations of the portable scanner such as selection of copy operation or transmission operation, hand copy can be performed by operating only the portable scanner even if the portable scanner exists at a location some distance from the image communication apparatus, when hand copy is required in the portable scanner, and facsimile transmission can be performed by operating only the portable scanner even if the portable scanner exists at a location some distance from the image communication apparatus, when facsimile transmission of the image read by the portable scanner is required, for example.

Furthermore, needless to say, a storage medium storing a program code of software achieving the function of the above described each embodiment is supplied to a system or apparatus, and the computer (or CPU and MPU) of the system or apparatus reads and executes the program code stored in the storage medium, whereby the object of the present invention is achieved.

In this case, the program code itself read from the storage medium achieves a new function of the present invention, and thus the storage medium storing the program code constitutes the present invention.

For storage media for supplying program codes, for example, floppy disks, hard disks, optical disks, magneto-optical disks, CD-ROMs, CD-Rs, magnetic tapes, nonvolatile memory cards, ROMs and the like may be used. Also, the program code may be supplied from the server computer via the communication network.

Also, needless to say, not only the case where the computer executes the read program code, whereby the function of the above described each embodiment is achieved, but also the case where the OS or the like operating on the computer performs part or all of actual process based on instructions of the program code, by which the function of the above described each embodiment is achieved is included.

Furthermore, needless to say, the case is also included where after the program code read from the storage medium is written in the memory provided in a feature expansion board inserted in the computer and a feature expansion unit connected to the computer, the CPU or the like provided in the feature expansion board and the feature expansion unit performs part or all of actual process based on instructions of the program code, by which the function of the above described each embodiment is achieved.

As described above, according to the present invention, the mode of wireless communication can be changed depending on a predetermined operation such as selection of copy operation or transmission operation. Thus, copy can be performed by operating only the scanner even if the scanner exists at a location some distance from the image communication apparatus, when a process for copy is required in the scanner, and facsimile transmission can be performed by operating only the scanner even if the scanner exists at a location some distance from the image communication apparatus, when facsimile transmission of the image read by the scanner is required, for example.

Also, the low power consumption state is released in predetermined timing, thus making it possible to reduce power consumption.

What is claimed is:

1. An image capture apparatus comprising:
an image capture unit, which captures an image;
a wireless communication device, which is configured to send the image captured by the image capture unit to another apparatus according to an operation at the image capture apparatus or to an operation at the other apparatus, and which has an image communication mode in which the image is communicated with the other apparatus, a low-power consumption mode in which electrical power for communication with the other apparatus is reduced, and an idle mode in which the wireless communication device does not send radio waves;
a detection device, which detects a completion of a printing operation by the other apparatus for the image sent by the wireless communication device, if the image is sent based on the operation at the image capture apparatus, and which detects the completion of the printing operation by the other apparatus for the image sent by the wireless communication device, if the image is sent based on the operation at the other apparatus; and
a mode changing controller, which keeps the communication with the other apparatus by the wireless communication device in the image communication mode before the completion of the printing in the other device is detected by the detection device, changes a mode of the communication with the other apparatus by the wireless communication device from the image communication mode to the low-power consumption mode, after a detection, by the detection device, of the completion of the printing operation by the other apparatus, and, if no operation requiring use of the wireless communication device is performed for a predetermined time after the mode of the wireless communication device is changed to the low-power consumption mode, releases a wireless communication connection between the image capture apparatus and the other apparatus and changes the mode of the communication with the other apparatus by the wireless communication device to the idle mode.

2. An image capture apparatus according to claim 1, further comprising a display device, which displays the completion of the printing operation by the other apparatus detected by the detection device, wherein the mode changing controller changes the mode of the wireless communication device from the image communication mode to the low-power consumption mode after the display device displays the completion of the printing operation by the other apparatus.

3. An image capture apparatus according to claim 1, further comprising a memory device arranged to store the captured image, wherein the detection device detects erasure of the image from the memory device based on an instruction from the other apparatus.

4. A control method performed by an image capture apparatus that includes a microprocessor, to reduce power consumption by the image capture apparatus, the method comprising steps of:

sending an image captured by the image capture apparatus to another apparatus by a wireless communication device of the image capture apparatus according to an operation at the image capture apparatus or to an operation at the other apparatus, wherein the wireless communication device has an image communication mode, in which the image is communicated with the other apparatus, a low-power consumption mode, in which electrical power for communication with the other apparatus is reduced, and an idle mode in which the wireless communication device does not send radio waves;

detecting a completion of a printing operation by the other apparatus for the image sent by the wireless communication device, if the image is sent based on the operation at the image capture apparatus, and detecting the completion of the printing operation by the other apparatus for the image sent by the wireless communication device, if the image is sent based on the operation at the other apparatus; and keeping the communication with the other apparatus by the wireless communication device in the image communication mode before the completion of the printing in the other device is detected, changing a mode of the communication with the other apparatus by the wireless communication device of the image capture apparatus from the image communication mode to the low-power consumption mode, after a detection, in the detecting step, of the completion of the printing operation by the other apparatus, and, if no operation requiring use of the wireless communication device is performed for a predetermined time after the mode of the wireless communication device is changed to the low-power consumption mode, releases a wireless communication connection between the image capture apparatus and the other apparatus and changes the mode of the communication with the other apparatus by the wireless communication device to the idle mode, wherein the keeping step is performed, at least in part, by the microprocessor.

* * * * *